__

US012551584B1

(12) United States Patent
Ludwig et al.

(10) Patent No.: US 12,551,584 B1
(45) Date of Patent: Feb. 17, 2026

(54) LEWIS Y RADIOIMMUNOTHERAPY FOR THE TREATMENT OF CANCER

(71) Applicant: Actinium Pharmaceuticals, Inc., New York, NY (US)

(72) Inventors: Dale L Ludwig, Rockaway, NJ (US); Eileen Geoghegan, Mamaroneck, NY (US)

(*) Notice: Subject to any disclaimer, the term of this patent is extended or adjusted under 35 U.S.C. 154(b) by 1107 days.

(21) Appl. No.: 17/544,522

(22) Filed: Dec. 7, 2021

Related U.S. Application Data

(60) Provisional application No. 63/122,026, filed on Dec. 7, 2020.

(51) Int. Cl.
| | | |
|---|---|---|
| *A61K 51/10* | (2006.01) | |
| *A61K 31/454* | (2006.01) | |
| *A61K 31/502* | (2006.01) | |
| *A61K 31/5025* | (2006.01) | |
| *A61K 31/55* | (2006.01) | |

(52) U.S. Cl.
CPC ........ *A61K 51/1096* (2013.01); *A61K 31/454* (2013.01); *A61K 31/502* (2013.01); *A61K 31/5025* (2013.01); *A61K 31/55* (2013.01)

(58) Field of Classification Search
None
See application file for complete search history.

(56) References Cited

U.S. PATENT DOCUMENTS

| | | | |
|---|---|---|---|
| 4,923,985 A | 5/1990 | Gansow | |
| 6,310,185 B1 * | 10/2001 | Wallace | C07K 16/30 530/387.3 |
| 6,417,384 B1 | 7/2002 | Counsell | |
| 7,029,674 B2 | 4/2006 | Carreno | |
| 7,705,130 B2 | 4/2010 | Rothe | |
| 7,834,019 B2 | 11/2010 | Sagara | |
| 7,846,440 B2 | 12/2010 | Schoeberl | |
| 7,935,708 B2 | 5/2011 | Sagara | |
| 8,288,396 B2 | 10/2012 | Goto | |
| 8,436,004 B2 | 5/2013 | Bamba | |
| 8,597,652 B2 | 12/2013 | Fuh | |
| 8,710,065 B2 | 4/2014 | Tong | |
| 8,716,297 B2 | 5/2014 | Woods | |
| 8,791,125 B2 | 7/2014 | Sagara | |
| 8,796,289 B2 | 8/2014 | Zhu | |
| 9,051,327 B2 | 6/2015 | Zhu | |
| 9,181,239 B2 | 11/2015 | Mastracchio | |
| 9,249,230 B2 | 2/2016 | Rothe | |
| 9,327,035 B2 | 5/2016 | Fuh | |
| 9,480,754 B2 | 11/2016 | Weichert | |
| 9,603,954 B2 | 3/2017 | Simon | |
| 9,714,244 B2 | 7/2017 | O'Dowd | |
| 9,718,821 B2 | 8/2017 | Woods | |
| 9,850,247 B2 | 12/2017 | Harrison | |
| 9,969,789 B2 | 5/2018 | Uger | |
| 10,413,607 B2 | 9/2019 | Bae | |
| 10,662,241 B1 | 5/2020 | Boyd-Kirkup | |
| 11,000,604 B2 | 5/2021 | Zeglis | |
| 2003/0223989 A1 | 12/2003 | Pluenneke | |
| 2006/0121030 A1 | 6/2006 | Schwarz | |
| 2006/0182744 A1 | 8/2006 | Strome | |
| 2006/0188439 A1 | 8/2006 | Strome | |
| 2008/0019905 A9 | 1/2008 | Strome | |
| 2008/0085278 A1 | 4/2008 | Durrant | |
| 2008/0166336 A1 | 7/2008 | Pluenneke | |
| 2009/0246206 A1 | 10/2009 | Nielsen | |
| 2010/0113445 A1 | 5/2010 | Deanda | |
| 2010/0239579 A1 | 9/2010 | Smith | |
| 2011/0097313 A1 | 4/2011 | Schönbrunn | |
| 2011/0104049 A1 | 5/2011 | Strome | |
| 2012/0058047 A9 | 3/2012 | Strome | |
| 2012/0165244 A1 | 6/2012 | Wu | |
| 2013/0071403 A1 | 3/2013 | Rolland | |
| 2013/0183311 A1 | 7/2013 | Nielsen | |
| 2013/0273078 A1 | 10/2013 | Rolland | |
| 2013/0280265 A1 | 10/2013 | Rolland | |
| 2014/0030187 A1 | 1/2014 | Weichert | |
| 2014/0193414 A1 | 7/2014 | Fuh | |
| 2014/0274909 A1 | 9/2014 | Orentas | |
| 2016/0222459 A1 | 8/2016 | Keating | |

(Continued)

FOREIGN PATENT DOCUMENTS

| | | |
|---|---|---|
| WO | 95/24484 A1 | 9/1995 |
| WO | 02/090360 A1 | 11/2002 |

(Continued)

OTHER PUBLICATIONS

Scott et al. Construction, production, and characterization of humanized anti-Lewis Y monoclonal antibody 3S193 for targeted immunotherapy of solid tumors. Cancer Res. Jun. 15, 2000;60(12):3254-61. PMID: 10866319. (Year: 2000).*

Abe K, McKibbin JM, Hakomor S. The Monoclonal Antibody Directed to Difucosylated Type2 Chain (Fucal→2Galβl→4[Fucal→3]GlcNAc Y Determinant)*. Journal of Biol. Chem. 1983; 258(19):11793-11797.

Boghaert ER, Sridharan L, Armellino DC, et al. Antibody-targeted chemotherapy with the calicheamicin conjugate hu3S193-N-Acetyl γ calicheamicin dimethyl hydrazide targets Lewisy and eliminates Lewisy-positive human carcinoma cells and xenografts. Clin Cancer Res. 2004;10(13):4538-4549.

Burvenich IJ, Lee FT, O'Keefe GJ, Makris D, Cao D, Gong S, Rigopoulos A, Allan LC, Brechbiel MW, Liu Z, Ramsland PA, Scott AM. Engineering anti-Lewis-Y hu3S193 antibodies with improved therapeutic ratio for radioimmunotherapy of epithelial cancers.

(Continued)

*Primary Examiner* — Daniel E Kolker
*Assistant Examiner* — Julia A Rossi

(57) ABSTRACT

Provided are compositions and methods for treating Lewis Y antigen positive cancers in mammalian subjects by administering an effective amount of a radionuclide-labeled Lewis Y antigen targeting agent such as an antibody labeled with an alpha particle-emitting radionuclide such as $^{225}$Ac. The methods may further include administration of additional agents, such as radiosensitizing agents, immune checkpoint therapies, CD47 blockades, and/or DNA damage response inhibitors.

7 Claims, 2 Drawing Sheets

Specification includes a Sequence Listing.

(56) References Cited

U.S. PATENT DOCUMENTS

| | | |
|---|---|---|
| 2017/0037145 A1 | 2/2017 | Geuijen |
| 2017/0058035 A1 | 3/2017 | Logtenberg |
| 2019/0300624 A1 | 10/2019 | Boyd-Kirkup |
| 2020/0102393 A1 | 4/2020 | Throsby |
| 2020/0291049 A1 | 9/2020 | Weichert |
| 2020/0308275 A1 | 10/2020 | Boyd-Kirkup |
| 2021/0024651 A1 | 1/2021 | Boyd-Kirkup |
| 2021/0155698 A1 | 5/2021 | Logtenberg |
| 2021/0206875 A1 | 7/2021 | Throsby |
| 2021/0246206 A1 | 8/2021 | Liu |

FOREIGN PATENT DOCUMENTS

| | | | | |
|---|---|---|---|---|
| WO | 2005/117973 A2 | 12/2005 | | |
| WO | 2006/091209 A2 | 8/2006 | | |
| WO | 2007/077028 A2 | 7/2007 | | |
| WO | 2008/100624 A2 | 8/2008 | | |
| WO | 2010/108127 A1 | 9/2010 | | |
| WO | 2011/143624 A2 | 11/2011 | | |
| WO | 2015/019037 A1 | 2/2015 | | |
| WO | 2016/187514 A1 | 11/2016 | | |
| WO | 2017/013436 A1 | 1/2017 | | |
| WO | 2017/155937 A1 | 9/2017 | | |
| WO | 2017/216559 A1 | 12/2017 | | |
| WO | 2018/011569 A1 | 1/2018 | | |
| WO | 2018/011570 A1 | 1/2018 | | |
| WO | WO-2018237287 A1 * | 12/2018 | | A61K 38/21 |
| WO | WO-2019010299 A1 * | 1/2019 | | A61K 47/6879 |
| WO | 2019/185164 A1 | 10/2019 | | |
| WO | 2019/185878 A1 | 10/2019 | | |

OTHER PUBLICATIONS

Chen J, Pan Z, Han L, Zhou Y, Zong H, Wang L, Sun R, Jiang H, Xie Y, Yuan Y, Wu M, Bian Y, Zhang B, Zhu J. A Novel Bispecific Antibody Targeting CD3 and Lewis Y with Potent Therapeutic Efficacy against Gastric Cancer. Biomedicines. Aug. 20, 2021;9(8):1059.

Clarke K, Lee FT, Brechbiel MW, Smyth FE, Old LJ, Scott AM. Therapeutic efficacy of anti-Lewis(y) humanized 3S193 radioimmunotherapy in a breast cancer model: enhanced activity when combined with taxol chemotherapy. Clin Cancer Res. 2000;6(9):3621-3628.

Herbertson RA, Tebbutt NC, Lee F-T, et al. Phase I biodistribution and pharmacokinetic study of Lewis Y-targeting immunoconjugate CMD-193 in patients with advanced epithelial cancers. Clin Cancer Res. 2009;15(21):6709-6715.

Hou R, Jiang L, Liu D, Lin B, Hu Z, Gao J, Zhang D, Zhang S, Iwamori M. Lewis(y) antigen promotes the progression of epithelial ovarian cancer by stimulating MUC1 expression. Int J Mol Med. Aug. 2017;40(2):293-302.

Kelly MP, Lee FT, Smyth FE, Brechbiel MW, Scott AM. Enhanced efficacy of 90Y-radiolabeled anti-Lewis Y humanized monoclonal antibody hu3S193 and paclitaxel combined-modality radioimmunotherapy in a breast cancer model. J Nucl Med. 2006;47(4):716-725.

Kelly MP, Lee ST, Lee F-T, et al. Therapeutic efficacy of 177 Lu-CHX-A"-DTPA-hu3S193 radioimmunotherapy in prostate cancer is enhanced by EGFR inhibition or docetaxel chemotherapy. Prostate. 2009;69(1):92-104.

Kitamura K, Stockert E, Garin-Chesa P, et al. Specificity analysis of blood group Lewis-y (Le(y)) antibodies generated against synthetic and natural Le(y) determinants. Proc Natl Acad Sci U S A. 1994;91(26):12957-12961.

Krug LM, Milton DT, Jungbluth AA, et al. Targeting Lewis Y (Ley) in small cell lung cancer with a humanized monoclonal antibody, hu3S193: A pilot trial testing two dose levels. J Thorac Oncol. 2007;2(10):947-952.

Lai TY, Chen IJ, Lin RJ, Liao GS, Yeo HL, Ho CL, Wu JC, Chang NC, Lee AC, Yu AL. Fucosyltransferase 1 and 2 play pivotal roles in breast cancer cells. Cell Death Discov. Mar. 6, 2019;5:74.

Liu J, Zheng M, Qi Y, Wang H, Liu M, Liu Q, Lin B. Lewis(y) antigen-mediated positive feedback loopinduces and promotes chemotherapeutic resistance in ovarian cancer. Int J Oncol. Oct. 2018; 53(4):1774-1786.

Ma Y, Kowolik CM, Swiderski PM, Kortylewski M, Yu H, Horne DA, Jove R, Caballero OL, Simpson AJG, Lee F-T, Pillay V, Scott AM. Humanized Lewis-Y specific antibody-based delivery of STAT3 siRNA. ACS Chem Biol. 2011; 6(9):962-970.

Oruzio D, Waxenecker G, Aulmann C, Märkl B, Wagner T, Mudde G, Schuster M, Eller N, Mayer A, Stranner S, Himmler G, Loibner H, Schlimok G, Kircheis R, Nechansky A. Phase I Dose Escalation Study with the Lewis Y Carbohydrate Specific Humanized Antibody IGN311, Journal of Cancer Ther. 2011; 2:760-771.

Pai LH, Wittes R, Setser A, Willingham MC, Pastan I. Treatment of advanced solid tumors with immunotoxin LMB-1: An antibody linked to Pseudomonas exotoxin. Nat Med. 1996;2(3):350-353.

Pai-Scherf LH, Carrasquillo JA, Paik C, et al. Imaging and phase I study of 111In- and 90Y-labeled anti-LewisY monoclonal antibody B3. Clin Cancer Res. 2000;6(5):1720-1730.

Pastan I, Lovelace ET, Gallo MG, Rutherford A V., Magnani JL, Willingham MC. Characterization of monoclonal antibodies B1 and B3 that react with mucinous adenocarcinomas. Cancer Res. 1991;51(14):3781-3787.

Repetto-Llamazares A, Advantage of Lutetium-177 versus Radioiodine Immunoconjugate in Targeted Radionuclide Therapy of B-cell Tumors, Anticancer Research. 2014;34(7):3263-3269.

Scott AM, Geleick D, Rubira M, et al. Construction, production, and characterization of humanized anti-Lewis Y monoclonal antibody 3S193 for targeted immunotherapy of solid tumors. Cancer Res. 2000;60(12):3254-3261.

Scott AM Tebbutt N, Lee F-T, et al. A phase I biodistribution and pharmacokinetic trial of humanized monoclonal antibody Hu3s193 in patients with advanced epithelial cancers that express the Lewis-Y antigen. Clin Cancer Res. 2007;13(11):3286-3292.

Sharabi AB, Lim M, DeWeese TL, Drake CG. Radiation and checkpoint blockade immunotherapy: radiosensitisation and potential mechanisms of synergy. Lancet Oncol. 2015;16(13):e498-509.

Smaletz O, Diz MDPE, do Carmo CC, et al. A phase II trial with anti-Lewis-Y monoclonal antibody (hu3S193) for the treatment of platinum resistant/refractory ovarian, fallopian tube and primary peritoneal carcinoma. Gynecol Oncol. 2015;138(2):272-277.

Testa L, Mano M, Arai RJ, Bonadio RC, Serrano SV, Zorzetto MMC, Crocamo S, Smaletz O, Freitas-Junior R, Hoff PM. Phase II trial of humanized anti-Lewis Y monoclonal antibody for advanced hormone receptor-positive breast cancer that progressed following endocrine therapy. Clinics (Sao Paulo). Oct. 11, 2021;76:e3146.

Walle T, Monge RM, Cerwenka A, Ajona D, Melero I, Lecanda F. Radiation effects on antitumor immune responses: Current perspectives and challenges. Ther Adv Med Oncol. 2018;10.

Westwood JA, Murray WK, Trivett M, et al. The Lewis-Y carbohydrate antigen is expressed by many human tumors and can serve as a target for genetically redirected T cells despite the presence of soluble antigen in serum. J Immunother. 2009;32(3):292-301.

Zhang S, Zhang HS, Cordon-Cardo C, et al. Selection of tumor antigens as targets for immune attack using immunohistochemistry: II. Blood group-related antigens. Int J cancer. 1997;73(1):50-56.

* cited by examiner

FIG. 1

| SEQ ID NO | AMINO ACID SEQUENCE |
|---|---|
| 119 | EVQLVESGGGVVQPGRSLRLSCSSSGFTFS<u>DYYMY</u>WVRQAPGKGLEWVA<u>YMS NVGAITDYPDTVKG</u>RFTISRDNSKNTLFLQMDSLRPEDTGVYFCAR<u>GTRDGS WFAY</u>WGQGTPVTVSS<br>Heavy Chain Variable Region |
| 120 | EVQLVESGGGVVQPGRSLRLSCSTSGFTFSDYYMYWVRQAPGKGLEWVAYMS NVGAITDYPDTVKGRFTISRDNSKNTLFLQMDSLRPEDTGVYFCARGTRDGS WFAYWGQGTPVTVSS<br>Heavy Chain Variable Region |
| 121 | EVQLVESGGGVVQPGRSLRLSCSSSGFTFSDYYMYWVRQAPGKGLEWVAYMS NVGAITDYPDTVKGRFTISRDNAKNTLFLQMDSLRPEDTGVYFCARGTRDGS WFAYWGQGTPVTVSS<br>Heavy Chain Variable Region |
| 122 | EVQLVESGGGVVQPGRSLRLSCSSSGFTFSDYYMYWVRQAPGKGLEWVAYMS NVGAITDYPDTVKGRFTISRDNAKSTLFLQMDSLRPEDTGVYFCARGTRDGS WFAYWGQGTPVTVSS<br>Heavy Chain Variable Region |
| 123 | EVQLVESGGGVVQPGRSLRLSCSSSGFTFSDYYMYWVRQAPGKGLEWVAYMS NVGAITDYPDTVKGRFTISRDNAKSTLYLQMDSLRPEDTGVYFCARGTRDGS WFAYWGQGTPVTVSS<br>Heavy Chain Variable Region |
| 124 | DIQMTQSPSSLSASVGDRVTITC<u>RSSQRIVHSNGNTYLE</u>WYQQTPGKAPKLLIY <u>KVSNRFS</u>GVPSRFSGSGSGTDYTFTISSLQPEDIATYYC<u>FQGSHVPFT</u>FGQGTK LQIT<br>Light Chain Variable Region |
| 125 | DIQMTQSPSSLSASVGDRVTITCRSSQRIVHSNGNTYLEWYQQTPGKAPKLLIY KVSNRFSGVPSRFSGSGSGTDFTFTISSLQPEDIATYYCFQGSHVPFTFGQGTK LQIT<br>Light Chain Variable Region |

FIG. 2

| SEQ ID NO | AMINO ACID SEQUENCE |
|---|---|
| 126 | EVQLVESGGG<br>Heavy Chain N-terminal Region |
| 127 | DYYMY<br>Heavy Chain CDR1 |
| 128 | YMSNVGAITDYPDTVKG<br>Heavy Chain CDR2 |
| 129 | GTRDGSWFAY<br>Heavy Chain CDR3 |
| 130 | DIQMTQSPSS<br>Light Chain N-terminal Region |
| 131 | RSSQRIVHSNGNTYLE<br>Light Chain CDR1 |
| 132 | KVSNRFS<br>Light Chain CDR2 |
| 133 | FQGSHVPFT<br>Light Chain CDR3 |

# LEWIS Y RADIOIMMUNOTHERAPY FOR THE TREATMENT OF CANCER

CROSS-REFERENCE TO RELATED APPLICATIONS

This application claims the benefit of U.S. provisional application Ser. No. 63/122,026 filed Dec. 7, 2020 which is hereby incorporated by reference in its entirety.

SEQUENCE LISTING

The instant application contains a Sequence Listing which has been submitted electronically in ASCII format and is hereby incorporated by reference in its entirety. Said ASCII copy, created on Dec. 7, 2021, is named ATNM-013_SL_ST25.txt and is 212,329 bytes in size.

FIELD OF THE INVENTION

The present invention relates to the field of radioconjugates.

BACKGROUND OF THE INVENTION

Lewis Y (LeY) is a blood group-related carbohydrate antigen having the structure Fucα1→2Galβ1→4 [Fucα1→3] GlcNAc31→3R (Abe, 1983) that is overexpressed on the surface on numerous cancers of epithelial origin, including lung, breast, gastric, ovarian, colon, and pancreatic cancer (Kitamura, 1994; Zhang, 1997). LeY is expressed at high levels and at similar levels in both primary and metastatic lesions (Kitamura, 1994). While there is some expression of LeY on normal tissues including colon and gastric tissues, immunohistochemistry studies have shown that the antigen is largely restricted to epithelial cells at secretory borders (Zhang, 1997), thereby sequestering LeY from access by antibodies. As a result of this favorable expression pattern, several antibody-based cancer therapeutics have been developed that target LeY, such as naked and armed versions of the mouse anti-LeY antibody 3S193 (Kitamura, 1994) and a humanized version of the antibody hu3S193 (Scott, 2000), as well as B3 (Pastan, 1991), BR55-BR55/BR96, and IGN 311 (Oruzio, 2011).

The 3S193/hu3S193 antibody stands out as being exquisitely specific for LeY, while many of the other anti-LeY antibodies have demonstrated cross reactivity to other carbohydrate antigens (Kitamura, 1994), which may negatively impact clinical targeting of LeY and lead to toxicities. The antibody 3S193 was raised against the breast cancer cell line MCF-7 in Balb/c mice. After initial proof of concept studies showing in vitro binding to Lewis Y expressing cells and tumor targeting in xenograft models (Clarke, 2000), the antibody was humanized to create hu3S193 (Scott, 2000). This antibody was then evaluated preclinically as an unlabeled antibody (Scott, 2000) and as a radio-conjugate with $^{131}$I (Clark, 2000), $^{90}$Y (Kelly, 2006), and $^{177}$Lu (Kelly, 2009). Additionally, hu3S193 has been used to deliver siRNA to tumors (Ma, 2011) and for engineering of CAR T-cells targeting LeY-expressing tumors (Westwood, 2009).

In two separate Phase I biodistribution trials in patients with LeY-expressing epithelial solid tumors (Scott, 2007) and small cell lung cancer (SCLC; Krug, 2007), hu3S193 was radiolabeled with $^{111}$In and it was determined that the antibody demonstrates specific targeting to tumors with limited uptake in normal tissues. Hu3S193 was also engineered as an antibody drug-conjugate (ADC; Boghaert, 2004) and tested in a Phase I clinical biodistribution study, however the hu3S193-ADC construct demonstrated a different biodistribution profile than the unconjugated hu3S193 and no longer exhibited strong tumor-binding activity. Accordingly, further development of the hu3S193-ADC was halted (Herbertson, 2009). Studies with unlabeled hu3S193 were are also pursued in ovarian (Smaletz, 2015) and breast cancers, but demonstrated limited clinical efficacy and development has also been halted.

This historical development of hu3S193 as an armed antibody, as well as other armed LeY antibodies such as B3, suggests that the choice of the warhead (i.e., label) is critically important to the clinical safety and efficacy of the agent. Hu3S193 as a calicheamicin drug-conjugate lost tumor targeting ability (Herbertson, 2009). Moreover, while B3 was first developed with a *Pseudomonas* exotoxin toxin label and a $^{90}$Y radio-conjugate label, serious toxicity/immunogenicity profiles prevented further development (Pai, 1996; Pai-Scherf, 2000).

Accordingly, a superior warhead with increased potency and improved safety would substantially improve outcomes from an armed anti-LeY antibody therapy and is an object of the present disclosure.

SUMMARY OF THE INVENTION

The presently disclosed invention provides a novel radio-conjugate approach for LeY targets. More specifically, the present invention is related to a LeY targeting agent, such as a monoclonal antibody, peptide, or small molecule that targets LeY, labeled with a radioisotope, and methods of diagnosing and treating LeY-positive cancers using the radiolabeled LeY targeting agent.

According to certain aspects of the present invention, the LeY targeting agent useful for diagnostic purposes may be an anti-LeY antibody, peptide, or small molecule including a radioisotope, such as $^{111}$In, $^{68}$Ga, $^{64}$Cu, or $^{89}$Zr.

According to certain other aspects, the LeY targeting agent useful for therapeutic interventions may be an anti-LeY antibody, peptide, or small molecule including a radioisotope, such as: $^{131}$I, $^{125}$I, $^{123}$I, $^{90}$Y, $^{177}$Lu, $^{186}$Re, $^{188}$Re, $^{89}$Sr, $^{153}$Sm, $^{32}$P, $^{225}$Ac, $^{213}$Bi, $^{213}$Po, $^{211}$At, $^{212}$Bi, $^{213}$Bi, $^{223}$Ra, $^{227}$Th, $^{149}$Tb, $^{137}$Cs, $^{212}$Pb, or combinations thereof.

According to certain other aspects, the LeY targeting agent useful for therapeutic interventions may be an anti-LeY antibody, peptide, or small molecule including an alpha emitting radioisotope. Exemplary alpha emitting radioisotopes include $^{211}$At, $^{212}$Bi, $^{213}$Bi, $^{223}$Ra, $^{227}$Th, $^{149}$Tb, $^{212}$Pb, or $^{225}$Ac.

According to certain aspects, the LeY targeting agent useful for therapeutic interventions may be an anti-LeY antibody, peptide, or small molecule including $^{177}$Lu or $^{225}$Ac. According to preferred aspects, the LeY targeting agent includes the alpha emitting radioisotope actinium-225 ($^{225}$Ac).

According to certain aspects, the LeY-positive cancer may be a solid tumor.

Therapeutic methods of the presently disclosed invention generally include administering to a patient an effective amount of the LeY targeting agent. According to certain aspects, the effective amount of the LeY targeting agent may be a maximum tolerated dose (MTD) or may be a fractioned dose wherein the total amount of radiation administered in the fractioned doses is the MTD.

According to certain aspects, the LeY targeting agent includes a radiolabeled fraction and a non-radiolabeled fraction. As such, an effective amount of the LeY targeting agent may include a total protein dose of less than 100 mg, such as from 5 mg to 60 mg, or 5 mg to 45 mg. According to certain aspects, the total protein dose may be from 0.001 mg/kg to 3 mg/kg body weight of the subject, such as from 0.005 mg/kg to 2 mg/kg body weight of the subject. According to certain aspects, the total protein dose may be less than 2 mg/kg, or less than 1 mg/kg, less than 0.5 mg/kg, or even less than 0.1 mg/kg. A portion of the total protein dose is radiolabeled (i.e., radio-conjugate) as indicated, wherein the effective amount of the radiolabeled LeY targeting agent may depend on the specific radioisotope selected. Thus, the LeY targeting agent may include a radiolabeled fraction, such as with any of the radioisotopes indicated herein, and an unlabeled fraction.

According to certain aspects, an effective amount of an LeY targeting agent, such as an $^{225}$Ac-anti-LeY antibody, peptide, or small molecule, may include a dose of 0.1 to 20 uCi/kg body weight of the subject, such as 0.1 to 10 uCi/kg or 0.1 to 5 uCi/kg body weight of the subject, or 0.5 to 20 uCi/kg or 1 to 10 uCi/kg body weight of the subject.

According to certain aspects, the effective amount of the LeY targeting agent, such as an $^{225}$Ac-anti-LeY antibody, peptide, or small molecule may depend on the configuration of the targeting agent, i.e., full length antibody or antibody fragment (e.g., minibody, nanobody, etc). For example, when the LeY targeting agent includes an $^{225}$Ac-anti-LeY antibody that is a full-length antibody, the dose may be below 5 uCi/kg body weight of the subject, such as 0.1 to 5 uCi/kg body weight of the subject. Alternatively, when the LeY targeting agent includes an $^{225}$Ac-anti-LeY antibody that is a fragment, the dose may be greater than 5 uCi/kg body weight of the subject, such as 5 to 20 uCi/kg body weight of the subject.

According to certain aspects, the LeY targeting agent may be an antibody selected from 3S1931 and/or a humanized version thereof such as Hu3S1933, or any of the monoclonal antibodies B34, BR55-2, BR55/BR96, and IGN 133.

According to certain aspects, the LeY targeting agent may be a monoclonal antibody including a heavy chain variable region having an amino acid sequence as set forth in any one of SEQ ID NOS: 119-123. According to certain aspects, the LeY targeting agent may be a monoclonal antibody including a light chain variable region having an amino acid sequence as set forth in SEQ ID NO: 124 or 125. According to certain aspects, the LeY targeting agent may be a monoclonal antibody including a heavy chain variable region having the amino acid sequence as set forth in any one of SEQ ID NOS: 119-123 and a light chain variable region having the amino acid sequence as set forth in SEQ ID NO: 124 or 125.

According to certain aspects, the LeY targeting agent may be a monoclonal antibody including one or more of the heavy chain N-terminal region and complementarity determining regions (CDRs) having amino acid sequences as set forth in SEQ ID NOS: 126 and/or 127-129, respectively. According to certain aspects, the LeY targeting agent may be a monoclonal antibody including one or more of the light chain N-terminal region and CDRs having amino acid sequences as set forth in SEQ ID NOS: 130 and/or 131-133, respectively. According to certain aspects, the LeY targeting agent may be a monoclonal antibody including one or more of the heavy chain N-terminal region set forth in SEQ ID NO:126 and the heavy chain CDRs set forth in SEQ ID NOS: 127-129, and one or more of the light chain N-terminal region set forth in SEQ ID NO: 130 and the light chain CDRs having amino acid sequences as set forth in SEQ ID NOS: 131-133.

According to certain aspects, the LeY targeting agent may be administered according to a dosing schedule selected from the group consisting of one dose every 7, 10, 12, 14, 20, 24, 28, 35, and 42 days throughout a treatment period, wherein the treatment period includes at least two doses.

According to certain aspects, the LeY targeting agent may be administered according to a dose schedule that includes 2 doses, such as on days 1 and 5, 6, 7, 8, 9, or 10 of a treatment period, or days 1 and 8 of a treatment period.

According to certain aspects, the LeY targeting agent may be administered as a single bolus or infusion in a single subject specific dose.

According to certain aspects, the methods may further include administration of one or more further therapeutic agents, such as an anti-inflammatory agent, an immunosuppressive agent, an immunomodulatory agent, an antimyeloma agent, a cytokine, or a combination thereof.

According to certain aspects, the methods may further include administration of one or more chemotherapeutic agents. Exemplary chemotherapeutic agents include at least radiosensitizers that may synergize with the radiolabeled LeY targeting agent, such as temozolomide, cisplatin, and/or fluorouracil.

According to certain aspects, the methods may further include administration of one or more immune checkpoint therapies. Exemplary immune checkpoint therapies include an antibody against CTLA-4, PD-1, TIM-3, VISTA, BTLA, LAG-3, TIGIT, CD28, OX40, GITR, CD137, CD40, CD40L, CD27, HVEM, PD-L1, PD-L2, PD-L3, PD-L4, CD80, CD86, CD137-L, GITR-L, CD226, B7-H3, B7-H4, BTLA, TIGIT, GALS, KIR, 2B4, CD160, CGEN-15049, or any combination thereof. According to certain aspects, the immune checkpoint therapy may include an antibody against an immune checkpoint protein selected from the group consisting of an antibody against PD-1, PD-L1, PD-L2, CTLA-4, CD137, and a combination thereof.

According to certain aspects, the immune checkpoint therapy may be provided in a subject effective amount including a dose of 0.1 mg/kg to 50 mg/kg of the patient's body weight, such as 0.1-5 mg/kg, or 5-30 mg/kg.

According to certain aspects, the methods may further include administration of one or more DNA damage response inhibitors (DDRi). An exemplary DDRi includes at least one or more antibodies or small molecules targeting poly(ADP-ribose) polymerase (i.e., a poly(ADP-ribose) polymerase inhibitor or PARPi). According to certain aspects, the PARPi may be a small molecule therapeutic selected from the group consisting of olaparib, niraparib, rucaparib, talazoparib, and a combination thereof. According to certain aspects, the PARPi may be provided in a subject effective amount including 0.1 mg/day-1200 mg/day, such as 0.100 mg/day-600 mg/day, or 0.25 mg/day-1 mg/day. Exemplary subject effective amounts include 0.1 mg, 0.25 mg, 0.5 mg, 0.75 mg, 1.0 mg, 100 mg, 200 mg, 300 mg, 400 mg, 500 mg, 600 mg, 700 mg, 750 mg, 800 mg, 900 mg, and 1000 mg, taken orally in one or two doses per day.

Another exemplary DDRi includes an inhibitor of Ataxia telangiectasia mutated (ATM), Ataxia talangiectasia mutated and Rad-3 related (ATR), or Wee1. Exemplary inhibitors of ATM include KU-55933, KU-59403, wortmannin, CP466722, and KU-60019. Exemplary inhibitors of ATR include at least Schisandrin B, NU6027, NVP-BEA235, VE-821, VE-822, AZ20, and AZD6738. Exemplary inhibitors of Wee1 include AZD-1775 (i.e., adavosertib).

According to certain aspects, the methods may further include administration of one or more CD47 blockades. The CD47 blockade may include a monoclonal antibody or other agent that prevents CD47 binding to SIRPα or otherwise inhibits the CD47/SIRPα axis, such as magrolimab, lemzoparlimab, AO-176, AK117, IMC-002, IBI-188, IBI-322, BI 766063, ZL-1201, AXL148, RRx-001, ES004, SRF231, SHR-1603, TJC4, TTI-621, or TTI-622. Exemplary effective doses for the CD47 blockade include 0.05 to 5 mg/kg patient weight. The CD47 blockade may also include agents that modulate the expression of CD47 and/or SIRPα, such as a nucleic acid approach. An exemplary agent includes phosphorodiamidate morpholino oligomers (PMO) that block translation of CD47.

According to certain aspects, the methods may further include administration of a combination of further therapeutic agents. Exemplary combinations include at least one or more DDRi and/or one or more immune checkpoint therapies and/or one or more CD47 blockades and/or one or more chemotherapeutics.

According to certain aspects, the LeY targeting agent and the one or more further therapeutic agents may be administered simultaneously or sequentially. When more than one additional therapeutic agent is administered, the agents may be administered simultaneously or sequentially.

According to certain aspects of the present invention, the LeY targeting agent may be a portion of a multi-specific antibody. Thus, the methods may include administering to the subject an effective amount of a multi-specific antibody, wherein the multi-specific antibody includes: a first target recognition component which specifically binds to an epitope of LeY, and a second target recognition component which specifically binds to a different epitope of LeY than the first target recognition component, or an epitope of a different antigen.

Additional features, advantages, and embodiments of the invention may be set forth or apparent from consideration of the following detailed description, drawings if any, and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

FIG. 1 provides amino acid sequences of the heavy and light chain variable regions of a humanized antibody against LeY that may be embodied and/or used in various aspects of the present invention, wherein the specific residues from the original murine monoclonal antibody are substituted (Thr24, Ala74, Ser76 and Tyr79 in the heavy chain and Phe71 in the light chain; indicated in bold-only (not underlined) in the figure).

FIG. 2 provides the N-terminal region and complementarity determining regions of the heavy and light chains of a LeY monoclonal antibody that may be embodied in or used in the various aspects of the present invention.

DETAILED DESCRIPTION OF THE INVENTION

In one aspect, the presently disclosed invention provides methods for treating LeY-expressing cancers in mammalian subjects, such as human patients, that include administering to the subject an effective amount of a LeY targeting agent, such as a radiolabeled antibody, peptide, or small molecule, alone or in combination with one or more therapeutic agents and/or treatment modalities.

Additional therapeutic agents that may be employed include, for example, at least one or more immune checkpoint therapies and/or one or more inhibitors of a component of the DNA damage response pathway (i.e., a DNA damage response inhibitor, DDRi, such as one or more agents against poly(ADP-ribose) polymerase, i.e., PARPi), and/or one or more CD47/SIRPα axis blockades and/or one or more chemotherapeutic agents such as radiosensitizers. Additional therapeutic agents and modalities may, for example, also include an anti-inflammatory agent, an immunosuppressive agent, an immunomodulatory agent, an antimyeloma agent, a cytokine, external beam radiation, brachytherapy, or a combination thereof.

The presently disclosed invention also provides methods for diagnosing patients having LeY-positive cancers. The presently disclosed invention further provides methods including diagnosing patients having LeY-positive cancers, followed by treating those patients according to any of the methods of treatment disclosed herein.

Prior to setting forth the invention in greater detail, it may be helpful to an understanding thereof to set forth definitions of certain terms to be used hereinafter.

Definitions and Abbreviations

The singular forms "a," "an," "the" and the like include plural referents unless the context clearly dictates otherwise. Thus, for example, reference to "an" antibody includes both a single antibody and a plurality of different antibodies.

The term "about" when used in this disclosure in connection with a numerical designation or value, e.g., in describing temperature, time, amount, and concentration, including in the description of a range, indicates a variance of ±10% and, within that larger variance, variances of ±5% or ±1% of the numerical designation or value.

As used herein, "administer", with respect to a targeting agent such as an antibody, antibody fragment, Fab fragment, or aptamer, means to deliver the agent to a subject's body via any known method suitable for antibody delivery. Specific modes of administration include, without limitation, intravenous, transdermal, subcutaneous, intraperitoneal, intrathecal and intra-tumoral administration. Exemplary administration methods for antibodies may be as substantially described in International Publication No. WO 2016/187514, incorporated by reference herein.

In addition, in this invention, antibodies can be formulated using one or more routinely used pharmaceutically acceptable carriers or pharmaceutically acceptable excipients. Such carriers/excipients are well known to those skilled in the art. For example, injectable drug delivery systems include solutions, suspensions, gels, microspheres and polymeric injectables, and can include excipients such as solubility-altering agents (e.g., ethanol, propylene glycol and sucrose) and polymers (e.g., polycaprylactones and PLGA's).

As used herein, the term "antibody" includes, without limitation, (a) an immunoglobulin molecule including two heavy chains and two light chains and which recognizes an antigen; (b) polyclonal and monoclonal immunoglobulin molecules; (c) monovalent and divalent fragments thereof, such as Fab, di-Fab, scFvs, diabodies, minibodies, and nanobodies (sdAb); (d) naturally occurring and non-naturally occurring, such as wholly synthetic antibodies, IgG-Fc-silent, and chimeric; and (e) bi-specific forms thereof. Immunoglobulin molecules may derive from any of the commonly known classes, including but not limited to IgA, secretory IgA, IgG and IgM. IgG subclasses are also well known to those in the art and include, but are not limited to, human IgG1, IgG2, IgG3 and IgG4. The N-terminus of each chain defines a "variable region" of about 100 to 110 or more amino acids primarily responsible for antigen recognition. The terms variable light chain (VL) and variable heavy chain (VH) refer to the variable regions of light and heavy chains respectively. Antibodies may be human, humanized or nonhuman. When a specific aspect of the presently disclosed invention refers to or recites an "antibody," it is envisioned as referring to any of the full-length antibodies or fragments thereof disclosed herein, unless explicitly denoted otherwise.

A "humanized" antibody refers to an antibody in which some, most or all amino acids outside the CDR domains of a non-human antibody are replaced with corresponding amino acids derived from human immunoglobulins. In one embodiment of a humanized form of an antibody, some, most or all of the amino acids outside the CDR domains have been replaced with amino acids from human immunoglobulins, whereas some, most or all amino acids within one or more CDR regions are unchanged. Small additions, deletions, insertions, substitutions or modifications of amino acids are permissible as long as they do not abrogate the ability of the antibody to bind to a particular antigen. A "humanized" antibody retains an antigenic specificity similar to that of the original antibody.

A "chimeric antibody" refers to an antibody in which the variable regions are derived from one species and the constant regions are derived from another species, such as an antibody in which the variable regions are derived from a mouse antibody and the constant regions are derived from a human antibody.

A "complementarity-determining region", or "CDR", refers to amino acid sequences that, together, define the binding affinity and specificity of the variable region of a native immunoglobulin binding site. There are three CDRs in each of the light and heavy chains of an antibody.

A "framework region", or "FR", refers to amino acid sequences interposed between CDRs, typically conserved, that act as the scaffold between the CDRs.

A "constant region" refers to the portion of an antibody molecule that is consistent for a class of antibodies and is defined by the type of light and heavy chains. For example, a light chain constant region can be of the kappa or lambda chain type and a heavy chain constant region can be of one of the five chain isotypes: alpha, delta, epsilon, gamma or mu. This constant region, in general, can confer effector functions exhibited by the antibodies. Heavy chains of various subclasses (such as the IgG subclass of heavy chains) are mainly responsible for different effector functions.

As used herein, a "LeY targeting agent" includes, without limitation, an antibody as defined herein, e.g., full length antibody, minibody, or nanobody, that binds to any available epitope of LeY with a high immunoreactivity. An exemplary antibody that may be embodied in and/or used in the various aspects of the present invention includes an antibody, such an IgG or an antigen-binding fragment thereof such as a Fab or Fab$_2$, or an scFv, against LeY including a heavy chain variable region having the amino acid sequence as set forth in any one of SEQ ID NO: 119-123, and/or a light chain variable region having the amino acid sequence as set forth in SEQ ID NO:124 or 125. Additional exemplary antibodies against LeY include those having a heavy chain with one or more of the CDRs having amino acid sequences as set forth in SEQ ID NOS: 127-129, and/or a light chain with one or more of the CDRs having the amino acid sequences as set forth in SEQ ID NOS: 131-133, and/or a heavy chain with an N-terminal region having an amino acid sequence as set forth in SEQ ID NO:126, and/or a light chain with an N-terminal region having the amino acid sequence as set forth in SEQ ID NO: 130. See also FIGS. 1 and 2 for details on these sequences. Any combination of light chain sequences and/or heavy chain sequences listed herein is possible and within the scope of the presently disclosed invention.

Exemplary antibodies against LeY further include at least 3S1931 and/or a humanized version thereof such as Hu3S1933, or any of the monoclonal antibodies B34, BR55-2, BR55/BR96, and IGN 133.

According to certain aspects, the LeY targeting agent may be an antibody mimetic, such as a DARPin, or an aptamer, or a peptide or a small molecule that binds to LeY.

As used herein, "Immunoreactivity" refers to a measure of the ability of an immunoglobulin to recognize and bind to a specific antigen. "Specific binding" or "specifically binds" or "binds" refers to an antibody binding to an antigen or an epitope within the antigen with greater affinity than for other antigens within a relevant context, such as within the treatment subject. Typically, the antibody binds to the antigen or the epitope within the antigen with an equilibrium dissociation constant ($K_D$) of about $1\times10^{-8}$ M or less, for example about $1\times10^{-9}$ M or less, about $1\times10^{-10}$ M or less, about $1\times10^{-11}$ M or less, or about $1\times10^{-12}$ M or less, typically with the $K_D$ that is at least one hundred fold less than its $K_D$ for binding to a nonspecific antigen (e.g., BSA, casein). The dissociation constant may be measured using standard procedures. Antibodies that specifically bind to the antigen or the epitope within the antigen may, however, have cross-reactivity to other related antigens, for example to the same antigen from other species (homologs), such as human or monkey, for example *Macaca fascicularis* (cynomolgus, cyno), *Pan troglodytes* (chimpanzee, chimp) or *Callithrix jacchus* (common marmoset, marmoset).

An "epitope" refers to the target molecule site (e.g., at least a portion of an antigen) that is capable of being recognized by, and bound by, a targeting agent such as an antibody, antibody fragment, Fab fragment, or aptamer. For a protein antigen, for example, this may refer to the region of the protein (i.e., amino acids, and particularly their side chains) that is bound by the antibody. Overlapping epitopes include at least one to five common amino acid residues. Methods of identifying epitopes of antibodies are known to those skilled in the art and include, for example, those described in Antibodies, A Laboratory Manual, Cold Spring Harbor Laboratory, Ed Harlow and David Lane (1988).

As used herein, the terms "proliferative disorder" and "cancer" may be used interchangeably and may include, without limitation, a solid cancer (e.g., a tumor) and hematological cancers. In general, LeY-positive cancers may be treated using the radiolabeled LeY targeting agent embodiments of the invention. Cancers that may be treated according to the invention include, without limitation, breast cancer such as tamoxifen/endocrine-resistant breast cancer or triple-negative breast cancer (TNBC), bone cancer, pancreatic cancer, skin cancer such as melanoma, cancer of the head or neck, cutaneous or intraocular malignant melanoma, uterine cancer, ovarian cancer, prostate cancer such as castration resistant prostate cancer (CRPC), colorectal cancer, rectal cancer, cancer of the anal region, stomach cancer, testicular cancer, uterine cancer, carcinoma of the fallopian tubes, carcinoma of the endometrium, carcinoma of the cervix, carcinoma of the vagina, carcinoma of the vulva, cancer of the esophagus, cancer of the small intestine, cancer of the endocrine system, cancer of the thyroid gland, cancer of the parathyroid gland, cancer of the adrenal gland, sarcoma of soft tissue, cancer of the urethra, cancer of the penis, pediatric tumors, cancer of the bladder, cancer of the kidney or ureter, carcinoma of the renal pelvis, neoplasm of the central nervous system (CNS), primary CNS lymphoma, tumor angiogenesis, spinal axis tumor, brain stem glioma, pituitary adenoma, Kaposi's sarcoma, epidermoid cancer, squamous cell cancer, environmentally-induced cancers including those induced by asbestos. Such cancers may be metastatic or non-metastatic.

According to certain aspects, the solid cancer treated may be breast cancer, gastric cancer, bladder cancer, cervical cancer, endometrial cancer, skin cancer, stomach cancer, testicular cancer, esophageal cancer, bronchioloalveolar cancer, prostate cancer, colorectal cancer, ovarian cancer, cervical epidermoid cancer, pancreatic cancer, lung cancer such as non-small cell lung carcinoma (NSCLC), renal cancer, head and neck cancer such as head and neck squamous cell carcinoma, or any combination thereof.

The LeY targeting agent includes a radioisotope. As used herein, a "radioisotope" may be, for example, any of $^{131}$I, $^{125}$I, $^{123}$I, $^{90}$Y, $^{177}$Lu, $^{186}$Re, $^{188}$Re, $^{89}$Sr, $^{153}$Sm, $^{32}$P, $^{225}$Ac, $^{213}$Bi, $^{213}$Po, $^{211}$At, $^{212}$Bi, $^{213}$Bi, $^{223}$Ra, $^{227}$Th, $^{149}$Tb, $^{137}$Cs, $^{212}$Pb and $^{103}$Pd. According to certain aspects, the radioisotope is an alpha-emitting isotope, such as $^{211}$At, $^{212}$Bi, $^{213}$Bi, $^{223}$Ra, $^{227}$Th, $^{149}$Th, $^{212}$Pb, or $^{225}$Ac. Methods for affixing a radioisotope to a protein such as an antibody or antibody fragment (i.e., "labeling" the protein with the radioisotope) are well known in the art. Specific compositions and methods for labeling are described, for example, in International Publication No. WO 2017/155937, U.S. Pat. Nos. 9,603,954 and 11,000,604.

According to certain aspects, the LeY targeting agent, such as an antibody, peptide, or small molecule, is radiolabeled with $^{225}$Ac ("$^{225}$Ac-labeled"), and the effective amount may be, for example, below 50.0 uCi/kg (i.e., where the amount of $^{225}$Ac administered to the subject delivers a radiation dose of below 50.0 uCi per kilogram of subject's body weight). According to certain aspects, when the LeY targeting agent is $^{225}$Ac-labeled, the effective amount is below 50 μCi/kg, 40 μCi/kg, 30 μCi/kg, 20 μCi/kg, 10 μCi/kg, 5 μCi/kg, 4 μCi/kg, 3 μCi/kg, 2 μCi/kg, 1 μCi/kg, or even 0.5 μCi/kg. According to certain aspects, when the LeY targeting agent is $^{225}$Ac-labeled, the effective amount is at least 0.05 μCi/kg, or 0.1 μCi/kg, 0.2 μCi/kg, 0.3 μCi/kg, 0.4 μCi/kg, 0.5 μCi/kg, 1 μCi/kg, 2 μCi/kg, 3 μCi/kg, 4 μCi/kg, 5 μCi/kg, 6 μCi/kg, 7 μCi/kg, 8 μCi/kg, 9 μCi/kg, 10 μCi/kg, 12 μCi/kg, 14 μCi/kg, 15 μCi/kg, 16 μCi/kg, 18 μCi/kg, 20 μCi/kg, 30 μCi/kg, or 40 μCi/kg. According to certain aspects, the $^{225}$Ac-labeled anti-LeY targeting agent may be administered at a dose that includes any combination of upper and lower limits as described herein, such as from at least 0.1 μCi/kg to at or below 5 μCi/kg, or from at least 5 μCi/kg to at or below 20 μCi/kg.

According to certain aspects, the LeY targeting agent, such as an antibody, peptide, or small molecule, is $^{225}$Ac-labeled, and the effective amount may be below 2 mCi (i.e., wherein the $^{225}$Ac is administered to the subject in a non-weight-based dosage). According to certain aspects, the effective dose of the $^{225}$Ac-labeled LeY targeting agent may be below 1 mCi, such as 0.9 mCi, 0.8 mCi, 0.7 mCi, 0.6 mCi, 0.5 mCi, 0.4 mCi, 0.3 mCi, 0.2 mCi, 0.1 mCi, 90 μCi, 80 μCi, 70 μCi, 60 μCi, 50 μCi, 40 μCi, 30 μCi, 20 μCi, 10 μCi, or 5 μCi. The effective amount of $^{225}$Ac-labeled LeY targeting agent may be at least 2 μCi, such as at least 5 μCi, 10 μCi, 20 μCi, 30 μCi, 40 μCi, 50 μCi, 60 μCi, 70 μCi, 80 μCi, 90 μCi, 100 μCi, 200 μCi, 300 μCi, 400 μCi, 500 μCi, 600 μCi, 700 μCi, 800 μCi, 900 μCi, 1 mCi, 1.1 mCi, 1.2 mCi, 1.3 mCi, 1.4 mCi, or 1.5 mCi. According to certain aspects, the $^{225}$Ac-labeled LeY targeting agent may be administered at a dose that includes any combination of upper and lower limits as described herein, such as from at least 2 μCi to at or below 1 mCi, or from at least 2 μCi to at or below 250 μCi, or from 75 μCi to at or below 400 μCi.

According to certain aspects, the $^{225}$Ac-labeled LeY targeting agent includes a single dose that delivers less than 12Gy, or less than 8 Gy, or less than 6 Gy, or less than 4 Gy, or less than 2 Gy, such as doses of 2 Gy to 8 Gy, to the subject, such as predominantly to the targeted solid tumor.

According to certain aspects, the LeY targeting agent, such as an antibody, peptide, or small molecule, is radiolabeled with $^{177}$Lu ("$^{177}$Lu-labeled"), and the effective amount may be, for example, below 1 mCi/kg (i.e., where the amount of $^{177}$Lu-labeled antibody administered to the subject delivers a radiation dose of below 1000 mCi per kilogram of subject's body weight). According to certain aspects, when the LeY targeting agent is an antibody that is $^{177}$Lu-labeled, and the effective amount is below 900 μCi/kg, 800 μCi/kg, 700 μCi/kg, 600 μCi/kg, 500 μCi/kg, 400 μCi/kg, 300 μCi/kg, 200 μCi/kg, 150 μCi/kg, 100 μCi/kg, 80 μCi/kg, 60 μCi/kg, 50 μCi/kg, 40 μCi/kg, 30 μCi/kg, 20 μCi/kg, 10 μCi/kg, 5 μCi/kg, or 1 μCi/kg. According to certain aspects, the effective amount of the $^{177}$Lu-labeled antibody is at least 1 μCi/kg, 2.5 μCi/kg, 5 μCi/kg, 10 μCi/kg, 20 μCi/kg, 30 μCi/kg, 40 μCi/kg, 50 μCi/kg, 60 μCi/kg, 70 μCi/kg, 80 μCi/kg, 90 μCi/kg, 100 μCi/kg, 150 μCi/kg, 200 μCi/kg, 250 μCi/kg, 300 μCi/kg, 350 μCi/kg, 400 μCi/kg or 450 μCi/kg. According to certain aspects, the $^{177}$Lu-labeled antibody may be administered at a dose that includes any combination of upper and lower limits as described herein, such as from at least 5 mCi/kg to at or below 50 μCi/kg, or from at least 50 mCi/kg to at or below 500 μCi/kg.

According to certain aspects, the LeY targeting agent, such as an antibody, peptide or small molecule, is $^{177}$Lu-labeled, and the effective amount may be below 45 mCi, such as below 40 mCi, 30 mCi, 20 mCi, 10 mCi, 5 mCi, 3.0 mCi, 2.0 mCi, 1.0 mCi, 800 μCi, 600 μCi, 400 μCi, 200 μCi, 100 μCi, or 50 μCi. The effective amount of $^{177}$Lu-labeled LeY targeting agent may be at least 10 μCi, such as at least 25 μCi, 50 μCi, 100 μCi, 200 μCi, 300 μCi, 400 μCi, 500 μCi, 600 μCi, 700 μCi, 800 μCi, 900 μCi, 1 mCi, 2 mCi, 3 mCi, 4 mCi, 5 mCi, 10 mCi, 15 mCi, 20 mCi, 25 mCi, 30 mCi. According to certain aspects, an $^{177}$Lu-labeled antibody may be administered at a dose that includes any combination of upper and lower limits as described herein, such as from at least 10 mCi to at or below 30 mCi, or from at least 100 μCi to at or below 3 mCi, or from 3 mCi to at or below 30 mCi.

In one aspect, a composition including a LeY targeting agent includes both a radionuclide labeled portion of the targeting agent and a non-labeled portion of the targeting agent. Such a composition may be a patient-specific composition. According to certain aspects of the present invention, when the LeY targeting agent is labeled with a radioisotope, the majority of the targeting agent (antibody, antibody fragment, etc.) administered to a patient may consist of non-radiolabeled targeting agent, with the minority being the radiolabeled targeting agent. The ratio of radiolabeled to non-radiolabeled targeting agent can be adjusted using known methods. According to certain aspects of the present invention, a composition including the LeY targeting agent, such as a patient-specific composition, may include the LeY targeting agent in a ratio of labeled:

unlabeled LeY targeting agent of from about 0.01:10 to 1:1, such as 0.1:10 to 1:1 labeled: unlabeled.

According to certain aspects of the present invention, a protein or peptide LeY targeting agent, such as an antibody or antibody fragment, may be provided in a total protein amount of up to 100 mg, such as up to 60 mg, such as 5 mg to 45 mg, or a total protein amount of from 0.001 mg/kg patient weight to 3.0 mg/kg patient weight, such as from 0.005 mg/kg patient weight to 2.0 mg/kg patient weight, or from 0.01 mg/kg patient weight to 1 mg/kg patient weight, or from 0.1 mg/kg patient weight to 0.6 mg/kg patient weight, or 0.3 mg/kg patient weight, or 0.4 mg/kg patient weight, or 0.5 mg/kg patient weight, or 0.6 mg/kg patient weight.

This inventive combination of a labeled fraction and a non-labeled fraction of the antibody or other biologic delivery vehicle allows the composition to be tailored to a specific patient, wherein each of the radiation dose and the protein dose of the antibody or other biologic delivery vehicle are personalized to that patient based on at least one patient specific parameter. As such, each vial of the composition may be made for a specific patient, where the entire content of the vial is delivered to that patient in a single dose. When a treatment regime calls for multiple doses, each dose may be formulated as a patient specific dose in a vial to be administered to the patient as a "single dose" (i.e., full contents of the vial administered at one time). The subsequent dose may be formulated in a similar manner, such that each dose in the regime provides a patient specific dose in a single dose container. One of the advantages of such a composition is that there will be no left-over radiation that would need to be discarded or handled by the medical personnel, e.g., no dilution, or other manipulation to obtain a dose for the patient. When provided in a single dose container, the container is simply placed in-line in an infusion tubing set for infusion to the patient. Moreover, the volume can be standardized so that there is a greatly reduced possibility of medical error (i.e., delivery of an incorrect dose, as the entire volume of the composition is to be administered in one infusion).

Thus, according to certain aspects, the LeY targeting agent may be provided as a single dose composition tailored to a specific patient, wherein the amount of labeled and unlabeled LeY targeting agent in the composition may depend on one or more of a patient weight, age, gender, disease state, and/or health status, such as detailed in International Publication No. WO 2016/187514. According to certain aspects, the LeY targeting agent may be provided as a multi-dose therapeutic, wherein each dose in the treatment regime is provided as a patient specific composition. The patient-specific composition may include labeled and unlabeled LeY targeting agents, wherein the amounts of each depend on one or more of patient weight, age, gender, disease state, and/or health status.

As used herein, the terms "subject" and "patient" are interchangeable and include, without limitation, a mammal such as a human, a non-human primate, a dog, a cat, a horse, a sheep, a goat, a cow, a rabbit, a pig, a rat and a mouse. Where the subject is human, the subject can be of any age. For example, the subject can be 60 years or older, 65 or older, 70 or older, 75 or older, 80 or older, 85 or older, or 90 or older. Alternatively, the subject can be 50 years or younger, 45 or younger, 40 or younger, 35 or younger, 30 or younger, 25 or younger, or 20 or younger. For a human subject afflicted with cancer, the subject can be newly diagnosed, or relapsed and/or refractory, or in remission.

As used herein, "treating" a subject afflicted with a cancer shall include, without limitation, (i) slowing, stopping or reversing the cancer's progression, (ii) slowing, stopping or reversing the progression of the cancer's symptoms, (iii) reducing the likelihood of the cancer's recurrence, and/or (iv) reducing the likelihood that the cancer's symptoms will recur. According to certain preferred aspects, treating a subject afflicted with a cancer means (i) reversing the cancer's progression, ideally to the point of eliminating the cancer, and/or (ii) reversing the progression of the cancer's symptoms, ideally to the point of eliminating the symptoms, and/or (iii) reducing or eliminating the likelihood of relapse (i.e., consolidation, which ideally results in the destruction of any remaining cancer cells).

"Chemotherapeutic", in the context of this invention, shall mean a chemical compound which inhibits or kills growing cells and which can be used or is approved for use in the treatment of cancer. Exemplary chemotherapeutic agents include cytostatic agents which prevent, disturb, disrupt or delay cell division at the level of nuclear division or cell plasma division. Such agents may stabilize microtubules, such as taxanes, in particular docetaxel or paclitaxel, and epothilones, in particular epothilone A, B, C, D, E, and F, or may destabilize microtubules such as vinca alkaloids, in particular vinblastine, vincristine, vindesine, vinflunine, and vinorelbine. Exemplary chemotherapeutics also include radiosensitizers that may synergize with the radiolabeled LeY, such as temozolomide, cisplatin, and/or fluorouracil.

"Therapeutically effective amount" or "effective amount" refers to an amount effective, at dosages and for periods of time necessary, to achieve a desired therapeutic result. A therapeutically effective amount may vary according to factors such as the disease state, age, sex, and weight of the individual, and the ability of a therapeutic or a combination of therapeutics to elicit a desired response in the individual. Exemplary indicators of an effective therapeutic or combination of therapeutics include, for example, improved well-being of the patient, reduction in a tumor burden, arrested or slowed growth of a tumor, and/or absence of metastasis of cancer cells to other locations in the body. According to certain aspects, "therapeutically effective amount" or "effective amount" refers to an amount of the LeY targeting agent that may deplete or cause a reduction in the overall number of cells expressing LeY, or an amount of the LeY targeting agent that may inhibit growth of cells expressing LeY.

As used herein, "depleting", with respect to cells expressing LeY, shall mean to lower the population of at least one type of cells that express or overexpress LeY (e.g., LeY-positive cells in a solid tumor or circulating in a subject's blood). According to certain aspects of this invention, a decrease is determined by comparison of the numbers of LeY-positive cells in the subject's blood or in a tissue biopsy, such as from the solid tumor, before and after initiation of treatment with the LeY targeting agent. As such, and by way of example, a subject's LeY-positive cells may be considered to be depleted if the population is lowered, such as by at least 10%, 20%, 30%, 40%, 50%, 60%, 70%, 80%, 90% or 99%.

"Inhibits growth" refers to a measurable decrease or delay in the growth of a malignant cell or tissue (e.g., tumor) in vitro or in vivo when contacted with a therapeutic or a combination of therapeutics or drugs, when compared to the decrease or delay in the growth of the same cells or tissue in the absence of the therapeutic or the combination of therapeutic drugs. Inhibition of growth of a malignant cell or tissue in vitro or in vivo may be at least about 10%, 20%, 30%, 40%, 50%, 60%, 70%, 80%, 90%, 95%, 96%, 97%, 98%, 99%, or 100%.

In the context of the present invention, an "immune checkpoint therapy" encompasses therapies such as antibodies capable of down-regulating at least partially the function of an inhibitory immune checkpoint (antagonist) and/or up-regulating at least partially the function of a stimulatory immune checkpoint (agonist). For example, an immune checkpoint therapy may refer to an antibody against an immune checkpoint inhibitor (ICI) that may be upregulated in certain cancers, and thus may inhibit the function of the ICI.

The term "DDRi" refers to an inhibitor of a DNA damage response pathway protein, of which a PARPi is an example. The term "PARPi" refers to an inhibitor of poly(ADP-ribose) polymerase. In the context of the present invention, the term PARPi encompasses molecules that may bind to and inhibitor the function of poly(ADP-ribose) polymerase, such as antibodies, peptides, or small molecules.

The term "CD47 blockade" refers to an agent that prevents CD47 binding to SIRPα, such as blocking agents that bind to either of CD47 or SIRPα, or those that modulate expression of CD47 or SIRPα, or those that otherwise inhibit the CD47/SIRPα axis. Without limitation, CD47 blockades encompass at least antibodies that bind to CD47 such as magrolimab, lemzoparlimab, and AO-176, SIRPα fusion proteins such as TTI-621 and TTI-622, agents that modulate the expression of CD47 and/or SIRPα, such as phosphorodiamidate morpholino oligomers (PMO) that block translation of CD47 such as MBT-001, and small molecule agents such as RRx-001.

As used herein, administering to a subject one or more additional therapies, such as one or more of an immune checkpoint therapy and/or DDRi and/or CD47 blockade and/or radiosensitizer "in conjunction with" a LeY targeting agent means administering the additional therapy before, during and/or after administration of the LeY targeting agent. This administration includes, without limitation, the following scenarios: (i) the additional therapy is administered first, and the LeY targeting agent is administered second; (ii) the additional therapy is administered concurrently with the LeY targeting agent (e.g., a DDRi is administered orally once per day for n days, and the LeY targeting agent is administered intravenously in a single dose on one of days 2 through n−1 of the DDRi regimen); (iii) the additional therapy is administered concurrently with the LeY targeting agent (e.g., a DDRi is administered orally for a duration of greater than one month, such as orally once per day for 35 days, 42 days, 49 days, or a longer period during which the cancer being treated does not progress and during which the DDRi does not cause unacceptable toxicity, and the LeY targeting agent is administered intravenously in a single dose on a day within the first month of the DDRi regimen); and (iv) the LeY targeting agent is administered first (e.g., intravenously in a single dose or a plurality of doses over a period of weeks), and the additional therapy is administered second (e.g., a DDRi is administered orally once per day for 21 days, 28 days, 35 days, 42 days, 49 days, or a longer period during which the cancer being treated does not progress and during which the DDRi does not cause unacceptable toxicity). Additional permutations that would be obvious to one of skill in the art are possible and within the scope of the presently claimed invention.

An "article of manufacture" indicates a package containing materials useful for the treatment, prevention and/or diagnosis of the disorders described herein. The article of manufacture may include a container and a label or package insert on or associated with the container. Suitable containers include, for example, bottles, vials, syringes, IV solution bags, etc. The containers may be formed from a variety of materials such as glass or plastic. The container holds a composition which is by itself or combined with another composition effective for treating, preventing and/or diagnosing the condition and may have a sterile access port (for example the container may be an intravenous solution bag or a vial having a stopper pierceable by a hypodermic injection needle). At least one active agent in the composition is a LeY targeting agent according to aspects of the presently disclosed invention.

A "label" or "package insert" is used to refer to instructions customarily included in commercial packages of therapeutic products that contain information about the indications, usage, dosage, administration, combination therapy, contraindications and/or warnings concerning the use of such therapeutic products. As used herein, a label may indicate that the composition is used for treating a LeY-positive cancer and may optionally indicate administration routes and/or methods. Moreover, the article of manufacture may include (a) a first container with a composition contained therein, wherein the composition includes LeY targeting agent; and (b) a second container with a composition contained therein, wherein the composition includes a further cytotoxic or otherwise therapeutic agent according to aspects of the presently disclosed invention. Alternatively, or additionally, the article of manufacture may further include a second (or third) container including a pharmaceutically acceptable buffer, such as bacteriostatic water for injection (BWFI), phosphate-buffered saline, Ringer's solution and dextrose solution. It may further include other materials desirable from a commercial and user standpoint, including other buffers, diluents, filters, needles, and syringes.

Throughout this application, various publications are cited. The disclosure of these publications is hereby incorporated by reference into this application to describe more fully the state of the art to which this invention pertains.

Unless otherwise defined, all technical and scientific terms used herein have the same meaning as commonly understood by one of ordinary skill in the art to which the present invention belongs. Although methods and materials similar or equivalent to those described herein can be used in the practice or testing described herein, suitable methods and materials are described below.

Aspects of the Invention

In one aspect of the invention, LeY targeting agents including an alpha-emitting radioisotope are used as therapeutic agents for treating LeY-expressing cancers such as solid tumors, in a mammal such as a human patient, and/or for killing LeY-expressing mammalian (such as human) cancer cells, such as solid tumor cancer cells.

Data evaluating hu3S193 conjugated to beta-emitting radioisotopes ($^{131}I$, $^{90}Y$, 177Lu) indicate that it is feasible to use a radio-conjugate to successfully target tumors in pre-clinical models. However, since hu3S193 does not cross-react with mouse LeY, this data only provides information on the tumor-targeting ability of the radio-conjugate and provides no information about the safety in terms of targeting LeY expression on normal tissues.

Furthermore, given the expression of LeY on normal tissues, even limited binding of certain beta-emitting anti-LeY radio-conjugates may cause substantial toxicity to normal tissues due to the crossfire effect from the long range of beta-particles. One beta-emitter, however, appears to be more highly tolerated and effective as an antibody radioconjugate. Repetto-Llamazares (2014) predicted that a $^{177}$Lu-labeled anti-CD37 antibody would deliver a more tumor-specific radiation compared other beta-emitters due to chemical properties more suitable for cell internalization and more favorable radiation properties with a higher component of beta emission vs. gamma. As such, the present inventors include $^{177}$Lu labeled LeY targeting agents as a preferred radioconjugate of the present invention.

As indicated hereinabove, alpha-emitting radioisotopes provide another preferred radioconjugate of the present invention. In particular, the alpha emitting radioisotope actinium-225 ($^{225}$Ac) provides an ideal warhead for arming hu3S193 given its potent cell-killing ability but very short particle range. An $^{225}$Ac-hu3S193 radio-conjugate would target the $^{225}$Ac directly to tumors and be delivered intracellularly due to the internalizing activity of LeY, thereby sequestering the daughter radioisotopes intracellularly. Thus, the present inventors expect $^{225}$Ac to be superior to a beta-emitting radioisotope from a safety perspective due to the short range of the alpha-particle emissions. Additionally, due to the potency of the $^{225}$Ac warhead, a lower dose of the antibody can be administered compared to unlabeled antibody, which will further reduce toxicities due to normal expression of LeY. A recent phase II clinical trial with hu3S193 in ovarian cancer reports dosing patients at 20 mg/m$^2$ weekly for 8 weeks (Smaletz, 2015). An $^{225}$Ac-hu3S193 radio-conjugate would be dosed at least 20× to 100× lower, such as at a radiation dose of 5-800 mCi/m$^2$ (0.1-20 mCi/kg) and a protein dose of less than 10 mg/m$^2$ (0.01-0.5 mg/kg). A $^{177}$Lu-hu3S193 radio-conjugate would be dosed at least 20× to 100× lower, such as at a radiation dose of 0.2-20 mCi/m$^2$ (5-500 mCi/kg) and a protein dose of less than 10 mg/m$^2$ (0.01-0.5 mg/kg).

Due to the unique nature of radiation-based modalities that causes direct DNA damage and other immunomodulatory changes (Walle, 2018), there is a potential to combine with other drugs with differing mechanisms of action that will result in synergistic outcomes. For example, it is known that radiation can synergize with immune checkpoint inhibitor antibodies and DNA damage response inhibitors (DDRi) such as PARP inhibitors. Other radiosensitizers that are routinely used for treatment of solid tumors that may synergize with a $^{225}$Ac-hu3S193 include temozolamide, cisplatin, and fluorouracil1 (Sharabi, 2015).

Thus, the presently disclosed invention provides therapeutic methods for treating LeY-positive cancers using targeting agents labeled with an alpha emitting radioisotope such as $^{225}$Ac. The methods may include diagnostic steps to identify if the patient has a LeY positive cancer, such as by identifying LeY positive cells within solid tumors or circulating in a blood sample from the patient.

According to certain aspects, the therapeutic methods include administration of a radiolabeled LeY targeting agent, such as a radiolabeled antibody, peptide, or small molecule that targets LeY, either alone or in combination with an additional therapeutic agent or modality. According to certain aspects, the additional agent or modality may be any one or more of administration of an immune checkpoint therapy, a DDRi, a CD47 blockade, a chemotherapeutic agent, or radiation therapy.

According to certain aspects, the LeY targeting agent may be administered to the patient in a patient specific composition in one or more doses.

According to certain aspects, the patient may be monitored at intervals during the therapy for the presence of LeY positive cells to evaluate the reduction in LeY-positive cells. Detecting a decreased number of the LeY-positive cells after treatment with the LeY targeting agent, as compared to the number of LeY-positive cells prior to treatment may indicate effectiveness of the LeY targeting agent in treating a LeY-positive cancer in the mammalian subject.

According to certain aspects, the method of treating cancer includes identifying a patient that has a LeY-positive cancer by identifying LeY-positive cells and administering to the patient an effective amount of a LeY targeting agent, either alone or in combination with an additional method of treatment. According to certain aspects, the additional method of treatment may be any one or more of administration of an immune checkpoint therapy, a DDRi, a CD47 blockade, a chemotherapeutic agent, or radiation therapy.

According to certain aspects, the chemotherapeutic agent is a radiosensitizer.

According to certain aspects, the LeY targeting agent can be administered to a patient that has also undergone a treatment, such as surgery for treatment of the cancer, such as to remove all or a portion of a solid tumor.

An exemplary antibody against human LeY that may be embodied in and/or used in the various aspects of the invention includes a heavy chain variable region having the amino acid sequence as set forth in any one of SEQ ID NO:119-123, and/or a light chain variable region having the amino acid sequence as set forth in SEQ ID NO:124 or 125. Additional exemplary antibodies against human LeY include those having a heavy chain with one or more of the CDRs having amino acid sequences as set forth in SEQ ID NOS: 127-130, and/or a light chain with one or more of the CDRs having the amino acid sequences as set forth in SEQ ID NOS: 131-133, and/or a heavy chain with an N-terminal region having an amino acid sequence as set forth in SEQ ID NO: 126, and/or a light chain with an N-terminal region having the amino acid sequence as set forth in SEQ ID NO:130. Any combination of light chain sequences and/or heavy chain sequences listed herein is possible and within the scope of the presently disclosed invention.

SEQ ID NOS: 119-133 are further described as follows and in FIGS. 1 and 2.

SEQ ID NO: 119 is the amino acid sequence of a heavy chain variable region of an anti-LeY monoclonal antibody.

SEQ ID NO:120 is the amino acid sequence of a heavy chain variable region of an anti-LeY monoclonal antibody including the amino acid substitution Ser24-Thr.

SEQ ID NO: 121 is the amino acid sequence of a heavy chain variable region of an anti-LeY monoclonal antibody including the amino acid substitution Ser74-Ala.

SEQ ID NO: 122 is the amino acid sequence of a heavy chain variable region of an anti-LeY monoclonal antibody including the amino acid substitutions Ser74-Ala and Asn76-Ser.

SEQ ID NO:123 is the amino acid sequence of a heavy chain variable region of an anti-LeY monoclonal antibody including the amino acid substitution Ser74-Ala, Asn76-Ser, and Phe79-Tyr.

SEQ ID NO: 124 is the amino acid sequence of a light chain variable region of an anti-LeY monoclonal antibody.

SEQ ID NO: 125 is the amino acid sequence of a light chain variable region of an anti-LeY monoclonal antibody including the amino acid substitution Tyr71-Phe.

SEQ ID NO: 126 is the amino acid sequence of an N-terminal region of the heavy chain of an anti-LeY monoclonal antibody.

SEQ ID NO:127 is the amino acid sequence of a complementary determining region 1 (CDR1) of the heavy chain of an anti-LeY monoclonal antibody.

SEQ ID NO: 128 is the amino acid sequence of CDR2 of the heavy chain of an anti-LeY monoclonal antibody.

SEQ ID NO: 129 is the amino acid sequence of CDR3 of the heavy chain of an anti-LeY monoclonal antibody.

SEQ ID NO: 130 is the amino acid sequence of an N-terminal region of the light chain of an anti-LeY monoclonal antibody.

SEQ ID NO: 131 is the amino acid sequence of CDR1 of the light chain of an anti-LeY monoclonal antibody.

SEQ ID NO:132 is the amino acid sequence of CDR2 of the light chain of an anti-LeY monoclonal antibody.

SEQ ID NO: 133 is the amino acid sequence of CDR3 of the light chain of an anti-LeY monoclonal antibody.

Exemplary antibodies against human LeY that may be embodied in and/or use in the various aspects of the invention also include 3S1931 and/or a humanized version thereof such as Hu3S1933, or any of the monoclonal antibodies B34, BR55-2, BR55/BR96, and IGN 133.

Additional Specificities and Targeting Agents

In one aspect, the present invention provides substantially improved therapeutic compositions and treatment regimens that include LeY targeting agents radiolabeled with $^{225}$Ac for use in therapy of LeY-positive cancers. In another aspect, the present invention provides radiolabeled LeY targeting agents useful in diagnostic methods that may be, for example, performed prior to treatment with a radiolabeled LeY targeting agent such as an $^{225}$Ac labeled agent. Thus, the present invention provides the treatment of proliferative diseases or disorders, such as solid tumors, using a radiolabeled LeY targeting agent that functions to target ionizing radiation from an alpha-emitting radioisotope to cells expressing LeY, thereby inducing DNA damage, including double strand DNA breaks, and death of those cells.

The present invention further provides multi-specific, such as bispecific, targeting agents, compositions and related methods of treating a proliferative disease or disorder which include administration of (i) a multi-specific antibody against two or more epitopes of LeY such as human LeY, or against an epitope of LeY and an epitope of one or more additional different antigens and/or (ii) administration of a LeY targeting agent such as an antibody and one or more discrete targeting agents directed against one or more cancer associated antigens wherein one or more of the targeting agents, such as the LeY targeting agent is radiolabeled. The additional different antigens may, for example, be antigens whose expression is upregulated on cells involved in various diseases or disorders, such as proliferative disorders, for example, solid tumor cancers, such as those in which LeY is also or can also be upregulated. For example, the additional different antigens may be selected from the group including mesothelin, TSHR, CD19, CD123, CD22, CD30, CD45, CD171, CD138, CS-1, CLL-1, GD2, GD3, B-cell maturation antigen (BCMA), T-Ag, TnAg, prostate specific membrane antigen (PSMA), ROR1, FLT3, TROP2, T-cell receptor gamma (TCRγ) chain alternate reading frame protein (TRAP), fibroblast activation protein (FAP), calreticulin, phosphatidylserine, GRP78 (BiP), TAG72, CD38, CD44v6, CEA, EPCAM, B7H3, KIT, IL-13Ra2, interleukin-11 receptor a (IL-11Ra), PSCA, PRSS21, VEGFR2, LewisY, CD24, platelet-derived growth factor receptor-beta (PDGFR-beta), SSEA-4, CD20, Folate receptor alpha (FRa), ERBB2 (Her2/neu), ERBB3/Her3, MUC1, epidermal growth factor receptor (EGFR), EGFRvIII, NCAM, Prostase, PAP, ELF2M, Ephrin B2, IGF-I receptor, CAIX, LMP2, gplOO, bcr-abl, tyrosinase, EphA2, Fucosyl GM1, sLe, GM3, DR5, 5T4, TGS5, HMWMAA, o-acetyl-GD2, Folate receptor beta, TEM1/CD248, TEM7R, CLDN6, GPRC5D, CXORF61, CD97, CD 179a, ALK, Polysialic acid, PLAC1, GloboH, NY-BR-1, UPK2, HAVCR, ADRB3, PANX3, GPR20, LY6K, OR51E2, TARP, WT1, NY-ESO-1, LAGE-1a, MAGE-A1, legumain, HPV E6,E7, MAGE A1, MAGEA3, MAGEA3/A6, ETV6-AML, sperm protein 17, XAGE1, Tie 2, MAD-CT-1, MAD-CT-2, Fos-related antigen 1, prostein, survivin and telomerase, PCTA-1/Galectin 8, KRAS, MelanA/MARTI, Ras mutant, hTERT, sarcoma translocation breakpoints, ML-IAP, ERG (TMPRSS2 ETS fusion gene), NA17, PAX3, Androgen receptor, Cyclin B 1, MYCN, RhoC, TRP-2, CYP1B 1, BORIS, SART3, PAX5, OY-TES 1, LCK, AKAP-4, SSX2, RAGE-1, human telomerase reverse transcriptase, RU1, RU2, intestinal carboxyl esterase, mut hsp70-2, CD79a, CD79b, CD72, LAIR1, FCAR, LILRA2, CD300LF, CLEC12A, BST2, EMR2, LY75, GPC3, FCRL5, GPA7, and IGLL1.

Exemplary DR5 (death receptor 5) targeting agents that may be radiolabeled, unlabeled or drug-conjugated for use in the invention include the monoclonal anti-DR5 antibodies mapatumumab, conatumumab, lexatumumab, tigatuzumab, drozitumab, and LBY-135. Such DR5 targeting agents may, for example, be used in combination with a radiolabeled LeY targeting agents for the treatment of ovarian, breast, cervical prostate, gastric, bladder, lung, melanoma, colorectal and squamous cell carcinoma cancers and any of the cancers disclosed herein.

Exemplary 5T4 (Trophoblast glycoprotein (TBPG)) targeting agents that may be radiolabeled, drug-conjugated, or unlabeled for use in the invention include the anti-5T4 monoclonal antibodies MED10641, ALG.APV-527, Tb535, H6-DM5, and ZV0508, as well as 5T4Fab-SEA/E-120 (SEQ ID NO:134), Naptumomab estafenatox (reported as SEQ ID NO:135 (chimeric heavy chain component) non-covalently bound to SEQ ID NO:136 (light chain component)) or the Fab portion thereof only, and an anti-5TF Fab molecule including a heavy chain component corresponding to residues 1 to 222 of SEQ ID NO:134 and a light chain component residues 459 to 672 of SEQ ID NO: 134. Such 5T4 targeting agents may, for example, be used in combination with a radiolabeled LeY targeting agent for the treatment of ovarian, head and neck, breast, prostate, gastric, bladder, lung, melanoma, colorectal and squamous cell carcinoma cancers and any of the cancers disclosed herein.

Exemplary HER2 (ERBB2) targeting agents that may be radiolabeled, drug-conjugated, or unlabeled for use in the invention include the monoclonal antibodies trastuzumab and pertuzumab. Applicants have successfully conjugated Trastuzumab with p-SCN-DOTA and radiolabeled the composition with $^{225}$Ac or $^{177}$Lu. Exemplary ADCs targeting HER2 that may be used include fam-trastuzumab deruxtecan-nxki (Enhertu®; AstraZeneca/Daiichi Sankyo) and Trastuzumab emtansine (Roche/Genentech). The anti-HER2 antibody may, for example, also be a multi-specific antibody, such as bispecific antibody, against any available epitope of HER3/HER2 such as MM-111 and MM-141/Istiratumab from Merrimack Pharmaceuticals, MCLA-128 from Merus NV, and MEHD7945A/Duligotumab from Genentech. HER2 targeting agents may, for example, be used in combination with a radiolabeled LeY targeting agent in the treatment of HER2-expressing cancers such as ovarian, breast, metastatic breast, esophageal, lung, cervical, and endometrial cancers including but not limited to those that are both HER2- and HER3-positive.

The amino acid sequences of the heavy chain and the light chain of Trastuzumab reported by DrugBank Online are: heavy chain (SEQ ID NO: 102) and light chain (SEQ ID NO:103) and a HER2 binding antibody including one or both of said chains may be embodied in or used in the various embodiments of the invention.

The amino acid sequences of the heavy chain and the light chain of Pertuzumab reported by DrugBank Online are: heavy chain (SEQ ID NO: 104) and light chain (SEQ ID NO: 105) and a HER2 binding antibody including one or both of said chains may be embodied in or used in the various embodiments of the invention.

An exemplary HER3 antibody that may be radiolabeled and embodied in and/or used in the presently disclosed invention may, for example, include a murine monoclonal antibody against HER3 including a heavy chain having the amino acid sequence as set forth in SEQ ID NO:9 or 11 and/or a light chain having the amino acid sequence as set forth in SEQ ID NO:10 or 12, or an antibody such as a humanized antibody derived from one or more of said sequences. An exemplary HER3 antibody that may be radiolabeled and embodied in and/or used in the presently disclosed invention may include or a heavy chain with an N-terminal region having the sequence set forth in SEQ ID NO:13 and/or a light chain with an N-terminal region having the sequence as set forth in SEQ ID NO: 14. A HER3 antibody that may be similarly embodied or used in various aspect of the invention may, for example, include the heavy chain variable region having the amino acid sequence as set forth in SEQ ID NO:7, and/or a light chain variable region having an amino acid sequence as set forth in SEQ ID NO:8; and/or a heavy chain including one or more of CDR1, CDR2 and CDR3 having the amino acid sequences respectively set forth in SEQ ID NOS: 1-3, and/or a light chain with one or more of the CDR1, CD2 and CDR3 having the amino acid sequences respectively set forth in SEQ ID NOS: 4-6. A HER3 antibody embodied in and/or used in any of the aspects of the invention may, for example, include any combination of the aforementioned light chain sequences and/or heavy chain sequences.

An exemplary HER3 antibody includes an immunoglobulin heavy chain variable region including a CDR-H1 including SEQ ID NO: 15, a CDR-H2 including SEQ ID NO: 16, and a CDR-H3 including SEQ ID NO:17, and/or an immunoglobulin light chain variable region including a CDR-L1 including SEQ ID NO: 18, a CDR-L2 including SEQ ID NO:19, and a CDR-L3 including SEQ ID NO:20. An exemplary An exemplary HER3 antibody includes an immunoglobulin heavy chain variable region including SEQ ID NO:21 and/or an immunoglobulin light chain variable region including SEQ ID NO:22. An exemplary HER3 antibody includes an immunoglobulin heavy chain amino acid sequence of SEQ ID NO:23 and/or an immunoglobulin light chain amino acid sequence of SEQ ID NO:24.

An exemplary HER3 antibody includes an immunoglobulin heavy chain variable region including a CDR-H1 including SEQ ID NO:25, a CDR-H2 including SEQ ID NO:26, and a CDR-H3 including SEQ ID NO:27; and/or an immunoglobulin light chain variable region including a CDR-L1 including SEQ ID NO:28, a CDR-L2 including SEQ ID NO:29, and a CDR-L3 including SEQ ID NO:30. An exemplary HER3 antibody includes an immunoglobulin heavy chain variable region including SEQ ID NO:31 and/or an immunoglobulin light chain variable region including SEQ ID NO:32. An exemplary HER3 antibody includes an immunoglobulin heavy chain amino acid sequence of SEQ ID NO:33 and/or an immunoglobulin light chain amino acid sequence of SEQ ID NO:34.

An exemplary HER3 antibody includes an immunoglobulin heavy chain variable region including a CDR-H1 including SEQ ID NO:35, a CDR-H2 including SEQ ID NO:36, and a CDR-H3 including SEQ ID NO:37; and/or an immunoglobulin light chain variable region including a CDR-L1 including SEQ ID NO:38, a CDR-L2 including SEQ ID NO:39, and a CDR-L3 including SEQ ID NO:40. An exemplary HER3 antibody includes an immunoglobulin heavy chain variable region including SEQ ID NO:41, and/or an immunoglobulin light chain variable region SEQ ID NO: 42. An exemplary HER3 antibody includes an immunoglobulin heavy chain amino acid sequence of SEQ ID NO:43 and an immunoglobulin light chain amino acid sequence of SEQ ID NO: 44.

An exemplary HER3 antibody includes an immunoglobulin heavy chain variable region including a CDR-H1 including SEQ ID NO:45, a CDR-H2 including SEQ ID NO:46, and a CDR-H3 including SEQ ID NO:47; and/or an immunoglobulin light chain variable region including a CDR-L1 including SEQ ID NO:48, a CDR-L2 including SEQ ID NO:29, and a CDR-L3 including SEQ ID NO:49. An exemplary HER3 antibody includes an immunoglobulin heavy chain variable region including SEQ ID NO:50 and/or an immunoglobulin light chain variable region including SEQ ID NO:51. An exemplary HER3 antibody includes an immunoglobulin heavy chain amino acid sequence of SEQ ID NO:52 and/or an immunoglobulin light chain amino acid sequence of SEQ ID NO:53.

An exemplary HER3 antibody includes an immunoglobulin heavy chain variable region including a CDR-H1 including SEQ ID NO:54, a CDR-H2 including SEQ ID NO:55, and a CDR-H3 including SEQ ID NO:56; and/or an immunoglobulin light chain variable region including a CDR-L1 including SEQ ID NO:28, a CDR-L2 including SEQ ID NO:29, and a CDR-L3 including SEQ ID NO:30. An exemplary HER3 antibody includes an immunoglobulin heavy chain variable region including SEQ ID NO:57 and/or an immunoglobulin light chain variable region including SEQ ID NO:58. An exemplary HER3 antibody includes an immunoglobulin heavy chain amino acid sequence of SEQ ID NO:59 and/or an immunoglobulin light chain amino acid sequence of SEQ ID NO: 60.

An exemplary HER3 antibody includes an immunoglobulin heavy chain variable region including a CDR-H1 including SEQ ID NO:61, a CDR-H2 including SEQ ID NO:62, and a CDR-H3 including SEQ ID NO:63; and/or an immunoglobulin light chain variable region including a CDR-L1 including SEQ ID NO:64, a CDR-L2 including SEQ ID NO:65, and a CDR-L3 including SEQ ID NO:66. An exemplary HER3 antibody includes an immunoglobulin heavy chain variable region including SEQ ID NO:67, and/or an immunoglobulin light chain variable region including SEQ ID NO:68. An exemplary HER3 antibody includes an immunoglobulin heavy chain amino acid sequence of SEQ ID NO:69 and an immunoglobulin light chain amino acid sequence of SEQ ID NO: 70.

An exemplary HER3 antibody includes an immunoglobulin heavy chain variable region including a CDR-H1 including SEQ ID NO:71, a CDR-H2 including SEQ ID NO: 72, and a CDR-H3 including SEQ ID NO:66; and/or an immunoglobulin light chain variable region including a CDR-L1 including SEQ ID NO:28, a CDR-L2 including SEQ ID NO:29, and a CDR-L3 including SEQ ID NO:30. An exemplary HER3 antibody includes an immunoglobulin heavy chain variable region including SEQ ID NO:73, and/or an immunoglobulin light chain variable region including SEQ ID NO:74. An exemplary HER3 antibody includes an immunoglobulin heavy chain amino acid sequence of SEQ ID NO:75 and/or an immunoglobulin light chain amino acid sequence of SEQ ID NO:76.

An exemplary HER3 antibody includes an immunoglobulin heavy chain amino acid sequence of SEQ ID NO:77 and/or an immunoglobulin light chain amino acid sequence of SEQ ID NO: 78.

An exemplary HER3 antibody includes an immunoglobulin light chain variable region including SEQ ID NOS: 86, 87, 88, 89, 90 or 91 and/or a heavy chain variable region including SEQ ID NOS: 79, 80, 81, 82, 83, 84 or 85.

An exemplary HER3 antibody includes an immunoglobulin heavy chain sequence including SEQ ID NO:92, 94, 95, 98 or 99 and/or an immunoglobulin light chain sequence including SEQ ID NO: 93, 96, 97, 100 or 101.

Exemplary HER3 antibodies also include Barecetamab (ISU104) from Isu Abxis Co and any of the HER3 antibodies disclosed in U.S. Pat. No. 10,413,607.

Exemplary HER3 antibodies also include HMBD-001 (10D1F) from Hummingbird Bioscience Pte. and any of the HER3 antibodies disclosed in International Pub. Nos. WO 2019185164 and WO2019185878, U.S. Pat. No. 10,662,241; and U.S. Pub. Nos. 20190300624, 20210024651, and 20200308275.

Exemplary HER3 antibodies also include the HER2/HER3 bispecific antibody MCLA-128 (i.e., Zenocutuzumab) from Merus N.V.; and any of the HER3 antibodies, whether monospecific or multi-specific, disclosed in U.S. Pub. Nos. 20210206875, 20210155698, 20200102393, 20170058035, and 20170037145.

Exemplary HER3 antibodies also include the HER3 antibody Patritumab (U3-1287), an antibody including heavy chain sequence SEQ ID NO: 106 and/or light chain sequence SEQ ID NO: 107 which are reported chains of Patritumab, and any of the HER3 antibodies disclosed in U.S. Pat. Nos. 9,249,230 and 7,705,130 and International Pub. No. WO2007077028.

Exemplary HER3 antibodies also include the HER3 antibody MM-121 and any of the HER3 antibodies disclosed in U.S. Pat. No. 7,846,440 and International Pub. No. WO2008100624.Exemplary HER3 antibodies also include the EGFR/HER3 bispecific antibody DLI and any of the HER3 antibodies, whether monospecific or multi-specific, disclosed in U.S. Pat. Nos. 9,327,035 and 8,597,652, U.S. Pub. No. 20140193414, and International Pub. No. WO2010108127.

Exemplary HER3 antibodies also include the HER2/HER3 bispecific antibody MM-111 and any of the HER3 antibodies, whether monospecific or multi-specific, disclosed in U.S. Pub. Nos. 20130183311 and 20090246206 and International Pub. Nos. WO2006091209 and WO2005117973.

According to certain aspects, the HER3 targeting agent includes an anti-HER3 antibody that binds to an epitope of HER3 recognized by Patritumab from Daiichi Sankyo, Seribantumab (MM-121) from Merrimack Pharmaceuticals, Lumretuzumab from Roche, Elgemtumab from Novartis, GSK2849330 from GlaxoSmithKline, CDX-3379 of Celldex Therapeutics, EV20 and MP-RM-1 from MediPharma, Barecetamab (ISU104) from Isu Abxis Co., HMBD-001 (10DIF) from Hummingbird Bioscience Pte., REGN1400 from Regeneron Pharmaceuticals, and/or AV-203 from AVEO Oncology. According to certain aspects, the anti-HER3 antibody is selected from one or more of Patritumab, Seribantumab or an antibody including heavy chain sequence SEQ ID NO: 108 and/or light chain sequence SEQ ID NO:109 which are reported for Seribantumab, Lumretuzumab or an antibody including heavy chain sequence SEQ ID NO: 110 and/or light chain sequence SEQ ID NO:111 which are reported for Lumretuzumab, Elgemtumab or an antibody including heavy chain sequence SEQ ID NO:112 and/or light chain sequence SEQ ID NO:113 which are reported for Elgemtumab, AV-203, CDX-3379, GSK2849330, EV20, MP-RM-1, ISU104, HMBD-001 (10DIF), and REGN1400.

An amino acid sequence of the human HER3 precursor protein (receptor tyrosine-protein kinase erbB-3 isoform 1 precursor NCBI Reference Sequence: NP_001973.2) is provided herein as SEQ ID NO:115.

Exemplary CD33 targeting agents that may be radiolabeled, drug-conjugated, or unlabeled for use in the invention include the monoclonal antibodies lintuzumab, gemtuzumab, and vadastuximab. In combination with a radiolabeled LeY targeting agent as disclosed herein, a CD33 targeting therapeutic agent may, for example, be used to treat solid cancers, such as ovarian, breast, cervical prostate, gastric, bladder, lung, melanoma, colorectal and squamous cell carcinoma cancers and any of the cancers disclosed herein, for example, by depleting myeloid-derived suppressor cells (MDSCs). In one aspect, the CD33 targeting agent used in combination with a radiolabeled LeY targeting agent is 225Ac-lintuzumab. In another aspect, the CD33 targeting agent used in combination with a radiolabeled HER3 targeting agent is the ADC gemtuzumab ozogamicin (Mylotarg®; Pfizer).

Exemplary CD38 targeting agents that may be radiolabeled, drug-conjugated, or unlabeled for use in the invention include anti-CD38 monoclonal antibodies such as daratumumab (Darzalex®; Johnson and Johnson) and isatuximab (Sarclisa®; Sanofi) or antigen-binding fragments thereof. Such CD38 targeting agents may, for example, be used in combination with the radiolabeled LeY targeting agents in the treatment of solid tumors that may, for example, be infiltrated with CD38-positive suppressive immune cells, such as but not limited to ovarian, breast, cervical prostate, gastric, bladder, lung, melanoma, colorectal and squamous cell carcinoma cancers and any of the cancers disclosed herein.

Exemplary MUC1 targeting agents that may be radiolabeled, drug-conjugated, or unlabeled for use in the invention include the monoclonal antibodies: KL-6 (epitope: a sialylated sugar of Krebs von den Lugen-6 (KL-6) PDTRPAP sequence); MY1.E12 (epitope: sialyla2-3 galactosylh1-3 Nacetylgalactosaminide linked to a distinct threonine residue in the MUC1 tandem repeat); 5E5, 2D9 (epitope: Tn or STn in the tandem repeat domain); hMUC1-1H7 (epitope: extracellular domain of MUC1 C-terminal subunit (MUC1-C)); and TAB004 (epitope: STAPPVHNV within the TR sequence); huC242 (epitope: Sialyl-Lewis a epitope CanAg glycoprotein which is similar to MUC1); huPAM4 (epitope: omain located between the amino terminus and start of the repeat domain of a MUC1 antigen (non-VNTR) and also react with MUC5AC); hPAM4 a/k/a Clivatuzumab (epitope: Domain located between the amino terminus and start of the repeat domain of a MUC1 antigen (non-VNTR) and also react with MUC5AC); SAR56665, 8huDS6-DM4 (epitope: O-linked glycans with α2,3-sialylated and β1,4-galactosylated termini in VNTR); Gatipotuzumab (epitope: PDT*RP . . . , where T* is O-glycosylated with GalNAca1—or a similar short, non-sialylated glycan such as Galb1-3GalNAca1-(core-1)); AR20.5 (epitope: DTRPAP and DTnR-PAP), antigen-binding fragments of any of said monoclonal antibodies, and antibodies or antigen-binding antibody fragments recognizing the same epitopes as the any of the aforementioned anti-MUC1 antibodies. Such MUC1 targeting agents may, for example, be used in combination with the radiolabeled LeY targeting agents in the treatment of solid tumors expressing or overexpressing MUC1, such as pancreatic cancer, breast cancer, ovarian cancer, gastric cancer, gastrointestinal cancer, liver cancer such as hepatocellular carcinoma (HCC) and cholangiocarcinoma, and colororectal cancer.

It should be understood that wherever in this disclosure specific antibodies, specific antibody heavy chains and specific antibody light chains are disclosed, against any target, also intended to be disclosed for embodiment in or use in the various aspects of the invention are antibodies, such as but not limited to immunoglobulins, such as but not limited to IgG, that (i) include the heavy chain variable region of the disclosed antibody or heavy chain, (ii) include 1, 2 or 3 of the heavy chain CDRs (e.g., by Kabat definition) of the disclosed antibody or heavy chain, (iii) include the light chain variable region of the disclosed antibody or light chain, and/or (iv) include 1, 2 or 3 of the light chain CDRs (e.g., by Kabat definition) of the disclosed antibody or light chain. It should also be understood that wherever in this disclosure an antibody heavy chain or an antibody light chain is disclosed that includes an N-terminal leader sequence, also intended to be disclosed for embodiment in and use in the various aspects of the invention are corresponding heavy chains and corresponding light chains that lack the leader sequence.

In still further embodiments of the invention, an additional radiolabeled targeting agent used in combination or conjunction with the radiolabeled LeY targeting agent for the treatment of a cancer or proliferative disorder such as any of those disclosed herein in a mammal, such as a human, includes a phospholipid-based cancer targeting agent. In certain embodiments, the phospholipid-based cancer targeting agent includes any of the radioactive phospholipid metal chelates disclosed in U.S. Pub. No. 20200291049, incorporated by reference herein, such as but not limited to

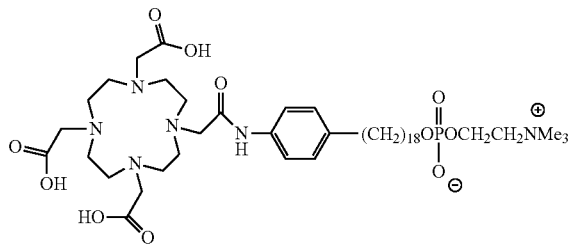

(a/k/a NM600) or a pharmaceutically acceptable salt thereof, chelated with a radionuclide, such as $^{225}$Ac, $^{177}$Lu, or $^{90}$Y.

In certain aspects, the lipid based radiolabeled targeting agent used in conjunction with the radiolabeled LeY targeting agent includes any of the radiolabeled phospholipid compounds disclosed in U.S. Pub. No. 20140030187 or U.S. Pat. No. 6,417,384, each incorporated by reference herein, such as but not limited to

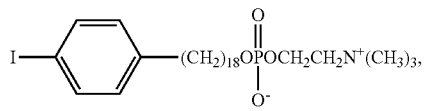

i.e., 18-(p-iodophenyl) octadecyl phosphocholine, wherein iodine is $^{131}$I (a/k/a NM404 I-131, and CLR 131), or a pharmaceutically acceptable salt thereof.

In certain aspects, the phospholipid-based radiolabeled targeting agent used in conjunction with the LeY targeting agent includes any of the phospholipid drug conjugate compounds disclosed in U.S. Pat. No. 9,480,754, incorporated by reference herein.

The present invention also provides methods of treating a proliferative disease or disorder that includes administration of a first antibody against at least one epitope of LeY such as human LeY, and administration of a second antibody, wherein the second antibody is against a different epitope of LeY than the first antibody, or is against an epitope of a different antigen, such as an antigen selected from the list presented above, or an immune checkpoint antigen (see discussion regarding immune checkpoint therapies below), or a DNA damage response antigen.

When the methods include administration of a multispecific antibody, the first target recognition component may, for example, include one of: a first full length heavy chain and a first full length light chain, a first Fab fragment, or a first single-chain variable fragment (scFvs). The second target recognition component may, for example, include one of: a second full length heavy chain and a second full length light chain, a second Fab fragment, or a second single-chain variable fragment (scFvs). Moreover, the second target recognition component may, for example, be derived from a different epitope of the LeY antigen or may be derived from any of the antigens listed above.

In one variation, the LeY targeting agent includes a radioisotope, and any one or more (in any combination) additional antibodies against other antigens may optionally include a radioisotope. According to certain aspects of the present invention, when the immunotherapy includes a bispecific antibody, either one or both of the first target recognition component and the second target recognition component or any part or parts of the bispecific molecule may include a radioisotope.

According to certain aspects of the present invention, the radiolabeled targeting agent may exhibit essentially the same immunoreactivity to the antigen as a control targeting agent, wherein the control targeting agent includes an un-labeled targeting agent against the same epitope of the antigen (i.e., LeY) as the radiolabeled targeting agent.

According to certain aspects of the present invention, the targeting agent may be labeled with $^{225}$Ac, and may be at least 5-fold more effective at causing cell death of LeY-positive cells than a control monoclonal antibody, wherein the control monoclonal antibody includes an un-labeled antibody against the same epitope of the antigen as the $^{225}$Ac labeled antibody. For example, a $^{225}$Ac labeled monoclonal antibody may be at least 10-fold more effective, at least 20-fold more effective, at least 50-fold more effective, or at least 100-fold more effective at causing cell death of LeY-positive cells than the control monoclonal antibody.

According to certain aspects of the present invention, the targeting agent may be labeled with $^{177}$Lu, and may be at least 5-fold more effective at causing cell death of LeY-positive cells than a control monoclonal antibody, wherein the control monoclonal antibody includes an un-labeled antibody against the same epitope of the antigen as the $^{177}$Lu labeled antibody. For example, a $^{177}$Lu labeled monoclonal antibody may be at least 10-fold more effective, at least 20-fold more effective, at least 50-fold more effective, or at least 100-fold more effective at causing cell death of LeY-positive cells than the control monoclonal antibody.

According to certain aspects of the present invention, the methods may include administration of labeled and un-labeled (e.g., "naked") fractions of the LeY targeting agent, such as an antibody, antibody fragment, etc. For example, the un-labeled fraction may include the same antibody against the same epitope as the labeled fraction. In this way, the total radioactivity of the antibody may be varied or may be held constant while the overall antibody protein concentration may be held constant or may be varied, respectively. For example, the total protein concentration of un-labeled antibody fraction administered may vary depending on the exact nature of the disease to be treated, age and weight of the patient, identity of the monoclonal antibody, and the label (e.g., radionuclide) selected for labeling of the monoclonal antibody.

According to certain aspects of the present invention, the effective amount of the anti-LeY antibody is a maximum tolerated dose (MTD) of the anti-LeY antibody.

According to certain aspects of the methods of the present invention, when more than one antibody is administered, the antibodies may be administered at the same time. As such, according to certain aspects of the present invention, the antibodies may be provided in a single composition. Alternatively, the two antibodies may be administered sequentially. As such, the LeY targeting agent may be administered before the second antibody, after the second antibody, or both before and after the second antibody. Moreover, the second antibody may be administered before the LeY targeting agent, after the LeY targeting agent, or both before and after the LeY targeting agent.

According to certain aspects of the methods of the present invention, the LeY targeting agent may be administered according to a dosing schedule selected from the group consisting of one every 7, 10, 12, 14, 20, 24, 28, 35, and 42 days throughout a treatment period, wherein the treatment period includes at least two doses.

According to certain aspects of the present invention, the LeY targeting agent may be administered according to a dose schedule that includes 2 doses, such as on days 1 and 5, 6, 7, 8, 9, or 10 of a treatment period, or days 1 and 8 of a treatment period.

Administration of the LeY targeting agents of the present invention, in addition to other therapeutic agents, may be provided in a number of ways depending upon whether local or systemic treatment is desired and upon the area to be treated. Administration may be intratracheal, intranasal, epidermal and transdermal, oral or parenteral. Parenteral administration includes intravenous, intra-arterial, subcutaneous, intraperitoneal or intramuscular injection or infusion; or intracranial, e.g., intrathecal or intraventricular, administration. In some embodiments a slow release preparation including the targeting agents(s) and/or other therapeutic agents may be administered. The various agents may be administered as a single treatment or in a series of treatments that continue as needed and for a duration of time that causes one or more symptoms of the cancer to be reduced or ameliorated, or that achieves another desired effect.

The dose(s) may vary, for example, depending upon the identity, size, and condition of the subject, further depending upon the route by which the composition is to be administered and the desired effect. Appropriate doses of a therapeutic agent depend upon the potency with respect to the expression or activity to be modulated. The therapeutic agents can be administered to an animal (e.g., a human) at a relatively low dose at first, with the dose subsequently increased until an appropriate response is obtained.

The radiolabeled LeY targeting agent may be administered simultaneously or sequentially with the one or more additional therapeutic agents. Moreover, when more than one additional therapeutic agent is included, the additional therapeutic agents may be administered simultaneously or sequentially with each other and/or with the radiolabeled LeY targeting agent.

Radiolabeling the LeY Targeting Agent

The LeY targeting agent and other targeting agents disclosed herein may, for example, be labeled with a radioisotope, such as an an alpha emitter (e.g., $^{225}$Ac), through conjugation of a chelator molecule, and chelation of the radioisotope thereto. According to certain aspects, the targeting agent may be an antibody against that is deglycosylated in the constant region, such as at asparagine-297 (Asn-297, N297; Kabat number) in the heavy chain CH2 domain, for the purpose of uncovering a unique conjugation site, glutamine (i.e., Gln-295, Q295) so that it is available for conjugation with bifunctional chelator molecules.

According to certain aspects, the radiotherapeutic may be an antibody that may have reduced disulfide bonds such as by using reducing agents, which may then be converted to dehydroalanine for the purpose of conjugating with a bifunctional chelator molecule.

According to certain aspects, the radiotherapeutic may be an antibody for which the disulfide bonds have been reduced using reducing agents, which is then conjugated via aryl bridges with a bifunctional chelator molecule. For example, according to certain aspects a linker molecule such as 3,5-bis(bromomethyl)benzene may be used to bridge the free sulfhydryl groups on the antibody.

According to certain aspects, the radiotherapeutic may be an antibody that may have certain specific existing amino acids replaced with cysteine(s) that then can be used for site-specific labeling.

Exemplary chelators that may be linked to targeting agents in the various aspects of the invention include: 1,4,7,10-tetraazacyclododecane-1,4,7-triacetic acid (DO3A) or a derivative thereof; 1,4,7-triazacyclononane-1,4-diacetic acid (NODA) or a derivative thereof; 1,4,7-triazacyclononane-1,4,7-triacetic acid (NOTA) or a derivative thereof; 1,4,7,10-tetraazacyclododecane-1,4,7,10-tetraacetic acid (DOTA) or a derivative thereof; 1,4,7-triazacyclononane, 1-glutaric acid-4,7-diacetic acid (NODAGA) or a derivative thereof; 1,4,7,10-tetraazacyclodecane, 1-glutaric acid-4,7,10-triacetic acid (DOTAGA) or a derivative thereof; 1,4,8,11-tetraazacyclotetradecane-1,4,8,11-tetraacetic acid (TETA) or a derivative thereof; 1,4,8,11-tetraazabicyclo [6.6.2]hexadecane-4,11-diacetic acid (CB-TE2A) or a derivative thereof; diethylene triamine pentaacetic acid (DTPA), its diester, or a derivative thereof; 2-cyclohexyl diethylene triamine pentaacetic acid (CHX-A"-DTPA) or a derivative thereof; deforoxamine (DFO) or a derivative thereof; 1,2-[[6-carboxypyridin-2-yl]methylamino]ethane (H2dedpa) or a derivative thereof; DADA or a derivative thereof; 1,4,7,10-Tetraazacyclododecane-1,4,7,10-tetra (methylene phosphonic acid) (DOTP) or a derivative thereof; 4-amino-6-[[16-[(6-carboxypyridin-2-yl)methyl]-1, 4,10,13-tetraoxa-7,16-diazacyclooctadec-7-yl]methyl]pyridine-2-carboxylic acid (MACROPA-NH$_2$) or a derivative thereof; MACROPA or a derivative thereof; 1,4,7,10-tetrakis(carbamoylmethyl)-1,4,7,10-tetraazacyclododecane (TCMC) or a derivative thereof; {4-[2-(bis-carboxymethyl-amino)-ethyl]-7-carboxymethyl-[1,4,7]triazonan-1-yl}-acetic acid (NETA) or a derivative thereof; Diamsar or a derivative thereof; 1,4,7-triazacyclononane-1,4,7-tris [methyl (2-carboxyethyl)phosphinic acid (TRAP, PRP9, TRAP-Pr) or a derivative thereof; N,N'-bis(6-carboxy-2-pyridylmethyl)ethylenediamine-N,N'-diacetic acid (H4octapa) or a derivative thereof; N,N'-[1-benzyl-1,2,3-triazole-4-yl]methyl-N,N'-[6-(carboxy)pyridin-2-yl]-1,2-diaminoethane (H2azapa) or a derivative thereof; N,N"-[[6-(carboxy)pyridin-2-yl]methyl]diethylenetriamine-N,N',N"-triacetic acid (H5decapa) or a derivative thereof; N,N'-bis(2-hydroxy-5-sulfobenzyl)ethylenediamine-N,N'-diacetic acid (SHBED) or a derivative thereof; N,N'-bis(2-hydroxybenzyl)ethylenediamine-N,N'-diacetic acid (HBED) or a derivative thereof; 3,6,9,15-tetraazabicyclo[9.3.1]pentadeca-1 (15), 11,13-triene-3,6,9,-triacetic acid (PCTA) or a derivative thereof; desferrioxamine B (DFO) or a derivative thereof; N,N'-(methylenephosphonate)-N,N'-[6-(methoxycarbonyl)pyridin-2-yl]methyl-1,2-diaminoethane (H6phospa) or a derivative thereof; 1,4,7,10,13,16-hexaazacyclohexadecane-N,N',N",N''',N'''',N'''''-hexaacetic acid (HEHA) or a derivative thereof; 1,4,7,10,13-pentaazacyclopentadecane-N,N',N",N''',N''''-pentaacetic acid (PEPA) or a derivative thereof; or 3,4,3-L1 (1,2-HOPO) or a derivative thereof.

According to certain aspects, the targeting agent may be radiolabeled through chemical conjugation of suitable bifunctional chelators that can chelate one or more radionuclides. Exemplary chelator molecules that may be used include p-SCN-Bn-DOTA, $NH_2$-DOTA, $NH_2$—$(CH_2)_{1-20}$-DOTA, $NH_2$-$(PEG)_{1-20}$-DOTA, HS-DOTA, HS-$(CH_2)_{1-20}$-DOTA, HS-$(PEG)_{1-20}$-DOTA, dibromo-S-$(CH_2)_{1-20}$-DOTA, dibromo-S-$(PEG)_{1-20}$-DOTA, p-SCN-Bn-DOTP, $NH_2$-DOTP, $NH_2$—$(CH_2)_{1-20}$-DOTP, $NH_2$-$(PEG)_{1-20}$-DOTP, HS-DOTP, HS-$(CH_2)_{1-20}$-DOTP, HS-$(PEG)_{1-20}$-DOTP, dibromo-S-$(CH_2)_{1-20}$-DOTP, and dibromo-S-$(PEG)_{1-20}$-DOTP.

The chelator molecules may, for example, be attached to a targeting agent through a linker molecule. Exemplary linker molecules include:

—$CH_2$ $(C_6H_4)$ $NH_2$ or —$CH_2$ $(C_6H_4)$ NH—X—Y, wherein X is

—$R_2$—$CH_2CH_2O(CH_2CH_2O)_nCH_2CH_2$—,
—$R_2$—$CH_2CH_2NHC(O)CH_2CH_2O(CH_2CH_2O)_nCH_2CH_2$—,
—$R_2$—$(CH_2)_nCH_2$—,
—$R_2$—$CH_2CH_2NHC(O)(CH_2)_nCH_2$—,
—$R_2$—$CH(C(O)R_3)$ $CH_2$—, wherein $R_3$ is —OH or a short peptide (1-20 amino acids),
—$R_2$—$CH_2CH_2O(CH_2CH_2O)_nCH_2C(O)O$—, or
—$R_2$—$CH_2CH_2NHC(O)CH_2CH_2O(CH_2CH_2O)_nCH_2CC(O)O$—, wherein n is 1-20, and $R_2$ is —C(O)— or —C(S)NH—; and Y is —$NH_2$ or —$SR_4$—, wherein $R_4$ is —H or —$CH_2$-3,5-bis(bromomethyl)benzene.

Targeting agents, such as protein targeting agents, for example antibodies and antigen-binding antibody fragments, and peptide targeting agents may, for example, be conjugated with a chelator for radiolabeling the targeting agent via chelation of a radionuclide. Such protein or peptide targeting agents, for example, that include lysine(s), may conveniently be conjugated to a DOTA chelating moiety using the bifunctional agent S-2-(4-Isothiocyanatobenzyl)-1,4,7,10-tetraazacyclododecane tetraacetic acid a/k/a/"p-SCN-Bn-DOTA" (Catalog #B205; Macrocyclics, Inc., Plano, TX, USA). p-SCN-Bn-DOTA may be synthesized by a multi-step organic synthesis fully described in U.S. Pat. No. 4,923,985. Chelation of a radionuclide by the DOTA moiety may be performed prior to chemical conjugation of the antibody with p-SCN-Bn-DOTA and/or after said conjugation. Methods for conjugating a targeting agent such as an antibody to DOTA using p-SCN-DOTA and/or labeling the conjugate with a radionuclide via chelation to the DOTA moiety which may be employed in the present invention are disclosed, for example, in U.S. Pat. No. 9,603,954.

LeY targeting agents and other targeting agents containing one or more cysteine residues, such as peptides, proteins, antibodies and protein antibody mimetics may, for example, be chemically conjugated to any of the chelator-bearing, such as DOTA-bearing, stable linkers disclosed in U.S. Pat. No. 11,000,604 titled "Reagent for site-selective bioconjugation of proteins or antibodies" for radionuclide labeling.

Methods for conjugating a targeting agent such as an antibody with DOTA using p-SCN-DOTA or PODS-DOTA and labeling the chelator-conjugated targeting agent with an exemplary radionuclide are further described in Example 1.

Diagnostics

The presently disclosed methods may include diagnosing the subject to ascertain if LeY-positive cells are present. LeY-positive cells may be present in a number of biological specimens, such as in circulating cells in a sample of blood from the subject or tumor cells in a biopsy of the subject. In one aspect, the diagnosing step may generally include obtaining a sample of blood or tissue from the subject and mounting the sample on a substrate. The presence or absence of the LeY antigen may be detected using a diagnostic antibody, peptide, or small molecule, wherein the diagnostic antibody peptide, or small molecule is labeled with any of the standard imaging labels known in the art. Exemplary labeling agents include, for example, radiolabels such as $^3$H, $^{14}$C, $^{32}$P, $^{35}$S, and $^{125}$I; fluorescent or chemiluminescent compounds, such as fluorescein isothiocyanate, rhodamine, or luciferin; and enzymes, such as alkaline phosphatase (e.g., for use with chromogenic substrates such as p-Nitrophenyl Phosphate (pNPP)), β-galactosidase (e.g., for use with chromogenic substrates such as X-gal (5-Bromo-4-chloro-3-indolyl-β-galactopyranoside)), or horseradish peroxidase (e.g., for use with chromogenic substrates such as 3,3'-diaminobenzidine (DAB)). An exemplary LeY targeting agent used in such a diagnostic assay includes a human or humanized antibody against LeY.

Alternatively, the methods may include diagnosing the subject to ascertain if LeY-positive cells are present, to what extent, and/or the localization thereof using a LeY targeting agent labeled with any of $^{18}$F, $^{11}$C, $^{68}$Ga, $^{64}$Cu, $^{89}$Zr, or $^{124}$I, which are useful for PET imaging, or $^{99m}$Tc or $^{111}$In, which are useful for SPECT imaging. Accordingly, the method may include administering to the subject a LeY targeting agent labeled with one or more of $^{18}$F, $^{11}$C, $^{68}$Ga, $^{64}$Cu, $^{89}$Zr, $^{124}$I, $^{99m}$Tc, or $^{111}$In, and performing a non-invasive imaging technique on the subject, such as performing a PET or SPECT scan on the subject. The method may further include, before performing the imaging, waiting a sufficient amount of time for the LeY targeting agent to accumulate in tissues of the subject. According to one variation of the method, the LeY targeting agent may include $^{68}$Ga, $^{89}$Zr, or $^{111}$In, and may be labeled using any of the methods disclosed herein (e.g., such as disclosed in Example 1).

If by performing the diagnostic method(s), it is determined that the subject has LeY-positive cells, such as beyond a predetermined threshold, the therapeutic methods of the presently disclosed invention may be carried out, i.e., administration of a therapeutically effective amount of a radiolabeled, such as 225Ac-labeled, LeY targeting agent, alone or in combination with one or more additional therapeutic agents.

Additional Therapeutic Agents and Modalities

The methods of the present invention that include administration of a radiolabeled LeY targeting agent therapeutic, alone or in combination with other targeting agents, may further include administration of an additional therapeutic agent or modality. According to certain aspects, the additional agent may be relevant for the disease or condition being treated by the radiolabeled LeY targeting agent. Such administration may be simultaneous, separate or sequential with the administration of the effective amount of the LeY targeting agent. For simultaneous administration, the agents may be administered as one composition, or as separate compositions, as appropriate.

Exemplary additional therapeutic agents and modalities that may be used in combination or conjunction with a radiolabeled LeY targeting agent include at least chemotherapeutic agents, small molecule oncology drugs, anti-inflammatory agents, immunosuppressive agents, immunomodulatory agents, include immune checkpoint therapies, DDR inhibitors, CD47 blockades, external beam radiation, brachytherapy, or any combination thereof. Exemplary additional agents and treatment modalities that may be used in combination or conjunction with a radiolabeled LeY targeting agent alone or in combination other targeting agents as disclosed herein are further described below.

A. Chemotherapeutic and Other Small Molecule Agents

Exemplary chemotherapeutic agents include, but are not limited to, anti-neoplastic agents including alkylating agents including: nitrogen mustards, such as mechlorethamine, cyclophosphamide, ifosfamide, melphalan and chlorambucil; nitrosoureas, such as carmustine (BCNU), lomustine (CCNU), and semustine (methyl-CCNU); Temodal™ (temozolomide), ethylenimines/methylmelamine such as thriethylenemelamine (TEM), triethylene, thiophosphoramide (thiotepa), hexamethylmelamine (HMM, altretamine); alkyl sulfonates such as busulfan; triazines such as dacarbazine (DTIC); antimetabolites including folic acid analogs such as methotrexate and trimetrexate, pyrimidine analogs such as 5-fluorouracil (5FU), fluorodeoxyuridine, gemcitabine, cytosine arabinoside (AraC, cytarabine), 5-azacytidine, 2,2'-difluorodeoxycytidine, purine analogs such as 6-mercaptopurine, 6-thioguamne, azathioprine, T-deoxycoformycin (pentostatin), erythrohydroxynonyladenine (EHNA), fludarabine phosphate, and 2-chlorodeoxyadenosine (cladribine, 2-CdA); natural products including antimitotic drugs such as paclitaxel, vinca alkaloids including vinblastine (VLB), vincristine, and vinorelbine, taxotere, estramustine, and estramustine phosphate; pipodophylotoxins such as etoposide and teniposide; antibiotics such as actinomycin D, daunomycin (rubidomycin), doxorubicin, mitoxantrone, idarubicin, bleomycins, plicamycin (mithramycin), mitomycin C, and actinomycin; enzymes such as L-asparaginase; biological response modifiers such as interferon-alpha, IL-2, G-CSF and GM-CSF; miscellaneous agents including platinum coordination complexes such as oxaliplatin, cisplatin and carboplatin, anthracenediones such as mitoxantrone, substituted urea such as hydroxyurea, methylhydrazine derivatives including N-methylhydrazine (MIH) and procarbazine, adrenocortical suppressants such as mitotane (o, p-DDD) and aminoglutethimide; hormones and antagonists including adrenocorticosteroid antagonists such as prednisone and equivalents, dexamethasone and aminoglutethimide; Gemzar™ (gemcitabine), progestin such as hydroxyprogesterone caproate, medroxyprogesterone acetate and megestrol acetate; estrogen such as diethylstilbestrol and ethinyl estradiol equivalents; antiestrogen such as tamoxifen; androgens including testosterone propionate and fluoxymesterone/equivalents; antiandrogens such as flutamide, gonadotropin-releasing hormone analogs and leuprolide; and non-steroidal antiandrogens such as flutamide.

Therapies targeting epigenetic mechanisms including, but not limited to: (i) histone deacetylase (HDAC) inhibitors such as Vorinostat (suberoylanilide hydroxamic acid; SAHA), Romidepsin, Belinostat (PDX101), Panobinostat (LBH589) and Tucidinostat, demethylating agents (e.g., Vidaza); (ii) LSD1 inhibitors such as seclidemstat, TCP (tranylcypromine), ORY-1001 (iadademstat), GSK2879552 (GSK), INCB059872 (Imago BioSciences), IMG-7289 (Bomedemstat; Imago BioSciences), ORY-2001 (Vafidemstat), and CC-90011 (Celgene); and (iii) release of transcriptional repression (ATRA) therapies, may also be used in combination or conjunction with a radiolabeled LeY targeting agent and/or other radiolabeled targeting agents and combinations thereof as disclosed herein.

According to certain aspects of the present invention, the chemotherapeutic agents include at least radiosensitizers, such as temozolomide, cisplatin, and/or fluorouracil.

The additional agents may, for example, include a bcl-2 inhibitor such as navitoclax or venetoclax (Venclexta®; Abbvie) and the combination may, for example, be used for the treatment of solid tumors such as breast cancers and lunger cancer such as small cell lung carcinoma (SCLC).

The additional agents may, for example, include a cyclin-dependent kinase CDK4 and CDK6 inhibitor such as palbociclib (Ibrance®; Pfizer) and the combination may, for example, be used for the treatment of solid cancers such as breast cancers such as HR-positive and HER2-negative breast cancer, with or without an aromatase inhibitor.

The additional agents may, for example, include erlotinib (Tarceva®; Roche) and the combination may, for example, be used for the treatment of solid tumor cancers such as non-small cell lung cancer (NSCLC), for example, with mutations in the epidermal growth factor receptor (EGFR) and pancreatic cancer.

The additional agents may, for example, include sirolimus or everolimus (Affinitor®; Novartis) and the combination may, for example, be used for the treatment of solid tumor cancers such as melanoma and breast cancer.

The additional agents may, for example, include pemetrexed (Alimta®; Eli Lilly) and the combination may, for example, be used for the treatment of solid cancers such as mesothelioma such as pleural mesothelioma and lung cancer such as non-small cell lung cancer (NSCLC).

The additional therapeutic agents may, for example, be administered according to any standard dose regime known in the field. For example, therapeutic agents may be administered at concentrations in the range of 1 to 500 mg/m$^2$, the amounts being calculated as a function of patient surface area (m$^2$). For example, exemplary doses of the chemotherapeutic paclitaxel may include 15 mg/m$^2$ to 275 mg/m$^2$, exemplary doses of docetaxel may include 60 mg/m$^2$ to 100 mg/m$^2$, exemplary doses of epithilone may include 10 mg/m$^2$ to 20 mg/m$^2$, and an exemplary dose of calicheamicin may include 1 mg/m$^2$ to 10 mg/m$^2$. While exemplary doses are listed herein, such are only provided for reference and are not intended to limit the dose ranges of the drug agents of the presently disclosed invention.

B. External Beam Radiation and/or Brachytherapy

The additional therapeutic modality administered in conjunction with the LeY targeting agent, and optionally any other of the additional therapeutics disclosed herein, may be an ionizing radiation, such as administered via external beam radiation or brachytherapy. Such radiation generally refers to the use of X-rays, gamma rays, or charged particles (e.g., protons or electrons) to generate ionizing radiation, such as delivered by a machine placed outside the patient's body (external-beam radiation therapy) or by a source placed inside a patient's body (internal radiation therapy or brachytherapy).

The external beam radiation or brachytherapy may enhance the targeted radiation damage delivered by the radiolabeled LeY targeting agent and may thus be delivered sequentially with the LeY targeting agent, such as before and/or after the LeY targeting agent, or simultaneous with the LeY targeting agents.

The external beam radiation or brachytherapy may be planned and administered in conjunction with imaging-based techniques such as computed tomography (CT) and/or magnetic resonance imaging (MRI) to accurately determine the dose and location of radiation to be administered. For example, a patient treated with any of the radiolabeled LeY targeting agents disclosed herein may be imaged using either of CT or MRI to determine the dose and location of radiation to be administered by the external beam radiation or brachytherapy.

In various embodiments, the radiation therapy may be selected from the group consisting of total all-body radiation therapy, conventional external beam radiation therapy, stereotactic radiosurgery, stereotactic body radiation therapy, 3-D conformal radiation therapy, intensity-modulated radiation therapy, image-guided radiation therapy, tomotherapy, and brachytherapy. According to certain aspects, the radiation therapy may be provided as a single dose or as fractionated doses, e.g., as 2 or more fractions. For example, the dose may be administered such that each fraction includes 2-20 Gy (e.g., a radiation dose of 50 Gy may be split up into 10 fractions, each including 5 Gy). The 2 or more fractions may be administered on consecutive or sequential days, such as once in 2 days, once in 3 days, once in 4 days, once in 5 days, once in 6 days, once in 7 days, or in a combination thereof.

C. Immune Checkpoint Therapies

The additional agent(s) administered in conjunction with the LeY targeting agent may be an immune checkpoint therapy. Cancer cells have developed means to evade the standard checkpoints of the immune system. For example, cancer cells have been found to evade immunosurveillance through reduced expression of tumor antigens, downregulation of MHC class I and II molecules leading to reduced tumor antigen presentation, secretion of immunosuppressive cytokines such as TGFb, recruitment or induction of immunosuppressive cells such as regulatory T cells (Treg) or myeloid-derived suppressor cells (MDSC), and overexpression of certain ligands [e.g., programmed death ligand-1 (PD-L1)] that inhibit the host's existing antitumor immunity.

Another major mechanism of immune suppression by cancer cells is a process known as "T-cell exhaustion", which results from chronic exposure to tumor antigens, and is characterized by the upregulation of inhibitory receptors. These inhibitory receptors serve as immune checkpoints in order to prevent uncontrolled immune reactions.

Various immune checkpoints acting at different levels of T cell immunity have been described in the literature, including PD-1 (i.e., programmed cell death protein 1) and its ligands PD-L1 and PD-L2, CTLA-4 (i.e., cytotoxic T-lymphocyte associated protein-4) and its ligands CD80 and CD86, LAG3 (i.e., Lymphocyte-activation gene 3), B and T lymphocyte attenuator, TIGIT (T-cell immunoreceptor with Ig and ITIM domains), TIM-3 (i.e., T-cell immunoglobulin and mucin-domain containing protein 3), and VISTA (V-domain immunoglobulin suppressor of T cell activation).

Enhancing the efficacy of the immune system by therapeutic intervention is a particularly exciting development in cancer treatment. As indicated, checkpoint inhibitors such as CTLA-4 and PD-1 prevent autoimmunity and generally protect tissues from immune collateral damage. In addition, stimulatory checkpoints, such as OX40 (i.e., tumor necrosis factor receptor superfamily, member 4; TNFR-SF4), CD137 (i.e., TNFR-SF9), GITR (i.e., Glucocorticoid-Induced TNFR), CD27 (i.e., TNFR-SF7), CD40 (i.e., cluster of differentiation 40), and CD28, activate and/or promote the expansion of T-cells. Regulation of the immune system by inhibition or overexpression of these proteins is an area of promising current research.

Thus, a promising therapeutic strategy is the use of immune checkpoint therapies that may remove certain blockades on the immune system that are utilized by cancer cells, in combination with the LeY targeting agents disclosed herein. For example, antibodies against certain immune checkpoint inhibitors (ICI) may block interaction between checkpoint inhibitor proteins and their ligands, therefore preventing the signaling events that would otherwise have led to inhibition of an immune response against the tumor cell.

Moreover, there is a growing body of preclinical evidence supporting the ability of radiation to synergize with ICI antibodies, and this is also being explored in the clinic with increasing numbers of clinical trials evaluating the combination of external beam radiation with immune checkpoint therapies across various tumor types and ICI antibodies (Lamichhane, 2018). Clinical evidence supporting this combination has been generated in melanoma, with two studies demonstrating a clinical benefit using radiation in combination with the anti-cytotoxic T-lymphocyte-associated protein 4 (CTLA-4) ICI antibody, Ipilimumab (Twyman-Saint Vistor, 2015).

Accordingly, an object of the presently disclosed invention is to provide therapies for the treatment of cancer using a LeY targeting agent in combination with one or more immune checkpoint therapies, such as an ICI antibody.

Immune checkpoint therapies of the present invention include molecules that totally or partially reduce, inhibit, interfere with or modulate one or more checkpoint proteins. Checkpoint proteins regulate T-cell activation or function. Immune checkpoint therapies may unblock an existing immune response inhibition by binding to or otherwise disabling checkpoint inhibition. The immune checkpoint therapies may include monoclonal antibodies, humanized antibodies, fully human antibodies, antibody fragments, small molecule therapeutics, or a combination thereof.

Exemplary immune checkpoint therapies may specifically bind to and inhibit a checkpoint protein, such as the inhibitory receptors CTLA-4, PD-1, TIM-3, VISTA, BTLA, LAG-3 and TIGIT, and/or the activating receptors CD28, OX40, CD40, GITR, CD137, CD27, and HVEM. Additionally, the immune checkpoint therapy may bind to a ligand of any of the aforementioned checkpoint proteins, such as PD-L1, PD-L2, PD-L3, and PD-L4 (ligands for PD-1); CD80 and CD86 (ligands for CTLA-4); CD137-L (ligand of CD137); and GITR-L (ligand of GITR). Other exemplary immune checkpoint therapies may bind to checkpoint proteins such as CD226, B7-$H_3$, B7-$H_4$, BTLA, TIGIT, GALS, KIR, 2B4 (belongs to the CD2 family of molecules and is expressed on all NK, γδ, and memory CD8+ (αβ) T cells), CD160 (also referred to as BY55), and CGEN-15049.

Central to the immune checkpoint process are the CD137, CTLA-4 and PD-1 immune checkpoint pathways.

The CTLA-4 and PD-1 pathways are thought to operate at different stages of an immune response. CTLA-4 is considered the "leader" of the immune checkpoint inhibitors (ICI), as it stops potentially autoreactive T cells at the initial stage of naive T-cell activation, typically in lymph nodes. The PD-1 pathway regulates previously activated T cells at the later stages of an immune response, primarily in peripheral tissues. Moreover, progressing cancer patients have been shown to lack upregulation of PD-L1 by either tumor cells or tumor-infiltrating immune cells. Immune checkpoint therapies targeting the PD-1 pathway might thus be especially effective in tumors where this immune suppressive axis is operational and reversing the balance towards an immune protective environment would rekindle and strengthen a pre-existing anti-tumor immune response. PD-1 blockade can be accomplished by a variety of mechanisms including antibodies that bind PD-1 or its ligand, PD-L1.

According to certain aspects of the presently disclosed invention, the immune checkpoint therapy may include an inhibitor of the PD-1 checkpoint, which may decrease, block, inhibit, abrogate, or interfere with signal transduction resulting from the interaction of PD-1 with one or more of its binding partners, such as PD-L1 and PD-L2. The inhibitor of the PD-1 checkpoint may be an anti-PD-1 antibody, antigen binding fragment, fusion proteins, oligopeptides, and other molecules that decrease, block, inhibit, abrogate or interfere with signal transduction resulting from the interaction of PD-1 with PD-L1 and/or PD-L2. In some embodiments, a PD-1 checkpoint inhibitor reduces the negative co-stimulatory signal mediated by or through cell surface proteins expressed on T lymphocytes so as render a dysfunctional T-cell less dysfunctional (e.g., enhancing effector responses to antigen recognition). In some embodiments, the PD-1 checkpoint therapy is an anti-PD-1 antibody.

Thus, according to certain aspects of the present invention, the immune checkpoint therapy may include a monoclonal antibody against an immune checkpoint inhibitor (ICI) such as against CTLA-4, PD-1, or PD-L1.

According to certain aspects, the ICI antibody may be an antibody against PD-1. The ICI antibody may be an anti-PD-1 antibody, such as nivolumab. For example, the inhibitors of PD-1 biological activity (or its ligands) disclosed in U.S. Pat. No. 7,029,674. Exemplary antibodies against PD-1 include: Anti-mouse PD-1 antibody Clone J43 (Cat #BE0033-2) from BioXcell; Anti-mouse PD-1 antibody Clone RMP1-14 (Cat #BE0146) from BioXcell; mouse anti-PD-1 antibody Clone EH12; Merck's MK-3475 anti-mouse PD-1 antibody (Keytruda®, pembrolizumab, lambrolizumab); and AnaptysBio's anti-PD-1 antibody, known as ANB011; antibody MDX-1 106 (ONO-4538); Bristol-Myers Squibb's human IgG4 monoclonal antibody nivolumab (Opdivo®, BMS-936558, MDX1106); Astra-Zeneca's AMP-514, and AMP-224; and Pidilizumab (CT-011), CureTech Ltd.

According to certain aspects, the immune checkpoint therapy is an inhibitor of PD-L1. Exemplary inhibitors of PD-L1 include antibodies (e.g., an anti-PD-L1 antibody, i.e., ICI antibody), RNAi molecules (e.g., anti-PD-L1 RNAi), antisense molecules (e.g., an anti-PD-L1 antisense RNA), dominant negative proteins (e.g., a dominant negative PD-L1 protein), and small molecule inhibitors. An exemplary anti-PD-L1 antibody includes clone EH12. Exemplary antibodies against PD-L1 include: Genentech's MPDL3280A (RG7446); anti-mouse PD-L1 antibody Clone 10F.9G2 (Cat #BE0101) from BioXcell; anti-PD-L1 monoclonal antibody MDX-1105 (BMS-936559) and BMS-935559 from Bristol-Meyer's Squibb; MSB0010718C; mouse anti-PD-L1 Clone 29E.2A3; and AstraZeneca's MEDI4736 (Durvalumab).

According to certain aspects, the immune checkpoint therapy is an inhibitor of PD-L2 or may reduce the interaction between PD-1 and PD-L2. Exemplary inhibitors of PD-L2 include antibodies (e.g., an anti-PD-L2 antibody, i.e., ICI antibody), RNAi molecules (e.g., an anti-PD-L2 RNAi), antisense molecules (e.g., an anti-PD-L2 antisense RNA), dominant negative proteins (e.g., a dominant negative PD-L2 protein), and small molecule inhibitors. Antibodies include monoclonal antibodies, humanized antibodies, deimmunized antibodies, and Ig fusion proteins.

According to certain aspects, the immune checkpoint therapy may be an inhibitor of CTLA-4, such as an anti-CTLA-4 antibody, i.e., ICI antibody. According to one aspect, the ICI antibody may be ipilimumab. The anti-CTLA-4 antibody may block the binding of CTLA-4 to CD80 (B7-1) and/or CD86 (B7-2) expressed on antigen presenting cells. Exemplary antibodies against CTLA-4 include: Bristol Meyers Squibb's anti-CTLA-4 antibody ipilimumab (also known as Yervoy®, MDX-010, BMS-734016 and MDX-101); anti-CTLA4 Antibody, clone 9H10 from Millipore; Pfizer's tremelimumab (CP-675,206, ticilimumab); and anti-CTLA-4 antibody clone BNI3 from Abcam. According to certain aspects, the immune checkpoint inhibitor may be a nucleic acid inhibitor of CTLA-4 expression.

CD137 (also known "TNF receptor superfamily member 9") is a costimulatory receptor member of the tumor necrosis factor receptor superfamily, mediating CD28-dependent and independent T-cell co-stimulation (Bartkowiak, 2015). CD137 is inducibly expressed by T cells, natural killer (NK) cells, dendritic cells (DC), B cells, and other cells of the immune system. The protein is composed of a 255-amino acid protein having a short N-terminal cytoplasmic portion, a transmembrane region, and an extracellular domain that possesses 3 cysteine-rich motifs. Ligation of CD137 by its ligand CD137L (4-1BBL; TNFSF9), which is mainly, though not exclusively, expressed on Antigen-Presenting Cells (APCs), evokes various T cell responses such as cell expansion, increased cytokine secretion and the prevention of activation-induced cell death. Thus, such ligation serves to activate the immune system. However, cis-interactions between CD137 and CD137L also potently downregulate the expression of CD137L (Kwon, 2015). The CD137 ligand thus functions to control the extent and kinetics of CD137-mediated immune system activation (Kwon, 2015). Significantly, CD137 expressed on human NK cells becomes upregulated upon binding to anti-tumor antibodies that have become bound to tumor cells (Wei, 2014).

Thus, according to certain aspects of the presently disclosed invention, the immune checkpoint therapy may include an antibody against CD137, which could be used to activate the immune system and thereby provide a therapy for cancer in combination with the presently disclosed LeY targeting agents. Exemplary anti-CD137 antibodies that may be used are disclosed in U.S. Publication Nos. 20140274909; 20130280265; 20130273078; 20130071403; 20120058047; 20110104049; 20110097313; 20080166336; 20080019905; 20060188439; 20060182744; 20060121030; and 20030223989.

According to certain aspects of the present invention, the immune checkpoint therapy may include more than one modulator of an immune checkpoint protein. As such, the immune checkpoint therapy may include a first antibody or inhibitor against a first immune checkpoint protein and a second antibody or inhibitor against a second immune checkpoint protein.

the DDR, i.e., DDR inhibitors or DDRi, thus maximizing DNA damage or inhibiting the repair if the damage, such as in G1 and S-phase and/or preventing repair in G2, ensuring the maximum amount of DNA damage is taken into mitosis, leading to cell death.

TABLE 1

| DNA repair mechanism | Gene examples | Cancer |
|---|---|---|
| Base Excision Repair | OGGI | Renal, breast and lung cancer |
|  | XRCC1 | Non-small cell lung cancer |
| Nucleotide Excision Repair | ERCC1 | Lung and skin cancer, and glioma |
|  | XP | Xeroderma pigmentosum predisposing to skin cancer. Also increased risk of bladder and lung cancer |
| Mismatch Repair | MSH2, MLH1 | Lynch syndrome predisposing to colorectal cancer as well as endometrial, ovarian, stomach, small intestine, hepatobiliary tract, upper urinary tract, brain and skin cancer |
| Homologous Recombinant Repair | BRCA1, BRCA2 | Increased risk of breast, ovarian, prostate, pancreatic, as well as gastrointestinal and hematological cancer, and melanoma |
| Non-homologous End Joining | KU70 | Breast, colorectal and lung cancer |
|  | KU80 | Lung cancer |
| Cell cycle checkpoints | ATM | Ataxia-telangiectasia predisposing to leukemia, breast and pancreatic cancer |
|  | ATR | Leukemia, lymphoma, gastric and endometrial cancer |

D. DNA Damage Response Inhibitors

The additional agents administered in conjunction with the LeY targeting agent may be one or more DNA damage response inhibitors (DDRi). DNA damage can be due to endogenous factors, such as spontaneous or enzymatic reactions, chemical reactions, or errors in replication, or may be due to exogenous factors, such as UV or ionizing radiation or genotoxic chemicals. The repair pathways that overcome this damage are collectively referred to as the DNA damage response or DDR. This signaling network acts to detect and orchestrate a cell's response to certain forms of DNA damage, most notably double strand breaks and replication stress. Following treatment with many types of DNA damaging drugs and ionizing radiation, cells are reliant on the DDR for survival. It has been shown that disruption of the DDR can increase cancer cell sensitivity to these DNA damaging agents and thus may improve patient responses to such therapies.

Within the DDR, there are several DNA repair mechanisms, including base excision repair, nucleotide excision repair, mismatch repair, homologous recombinant repair, and non-homologous end joining. Approximately 450 human DDR genes code for proteins with roles in physiological processes. Dysregulation of DDR leads to a variety of disorders, including genetic, neurodegenerative, immune, cardiovascular, and metabolic diseases or disorders and cancers. For example, the genes OGGI and XRCC1 are part of the base excision repair mechanism of DDR, and mutations in these genes are found in renal, breast, and lung cancers, while the genes BRCA1 and BRCA2 are involved in homologous recombination repair mechanisms and mutations in these genes leads to an increased risk of breast, ovarian, prostate, pancreatic, as well as gastrointestinal and hematological cancers, and melanoma. Exemplary DDR genes are provided in Table 1.

An object of the presently disclosed invention is to administer radiolabeled LeY targeting agents that deliver ionizing radiation in combination with a DDRi. Thus, according to certain aspects, the additional agent(s) administered with the LeY targeting agent may target proteins in Moreover, one or more DDR pathways may be targeted to ensure cell death, i.e., lethality to the targeted cancer cells. For example, mutations in the BRCA1 and 2 genes alone may not be sufficient to ensure cell death, as other pathways, such as the PARP1 base excision pathway, may act to repair the DNA damage. Thus, combinations of multiple DDRi inhibitors or combining DDRi with antiangiogenic agents or immune checkpoint inhibitors, such as listed hereinabove, are possible and an object of the presently disclosed invention.

Exemplary DDRi—ATM and ATR Inhibitors

Ataxia telangiectasia mutated (ATM) and Ataxia talangiectasia mutated and Rad-3 related (ATR) are members of the phosphatidylinositol 3-kinase-related kinase (PIKK) family of serine/threonine protein kinases.

ATM is a serine/threonine protein kinase that is recruited and activated by DNA double-strand breaks. The ATM phosphorylates several key proteins that initiate activation of a DNA damage checkpoint, leading to cell cycle arrest, DNA repair, or cellular apoptosis. Several of these targets, including p53, CHK2, and H2AX, are tumor suppressors. The protein is named for the disorder ataxia telangiectasia caused by mutations of the ATM. The ATM belongs to the superfamily of phosphatidylinositol 3-kinase-related kinases (PIKKs), which includes six serine/threonine protein kinases that show a sequence similarity to a phosphatidylinositol 3-kinase (PI3K).

Like ATM, ATR is one of the central kinases involved in the DDR. ATR is activated by single stranded DNA structures, which may for example arise at resected DNA DSBs or stalled replication forks. When DNA polymerases stall during DNA replication, the replicative helicases continue to unwind the DNA ahead of the replication fork, leading to the generation of long stretches of single stranded DNA (ssDNA).

ATM has been found to assist cancer cells by providing resistance against chemotherapeutic agents and thus favors tumor growth and survival. Inhibition of ATM and/or ATR may markedly increase cancer cell sensitivity to DNA damaging agents, such as the ionizing radiation provided by the radiolabeled LeY targeting agent. Accordingly, an object of the presently disclosed invention includes administration of an inhibitor of ATM (ATMi) and/or ATR (ATRi), in combination with the LeY targeting agents, to inhibit or kill cancer cells, such as those expressing tor overexpressing LeY.

The inhibitor of ATM (ATMi) or ATR (ATRi) may be an antibody, peptide, or small molecule that targets ATM or ATR, respectively. Alternatively, an ATMi or ATRi may reduce or eliminate activation of ATM or ATR by one or more signaling molecules, proteins, or other compounds, or can result in the reduction or elimination of ATM or ATR activation by all signaling molecules, proteins, or other compounds. ATMi and/or ATRi also include compounds that inhibit their expression (e.g., compounds that inhibit ATM or ATR transcription or translation). An exemplary ATMi KU-55933 suppresses cell proliferation and induces apoptosis. Other exemplary ATMi include at least KU-59403, wortmannin, CP466722, and KU-60019. Exemplary ATRi include at least Schisandrin B, NU6027, NVP-BEA235, VE-821, VE-822, AZ20, and AZD6738.

Exemplary DDRi—Wee1 Inhibitors

The checkpoint kinase Wee1 catalyzes an inhibitory phosphorylation of both CDK1 (CDC2) and CDK2 on tyrosine 15, thus arresting the cell cycle in response to extrinsically induced DNA damage. Deregulated Wee1 expression or activity is believed to be a hallmark of pathology in several types of cancer. For example, Wee1 is often overexpressed in glioblastomas, malignant melanoma, hepatocellular carcinoma, breast cancer, colon carcinoma, lung carcinoma, and head and neck squamous cell carcinoma. Advanced tumors with an increased level of genomic instability may require functional checkpoints to allow for repair of such lethal DNA damage. As such, the present inventors believe that Wee1 represents an attractive target in advanced tumors where its inhibition is believed to result in irreparable DNA damage. Accordingly, an object of the presently disclosed invention includes administration of an inhibitor of Wee1, in combination with the LeY targeting agents, to inhibit or kill cancer cells, such as those expressing tor overexpressing LeY.

A Wee1 inhibitor may be an antibody, peptide, or small molecule that targets Wee1. Alternatively, a Wee1 inhibitor may reduce or eliminate Wee1 activation by one or more signaling molecules, proteins, or other compounds, or can result in the reduction or elimination of Wee1 activation by all signaling molecules, proteins, or other compounds. The term also includes compounds that decrease or eliminate the activation or deactivation of one or more proteins or cell signaling components by Wee1 (e.g., a Wee1 inhibitor can decrease or eliminate Wee1-dependent inactivation of cyclin and Cdk activity). Wee1 inhibitors also include compounds that inhibit Wee1 expression (e.g., compounds that inhibit Wee1 transcription or translation).

Exemplary Wee1 inhibitors include AZD-1775 (i.e., adavosertib), and inhibitors such as those described in, e.g., U.S. Pat. Nos. 7,834,019; 7,935,708; 8,288,396; 8,436,004; 8,710,065; 8,716,297; 8,791,125; 8,796,289; 9,051,327; 9,181,239; 9,714,244; 9,718,821; and 9,850,247; U.S. Pub. Nos. US20100113445 and 20160222459; and International Pub. Nos. WO2002090360, 2015019037, 2017013436, 2017216559, 2018011569, and 2018011570.

Further Wee1 inhibitors include a pyrazolopyrimidine derivative, a pyridopyrimidine, 4-(2-chlorophenyl)-9-hydroxypyrrolo[3,4-c]carbazole-1,3-(2H, 6H)-dione (CAS No. 622855-37-2), 6-butyl-4-(2-chlorophenyl)-9-hydroxypyrrolo[3,4-c]carbazole-1,3-(2H,6H)-dione (CAS No. 62285550-9), 4-(2-phenyl)-9-hydroxypyrrolo[3,4-c]carbazole-1,3-(2H,6H)-dione (CAS No. 1177150-89-8), and an anti-Wee1 small interfering RNA (siRNA) molecule.

Exemplary DDRi—PARP Inhibitors

Another exemplary type of DDRi that may be used are inhibitors of poly(ADP-ribose) polymerase ("PARP"). Inhibitors of the DNA repair protein PARP, referred to individually and collectively as "PARPi", have been approved for use in a range of solid tumors, such as breast and ovarian cancer, particularly in patients having BRCA1/2 mutations. BRCA1 and 2 function in homologous recombination repair (HRR). When mutated, they induce genomic instability by shifting the DNA repair process from conservative and precise HRR to non-fidelitous methods such as DNA endjoining, which can produce mutations via deletions and insertions.

PARPi have been shown to exhibit synthetic lethality, as exhibited by potent single agent activity, in BRCA1/2 mutant cells. This essentially blocks repair of single-strand DNA breaks. Since HRR is not functional in these tumor cells, cell death results. Because most tumors do not carry BRCA1 or BRCA2 mutations, the potency of PARPi in such tumors is far less pronounced.

To date, the FDA has approved four PARPi drugs (olaparib, niraparib, rucaparib and talazoparib) as monotherapy agents, specifically in patients with germline and somatic mutations in the BRCA1 and BRCA2 genes. Along with veliparib, olaparib, niraparib and rucaparib were among the first generation of PARPi that entered clinical trials. Their IC50 values were found to be in the nanomolar range. In contrast, second generation PARPi like talazoparib have IC50 values in the picomolar range.

These PARPi all bind to the binding site of the cofactor, b nicotinamide adenine dinucleotide (b-NAD+), in the catalytic domain of PARP1 and PARP2. The PARP family of enzymes use NAD+ to covalently add Poly(ADP-ribose) (PAR) chains onto target proteins, a process termed "PARylation." PARP1 (which is the best-studied member) and PARP2, are important components of the DNA damage response (DDR) pathway. PARP1 is involved in the repair of single-stranded DNA breaks, and possibly other DNA lesions (Woodhouse, et al.; Krishnakumar, et al.). Through its zinc finger domains, PARP1 binds to damaged DNA and then PARylates a series of DNA repair effector proteins, releasing nicotinamide as a by-product (Krishnakumar, et al.). Subsequently, PARP1 auto-PARylation leads to release of the protein from the DNA. The available PARPi, however, differ in their capability to trap PARP1 on DNA, which seems to correlate with cytotoxicity and drug efficacy. Specifically, drugs like talazoparib and olaparib are more effective in trapping PARP1 than are veliparib (Murai, et al., 2012; Murai, et al., 2014).

The efficacy of PARPi in ovarian cancer and breast cancer patients who have loss-of-function mutations in BRCA1 or BRCA2 genes is largely attributed to the genetic concept of synthetic lethality: that proteins of BRCA 1 and 2 normally maintain the integrity of the genome by mediating a DNA repair process, known as homologous recombination repair (HRR); and PARPi causes a persistent DNA lesion that, normally, would otherwise be repaired by HR. In the presence of PARPi, PARP1 is trapped on DNA which stalls progression of the replication fork. This stalling is cytotoxic unless timely repaired by the HR system. In cells lacking effective HR, they are unable to effectively repair these DNA lesions, and thus die.

Again, mutations in BRCA genes and others in the HRR system are not prevalent in many cancer types. So, to better harness the therapeutic benefits of PARPi in such cancers, one can induce "artificial" synthetic lethality by pairing a PARPi with either chemotherapy or radiation therapy. Preclinical studies have demonstrated that combining radiation therapy and PARPi can increase the sensitivity of BRCA1/2 mutant tumor cells to PARP inhibition and extend the sensitivity of non-mutant BRCA tumors to PARP inhibition. Additional studies have shown that ionizing radiation (IR) itself can mediate PARPi synthetic lethality in tumor cells.

Accordingly, an object of the presently disclosed invention is to administer radiolabeled LeY targeting agents that deliver ionizing radiation in combination with a PARPi.

In the various embodiments of this invention, the PARPi may be any known agent performing that function, and preferably, one approved by the FDA. Preferably, the PARPi is olaparib (Lynparza®), niraparib (Zejula®), rucaparib (Rubraca®) or talazoparib (Talzenna®).

Clinically, therapy with PARPi has resulted in sustained anti-tumor responses in a range of cancers including ovarian, prostate, pancreatic, and triple-negative breast cancers (TNBC). In one clinical trial, TNBC patients with germline BRCA1/2 mutations were treated with the PARPi, olaparib. While this therapy demonstrated a higher disease stabilization rate in BRCA1/2-mutant compared to non-mutant patients, there were no sustained responses achieved in either cohort (Gelmon, 2011).

The present inventors realized that the effect of PARPi may be improved through increases in dsDNA breaks induced by ionizing radiation provided by a LeY targeting agent while these repair pathways are being blocked by the PARPi. Exemplary PARPi include olaparib, niraparib, rucaparib and talazoparib.

E. CD47 Blockades

The additional agents administered with the LeY targeting agent may be a CD47 blockade, such as any agent that interferes with, or reduces the activity and/or signaling between CD47 (e.g., on a target cell) and SIRPα (e.g., on a phagocytic cell), for example, through interaction with either CD47 or SIRPα. Non-limiting examples of suitable CD47 blockades include CD47 and/or SIRPα reagents, including without limitation SIRPα polypeptides, anti-SIRPα antibodies, soluble CD47 polypeptides, and anti-CD47 antibodies or antibody fragments.

The CD47 blockade may alternatively, or additionally, include agents that modulate the expression of CD47 and/or SIRPα, such as phosphorodiamidate morpholino oligomers (PMO) that block translation of CD47 such as MBT-001 (PMO, morpholino, Sequence: 5'-CGT-CACAGGCAGGACCCACTGCCCA-3') [SEQ ID NO: 114]) or any of the PMO oligomer CD47 inhibitors disclosed in any of U.S. Pat. Nos. 8,557,788, 8,236,313, 10,370,439 and Int'l Pub. No. WO2008060785.

The CD47 antibodies or anti-sense approaches may, for example, inhibit CD47 expression (e.g., inhibiting cell surface expression of CD47), activity, and/or signaling, or may interfere with the interaction between CD47 and SIRPα. The agents provided herein completely or partially reduce or otherwise modulate CD47 expression or activity upon binding to, or otherwise interacting with, CD47, e.g., a human CD47. The reduction or modulation of a biological function of CD47 is complete, significant, or partial upon interaction between the antibodies and the human CD47 polypeptide and/or peptide. The agents are considered to inhibit CD47 expression or activity when the level of CD47 expression or activity in the presence of the antibody is decreased by at least 50%, e.g., by 60%, 70%, 80%, 90%, 95%, 96%, 98%, 99%, or 100% as compared to the level of CD47 expression or activity in the absence of interaction, e.g., binding, with the antibody described herein.

According to certain aspects, an anti-CD47 agent is an antibody that specifically binds CD47 (i.e., an anti-CD47 antibody) and reduces the interaction between CD47 on one cell (e.g., an infected cell) and SIRPα on another cell (e.g., a phagocytic cell). Non-limiting examples of suitable antibodies include clones B6H12, 5F9, 8B6, and $C_3$ and any of those described in International Pub. No. WO2011/143624 and U.S. Pub. 20210246206. Suitable anti-CD47 antibodies include fully human, humanized or chimeric versions of such antibodies.

Exemplary human or humanized antibodies especially useful for in vivo applications in humans due to their low antigenicity include at least monoclonal antibodies against CD47, such as Hu5F9-G4, a humanized monoclonal antibody available from Gilead as Magrolimab (Sikic, et al. (2019) *Journal of Clinical Oncology* 37:946); Lemzoparlimab and TJC4 from I-Mab Biopharma; AO-176 from Arch Oncology, Inc; AK117 from Akesobio Australia Pty; IMC-002 from Innovent Biologics; ZL-1201 from Zia Lab; SHR-1603 from Jiangsu HengRui Medincine Co.; and SRF231 from Surface Oncology. Bispecific monoclonal antibodies are also available, such as IBI-322, targeting both CD47 and PD-L1 from Innovent Biologics. Antibodies against SIRPα are also possible, such as ALX148 from Alx Oncology; BI 765063 (OSE-172) from OSE; as well as small molecule inhibitors, such as RRx-001 (1-bromoacetyl-3,3 dinitroazetidine) from EpicentRx and Azelnidipine (CAS number 123524-52-7) or pharmaceutically acceptable salts thereof. See also Table 2 for further description of exemplary agents.

TABLE 2

| Company | Approach | Agent/Program |
|---|---|---|
| Akesobio Australia Pty Ltd | CD47 mAb | AK117 |
| Arch Oncology (Tioma Therapeutics) | CD47 mAb | AO-176 |
| Elpiscience Biopharma Inc. | CD47 | ES004 |
| EpicentRx | Small molecule inhibitor of dinitroazetidine hypoxia sensor to downregulate CD47/SIRPα | RRx-001 (1-bromoacetyl-3,3 dinitroazetidine) |
| ImmuneOncia Therapeutics | CD47 mAb human | IMC-002 |
| Innovent Biologics | CD47 mAb | IBI-188 (CD47 mAb) |
| | CD47/PD-L1 bispecific mAb | IBI-322 (Bispecific) |
| OSE | SIRPα mAb | BI 765063 (OSE-172) |
| Zai Lab | CD47 mAb | ZL-1201 |
| Alx Oncology | High-affinity SIRPα-Fc | ALX148 |

TABLE 2-continued

| Company | Approach | Agent/Program |
|---|---|---|
| Gilead/Forty Seven | CD47 mAb SIRPα mAb | Magrolimab FSI-189 |
| I-Mab Biopharma | CD47 mAb | TJC4 |
| Jiangsu HengRui Medicine Co., Ltd. | CD47 mAb | SHR-1603 |
| Surface Oncology | CD47 mAb human | SRF231 |
| Morphiex | CD47 targeting phosphorodiamidate morpholino oligomers | MBT-001 |

AO-176, in addition to inducing tumor phagocytosis through blocking the CD47-SIRPα interaction, is reported to preferentially bind tumor cells versus normal cells (particularly RBCs where binding is negligible) and directly kills tumor versus normal cells.

According to certain aspects, a SIRPα reagent may include the portion of SIRPα that is sufficient to bind CD47 at a recognizable affinity, which normally lies between the signal sequence and the transmembrane domain, or a fragment thereof that retains the binding activity. A suitable SIRPα reagent reduces (e.g., blocks, prevents, etc.) the interaction between the native proteins SIRPα and CD47. For example, the CD47 blocking agent used in various aspects of the invention may be any of those disclosed in U.S. Pat. No. 9,969,789 including but not limited to the SIRPα-IgG Fc fusion proteins disclosed therein, such as TTI-621 and TTI-622, both of which preferentially bind CD47 on tumor cells while also engaging activating Fc receptors. A SIRPα-IgG Fc fusion protein including the amino acid sequence SEQ ID NO:116, SEQ ID NO:117, or SEQ ID NO:118 may, for example, be used.

Therapeutically effective doses of an anti-CD47 antibody or other protein CD47 inhibitor may be a dose that leads to sustained serum levels of the protein of about 40 µg/ml or more (e.g., about 50 µg/ml or more, about 60 µg/ml or more, about 75 µg/ml or more, about 100 µg/ml or more, about 125 µg/ml or more, or about 150 µg/ml or more). Therapeutically effective doses or administration of a CD47 blockade, such as an anti-CD47 antibody or SIRPα fusion protein or small molecule, include, for example, amounts of 0.05-10 mg/kg (agent weight/subject weight), such as at least 0.1 mg/kg, 0.5 mg/kg, 1.0 mg/kg, 1.5 mg/kg, 2.0 mg/kg, 2.5 mg/kg, 3.0 mg/kg, 3.5 mg/kg, 4.0 mg/kg, 4.5 mg/kg, 5.0 mg/kg, 5.5 mg/kg, 6.0 mg/kg, 6.5 mg/kg, 7.0 mg/kg, 7.5 mg/kg, 8.0 mg/kg, 8.5 mg/kg, 9.0 mg/kg; or not more than 10 mg/kg, 9.5 mg/kg, 9.0 mg/kg, 8.5 mg/kg, 8.0 mg/kg, 7.5 mg/kg, 7.0 mg/kg, 6.5 mg/kg, 6.0 mg/kg, 5.5 mg/kg, 5.0 mg/kg, 4.5 mg/kg, 4.0 mg/kg, 3.5 mg/kg, 3.0 mg/kg, 2.5 mg/kg, 2.0 mg/kg, 1.5 mg/kg, 1.0 mg/kg, or any combination of these upper and lower limits. Therapeutically effective doses of a small molecule CD47 blockade such as those disclosed herein also, for example, include 0.01 mg/kg to 1,000 mg/kg and any subrange or value of mg/kg therein such as 0.01 mg/kg to 500 mg/kg or 0.05 mg/kg to 500 mg/kg, or 0.5 mg/kg to 200 mg/kg, or 0.5 mg/kg to 150 mg/kg, or 1.0 mg/kg to 100 mg/kg, or 10 mg/kg to 50 mg/kg.

According to certain aspects, the anti-CD47 agent is a soluble CD47 polypeptide that specifically binds SIRPα and reduces the interaction between CD47 on one cell (e.g., an infected cell) and SIRPα on another cell (e.g., a phagocytic cell). A suitable soluble CD47 polypeptide can bind SIRPα without activating or stimulating signaling through SIRPα because activation of SIRPα would inhibit phagocytosis. Instead, suitable soluble CD47 polypeptides facilitate the preferential phagocytosis of infected cells over non-infected cells. Those cells that express higher levels of CD47 (e.g., infected cells) relative to normal, non-target cells (normal cells) will be preferentially phagocytosed. Thus, a suitable soluble CD47 polypeptide specifically binds SIRPα without activating/stimulating enough of a signaling response to inhibit phagocytosis. In some cases, a suitable soluble CD47 polypeptide can be a fusion protein (for example, as described in U.S. Pub. No. 20100239579).

Advantageously, CD47 blockade can enhance the cytotoxic and prophagocytotic effect of a radiolabeled targeting agent, such as a radiolabeled LeY and/or HER2 targeting agent, while reducing the dose-limiting radiotoxicity of the targeting agent, thereby improving tolerability and permitting higher radiation doses of the targeting agent to be used/tolerated in the treatment of a subject.

EXAMPLES

Example 1: Production of Radiolabeled LeY Targeting Agent

The LeY targeting agent, such as a monoclonal antibody against LeY, may be labeled with 111-Indium ($^{111}$In) or Actinium-225 ($^{225}$Ac) or Lutetium-177 ($^{177}$Lu) according to procedures detailed in International Publication No. WO 2017/155937.

Preparing the DOTA-conjugated antibody using p-SCN-Bn-DOTA: antibody conjugates may be prepared by reacting a concentrated solution of monoclonal anti-LeY antibody, such as Hu3S193 or an antigen-binding portion thereof, with p-SCN-Bn-DOTA in bicarbonate or in phosphate buffers at pH between about 8 and about 9 and by incubation at either about 37° C. or at room temperature. The conjugates may be purified from excess of the bifunctional chelator by repeated filtration or centrifugation and by gravity size exclusion chromatography (SEC). During the purification process, the bicarbonate or phosphate buffer is changed to N-2-Hydroxyethylpiperazine-N-2-ethanesulfonic acid (HEPES; Free Acid) or acetate medium. Conjugates may be characterized by size exclusion high performance liquid chromatography (SE-HPLC).

Preparing the DOTA-conjugated antibody using PODS-DOTA: DOTA may be conjugated to a monoclonal antibody, such as an IgG, such as Hu3S193 or an antigen-binding portion thereof, using PODS-DOTA in the presence of TCEP, a mild reducing agent that cleaves the inter-chain disulfide bonds within an immunoglobin according to the methods set forth in U.S. Pat. No. 11,000,604. The structure of PODS-DOTA is

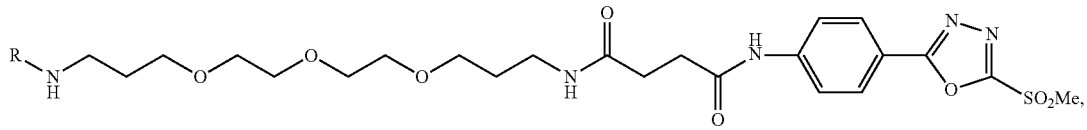

wherein R is a covalently bound DOTA moiety.

In more detail, to a suspension of 200 μg of antibody in PBS pH 7.4 (1 mg/mL) 1.33 μL of a fresh TCEP solution (10 mM in water, 10 eq.) is added and the appropriate volume of a solution of PODS-DOTA (1 mM in DMSO). The reaction mixture is then stirred on a thermomixer (25° C. or 37° C.) for 30 min, 2 h, or 24 h. The conjugate is then purified on a size exclusion column (Sephadex G-25 M, PD-10 column, GE Healthcare; dead volume=2.5 mL, eluted with 2 mL of PBS, pH 7.4) and concentrated using centrifugal filtration units with a 50,000 Da molecular weight cut off (AMICON™. Ultra 4 Centrifugal Filtration Units, Millipore Corp. Billerica, Mass.)

Radiolabeling the DOTA-conjugated antibody: The antibody may be conjugated to a linker, such as any of the linkers described in the above indicated patent applications or as outlined above. An exemplary linker includes at least dodecane tetraacetic acid (DOTA), wherein a goal of the conjugation reaction is to achieve a DOTA-antibody ratio of 3:1 to 5:1. Chelation with the radionuclide (e.g., $^{225}$Ac) may then be performed and efficiency and purity of the resulting radiolabeled anti-LeY antibody may be determined by HPLC and iTLC.

An exemplary labeling reaction for $^{225}$Ac is as follows: A reaction including 15 μl 0.15M NH$_4$OAc buffer, pH=6.5 and 2 μL (10 μg) DOTA-anti-LeY (5 mg/ml) may be mixed in an Eppendorf reaction tube, and 4 μL $^{225}$Ac (10 μCi) in 0.05 M HCl subsequently added. The contents of the tube may be mixed with a pipette tip and the reaction mixture incubated at 37° C. for 90 min with shaking at 100 rpm. At the end of the incubation period, 3 μL of a 1 mM DTPA solution may be added to the reaction mixture and incubated at room temperature for 20 min to bind the unreacted $^{225}$Ac into the $^{225}$Ac-DTPA complex. Instant thin layer chromatography with 10 cm silica gel strip and 10 mM EDTA/normal saline mobile phase may be used to determine the radiochemical purity of $^{225}$Ac-DOTA-anti-LeY through separating $^{225}$Ac-labeled anti-LeY ($^{225}$Ac-DOTA-anti-LeY) from free $^{225}$Ac ($^{225}$Ac-DTPA). In this system, the radiolabeled antibody stays at the point of application and $^{225}$Ac-DTPA moves with the solvent front. The strips may be cut in halves and counted in the gamma counter equipped with the multichannel analyzer using channels 72-110 for $^{225}$Ac to exclude its daughters.

Purification: An exemplary radiolabeled LeY targeting agent, such as $^{225}$Ac-DOTA-anti-LeY, may be purified either on PD10 columns pre-blocked with 1% HSA or on Vivaspin centrifugal concentrators with a 50 kDa MW cut-off with 2×1.5 mL washes, 3 min per spin. HPLC analyses of the $^{225}$Ac-DOTA-anti-LeY after purification may be conducted using a Waters HPLC system equipped with flow-through Waters UV and Bioscan Radiation detectors, using a TSK3000SW XL column eluted with PBS at pH=7.4 and a flow rate of 1 ml/min.

Stability determination: An exemplary radiolabeled LeY targeting agent, such as $^{225}$Ac-DOTA-anti-LeY, may be used for stability determination, wherein the $^{225}$Ac-DOTA-anti-LeY may be tested either in the original volume or diluted (2-10 fold) with the working buffer (0.15 M NH$_4$OAc) and incubated at room temperature (rt) for 48 hours or at 4° C. for 96 hours and tested by ITLC. Stability is determined by comparison of the intact radiolabeled anti-LeY before and after incubation. Other antibodies labeled with $^{225}$Ac have been found to be stable at 4° C. for up to 96 hrs.

Immunoreactivity (IR) determination: An exemplary radiolabeled LeY targeting agent, such as $^{225}$Ac-DOTA-anti-LeY, may be used in immunoreactivity experiments. LeY positive cells and control LeY negative cells may be used in the amounts of 1.0-7.5 million cells per sample to investigate the amount of binding (percent radioactivity binding to cells after several washes; or using an immunoreactive fraction (IRF) bead assay may be performed according to methods disclosed in as described by Sharma, 2019). Prior assays for other antibodies radiolabeled with $^{111}$In or $^{225}$Ac demonstrated about 50-60% immunoreactivity.

Example 2: Exemplary PARPi Administration and Dosing Regimes (A) Olaparib (Lynparza®)—Normal and Reduced Dosing Regimens Olaparib is sold by AstraZeneca under the brand name Lynparza®. Lynparza® is sold in tablet form at 100 mg and 150 mg. The dosage is 300 mg taken orally twice daily for a daily total of 600 mg. Dosing continues until disease progression or unacceptable toxicity. This dosing regimen is referred to herein as the "normal" human dosing regimen for Lynparza®, regardless of the disorder treated. Any dosing regimen having a shorter duration (e.g., 21 days) or involving the administration of less Lynparza® (e.g., 300 mg/day) is referred to herein as a "reduced" human dosing regimen. Examples of reduced human dosing regimens include the following: (i) 550 mg/day; (ii) 500 mg/day; (iii) 450 mg/day; (iv) 400 mg/day; (v) 350 mg/day; (vi) 300 mg/day; (vii) 250 mg/day; (viii) 200 mg/day; (ix) 150 mg/day; (x) 100 mg/day; or (xi) 50 mg/day.

(B) Niraparib (Zejula®)—Normal and Reduced Dosing Regimens

Niraparib is sold by Tesaro under the brand name Zejula®. Zejula® is sold in capsule form at 100 mg. The dosage is 300 mg taken orally once daily. Dosing continues until disease progression or unacceptable adverse reaction. This dosing regimen is referred to herein as the "normal" human dosing regimen for Zejula®, regardless of the disorder treated. Any dosing regimen having a shorter duration (e.g., 21 days) or involving the administration of less Zejula® (e.g., 150 mg/day) is referred to herein as a "reduced" human dosing regimen. Examples of reduced human dosing regimens include the following: (i) 250 mg/day; (ii) 200 mg/day; (iii) 150 mg/day; (iv) 100 mg/day; or (v) 50 mg/day.

(C) Rucaparib (Rubraca®)—Normal and Reduced Dosing Regimens

Rucaparib is sold by Clovis Oncology, Inc. under the brand name Rubraca™. Rubraca™ is sold in tablet form at 200 mg and 300 mg. The dosage is 600 mg taken orally twice daily for a daily total of 1,200 mg. Dosing continues until disease progression or unacceptable toxicity. This dosing regimen is referred to herein as the "normal" human dosing regimen for Rubraca™, regardless of the disorder treated. Any dosing regimen having a shorter duration (e.g., 21 days) or involving the administration of less Rubraca™ (e.g., 600 mg/day) is referred to herein as a "reduced" human dosing regimen. Examples of reduced human dosing regimens include the following: (i) 1,150 mg/day; (ii) 1,100 mg/day; (iii) 1,050 mg/day; (iv) 1,000 mg/day; (v) 950 mg/day; (vi) 900 mg/day; (vii) 850 mg/day; (viii) 800 mg/day; (ix) 750 mg/day; (x) 700 mg/day; (xi) 650 mg/day; (xii) 600 mg/day; (xiii) 550 mg/day; (xiv) 500 mg/day; (xv) 450 mg/day; (xvi) 400 mg/day; (xvii) 350 mg/day; (xviii) 300 mg/day; (xix) 250 mg/day; (xx) 200 mg/day; (xxi) 150 mg/day; or (xxii) 100 mg/day.

(D)—Talazoparib (Talzenna™)—Normal and Reduced Dosing Regimens

Talazoparib is sold by Pfizer Labs under the brand name Talzenna™. Talzenna™ is sold in capsule form at 1 mg. The dosage is 1 mg taken orally. Dosing continues until disease progression or unacceptable toxicity. This dosing regimen is referred to herein as the "normal" human dosing regimen for Talzenna™, regardless of the disorder treated. Any dosing regimen having a shorter duration (e.g., 21 days) or involving the administration of less Talzenna™ (e.g., 0.5 mg/day) is referred to herein as a "reduced" human dosing regimen. Examples of reduced human dosing regimens include the following: (i) 0.9 mg/day; (ii) 0.8 mg/day; (iii) 0.7 mg/day; (iv) 0.6 mg/day; (v) 0.5 mg/day; (vi) 0.4 mg/day; (vii) 0.3 mg/day; (viii) 0.2 mg/day; or (ix) 0.1 mg/day.

Example 3: Dosing Regimens for LeY Targeting Agent and PARPi

A human patient may be treated according to the following regimen. One of olaparib, niraparib, rucaparib or talazoparib (PARPi) is orally administered according to one of the dosing regimens listed in Example 2, accompanied by intravenous administration of a radiolabeled LeY targeting agent as detailed herein in either single or fractional administration. For example, the dosing regimens include, by way of example: (a) the PARPi and the LeY targeting agent administered concurrently, wherein (i) each is administered beginning on the same day, (ii) the LeY targeting agent is administered in a single dose or fractionated doses not less than one week apart, and (iii) the PARPi is administered daily or twice daily (as appropriate), and for a duration equal to or exceeding that of the LeY targeting agent administration; or (b) the PARPi and LeY targeting agent are administered concurrently, wherein (i) the PARPi administration precedes LeY targeting agent administration by at least one week, (ii) the LeY targeting agent is administered in a single dose or fractionated doses not less than one week apart, and (iii) the PARPi is administered daily or twice daily (as appropriate), and for a duration equal to or exceeding that of the LeY targeting agent administration.

Example 4: Dosing Regimens for LeY Targeting Agent and a CD47 Blockade

According to certain aspects of the present invention, the CD47 blocking agent may be a monoclonal antibody that prevents CD47 binding to SIRPα. Exemplary monoclonal antibodies include at least magrolimab, lemzoparlimab, AO-176, TTI-621, TTI-622, or a combination thereof, the CD47 blockade may alternatively, or additionally, include agents that modulate the expression of CD47 and/or SIRPα, such as phosphorodiamidate morpholino oligomers (PMO) that block translation of CD47. Therapeutically effective doses of anti-CD47 antibodies include at least 0.05-10 mg/kg. Thus, methods of the present invention may include administering one or more of the anti-CD47 antibodies or other agents, accompanied by intravenous administration of a radiolabeled LeY targeting agent as detailed herein in either single or fractional administration. For example, the dosing regimens include, by way of example: (a) the anti-CD47 antibody or agent and the LeY targeting agent administered concurrently, wherein (i) each is administered beginning on the same day, (ii) the LeY targeting agent is administered in a single dose or fractionated doses not less than one week apart, and (iii) the anti-CD47 antibody or agent is administered daily or twice daily (as appropriate), and for a duration equal to or exceeding that of the LeY targeting agent administration; or (b) the anti-CD47 antibody or agent and LeY targeting agent are administered concurrently, wherein (i) the anti-CD47 antibody or agent administration precedes LeY targeting agent administration by at least one week, (ii) the LeY targeting agent is administered in a single dose or fractionated doses not less than one week apart, and (iii) the anti-CD47 antibody or agent is administered daily or twice daily (as appropriate), and for a duration equal to or exceeding that of the LeY targeting agent administration.

Example 5: Dosing Regimens for LeY Targeting Agent and an ICI

According to certain aspects of the present invention, the immune checkpoint inhibitor (ICI) may be a monoclonal antibody against any of PD-1, PD-L1, PD-L2, CTLA-4, CD137. Therapeutically effective doses of these antibodies include at least 0.05-10 mg/kg. Thus, method of the present invention include administering one or more ICI, accompanied by intravenous administration of a radiolabeled LEY targeting agent as detailed herein in either single or fractional administration. For example, the dosing regimens include, by way of example: (a) the ICI and the LEY targeting agent administered concurrently, wherein (i) each is administered beginning on the same day, (ii) the LEY targeting agent is administered in a single dose or fractionated doses not less than one week apart, and (iii) the ICI is administered daily or twice daily (as appropriate), and for a duration equal to or exceeding that of the LEY targeting agent administration; or (b) the ICI and LEY targeting agent are administered concurrently, wherein (i) the anti-CD47 antibody administration precedes LEY targeting agent administration by at least one week, (ii) the LEY targeting agent is administered in a single dose or fractionated doses not less than one week apart, and (iii) the ICI is administered daily or twice daily (as appropriate), and for a duration equal to or exceeding that of the LEY targeting agent administration.

Without limitation, the following enumerated aspects of the invention are also provided.

Aspect 1. A method for treating a solid cancer in a subject, the method including: administering to the subject a therapeutically effective amount of a radiolabeled LeY targeting agent.

Aspect 2. The method according to any preceding aspect, wherein the solid cancer is a breast cancer, gastric cancer, bladder cancer, cervical cancer, endometrial cancer, skin cancer, stomach cancer, testicular cancer, esophageal cancer, bronchioloalveolar cancer, prostate cancer, colorectal cancer, ovarian cancer, cervical epidermoid cancer, pancreatic cancer, lung cancer, renal cancer, head and neck cancer, or any of the cancers disclosed herein.

Aspect 3. The method according to any preceding aspect, wherein the solid cancer is a LeY-positive tumor.

Aspect 4. The method according to any preceding aspect, wherein the radiolabeled LeY targeting agent includes a radiolabel selected from 131I, $^{125}$I, 123I, 90Y, $^{177}$Lu, 186Re, 188Re, 89Sr, 153 Sm, 32p, $^{225}$Ac, 213Bi, 213Po, 211At, 212Bi, 213Bi, 223Ra, 227Th, 149Tb, 137Cs, 212Pb or 103Pd; or a combination thereof, or wherein the radiolabeled LeY targeting agent includes an alpha emitting radioisotopes selected from the group consisting of 211At, 212Bi, 213Bi, 223Ra, 227Th, 149Th, 212Pb, and $^{225}$Ac.

Aspect 5. The method according to any preceding aspect, wherein the radiolabeled LeY targeting agent is $^{225}$Ac labeled or $^{177}$Lu labeled.

Aspect 6. The method according to any preceding aspect, wherein the radiolabeled LeY targeting agent includes an antibody against LeY.

Aspect 7. The method according to any preceding aspect, wherein the LeY targeting agent is a monoclonal antibody including a heavy chain variable region having an amino acid sequence as set forth in any one of SEQ ID NO: 119-123; and/or the LeY targeting agent is a monoclonal antibody including a light chain variable region having an amino acid sequence as set forth in SEQ ID NO: 124 or 125.

Aspect 8. The method according to any preceding aspect, wherein the LeY targeting agent is a monoclonal antibody including a heavy chain with one or more of an N-terminal region and complementarity determining regions (CDRs) having amino acid sequences as set forth in SEQ ID NO: 126-129, respectively; and/or the LeY targeting agent is a monoclonal antibody including a light chain with one or more of an N-terminal region and CDRs having amino acid sequences as set forth in SEQ ID NO:130-133, respectively.

Aspect 9. The method according to any preceding aspect, wherein the LeY targeting agent includes the monoclonal antibody Hu3S193.

Aspect 10. The method according to any preceding aspect, wherein the effective amount of the radiolabeled LeY targeting agent is a maximum tolerated dose.

Aspect 11. The method according to any preceding aspect, wherein the therapeutically effective amount of the radiolabeled LeY targeting agent includes a single dose that delivers less than 2Gy, or less than 8 Gy, such as doses of 2 Gy to 8 Gy, to the subject.

Aspect 12. The method according to any preceding aspect, wherein the radiolabeled LeY targeting agent is $^{225}$Ac-labeled, and the effective amount of the $^{225}$Ac-labeled LeY targeting agent includes a dose of 0.1 to 50 µCi/kg body weight of the subject, or 0.2 to 20 µCi/kg body weight of the subject, or 0.5 to 10 µCi/kg subject body weight.

Aspect 13. The method according to any preceding aspect, wherein the radiolabeled LeY targeting agent is a full length antibody against LeY that is $^{225}$Ac-labeled, and the effective of the $^{225}$Ac-labeled LeY targeting agent includes less than 5 µCi/kg body weight of the subject, such as 0.1 to 5 µCi/kg body weight of the subject.

Aspect 14. The method according to any one of aspects 1 to 12, wherein the radiolabeled LeY targeting agent is an antibody fragment, such as a minibody or nanobody against LeY that is $^{225}$Ac-labeled, and the effective of the $^{225}$Ac-labeled LeY targeting agent includes greater than 5 µCi/kg body weight of the subject, such as 5 to 20 µCi/kg body weight of the subject.

Aspect 15. The method according to any one of aspects 1 to 12, wherein the radiolabeled LeY targeting agent is $^{225}$Ac-labeled, and the effective amount of the $^{225}$Ac-labeled LeY targeting agent includes 2 µCi to 2 mCi, or 2 µCi to 250 µCi, or 75 µCi to 400 µCi.

Aspect 16. The method according to any one of aspects 1 to 11, wherein the radioisotope labeled LeY targeting agent is $^{177}$Lu-labeled and the effective amount of the LeY targeting agent includes a dose of less than 1000 µCi/kg body weight of the subject, such as a dose of 1 to 900 µCi/kg body weight of the subject, or 5 to 250 µCi/kg body weight of the subject or 50 to 450 µCi/kg body weight.

Aspect 17. The method according to any one of aspects 1 to 11, wherein the radioisotope labeled LeY targeting agent is $^{177}$Lu-labeled, and the effective amount of the $^{177}$Lu-labeled LeY targeting agent includes a dose of 10 mCi to at or below 30 mCi, or from at least 100 µCi to at or below 3 mCi, or from 3 mCi to at or below 30 mCi.

Aspect 18. The method according to any preceding aspect, wherein the effective amount of the LeY targeting agent includes a protein dose of less than 3 mg/kg body weight of the subject, such as from 0.001 mg/kg patient weight to 3.0 mg/kg patient weight, or from 0.005 mg/kg patient weight to 2.0 mg/kg patient weight, or from 0.01 mg/kg patient weight to 1 mg/kg patient weight, or from 0.1 mg/kg patient weight to 0.6 mg/kg patient weight, or 0.3 mg/kg patient weight, or 0.4 mg/kg patient weight, or 0.5 mg/kg patient weight, or 0.6 mg/kg patient weight.

Aspect 19. The method according to any preceding aspect, wherein the LeY targeting agent is administered according to a dosing schedule selected from the group consisting of once every 7, 10, 12, 14, 20, 24, 28, 36, and 42 days throughout a treatment period, wherein the treatment period includes at least two doses.

Aspect 20. The method according to any preceding aspect, further including administering to the subject a therapeutically effective amount of an immune checkpoint therapy, a chemotherapeutic agent, a DNA damage response inhibitor (DDRi), a CD47 blockade, or a combination thereof.

Aspect 21. The method according to aspect 20, wherein the immune checkpoint therapy includes an antibody against CTLA-4, PD-1, TIM-3, VISTA, BTLA, LAG-3, TIGIT, CD28, OX40, GITR, CD137, CD40, CD40L, CD27, HVEM, PD-L1, PD-L2, PD-L3, PD-L4, CD80, CD86, CD137-L, GITR-L, CD226, B7-H3, B7-H4, BTLA, TIGIT, GALS, KIR, 2B4, CD160, CGEN-15049, or a combination thereof.

Aspect 22. The method according to aspect 21, wherein the immune checkpoint therapy includes an antibody against PD-1, PD-L1, PD-L2, CTLA-4, CD137, or a combination thereof.

Aspect 23. The method according to aspect 20, wherein the DDRi includes a poly(ADP-ribose) polymerase inhibitor (PARPi), an ataxia telangiectasia mutated inhibitor (ATMi), an ataxia talangiectasia mutated and Rad-3 related inhibitor (ATRi), or a Wee1 inhibitor.

Aspect 24. The method according to aspect 23, wherein the PARPi includes one or more of olaparib, niraparib, rucaparib and talazoparib.

Aspect 25. The method according to aspect 23, wherein the ATMi includes one or more of KU-55933, KU-59403, wortmannin, CP466722, or KU-60019.

Aspect 26. The method according to aspect 23, wherein the ATRi includes one or more of Schisandrin B, NU6027, NVP-BEA235, VE-821, VE-822, AZ20, or AZD6738.

Aspect 27. The method according to aspect 23, wherein the Wee1 inhibitor includes AZD-1775 (i.e., adavosertib).

Aspect 28. The method according to aspect 20, wherein the CD47 blockade includes a monoclonal antibody that prevents CD47 binding to SIRPα and/or an agent that modulates CD47 expression.

Aspect 29. The method according to aspect 28, wherein the monoclonal antibody that prevents CD47 binding to SIRPα includes magrolimab, lemzoparlimab, AO-176, TTI-621, TTI-622, or a combination thereof; and/or wherein the agent that modulates CD47 expression includes phosphorodiamidate morpholino oligomers (PMO) that block translation of CD47 (e.g., MBT-001).

Aspect 30. The method according to aspect 29, wherein the therapeutically effective amount of the CD47 blockade includes 0.05 to 5 mg/Kg patient weight.

Aspect 31. The method according to any one of aspects 20-30, wherein the LeY targeting agent is administered at least one week before the immune checkpoint therapy and/or the DDRi and/or the CD47 blockade; or wherein the immune checkpoint therapy and/or the DDRi and/or CD47 blockade is administered at least one week before the LeY targeting agent.

Aspect 32. The method according to any one of aspects 20-30, wherein the LeY targeting agent is administered with one of the immune checkpoint therapy or the DDRi or the CD47 blockade, and the other of the immune checkpoint therapy or the DDRi or the CD47 blockade is administered either before or after the LeY targeting agent.

Aspect 33. The method according to any one of aspects 20-30, wherein the LeY targeting agent is administered simultaneously with the immune checkpoint therapy and/or the DDRi and/or the CD47 blockade.

Aspect 34. The method according to any preceding aspect, wherein the LeY targeting agent is a multi-specific antibody, wherein the multi-specific antibody includes: a first target recognition component which specifically binds to an epitope of LeY, and a second target recognition component which specifically binds to a different epitope of LeY than the first target recognition component, or an epitope of a different antigen, such as a cancer associated antigen.

Aspect 35. A method for treating a proliferative disease or disorder, the method including: diagnosing the subject with LeY-positive cells; and if the subject has LeY-positive cells, administering to the subject a therapeutically effective amount of an LeY targeting agent according to any of the methods of aspects 1 to 34.

Aspect 36. The method according to aspect 35, wherein the diagnosing includes obtaining a sample of blood or tissue from the subject; mounting the sample on a substrate; and detecting the presence or absence of LeY antigen using a diagnostic antibody, wherein the diagnostic antibody includes an antibody against LeY labeled with a radiolabel such as $^3$H, $^{14}$C, $^{32}$P, $^{35}$S, and $^{125}$I; fluorescent or chemiluminescent compounds, such as fluorescein isothiocyanate, rhodamine, or luciferin; or an enzyme, such as alkaline phosphatase, β-galactosidase, or horseradish peroxidase.

Aspect 37. The method according to aspect 35, wherein the diagnosing includes administering a LeY targeting agent to the subject, wherein the LeY targeting agent includes a radiolabel selected from the group including $^{18}$F, $^{11}$C, $^{68}$Ga, $^{64}$Cu, $^{89}$Zr, $^{124}$I, $^{99m}$Tc, or $^{111}$In; waiting a time sufficient to allow the LeY targeting agent to accumulate at a tissue site; and imaging the tissues with a non-invasive imaging technique to detect presence or absence of LeY-positive cells.

Aspect 38. The method according to aspect 36, wherein the non-invasive imaging technique includes positron emission tomography (PET imaging) for $^{18}$F, $^{11}$C, $^{68}$Ga, $^{64}$Cu, $^{89}$Zr, or $^{124}$I labeled LeY targeting agents or single photon emission computed tomography (SPECT imaging) for $^{99m}$Tc or $^{111}$In labeled LeY targeting agents.

Any and all publications, patents, patent applications and other documents cited in this application are hereby incorporated by reference in their entireties for all purposes to the same extent as if each individual publication, patent, patent application or other document were individually indicated to be incorporated by reference for all purposes.

It should be understood that wherever in this disclosure an embodiment of the invention or an element or step thereof is described in terms of "including," "include(s)," "including," or "include(s)," corresponding embodiments, elements or steps thereof expressed, instead, in terms of "consisting essentially of" or "consisting of" are also intended to be disclosed and provided by this disclosure.

While various specific embodiments have been illustrated and described herein, it will be appreciated that various changes can be made without departing from the spirit and scope of the invention(s). Moreover, features described in connection with one embodiment of the invention may be used in conjunction with other embodiments, even if not explicitly exemplified in combination within.

REFERENCES

Abe K, Mckibbin J M, Hakomor S. The Monoclonal Antibody Directed to Difucosylated Type2 Chain (Fucα1→2Gal β1→4[Fucα1→3]GlcNAc Y Determinant)*. *Journal of Biol. Chem.* 1983; 258 (19): 11793-11797.

Boghaert E R, Sridharan L, Armellino D C, et al. Antibody-targeted chemotherapy with the calicheamicin conjugate hu3S193-N-Acetyl γ calicheamicin dimethyl hydrazide targets lewis y and eliminates lewisy-positive human carcinoma cells and xenografts. *Clin Cancer Res.* 2004; 10 (13): 4538-4549.

Clarke K, Lee F T, Brechbiel M W, Smyth F E, Old L J, Scott A M. Therapeutic efficacy of anti-Lewis(y) humanized 3S193 radioimmunotherapy in a breast cancer model: enhanced activity when combined with taxol chemotherapy. *Clin Cancer Res.* 2000; 6 (9): 3621-3628.

Herbertson R A, Tebbutt N C, Lee F-T, et al. Phase I biodistribution and pharmacokinetic study of Lewis Y-targeting immunoconjugate CMD-193 in patients with advanced epithelial cancers. *Clin Cancer Res.* 2009; 15 (21): 6709-6715.

Kelly M P, Lee F T, Smyth F E, Brechbiel M W, Scott A M. Enhanced efficacy of 90Y-radiolabeled anti-Lewis Y humanized monoclonal antibody hu3S193 and paclitaxel combined-modality radioimmunotherapy in a breast cancer model. *J Nucl Med.* 2006; 47 (4): 716-725.

Kelly M P, Lee S T, Lee F-T, et al. Therapeutic efficacy of 177 Lu-CHX-A"-DTPA-hu3S193 radioimmunotherapy in prostate cancer is enhanced by EGFR inhibition or docetaxel chemotherapy. *Prostate.* 2009; 69 (1): 92-104.

Kitamura K, Stockert E, Garin-Chesa P, et al. Specificity analysis of blood group Lewis-y (Le(y)) antibodies generated against synthetic and natural Le(y) determinants. *Proc Natl Acad Sci USA.* 1994; 91 (26): 12957-12961.

Krug L M, Milton D T, Jungbluth A A, et al. Targeting Lewis Y (Ley) in small cell lung cancer with a humanized monoclonal antibody, hu3S193: A pilot trial testing two dose levels. *J Thorac Oncol.* 2007; 2 (10): 947-952.

Ma Y, Kowolik C M, Swiderski P M, Kortylewski M, Yu H, Horne D A, Jove R, Caballero O L, Simpson A J G, Lee F-T, Pillay V, Scott A M. Humanized Lewis-Y specific antibody-based delivery of STAT3 siRNA. *ACS Chem Biol.* 2011; 6 (9): 962-970.

Oruzio D, Waxenecker G, Aulmann C, Märkl B, Wagner T, Mudde G, Schuster M, Eller N, Mayer A, Stranner S, Himmler G, Loibner H, Schlimok G, Kircheis R, Nechansky A. Phase I Dose Escalation Study with the Lewis Y Carbohydrate Specific Humanized Antibody IGN311, *Journal of Cancer Ther.* 2011; 2:760-771.

Pai L H, Wittes R, Setser A, Willingham M C, Pastan I. Treatment of advanced solid tumors with immunotoxin LMB-1: An antibody linked to *Pseudomonas* exotoxin. *Nat Med.* 1996; 2 (3): 350-353.

Pai-Scherf L H, Carrasquillo J A, Paik C, et al. Imaging and phase I study of $^{111}$In- and 90Y-labeled anti-LewisY monoclonal antibody B3. *Clin Cancer Res.* 2000; 6 (5): 1720-1730.

Pastan I, Lovelace E T, Gallo M G, Rutherford A V., Magnani J L, Willingham M C. Characterization of monoclonal antibodies B1 and B3 that react with mucinous adenocarcinomas. *Cancer Res.* 1991; 51 (14): 3781-3787.

Repetto-Llamazares A, Advantage of Lutetium-177 versus Radioiodine Immunoconjugate in Targeted Radionuclide Therapy of B-cell Tumors, *Anticancer Research.* 2014; 34 (7): 3263-3269.

Scott A M, Geleick D, Rubira M, et al. Construction, production, and characterization of humanized anti-Lewis Y monoclonal antibody 3S193 for targeted immunotherapy of solid tumors. *Cancer Res.* 2000; 60 (12): 3254-3261.

Scott A M, Tebbutt N, Lee F-T, et al. A phase I biodistribution and pharmacokinetic trial of humanized monoclonal antibody Hu3s193 in patients with advanced epithelial cancers that express the Lewis-Y antigen. *Clin Cancer Res.* 2007; 13 (11): 3286-3292.

Sharabi A B, Lim M, DeWeese T L, Drake C G. Radiation and checkpoint blockade immunotherapy: radiosensitisation and potential mechanisms of synergy. *Lancet Oncol.* 2015; 16 (13): e498-509.

Smaletz O, Diz MDPE, do Carmo C C, et al. A phase II trial with anti-Lewis-Y monoclonal antibody (hu3S193) for the treatment of platinum resistant/refractory ovarian, fallopian tube and primary peritoneal carcinoma. *Gynecol Oncol.* 2015; 138 (2): 272-277.

Walle T, Monge R M, Cerwenka A, Ajona D, Melero I, Lecanda F. Radiation effects on antitumor immune responses: Current perspectives and challenges. *Ther Adv Med Oncol.* 2018; 10.

Westwood J A, Murray W K, Trivett M, et al. The Lewis-Y carbohydrate antigen is expressed by many human tumors and can serve as a target for genetically redirected T cells despite the presence of soluble antigen in serum. *J Immunother.* 2009; 32 (3): 292-301.

Zhang S, Zhang H S, Cordon-Cardo C, et al. Selection of tumor antigens as targets for immune attack using immunohistochemistry: II. Blood group-related antigens. *Int J cancer.* 1997;73 (1): 50-56.

---

What is claimed is:

1. A method for the treatment of a Lewis Y antigen positive solid cancer in a human subject, comprising:
administering to the subject a pharmaceutical composition comprising a radiolabeled DOTA-conjugated human Lewis Y antigen (huLeY) binding antibody prepared according to the process of reacting p-SCN-Bn-DOTA with unconjugated huLeY binding antibody to obtain DOTA-conjugated huLeY binding antibody and radiolabeling the DOTA-conjugated huLeY binding antibody by chelation of a radionuclide to the DOTA moiety of the DOTA-conjugated huLeY binding antibody,
wherein a portion of the radiolabeled DOTA-conjugated huLeY binding antibody in the pharmaceutical composition maintains immunoreactivity with human Lewis Y antigen; and
administering to the subject an immune checkpoint therapy comprising an antibody against PD-1, PD-L1, or CTLA-4,
wherein the huLeY binding antibody is a Fc-silent IgG antibody comprising a heavy chain CDR1 comprising SEQ ID NO: 127, a heavy chain CDR2 comprising SEQ ID NO: 128, a heavy chain CDR3 comprising SEQ ID NO: 129, a light chain CDR1 comprising SEQ ID NO: 131, a light chain CDR2 comprising SEQ ID NO: 132, and a light chain CDR3 comprising SEQ ID NO: 133.

2. The method of claim 1, wherein the pharmaceutical composition further comprises at least one pharmaceutically acceptable excipient.

3. The method of claim 1, wherein the radionuclide comprises $^{177}$Lu or $^{225}$Ac.

4. The method of claim 3, wherein the radionuclide comprises $^{225}$Ac.

5. The method of claim 1, wherein the solid cancer is a breast cancer, gastric cancer, bladder cancer, cervical cancer, endometrial cancer, skin cancer, stomach cancer, testicular cancer, esophageal cancer, bronchioloalveolar cancer, prostate cancer, colorectal cancer, ovarian cancer, cervical epidermoid cancer, pancreatic cancer, lung cancer, non-small cell lung cancer, renal cancer, head and neck cancer, hepatocellular carcinoma, or cholangiocarcinoma.

6. The method of claim 1, wherein administering to the subject an immune checkpoint therapy comprising an antibody against PD-1, PD-L1, or CTLA-4 comprises administering to the subject nivolumab, pembrolizumab, or ipilimumab.

7. The method of claim 5, wherein administering to the subject an immune checkpoint therapy comprising an antibody against PD-1, PD-L1, or CTLA-4 comprises administering to the subject nivolumab, pembrolizumab, or ipilimumab.

* * * * *

SEQUENCE LISTING

```
<160> NUMBER OF SEQ ID NOS: 136

<210> SEQ ID NO 1
<211> LENGTH: 5
<212> TYPE: PRT
<213> ORGANISM: Mus musculus

<400> SEQUENCE: 1

Ser His Trp Leu His
1               5

<210> SEQ ID NO 2
<211> LENGTH: 17
<212> TYPE: PRT
<213> ORGANISM: Mus musculus

<400> SEQUENCE: 2

Val Leu Asp Pro Ser Asp Phe Tyr Ser Asn Tyr Asn Gln Asn Phe Lys
1               5                   10                  15

Gly

<210> SEQ ID NO 3
<211> LENGTH: 11
<212> TYPE: PRT
<213> ORGANISM: mus musculus

<400> SEQUENCE: 3

Gly Leu Leu Ser Gly Asp Tyr Ala Met Asp Tyr
1               5                   10

<210> SEQ ID NO 4
<211> LENGTH: 16
<212> TYPE: PRT
<213> ORGANISM: mus musculus
```

```
<400> SEQUENCE: 4

Arg Ser Ser Gln Ser Ile Val His Ser Asn Gly Asn Thr Tyr Leu Glu
1               5                   10                  15

<210> SEQ ID NO 5
<211> LENGTH: 7
<212> TYPE: PRT
<213> ORGANISM: mus musculus

<400> SEQUENCE: 5

Lys Val Ser Asn Arg Phe Ser
1               5

<210> SEQ ID NO 6
<211> LENGTH: 9
<212> TYPE: PRT
<213> ORGANISM: mus musculus

<400> SEQUENCE: 6

Phe Gln Gly Ser Tyr Val Pro Trp Thr
1               5

<210> SEQ ID NO 7
<211> LENGTH: 120
<212> TYPE: PRT
<213> ORGANISM: mus musculus

<400> SEQUENCE: 7

Gln Val Gln Leu Gln Gln Pro Gly Ala Glu Leu Val Arg Pro Gly Thr
1               5                   10                  15

Ser Val Lys Leu Ser Cys Lys Ala Ser Gly Tyr Thr Phe Thr Ser His
            20                  25                  30

Trp Leu His Trp Val Lys Gln Arg Pro Gly Gln Gly Leu Glu Trp Ile
        35                  40                  45

Gly Val Leu Asp Pro Ser Asp Phe Tyr Ser Asn Tyr Asn Gln Asn Phe
    50                  55                  60

Lys Gly Lys Ala Thr Leu Thr Val Asp Thr Ser Ser Ser Thr Ala Tyr
65                  70                  75                  80

Met Gln Leu Ser Ser Leu Thr Ser Glu Asp Ser Ala Val Tyr Tyr Cys
                85                  90                  95

Ala Arg Gly Leu Leu Ser Gly Asp Tyr Ala Met Asp Tyr Trp Gly Ala
            100                 105                 110

Gly Thr Ser Val Thr Val Ser Ser
        115                 120

<210> SEQ ID NO 8
<211> LENGTH: 112
<212> TYPE: PRT
<213> ORGANISM: mus musculus

<400> SEQUENCE: 8

Asp Val Leu Met Thr Gln Ile Pro Leu Ser Leu Pro Val Ser Leu Gly
1               5                   10                  15

Asp Gln Ala Ser Ile Ser Cys Arg Ser Ser Gln Ser Ile Val His Ser
            20                  25                  30

Asn Gly Asn Thr Tyr Leu Glu Trp Tyr Leu Gln Lys Pro Gly Gln Ser
        35                  40                  45

Pro Lys Ser Leu Ile Tyr Lys Val Ser Asn Arg Phe Ser Gly Val Pro
    50                  55                  60
```

```
Asp Arg Phe Ser Gly Ser Gly Ser Gly Thr Asp Phe Thr Leu Lys Ile
 65                  70                  75                  80

Ser Arg Val Glu Ala Glu Asp Leu Gly Val Tyr Tyr Cys Phe Gln Gly
                 85                  90                  95

Ser Tyr Val Pro Trp Thr Phe Gly Gly Gly Thr Lys Leu Glu Ile Lys
            100                 105                 110
```

<210> SEQ ID NO 9
<211> LENGTH: 463
<212> TYPE: PRT
<213> ORGANISM: mus musculus

<400> SEQUENCE: 9

```
Met Gly Trp Ser Cys Ile Ile Val Leu Leu Val Ser Thr Ala Thr Gly
  1               5                  10                  15

Val His Ser Gln Val Gln Leu Gln Gln Pro Gly Ala Glu Leu Val Arg
                 20                  25                  30

Pro Gly Thr Ser Val Lys Leu Ser Cys Lys Ala Ser Gly Tyr Thr Phe
             35                  40                  45

Thr Ser His Trp Leu His Trp Val Lys Gln Arg Pro Gly Gln Gly Leu
         50                  55                  60

Glu Trp Ile Gly Val Leu Asp Pro Ser Asp Phe Tyr Ser Asn Tyr Asn
 65                  70                  75                  80

Gln Asn Phe Lys Gly Lys Ala Thr Leu Thr Val Asp Thr Ser Ser Ser
                 85                  90                  95

Thr Ala Tyr Met Gln Leu Ser Ser Leu Thr Ser Glu Asp Ser Ala Val
            100                 105                 110

Tyr Tyr Cys Ala Arg Gly Leu Leu Ser Gly Asp Tyr Ala Met Asp Tyr
        115                 120                 125

Trp Gly Gln Gly Thr Ser Val Thr Val Ser Ser Ala Lys Thr Thr Pro
130                 135                 140

Pro Ser Val Tyr Pro Leu Ala Pro Gly Ser Ala Ala Gln Thr Asn Ser
145                 150                 155                 160

Met Val Thr Leu Gly Cys Leu Val Lys Gly Tyr Phe Pro Glu Pro Val
                165                 170                 175

Thr Val Thr Trp Asn Ser Gly Ser Leu Ser Ser Gly Val His Thr Phe
            180                 185                 190

Pro Ala Val Leu Gln Ser Asp Leu Tyr Thr Leu Ser Ser Ser Val Thr
        195                 200                 205

Val Pro Ser Ser Thr Trp Pro Ser Gln Thr Val Thr Cys Asn Val Ala
    210                 215                 220

His Pro Ala Ser Ser Thr Lys Val Asp Lys Lys Ile Val Pro Arg Asp
225                 230                 235                 240

Cys Gly Cys Lys Pro Cys Ile Cys Thr Val Pro Glu Val Ser Ser Val
                245                 250                 255

Phe Ile Phe Pro Pro Lys Pro Lys Asp Val Leu Thr Ile Thr Leu Thr
            260                 265                 270

Pro Lys Val Thr Cys Val Val Val Asp Ile Ser Lys Asp Asp Pro Glu
        275                 280                 285

Val Gln Phe Ser Trp Phe Val Asp Asp Val Glu Val His Thr Ala Gln
    290                 295                 300

Thr Gln Pro Arg Glu Glu Gln Phe Asn Ser Thr Phe Arg Ser Val Ser
305                 310                 315                 320

Glu Leu Pro Ile Met His Gln Asp Trp Leu Asn Gly Lys Glu Phe Lys
```

-continued

```
                325                 330                 335
Cys Arg Val Asn Ser Ala Ala Phe Pro Ala Pro Ile Glu Lys Thr Ile
            340                 345                 350

Ser Lys Thr Lys Gly Arg Pro Lys Ala Pro Gln Val Tyr Thr Ile Pro
        355                 360                 365

Pro Pro Lys Glu Gln Met Ala Lys Asp Lys Val Ser Leu Thr Cys Met
    370                 375                 380

Ile Thr Asp Phe Phe Pro Glu Asp Ile Thr Val Glu Trp Gln Trp Asn
385                 390                 395                 400

Gly Gln Pro Ala Glu Asn Tyr Lys Asn Thr Gln Pro Ile Met Asp Thr
                405                 410                 415

Asp Gly Ser Tyr Phe Val Tyr Ser Lys Leu Asn Val Gln Lys Ser Asn
            420                 425                 430

Trp Glu Ala Gly Asn Thr Phe Thr Cys Ser Val Leu His Glu Gly Leu
        435                 440                 445

His Asn His His Thr Glu Lys Ser Leu Ser His Ser Pro Gly Lys
    450                 455                 460

<210> SEQ ID NO 10
<211> LENGTH: 238
<212> TYPE: PRT
<213> ORGANISM: mus musculus

<400> SEQUENCE: 10

Met Lys Leu Pro Val Arg Leu Leu Val Leu Met Phe Trp Ile Pro Ala
1               5                   10                  15

Ser Ser Ser Asp Val Leu Met Thr Gln Ile Pro Leu Ser Leu Pro Val
            20                  25                  30

Ser Leu Gly Asp Gln Ala Ser Ile Ser Cys Arg Ser Ser Gln Ser Ile
        35                  40                  45

Val His Ser Asn Gly Asn Thr Tyr Leu Glu Trp Tyr Leu Gln Lys Pro
    50                  55                  60

Gly Gln Ser Pro Lys Ser Leu Ile Tyr Lys Val Ser Asn Arg Phe Ser
65                  70                  75                  80

Gly Val Pro Asp Arg Phe Ser Gly Ser Gly Ser Gly Thr Asp Phe Thr
                85                  90                  95

Leu Lys Ile Ser Arg Val Glu Ala Glu Asp Leu Gly Val Tyr Tyr Cys
            100                 105                 110

Phe Gln Gly Ser Tyr Val Pro Trp Thr Phe Gly Gly Gly Thr Lys Leu
        115                 120                 125

Glu Ile Lys Arg Ala Asp Ala Ala Pro Thr Val Ser Ile Phe Pro Pro
    130                 135                 140

Ser Ser Glu Gln Leu Thr Ser Gly Gly Ala Ser Val Val Cys Phe Leu
145                 150                 155                 160

Asn Asn Phe Tyr Pro Arg Asp Ile Asn Val Lys Trp Lys Ile Asp Gly
                165                 170                 175

Ser Glu Arg Gln Asn Gly Val Leu Asn Ser Trp Thr Asp Gln Asp Ser
            180                 185                 190

Lys Asp Ser Thr Tyr Ser Met Ser Ser Thr Leu Thr Leu Thr Lys Asp
        195                 200                 205

Glu Tyr Glu Arg His Asn Ser Tyr Thr Cys Glu Ala Thr His Lys Thr
    210                 215                 220

Ser Thr Ser Pro Ile Val Lys Ser Phe Asn Arg Asn Glu Cys
225                 230                 235
```

<210> SEQ ID NO 11
<211> LENGTH: 444
<212> TYPE: PRT
<213> ORGANISM: mus musculus

<400> SEQUENCE: 11

Gln Val Gln Leu Gln Gln Pro Gly Ala Glu Leu Val Arg Pro Gly Thr
1               5                   10                  15

Ser Val Lys Leu Ser Cys Lys Ala Ser Gly Tyr Thr Phe Thr Ser His
            20                  25                  30

Trp Leu His Trp Val Lys Gln Arg Pro Gly Gln Gly Leu Glu Trp Ile
        35                  40                  45

Gly Val Leu Asp Pro Ser Asp Phe Tyr Ser Asn Tyr Asn Gln Asn Phe
    50                  55                  60

Lys Gly Lys Ala Thr Leu Thr Val Asp Thr Ser Ser Thr Ala Tyr
65                  70                  75                  80

Met Gln Leu Ser Ser Leu Thr Ser Glu Asp Ser Ala Val Tyr Tyr Cys
                85                  90                  95

Ala Arg Gly Leu Leu Ser Gly Asp Tyr Ala Met Asp Tyr Trp Gly Gln
            100                 105                 110

Gly Thr Ser Val Thr Val Ser Ser Ala Lys Thr Thr Pro Pro Ser Val
        115                 120                 125

Tyr Pro Leu Ala Pro Gly Ser Ala Ala Gln Thr Asn Ser Met Val Thr
    130                 135                 140

Leu Gly Cys Leu Val Lys Gly Tyr Phe Pro Glu Pro Val Thr Val Thr
145                 150                 155                 160

Trp Asn Ser Gly Ser Leu Ser Ser Gly Val His Thr Phe Pro Ala Val
                165                 170                 175

Leu Gln Ser Asp Leu Tyr Thr Leu Ser Ser Ser Val Thr Val Pro Ser
            180                 185                 190

Ser Thr Trp Pro Ser Gln Thr Val Thr Cys Asn Val Ala His Pro Ala
        195                 200                 205

Ser Ser Thr Lys Val Asp Lys Lys Ile Val Pro Arg Asp Cys Gly Cys
    210                 215                 220

Lys Pro Cys Ile Cys Thr Val Pro Glu Val Ser Ser Val Phe Ile Phe
225                 230                 235                 240

Pro Pro Lys Pro Lys Asp Val Leu Thr Ile Thr Leu Thr Pro Lys Val
                245                 250                 255

Thr Cys Val Val Val Asp Ile Ser Lys Asp Asp Pro Glu Val Gln Phe
            260                 265                 270

Ser Trp Phe Val Asp Asp Val Glu Val His Thr Ala Gln Thr Gln Pro
        275                 280                 285

Arg Glu Glu Gln Phe Asn Ser Thr Phe Arg Ser Val Ser Glu Leu Pro
    290                 295                 300

Ile Met His Gln Asp Trp Leu Asn Gly Lys Glu Phe Lys Cys Arg Val
305                 310                 315                 320

Asn Ser Ala Ala Phe Pro Ala Pro Ile Glu Lys Thr Ile Ser Lys Thr
                325                 330                 335

Lys Gly Arg Pro Lys Ala Pro Gln Val Tyr Thr Ile Pro Pro Lys
            340                 345                 350

Glu Gln Met Ala Lys Asp Lys Val Ser Leu Thr Cys Met Ile Thr Asp
        355                 360                 365

Phe Phe Pro Glu Asp Ile Thr Val Glu Trp Gln Trp Asn Gly Gln Pro
    370                 375                 380

```
Ala Glu Asn Tyr Lys Asn Thr Gln Pro Ile Met Asp Thr Asp Gly Ser
385                 390                 395                 400

Tyr Phe Val Tyr Ser Lys Leu Asn Val Gln Lys Ser Asn Trp Glu Ala
                405                 410                 415

Gly Asn Thr Phe Thr Cys Ser Val Leu His Glu Gly Leu His Asn His
            420                 425                 430

His Thr Glu Lys Ser Leu Ser His Ser Pro Gly Lys
        435                 440

<210> SEQ ID NO 12
<211> LENGTH: 219
<212> TYPE: PRT
<213> ORGANISM: mus musculus

<400> SEQUENCE: 12

Asp Val Leu Met Thr Gln Ile Pro Leu Ser Leu Pro Val Ser Leu Gly
1               5                   10                  15

Asp Gln Ala Ser Ile Ser Cys Arg Ser Ser Gln Ser Ile Val His Ser
            20                  25                  30

Asn Gly Asn Thr Tyr Leu Glu Trp Tyr Leu Gln Lys Pro Gly Gln Ser
        35                  40                  45

Pro Lys Ser Leu Ile Tyr Lys Val Ser Asn Arg Phe Ser Gly Val Pro
    50                  55                  60

Asp Arg Phe Ser Gly Ser Gly Ser Gly Thr Asp Phe Thr Leu Lys Ile
65                  70                  75                  80

Ser Arg Val Glu Ala Glu Asp Leu Gly Val Tyr Tyr Cys Phe Gln Gly
                85                  90                  95

Ser Tyr Val Pro Trp Thr Phe Gly Gly Gly Thr Lys Leu Glu Ile Lys
            100                 105                 110

Arg Ala Asp Ala Ala Pro Thr Val Ser Ile Phe Pro Pro Ser Ser Glu
        115                 120                 125

Gln Leu Thr Ser Gly Gly Ala Ser Val Val Cys Phe Leu Asn Asn Phe
    130                 135                 140

Tyr Pro Arg Asp Ile Asn Val Lys Trp Lys Ile Asp Gly Ser Glu Arg
145                 150                 155                 160

Gln Asn Gly Val Leu Asn Ser Trp Thr Asp Gln Asp Ser Lys Asp Ser
                165                 170                 175

Thr Tyr Ser Met Ser Ser Thr Leu Thr Leu Thr Lys Asp Glu Tyr Glu
            180                 185                 190

Arg His Asn Ser Tyr Thr Cys Glu Ala Thr His Lys Thr Ser Thr Ser
        195                 200                 205

Pro Ile Val Lys Ser Phe Asn Arg Asn Glu Cys
    210                 215

<210> SEQ ID NO 13
<211> LENGTH: 10
<212> TYPE: PRT
<213> ORGANISM: mus musculus

<400> SEQUENCE: 13

Gln Val Gln Leu Gln Gln Pro Gly Ala Glu
1               5                   10

<210> SEQ ID NO 14
<211> LENGTH: 10
<212> TYPE: PRT
<213> ORGANISM: mus musculus
```

<400> SEQUENCE: 14

Asp Val Leu Met Thr Gln Ile Pro Leu Ser
1               5                   10

<210> SEQ ID NO 15
<211> LENGTH: 5
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 15

Asp Tyr Ala Met Ser
1               5

<210> SEQ ID NO 16
<211> LENGTH: 17
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 16

Thr Ile Ser Asp Gly Gly Thr Tyr Thr Tyr Tyr Pro Asp Ser Val Lys
1               5                   10                  15

Gly

<210> SEQ ID NO 17
<211> LENGTH: 10
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 17

Glu Trp Gly Asp Tyr Asp Gly Phe Asp Tyr
1               5                   10

<210> SEQ ID NO 18
<211> LENGTH: 11
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 18

Arg Ala Ser Gln Glu Ile Ser Gly Tyr Leu Ser
1               5                   10

<210> SEQ ID NO 19
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 19

Ala Ala Ser Thr Leu Asp Ser
1               5

```
<210> SEQ ID NO 20
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 20

Leu Gln Tyr Asp Ser Tyr Pro Tyr Thr
1               5

<210> SEQ ID NO 21
<211> LENGTH: 119
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 21

Gln Val Gln Leu Val Glu Ser Gly Gly Gly Leu Val Lys Pro Gly Gly
1               5                   10                  15

Ser Leu Arg Leu Ser Cys Ala Ala Ser Gly Phe Thr Phe Ser Asp Tyr
            20                  25                  30

Ala Met Ser Trp Ile Arg Gln Ala Pro Gly Lys Gly Leu Glu Trp Val
        35                  40                  45

Ser Thr Ile Ser Asp Gly Gly Thr Tyr Thr Tyr Tyr Pro Asp Ser Val
    50                  55                  60

Lys Gly Arg Phe Thr Ile Ser Arg Asp Asn Ala Lys Asn Ser Leu Tyr
65                  70                  75                  80

Leu Gln Met Asn Ser Leu Arg Ala Glu Asp Thr Ala Val Tyr Tyr Cys
                85                  90                  95

Ala Arg Glu Trp Gly Asp Tyr Asp Gly Phe Asp Tyr Trp Gly Gln Gly
            100                 105                 110

Thr Leu Val Thr Val Ser Ser
        115

<210> SEQ ID NO 22
<211> LENGTH: 107
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 22

Asp Ile Gln Met Thr Gln Ser Pro Ser Ser Leu Ser Ala Ser Val Gly
1               5                   10                  15

Asp Arg Val Thr Ile Thr Cys Arg Ala Ser Gln Glu Ile Ser Gly Tyr
            20                  25                  30

Leu Ser Trp Tyr Gln Gln Lys Pro Gly Lys Ala Pro Lys Arg Leu Ile
        35                  40                  45

Tyr Ala Ala Ser Thr Leu Asp Ser Gly Val Pro Ser Arg Phe Ser Gly
    50                  55                  60

Ser Gly Ser Gly Thr Glu Phe Thr Leu Thr Ile Ser Ser Leu Gln Pro
65                  70                  75                  80

Glu Asp Phe Ala Thr Tyr Tyr Cys Leu Gln Tyr Asp Ser Tyr Pro Tyr
                85                  90                  95

Thr Phe Gly Gln Gly Thr Lys Leu Glu Ile Lys
            100                 105
```

<210> SEQ ID NO 23
<211> LENGTH: 471
<212> TYPE: PRT
<213> ORGANISM: Artificial Sequence
<220> FEATURE:
<223> OTHER INFORMATION: Description of Artificial Sequence: Synthetic polypeptide

<400> SEQUENCE: 23

```
Met Asp Met Arg Val Pro Ala Gln Leu Leu Gly Leu Leu Leu Leu Trp
1               5                   10                  15

Leu Arg Gly Ala Arg Cys Gln Val Gln Leu Val Glu Ser Gly Gly Gly
            20                  25                  30

Leu Val Lys Pro Gly Gly Ser Leu Arg Leu Ser Cys Ala Ala Ser Gly
        35                  40                  45

Phe Thr Phe Ser Asp Tyr Ala Met Ser Trp Ile Arg Gln Ala Pro Gly
    50                  55                  60

Lys Gly Leu Glu Trp Val Ser Thr Ile Ser Asp Gly Gly Thr Tyr Thr
65                  70                  75                  80

Tyr Tyr Pro Asp Ser Val Lys Gly Arg Phe Thr Ile Ser Arg Asp Asn
                85                  90                  95

Ala Lys Asn Ser Leu Tyr Leu Gln Met Asn Ser Leu Arg Ala Glu Asp
            100                 105                 110

Thr Ala Val Tyr Tyr Cys Ala Arg Glu Trp Gly Asp Tyr Asp Gly Phe
        115                 120                 125

Asp Tyr Trp Gly Gln Gly Thr Leu Val Thr Val Ser Ser Ala Ser Thr
    130                 135                 140

Lys Gly Pro Ser Val Phe Pro Leu Ala Pro Ser Ser Lys Ser Thr Ser
145                 150                 155                 160

Gly Gly Thr Ala Ala Leu Gly Cys Leu Val Lys Asp Tyr Phe Pro Glu
                165                 170                 175

Pro Val Thr Val Ser Trp Asn Ser Gly Ala Leu Thr Ser Gly Val His
            180                 185                 190

Thr Phe Pro Ala Val Leu Gln Ser Ser Gly Leu Tyr Ser Leu Ser Ser
        195                 200                 205

Val Val Thr Val Pro Ser Ser Ser Leu Gly Thr Gln Thr Tyr Ile Cys
    210                 215                 220

Asn Val Asn His Lys Pro Ser Asn Thr Lys Val Asp Lys Arg Val Glu
225                 230                 235                 240

Pro Lys Ser Cys Asp Lys Thr His Thr Cys Pro Pro Cys Pro Ala Pro
                245                 250                 255

Glu Leu Leu Gly Gly Pro Ser Val Phe Leu Phe Pro Pro Lys Pro Lys
            260                 265                 270

Asp Thr Leu Met Ile Ser Arg Thr Pro Glu Val Thr Cys Val Val Val
        275                 280                 285

Asp Val Ser His Glu Asp Pro Glu Val Lys Phe Asn Trp Tyr Val Asp
    290                 295                 300

Gly Val Glu Val His Asn Ala Lys Thr Lys Pro Arg Glu Glu Gln Tyr
305                 310                 315                 320

Asn Ser Thr Tyr Arg Val Val Ser Val Leu Thr Val Leu His Gln Asp
                325                 330                 335

Trp Leu Asn Gly Lys Glu Tyr Lys Cys Lys Val Ser Asn Lys Ala Leu
            340                 345                 350

Pro Ala Pro Ile Glu Lys Thr Ile Ser Lys Ala Lys Gly Gln Pro Arg
```

```
                355                 360                 365
Glu Pro Gln Val Tyr Thr Leu Pro Pro Ser Arg Glu Glu Met Thr Lys
    370                 375                 380

Asn Gln Val Ser Leu Thr Cys Leu Val Lys Gly Phe Tyr Pro Ser Asp
385                 390                 395                 400

Ile Ala Val Glu Trp Glu Ser Asn Gly Gln Pro Glu Asn Asn Tyr Lys
                405                 410                 415

Thr Thr Pro Pro Val Leu Asp Ser Asp Gly Ser Phe Phe Leu Tyr Ser
            420                 425                 430

Lys Leu Thr Val Asp Lys Ser Arg Trp Gln Gln Gly Asn Val Phe Ser
        435                 440                 445

Cys Ser Val Met His Glu Ala Leu His Asn His Tyr Thr Gln Lys Ser
    450                 455                 460

Leu Ser Leu Ser Pro Gly Lys
465                 470

<210> SEQ ID NO 24
<211> LENGTH: 236
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 24

Met Asp Met Arg Val Pro Ala Gln Leu Leu Gly Leu Leu Leu Leu Trp
1               5                   10                  15

Leu Arg Gly Ala Arg Cys Asp Ile Gln Met Thr Gln Ser Pro Ser Ser
            20                  25                  30

Leu Ser Ala Ser Val Gly Asp Arg Val Thr Ile Thr Cys Arg Ala Ser
        35                  40                  45

Gln Glu Ile Ser Gly Tyr Leu Ser Trp Tyr Gln Gln Lys Pro Gly Lys
    50                  55                  60

Ala Pro Lys Arg Leu Ile Tyr Ala Ala Ser Thr Leu Asp Ser Gly Val
65                  70                  75                  80

Pro Ser Arg Phe Ser Gly Ser Gly Ser Gly Thr Glu Phe Thr Leu Thr
                85                  90                  95

Ile Ser Ser Leu Gln Pro Glu Asp Phe Ala Thr Tyr Tyr Cys Leu Gln
            100                 105                 110

Tyr Asp Ser Tyr Pro Tyr Thr Phe Gly Gln Gly Thr Lys Leu Glu Ile
        115                 120                 125

Lys Arg Thr Val Ala Ala Pro Ser Val Phe Ile Phe Pro Pro Ser Asp
    130                 135                 140

Glu Gln Leu Lys Ser Gly Thr Ala Ser Val Val Cys Leu Leu Asn Asn
145                 150                 155                 160

Phe Tyr Pro Arg Glu Ala Lys Val Gln Trp Lys Val Asp Asn Ala Leu
                165                 170                 175

Gln Ser Gly Asn Ser Gln Glu Ser Val Thr Glu Gln Asp Ser Lys Asp
            180                 185                 190

Ser Thr Tyr Ser Leu Ser Ser Thr Leu Thr Leu Ser Lys Ala Asp Tyr
        195                 200                 205

Glu Lys His Lys Val Tyr Ala Cys Glu Val Thr His Gln Gly Leu Ser
    210                 215                 220

Ser Pro Val Thr Lys Ser Phe Asn Arg Gly Glu Cys
225                 230                 235
```

<210> SEQ ID NO 25
<211> LENGTH: 5
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 25

Ser His Trp Leu His
1               5

<210> SEQ ID NO 26
<211> LENGTH: 17
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 26

Val Leu Asp Pro Ser Asp Phe Tyr Ser Asn Tyr Asn Gln Asn Phe Lys
1               5                   10                  15

Gly

<210> SEQ ID NO 27
<211> LENGTH: 11
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 27

Gly Leu Leu Ser Gly Asp Tyr Ala Met Asp Tyr
1               5                   10

<210> SEQ ID NO 28
<211> LENGTH: 16
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 28

Arg Ser Ser Gln Ser Ile Val His Ser Asn Gly Asn Thr Tyr Leu Glu
1               5                   10                  15

<210> SEQ ID NO 29
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 29

Lys Val Ser Asn Arg Phe Ser
1               5

<210> SEQ ID NO 30
<211> LENGTH: 9
<212> TYPE: PRT
<213> ORGANISM: Artificial Sequence
<220> FEATURE:
<223> OTHER INFORMATION: Description of Artificial Sequence: Synthetic peptide

<400> SEQUENCE: 30

Phe Gln Gly Ser Tyr Val Pro Trp Thr
1               5

<210> SEQ ID NO 31
<211> LENGTH: 120
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 31

Gln Val Gln Leu Gln Gln Pro Gly Ala Glu Leu Val Arg Pro Gly Thr
1               5                   10                  15

Ser Val Lys Leu Ser Cys Lys Ala Ser Gly Tyr Thr Phe Thr Ser His
                20                  25                  30

Trp Leu His Trp Val Lys Gln Arg Pro Gly Gln Gly Leu Glu Trp Ile
            35                  40                  45

Gly Val Leu Asp Pro Ser Asp Phe Tyr Ser Asn Tyr Asn Gln Asn Phe
        50                  55                  60

Lys Gly Lys Ala Thr Leu Thr Val Asp Thr Ser Ser Ser Thr Ala Tyr
65                  70                  75                  80

Met Gln Leu Ser Ser Leu Thr Ser Glu Asp Ser Ala Val Tyr Tyr Cys
                85                  90                  95

Ala Arg Gly Leu Leu Ser Gly Asp Tyr Ala Met Asp Tyr Trp Gly Gln
            100                 105                 110

Gly Thr Ser Val Thr Val Ser Ser
        115                 120

<210> SEQ ID NO 32
<211> LENGTH: 112
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 32

Asp Val Leu Met Thr Gln Ile Pro Leu Ser Leu Pro Val Ser Leu Gly
1               5                   10                  15

Asp Gln Ala Ser Ile Ser Cys Arg Ser Ser Gln Ser Ile Val His Ser
                20                  25                  30

Asn Gly Asn Thr Tyr Leu Glu Trp Tyr Leu Gln Lys Pro Gly Gln Ser
            35                  40                  45

Pro Lys Ser Leu Ile Tyr Lys Val Ser Asn Arg Phe Ser Gly Val Pro
        50                  55                  60

Asp Arg Phe Ser Gly Ser Gly Ser Gly Thr Asp Phe Thr Leu Lys Ile
65                  70                  75                  80

Ser Arg Val Glu Ala Glu Asp Leu Gly Val Tyr Tyr Cys Phe Gln Gly
                85                  90                  95

Ser Tyr Val Pro Trp Thr Phe Gly Gly Gly Thr Lys Leu Glu Ile Lys
            100                 105                 110

<210> SEQ ID NO 33
<211> LENGTH: 463
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 33

Met Gly Trp Ser Cys Ile Ile Val Leu Leu Val Ser Thr Ala Thr Gly
1               5                   10                  15

Val His Ser Gln Val Gln Leu Gln Gln Pro Gly Ala Glu Leu Val Arg
            20                  25                  30

Pro Gly Thr Ser Val Lys Leu Ser Cys Lys Ala Ser Gly Tyr Thr Phe
        35                  40                  45

Thr Ser His Trp Leu His Trp Val Lys Gln Arg Pro Gly Gln Gly Leu
    50                  55                  60

Glu Trp Ile Gly Val Leu Asp Pro Ser Asp Phe Tyr Ser Asn Tyr Asn
65                  70                  75                  80

Gln Asn Phe Lys Gly Lys Ala Thr Leu Thr Val Asp Thr Ser Ser Ser
                85                  90                  95

Thr Ala Tyr Met Gln Leu Ser Ser Leu Thr Ser Glu Asp Ser Ala Val
            100                 105                 110

Tyr Tyr Cys Ala Arg Gly Leu Leu Ser Gly Asp Tyr Ala Met Asp Tyr
        115                 120                 125

Trp Gly Gln Gly Thr Ser Val Thr Val Ser Ser Ala Lys Thr Thr Pro
130                 135                 140

Pro Ser Val Tyr Pro Leu Ala Pro Gly Ser Ala Ala Gln Thr Asn Ser
145                 150                 155                 160

Met Val Thr Leu Gly Cys Leu Val Lys Gly Tyr Phe Pro Glu Pro Val
                165                 170                 175

Thr Val Thr Trp Asn Ser Gly Ser Leu Ser Ser Gly Val His Thr Phe
            180                 185                 190

Pro Ala Val Leu Gln Ser Asp Leu Tyr Thr Leu Ser Ser Ser Val Thr
        195                 200                 205

Val Pro Ser Ser Thr Trp Pro Ser Gln Thr Val Thr Cys Asn Val Ala
210                 215                 220

His Pro Ala Ser Ser Thr Lys Val Asp Lys Lys Ile Val Pro Arg Asp
225                 230                 235                 240

Cys Gly Cys Lys Pro Cys Ile Cys Thr Val Pro Glu Val Ser Ser Val
                245                 250                 255

Phe Ile Phe Pro Pro Lys Pro Lys Asp Val Leu Thr Ile Thr Leu Thr
            260                 265                 270

Pro Lys Val Thr Cys Val Val Val Asp Ile Ser Lys Asp Asp Pro Glu
        275                 280                 285

Val Gln Phe Ser Trp Phe Val Asp Asp Val Glu Val His Thr Ala Gln
290                 295                 300

Thr Gln Pro Arg Glu Glu Gln Phe Asn Ser Thr Phe Arg Ser Val Ser
305                 310                 315                 320

Glu Leu Pro Ile Met His Gln Asp Trp Leu Asn Gly Lys Glu Phe Lys
                325                 330                 335

Cys Arg Val Asn Ser Ala Ala Phe Pro Ala Pro Ile Glu Lys Thr Ile
            340                 345                 350

Ser Lys Thr Lys Gly Arg Pro Lys Ala Pro Gln Val Tyr Thr Ile Pro
        355                 360                 365

Pro Pro Lys Glu Gln Met Ala Lys Asp Lys Val Ser Leu Thr Cys Met
370                 375                 380

Ile Thr Asp Phe Phe Pro Glu Asp Ile Thr Val Glu Trp Gln Trp Asn

```
                385                 390                 395                 400
Gly Gln Pro Ala Glu Asn Tyr Lys Asn Thr Gln Pro Ile Met Asp Thr
                    405                 410                 415

Asp Gly Ser Tyr Phe Val Tyr Ser Lys Leu Asn Val Gln Lys Ser Asn
                420                 425                 430

Trp Glu Ala Gly Asn Thr Phe Thr Cys Ser Val Leu His Glu Gly Leu
                435                 440                 445

His Asn His His Thr Glu Lys Ser Leu Ser His Ser Pro Gly Lys
                450                 455                 460

<210> SEQ ID NO 34
<211> LENGTH: 238
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 34

Met Lys Leu Pro Val Arg Leu Leu Val Leu Met Phe Trp Ile Pro Ala
1               5                   10                  15

Ser Ser Ser Asp Val Leu Met Thr Gln Ile Pro Leu Ser Leu Pro Val
                20                  25                  30

Ser Leu Gly Asp Gln Ala Ser Ile Ser Cys Arg Ser Ser Gln Ser Ile
            35                  40                  45

Val His Ser Asn Gly Asn Thr Tyr Leu Glu Trp Tyr Leu Gln Lys Pro
    50                  55                  60

Gly Gln Ser Pro Lys Ser Leu Ile Tyr Lys Val Ser Asn Arg Phe Ser
65                  70                  75                  80

Gly Val Pro Asp Arg Phe Ser Gly Ser Gly Ser Gly Thr Asp Phe Thr
                85                  90                  95

Leu Lys Ile Ser Arg Val Glu Ala Glu Asp Leu Gly Val Tyr Tyr Cys
            100                 105                 110

Phe Gln Gly Ser Tyr Val Pro Trp Thr Phe Gly Gly Gly Thr Lys Leu
        115                 120                 125

Glu Ile Lys Arg Ala Asp Ala Ala Pro Thr Val Ser Ile Phe Pro Pro
    130                 135                 140

Ser Ser Glu Gln Leu Thr Ser Gly Gly Ala Ser Val Val Cys Phe Leu
145                 150                 155                 160

Asn Asn Phe Tyr Pro Arg Asp Ile Asn Val Lys Trp Lys Ile Asp Gly
                165                 170                 175

Ser Glu Arg Gln Asn Gly Val Leu Asn Ser Trp Thr Asp Gln Asp Ser
            180                 185                 190

Lys Asp Ser Thr Tyr Ser Met Ser Ser Thr Leu Thr Leu Thr Lys Asp
        195                 200                 205

Glu Tyr Glu Arg His Asn Ser Tyr Thr Cys Glu Ala Thr His Lys Thr
    210                 215                 220

Ser Thr Ser Pro Ile Val Lys Ser Phe Asn Arg Asn Glu Cys
225                 230                 235

<210> SEQ ID NO 35
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide
```

```
<400> SEQUENCE: 35

Thr Phe Gly Leu Ser Val Gly
1               5

<210> SEQ ID NO 36
<211> LENGTH: 16
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 36

His Ile Trp Trp Asp Asp Asp Lys Tyr Tyr Asn Pro Ala Leu Lys Ser
1               5                   10                  15

<210> SEQ ID NO 37
<211> LENGTH: 10
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 37

Ile Gly Ala Asp Ala Leu Pro Phe Asp Tyr
1               5                   10

<210> SEQ ID NO 38
<211> LENGTH: 16
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 38

Arg Ser Ser Lys Ser Leu Leu His Ser Asn Gly Asn Thr Tyr Leu Tyr
1               5                   10                  15

<210> SEQ ID NO 39
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 39

Arg Met Ser Asn Leu Ala Ser
1               5

<210> SEQ ID NO 40
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 40

Met Gln His Leu Glu Tyr Pro Phe Thr
1               5

<210> SEQ ID NO 41
<211> LENGTH: 120
<212> TYPE: PRT
```

```
<213> ORGANISM: Artificial Sequence
<220> FEATURE:
<223> OTHER INFORMATION: Description of Artificial Sequence: Synthetic
      polypeptide

<400> SEQUENCE: 41

Gln Val Thr Leu Lys Glu Ser Gly Pro Gly Ile Leu Arg Pro Ser Gln
1               5                   10                  15

Thr Leu Ser Leu Thr Cys Ser Phe Ser Gly Phe Ser Leu Ser Thr Phe
            20                  25                  30

Gly Leu Ser Val Gly Trp Ile Arg Gln Pro Ser Gly Lys Gly Leu Glu
        35                  40                  45

Trp Leu Ala His Ile Trp Trp Asp Asp Lys Tyr Tyr Asn Pro Ala
50                  55                  60

Leu Lys Ser Arg Leu Thr Ile Ser Lys Asp Thr Ser Lys Asn Gln Val
65                  70                  75                  80

Phe Leu Lys Ile Ala Asn Val Asp Thr Ala Asp Thr Ala Thr Tyr Tyr
                85                  90                  95

Cys Ala Arg Ile Gly Ala Asp Ala Leu Pro Phe Asp Tyr Trp Gly Gln
            100                 105                 110

Gly Thr Thr Leu Thr Val Ser Ser
        115                 120

<210> SEQ ID NO 42
<211> LENGTH: 112
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 42

Asp Ile Val Leu Thr Gln Thr Ala Pro Ser Val Pro Val Thr Pro Gly
1               5                   10                  15

Glu Ser Val Ser Ile Ser Cys Arg Ser Ser Lys Ser Leu Leu His Ser
            20                  25                  30

Asn Gly Asn Thr Tyr Leu Tyr Trp Phe Leu Gln Arg Pro Gly Gln Ser
        35                  40                  45

Pro Gln Leu Leu Ile Tyr Arg Met Ser Asn Leu Ala Ser Gly Val Pro
50                  55                  60

Asp Arg Phe Ser Gly Ser Gly Ser Gly Thr Ala Phe Thr Leu Arg Ile
65                  70                  75                  80

Ser Arg Val Glu Ala Glu Asp Val Gly Val Tyr Tyr Cys Met Gln His
                85                  90                  95

Leu Glu Tyr Pro Phe Thr Phe Gly Ser Gly Thr Lys Leu Glu Ile Lys
            100                 105                 110

<210> SEQ ID NO 43
<211> LENGTH: 475
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 43

Met Gly Arg Leu Thr Ser Ser Phe Leu Leu Leu Ile Val Pro Ala Tyr
1               5                   10                  15

Val Leu Ser Gln Val Thr Leu Lys Glu Ser Gly Pro Gly Ile Leu Arg
            20                  25                  30
```

-continued

```
Pro Ser Gln Thr Leu Ser Leu Thr Cys Ser Phe Ser Gly Phe Ser Leu
        35                  40                  45

Ser Thr Phe Gly Leu Ser Val Gly Trp Ile Arg Gln Pro Ser Gly Lys
    50                  55                  60

Gly Leu Glu Trp Leu Ala His Ile Trp Trp Asp Asp Lys Tyr Tyr
65                  70                  75                  80

Asn Pro Ala Leu Lys Ser Arg Leu Thr Ile Ser Lys Asp Thr Ser Lys
                85                  90                  95

Asn Gln Val Phe Leu Lys Ile Ala Asn Val Asp Thr Ala Asp Thr Ala
                100                 105                 110

Thr Tyr Tyr Cys Ala Arg Ile Gly Ala Asp Ala Leu Pro Phe Asp Tyr
                115                 120                 125

Trp Gly Gln Gly Thr Thr Leu Thr Val Ser Ser Ala Lys Thr Thr Pro
    130                 135                 140

Pro Ser Val Tyr Pro Leu Ala Pro Gly Cys Gly Asp Thr Thr Gly Ser
145                 150                 155                 160

Ser Val Thr Ser Gly Cys Leu Val Lys Gly Tyr Phe Pro Glu Pro Val
                165                 170                 175

Thr Val Thr Trp Asn Ser Gly Ser Leu Ser Ser Val His Thr Phe
                180                 185                 190

Pro Ala Leu Leu Gln Ser Gly Leu Tyr Thr Met Ser Ser Val Thr
                195                 200                 205

Val Pro Ser Ser Thr Trp Pro Ser Gln Thr Val Thr Cys Ser Val Ala
    210                 215                 220

His Pro Ala Ser Ser Thr Thr Val Asp Lys Lys Leu Glu Pro Ser Gly
225                 230                 235                 240

Pro Ile Ser Thr Ile Asn Pro Cys Pro Pro Cys Lys Glu Cys His Lys
                245                 250                 255

Cys Pro Ala Pro Asn Leu Glu Gly Gly Pro Ser Val Phe Ile Phe Pro
                260                 265                 270

Pro Asn Ile Lys Asp Val Leu Met Ile Ser Leu Thr Pro Lys Val Thr
    275                 280                 285

Cys Val Val Val Asp Val Ser Glu Asp Asp Pro Asp Val Gln Ile Ser
    290                 295                 300

Trp Phe Val Asn Asn Val Glu Val His Thr Ala Gln Thr Gln Thr His
305                 310                 315                 320

Arg Glu Asp Tyr Asn Ser Thr Ile Arg Val Val Ser Thr Leu Pro Ile
                325                 330                 335

Gln His Gln Asp Trp Met Ser Gly Lys Glu Phe Lys Cys Lys Val Asn
                340                 345                 350

Asn Lys Asp Leu Pro Ser Pro Ile Glu Arg Thr Ile Ser Lys Ile Lys
                355                 360                 365

Gly Leu Val Arg Ala Pro Gln Val Tyr Thr Leu Pro Pro Pro Ala Glu
    370                 375                 380

Gln Leu Ser Arg Lys Asp Val Ser Leu Thr Cys Leu Val Val Gly Phe
385                 390                 395                 400

Asn Pro Gly Asp Ile Ser Val Glu Trp Thr Ser Asn Gly His Thr Glu
                405                 410                 415

Glu Asn Tyr Lys Asp Thr Ala Pro Val Leu Asp Ser Asp Gly Ser Tyr
                420                 425                 430

Phe Ile Tyr Ser Lys Leu Asn Met Lys Thr Ser Lys Trp Glu Lys Thr
                435                 440                 445
```

Asp Ser Phe Ser Cys Asn Val Arg His Glu Gly Leu Lys Asn Tyr Tyr
        450                 455                 460

Leu Lys Lys Thr Ile Ser Arg Ser Pro Gly Lys
465                 470                 475

<210> SEQ ID NO 44
<211> LENGTH: 239
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 44

Met Arg Cys Leu Ala Glu Phe Leu Gly Leu Leu Val Leu Trp Ile Pro
1               5                   10                  15

Gly Ala Ile Gly Asp Ile Val Leu Thr Gln Thr Ala Pro Ser Val Pro
                20                  25                  30

Val Thr Pro Gly Glu Ser Val Ser Ile Ser Cys Arg Ser Ser Lys Ser
            35                  40                  45

Leu Leu His Ser Asn Gly Asn Thr Tyr Leu Tyr Trp Phe Leu Gln Arg
    50                  55                  60

Pro Gly Gln Ser Pro Gln Leu Leu Ile Tyr Arg Met Ser Asn Leu Ala
65                  70                  75                  80

Ser Gly Val Pro Asp Arg Phe Ser Gly Ser Gly Ser Gly Thr Ala Phe
                85                  90                  95

Thr Leu Arg Ile Ser Arg Val Glu Ala Glu Asp Val Gly Val Tyr Tyr
            100                 105                 110

Cys Met Gln His Leu Glu Tyr Pro Phe Thr Phe Gly Ser Gly Thr Lys
        115                 120                 125

Leu Glu Ile Lys Arg Ala Asp Ala Ala Pro Thr Val Ser Ile Phe Pro
    130                 135                 140

Pro Ser Ser Glu Gln Leu Thr Ser Gly Gly Ala Ser Val Val Cys Phe
145                 150                 155                 160

Leu Asn Asn Phe Tyr Pro Arg Asp Ile Asn Val Lys Trp Lys Ile Asp
                165                 170                 175

Gly Ser Glu Arg Gln Asn Gly Val Leu Asn Ser Trp Thr Asp Gln Asp
            180                 185                 190

Ser Lys Asp Ser Thr Tyr Ser Met Ser Ser Thr Leu Thr Leu Thr Lys
        195                 200                 205

Asp Glu Tyr Glu Arg His Asn Ser Tyr Thr Cys Glu Ala Thr His Lys
    210                 215                 220

Thr Ser Thr Ser Pro Ile Val Lys Ser Phe Asn Arg Asn Glu Cys
225                 230                 235

<210> SEQ ID NO 45
<211> LENGTH: 5
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 45

Asp His Ile Ile His
1               5

<210> SEQ ID NO 46
<211> LENGTH: 17

-continued

```
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 46

Tyr Ile Tyr Pro Arg Asp Gly Tyr Ile Lys Tyr Asn Glu Lys Phe Lys
1               5                   10                  15

Gly

<210> SEQ ID NO 47
<211> LENGTH: 8
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 47

Gly Tyr Tyr Tyr Ala Met Asp Tyr
1               5

<210> SEQ ID NO 48
<211> LENGTH: 16
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 48

Arg Ser Ser Gln Ser Ile Val His Ser Ile Gly Asn Thr Tyr Leu Glu
1               5                   10                  15

<210> SEQ ID NO 49
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 49

Phe Gln Gly Ser His Val Pro Phe Thr
1               5

<210> SEQ ID NO 50
<211> LENGTH: 117
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 50

Gln Val Gln Leu Gln Gln Ser Asp Ala Glu Leu Val Lys Pro Gly Ala
1               5                   10                  15

Ser Val Lys Ile Ser Cys Lys Val Ser Gly Tyr Thr Phe Thr Asp His
                20                  25                  30

Ile Ile His Trp Met Lys Gln Arg Pro Glu Gln Gly Leu Glu Trp Ile
            35                  40                  45

Gly Tyr Ile Tyr Pro Arg Asp Gly Tyr Ile Lys Tyr Asn Glu Lys Phe
        50                  55                  60

Lys Gly Lys Ala Thr Leu Thr Ala Asp Lys Ser Ser Ser Thr Ala Tyr
```

```
                65                  70                  75                  80
Met Gln Val Asn Ser Leu Thr Ser Glu Asp Ser Ala Val Tyr Phe Cys
                    85                  90                  95

Ala Arg Gly Tyr Tyr Tyr Ala Met Asp Tyr Trp Gly Gln Gly Thr Ser
                    100                 105                 110

Val Thr Val Ser Ser
            115

<210> SEQ ID NO 51
<211> LENGTH: 112
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 51

Asp Val Leu Met Thr Gln Thr Pro Leu Ser Leu Pro Val Ser Leu Gly
1               5                   10                  15

Asp Gln Ala Ser Ile Ser Cys Arg Ser Ser Gln Ser Ile Val His Ser
                20                  25                  30

Ile Gly Asn Thr Tyr Leu Glu Trp Tyr Leu Gln Lys Pro Gly Gln Ser
            35                  40                  45

Pro Lys Leu Leu Ile Tyr Lys Val Ser Asn Arg Phe Ser Gly Val Pro
        50                  55                  60

Glu Arg Phe Ser Gly Ser Gly Ser Gly Thr Asp Phe Thr Leu Lys Ile
65                  70                  75                  80

Ser Arg Val Glu Ala Glu Asp Leu Gly Val Tyr Tyr Cys Phe Gln Gly
                85                  90                  95

Ser His Val Pro Phe Thr Phe Gly Ser Gly Thr Lys Leu Glu Ile Lys
                100                 105                 110

<210> SEQ ID NO 52
<211> LENGTH: 460
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 52

Met Glu Trp Ser Trp Val Ser Leu Phe Phe Leu Ser Val Thr Thr Gly
1               5                   10                  15

Val His Ser Gln Val Gln Leu Gln Gln Ser Asp Ala Glu Leu Val Lys
                20                  25                  30

Pro Gly Ala Ser Val Lys Ile Ser Cys Lys Val Ser Gly Tyr Thr Phe
            35                  40                  45

Thr Asp His Ile Ile His Trp Met Lys Gln Arg Pro Glu Gln Gly Leu
        50                  55                  60

Glu Trp Ile Gly Tyr Ile Tyr Pro Arg Asp Gly Tyr Ile Lys Tyr Asn
65                  70                  75                  80

Glu Lys Phe Lys Gly Lys Ala Thr Leu Thr Ala Asp Lys Ser Ser Ser
                85                  90                  95

Thr Ala Tyr Met Gln Val Asn Ser Leu Thr Ser Glu Asp Ser Ala Val
                100                 105                 110

Tyr Phe Cys Ala Arg Gly Tyr Tyr Tyr Ala Met Asp Tyr Trp Gly Gln
            115                 120                 125

Gly Thr Ser Val Thr Val Ser Ser Ala Lys Thr Thr Pro Pro Ser Val
```

```
            130                 135                 140
Tyr Pro Leu Ala Pro Gly Ser Ala Ala Gln Thr Asn Ser Met Val Thr
145                 150                 155                 160

Leu Gly Cys Leu Val Lys Gly Tyr Phe Pro Glu Pro Val Thr Val Thr
                    165                 170                 175

Trp Asn Ser Gly Ser Leu Ser Ser Gly Val His Thr Phe Pro Ala Val
                180                 185                 190

Leu Gln Ser Asp Leu Tyr Thr Leu Ser Ser Val Thr Val Pro Ser
                195                 200                 205

Ser Thr Trp Pro Ser Gln Thr Val Thr Cys Asn Val Ala His Pro Ala
210                 215                 220

Ser Ser Thr Lys Val Asp Lys Lys Ile Val Pro Arg Asp Cys Gly Cys
225                 230                 235                 240

Lys Pro Cys Ile Cys Thr Val Pro Glu Val Ser Ser Val Phe Ile Phe
                    245                 250                 255

Pro Pro Lys Pro Lys Asp Val Leu Thr Ile Thr Leu Thr Pro Lys Val
                260                 265                 270

Thr Cys Val Val Val Asp Ile Ser Lys Asp Asp Pro Glu Val Gln Phe
                275                 280                 285

Ser Trp Phe Val Asp Asp Val Glu Val His Thr Ala Gln Thr Gln Pro
290                 295                 300

Arg Glu Glu Gln Phe Asn Ser Thr Phe Arg Ser Val Ser Glu Leu Pro
305                 310                 315                 320

Ile Met His Gln Asp Trp Leu Asn Gly Lys Glu Phe Lys Cys Arg Val
                    325                 330                 335

Asn Ser Ala Ala Phe Pro Ala Pro Ile Glu Lys Thr Ile Ser Lys Thr
                340                 345                 350

Lys Gly Arg Pro Lys Ala Pro Gln Val Tyr Thr Ile Pro Pro Pro Lys
                355                 360                 365

Glu Gln Met Ala Lys Asp Lys Val Ser Leu Thr Cys Met Ile Thr Asp
370                 375                 380

Phe Phe Pro Glu Asp Ile Thr Val Glu Trp Gln Trp Asn Gly Gln Pro
385                 390                 395                 400

Ala Glu Asn Tyr Lys Asn Thr Gln Pro Ile Met Asp Thr Asp Gly Ser
                405                 410                 415

Tyr Phe Val Tyr Ser Lys Leu Asn Val Gln Lys Ser Asn Trp Glu Ala
                420                 425                 430

Gly Asn Thr Phe Thr Cys Ser Val Leu His Glu Gly Leu His Asn His
                435                 440                 445

His Thr Glu Lys Ser Leu Ser His Ser Pro Gly Lys
450                 455                 460

<210> SEQ ID NO 53
<211> LENGTH: 238
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 53

Met Lys Leu Pro Val Arg Leu Leu Val Leu Met Phe Trp Ile Pro Ala
1               5                   10                  15

Ser Arg Ser Asp Val Leu Met Thr Gln Thr Pro Leu Ser Leu Pro Val
                20                  25                  30
```

```
Ser Leu Gly Asp Gln Ala Ser Ile Ser Cys Arg Ser Ser Gln Ser Ile
            35                  40                  45
Val His Ser Ile Gly Asn Thr Tyr Leu Glu Trp Tyr Leu Gln Lys Pro
 50                  55                  60
Gly Gln Ser Pro Lys Leu Leu Ile Tyr Lys Val Ser Asn Arg Phe Ser
 65                  70                  75                  80
Gly Val Pro Glu Arg Phe Ser Gly Ser Gly Ser Gly Thr Asp Phe Thr
                 85                  90                  95
Leu Lys Ile Ser Arg Val Glu Ala Glu Asp Leu Gly Val Tyr Tyr Cys
            100                 105                 110
Phe Gln Gly Ser His Val Pro Phe Thr Phe Gly Ser Gly Thr Lys Leu
            115                 120                 125
Glu Ile Lys Arg Ala Asp Ala Ala Pro Thr Val Ser Ile Phe Pro Pro
130                 135                 140
Ser Ser Glu Gln Leu Thr Ser Gly Gly Ala Ser Val Val Cys Phe Leu
145                 150                 155                 160
Asn Asn Phe Tyr Pro Lys Asp Ile Asn Val Lys Trp Lys Ile Asp Gly
                165                 170                 175
Ser Glu Arg Gln Asn Gly Val Leu Asn Ser Trp Thr Asp Gln Asp Ser
            180                 185                 190
Lys Asp Ser Thr Tyr Ser Met Ser Ser Thr Leu Thr Leu Thr Lys Asp
            195                 200                 205
Glu Tyr Glu Arg His Asn Ser Tyr Thr Cys Glu Ala Thr His Lys Thr
210                 215                 220
Ser Thr Ser Pro Ile Val Lys Ser Phe Asn Arg Asn Glu Cys
225                 230                 235
```

```
<210> SEQ ID NO 54
<211> LENGTH: 5
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 54

Ser Tyr Trp Met His
1               5

<210> SEQ ID NO 55
<211> LENGTH: 17
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 55

Met Ile Asp Pro Ser Asp Val Tyr Thr Asn Tyr Asn Pro Lys Phe Lys
1               5                   10                  15

Gly

<210> SEQ ID NO 56
<211> LENGTH: 6
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 56
```

Asn Tyr Ser Gly Asp Tyr
1               5

<210> SEQ ID NO 57
<211> LENGTH: 115
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 57

Gln Val Gln Leu Leu Gln Pro Gly Ala Glu Leu Val Arg Pro Gly Thr
1               5                   10                  15

Ser Val Lys Leu Ser Cys Lys Thr Ser Gly Tyr Thr Phe Ser Ser Tyr
                20                  25                  30

Trp Met His Trp Val Lys Gln Arg Pro Gly Gln Gly Leu Glu Trp Ile
            35                  40                  45

Gly Met Ile Asp Pro Ser Asp Val Tyr Thr Asn Tyr Asn Pro Lys Phe
        50                  55                  60

Lys Gly Lys Ala Thr Leu Thr Val Asp Thr Ser Ser Ser Thr Ala Tyr
65                  70                  75                  80

Met Gln Leu Ser Ser Leu Thr Ser Glu Asp Ser Ala Val Tyr Tyr Cys
                85                  90                  95

Ala Arg Asn Tyr Ser Gly Asp Tyr Trp Gly Gln Gly Thr Thr Leu Thr
            100                 105                 110

Val Ser Ser
        115

<210> SEQ ID NO 58
<211> LENGTH: 112
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 58

Asp Val Leu Met Thr Gln Ile Pro Leu Ser Leu Pro Val Ser Leu Gly
1               5                   10                  15

Asp Gln Ala Ser Ile Ser Cys Arg Ser Ser Gln Ser Ile Val His Ser
                20                  25                  30

Asn Gly Asn Thr Tyr Leu Glu Trp Tyr Leu Gln Lys Pro Gly Gln Ser
            35                  40                  45

Pro Lys Leu Leu Ile Tyr Lys Val Ser Asn Arg Phe Ser Gly Val Pro
        50                  55                  60

Asp Arg Phe Ser Gly Ser Gly Ser Gly Thr Asp Phe Thr Leu Lys Ile
65                  70                  75                  80

Ser Arg Val Glu Ala Glu Asp Leu Gly Val Tyr Tyr Cys Phe Gln Gly
                85                  90                  95

Ser Tyr Val Pro Trp Thr Phe Gly Gly Gly Thr Lys Leu Glu Ile Lys
            100                 105                 110

<210> SEQ ID NO 59
<211> LENGTH: 458
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 59

```
Met Gly Trp Ser Cys Ile Ile Val Leu Leu Val Ser Thr Ala Thr Cys
1               5                   10                  15

Val His Ser Gln Val Gln Leu Leu Gln Pro Gly Ala Glu Leu Val Arg
            20                  25                  30

Pro Gly Thr Ser Val Lys Leu Ser Cys Lys Thr Ser Gly Tyr Thr Phe
        35                  40                  45

Ser Ser Tyr Trp Met His Trp Val Lys Gln Arg Pro Gly Gln Gly Leu
    50                  55                  60

Glu Trp Ile Gly Met Ile Asp Pro Ser Asp Val Tyr Thr Asn Tyr Asn
65                  70                  75                  80

Pro Lys Phe Lys Gly Lys Ala Thr Leu Thr Val Asp Thr Ser Ser Ser
                85                  90                  95

Thr Ala Tyr Met Gln Leu Ser Ser Leu Thr Ser Glu Asp Ser Ala Val
            100                 105                 110

Tyr Tyr Cys Ala Arg Asn Tyr Ser Gly Asp Tyr Trp Gly Gln Gly Thr
        115                 120                 125

Thr Leu Thr Val Ser Ser Ala Lys Thr Thr Pro Pro Ser Val Tyr Pro
130                 135                 140

Leu Ala Pro Gly Ser Ala Ala Gln Thr Asn Ser Met Val Thr Leu Gly
145                 150                 155                 160

Cys Leu Val Lys Gly Tyr Phe Pro Glu Pro Val Thr Val Thr Trp Asn
                165                 170                 175

Ser Gly Ser Leu Ser Ser Gly Val His Thr Phe Pro Ala Val Leu Gln
            180                 185                 190

Ser Asp Leu Tyr Thr Leu Ser Ser Ser Val Thr Val Pro Ser Ser Thr
        195                 200                 205

Trp Pro Ser Gln Thr Val Thr Cys Asn Val Ala His Pro Ala Ser Ser
210                 215                 220

Thr Lys Val Asp Lys Lys Ile Val Pro Arg Asp Cys Gly Cys Lys Pro
225                 230                 235                 240

Cys Ile Cys Thr Val Pro Glu Val Ser Ser Val Phe Ile Phe Pro Pro
                245                 250                 255

Lys Pro Lys Asp Val Leu Thr Ile Thr Leu Thr Pro Lys Val Thr Cys
            260                 265                 270

Val Val Val Asp Ile Ser Lys Asp Asp Pro Glu Val Gln Phe Ser Trp
        275                 280                 285

Phe Val Asp Asp Val Glu Val His Thr Ala Gln Thr Gln Pro Arg Glu
290                 295                 300

Glu Gln Phe Asn Ser Thr Phe Arg Ser Val Ser Glu Leu Pro Ile Met
305                 310                 315                 320

His Gln Asp Trp Leu Asn Gly Lys Glu Phe Lys Cys Arg Val Asn Ser
                325                 330                 335

Ala Ala Phe Pro Ala Pro Ile Glu Lys Thr Ile Ser Lys Thr Lys Gly
            340                 345                 350

Arg Pro Lys Ala Pro Gln Val Tyr Thr Ile Pro Pro Lys Glu Gln
        355                 360                 365

Met Ala Lys Asp Lys Val Ser Leu Thr Cys Met Ile Thr Asp Phe Phe
370                 375                 380

Pro Glu Asp Ile Thr Val Glu Trp Gln Trp Asn Gly Gln Pro Ala Glu
385                 390                 395                 400

Asn Tyr Lys Asn Thr Gln Pro Ile Met Asp Thr Asp Gly Ser Tyr Phe
```

```
                    405                 410                 415
Val Tyr Ser Lys Leu Asn Val Gln Lys Ser Asn Trp Glu Ala Gly Asn
            420                 425                 430

Thr Phe Thr Cys Ser Val Leu His Glu Gly Leu His Asn His His Thr
        435                 440                 445

Glu Lys Ser Leu Ser His Ser Pro Gly Lys
    450                 455

<210> SEQ ID NO 60
<211> LENGTH: 238
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 60

Met Lys Leu Pro Val Arg Leu Leu Val Leu Met Phe Trp Ile Pro Ala
1               5                   10                  15

Ser Ser Ser Asp Val Leu Met Thr Gln Ile Pro Leu Ser Leu Pro Val
            20                  25                  30

Ser Leu Gly Asp Gln Ala Ser Ile Ser Cys Arg Ser Ser Gln Ser Ile
        35                  40                  45

Val His Ser Asn Gly Asn Thr Tyr Leu Glu Trp Tyr Leu Gln Lys Pro
    50                  55                  60

Gly Gln Ser Pro Lys Leu Leu Ile Tyr Lys Val Ser Asn Arg Phe Ser
65                  70                  75                  80

Gly Val Pro Asp Arg Phe Ser Gly Ser Gly Ser Gly Thr Asp Phe Thr
                85                  90                  95

Leu Lys Ile Ser Arg Val Glu Ala Glu Asp Leu Gly Val Tyr Tyr Cys
            100                 105                 110

Phe Gln Gly Ser Tyr Val Pro Trp Thr Phe Gly Gly Gly Thr Lys Leu
        115                 120                 125

Glu Ile Lys Arg Ala Asp Ala Ala Pro Thr Val Ser Ile Phe Pro Pro
    130                 135                 140

Ser Ser Glu Gln Leu Thr Ser Gly Gly Ala Ser Val Val Cys Phe Leu
145                 150                 155                 160

Asn Asn Phe Tyr Pro Arg Asp Ile Asn Val Lys Trp Lys Ile Asp Gly
                165                 170                 175

Ser Glu Arg Gln Asn Gly Val Leu Asn Ser Trp Thr Asp Gln Asp Ser
            180                 185                 190

Lys Asp Ser Thr Tyr Ser Met Ser Ser Thr Leu Thr Leu Thr Lys Asp
        195                 200                 205

Glu Tyr Glu Arg His Asn Ser Tyr Thr Cys Glu Ala Thr His Lys Thr
    210                 215                 220

Ser Thr Ser Pro Ile Val Lys Ser Phe Asn Arg Asn Glu Cys
225                 230                 235

<210> SEQ ID NO 61
<211> LENGTH: 5
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 61

Thr Tyr Gly Met Ser
```

```
<210> SEQ ID NO 62
<211> LENGTH: 17
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 62

Trp Ile Asn Thr Tyr Ser Gly Val Pro Thr Tyr Ala Asp Asp Phe Lys
1               5                   10                  15
Gly

<210> SEQ ID NO 63
<211> LENGTH: 12
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 63

Gly Arg Asp Gly Tyr Gln Val Ala Trp Phe Ala Tyr
1               5                   10

<210> SEQ ID NO 64
<211> LENGTH: 11
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 64

Ile Thr Ser Thr Asp Ile Asp Asp Asp Met Asn
1               5                   10

<210> SEQ ID NO 65
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 65

Glu Gly Asn Thr Leu Arg Pro
1               5

<210> SEQ ID NO 66
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 66

Leu Gln Ser Asp Asn Leu Pro Tyr Thr
1               5

<210> SEQ ID NO 67
<211> LENGTH: 121
<212> TYPE: PRT
<213> ORGANISM: Artificial Sequence
```

```
<220> FEATURE:
<223> OTHER INFORMATION: Description of Artificial Sequence: Synthetic
      polypeptide

<400> SEQUENCE: 67

Gln Ile Gln Leu Val Gln Ser Gly Pro Glu Leu Lys Lys Pro Gly Glu
1               5                   10                  15

Ala Val Lys Ile Ser Cys Lys Ser Gly Tyr Thr Phe Thr Thr Tyr
            20                  25                  30

Gly Met Ser Trp Val Lys Gln Ala Pro Gly Arg Ala Leu Lys Trp Met
        35                  40                  45

Gly Trp Ile Asn Thr Tyr Ser Gly Val Pro Thr Tyr Ala Asp Asp Phe
    50                  55                  60

Lys Gly Arg Phe Ala Phe Ser Leu Glu Ser Ser Ala Ser Thr Ala Tyr
65                  70                  75                  80

Leu Gln Ile Asn Asn Leu Lys Asn Glu Asp Thr Ala Thr Tyr Phe Cys
                85                  90                  95

Ala Arg Gly Arg Asp Gly Tyr Gln Val Ala Trp Phe Ala Tyr Trp Gly
            100                 105                 110

Gln Gly Thr Leu Val Thr Val Ser Ala
        115                 120

<210> SEQ ID NO 68
<211> LENGTH: 107
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 68

Glu Thr Thr Val Thr Gln Ser Pro Ala Ser Leu Ser Met Ala Ile Gly
1               5                   10                  15

Asp Lys Val Thr Ile Arg Cys Ile Thr Ser Thr Asp Ile Asp Asp Asp
            20                  25                  30

Met Asn Trp Phe Gln Gln Lys Pro Gly Glu Pro Pro Lys Leu Leu Ile
        35                  40                  45

Ser Glu Gly Asn Thr Leu Arg Pro Gly Val Pro Ser Arg Phe Ser Gly
    50                  55                  60

Ser Gly Tyr Gly Thr Asp Phe Ile Phe Thr Ile Glu Asn Met Leu Ser
65                  70                  75                  80

Glu Asp Val Ala Asp Tyr Tyr Cys Leu Gln Ser Asp Asn Leu Pro Tyr
                85                  90                  95

Thr Phe Gly Gly Gly Thr Lys Leu Glu Ile Lys
            100                 105

<210> SEQ ID NO 69
<211> LENGTH: 464
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 69

Met Gly Trp Leu Trp Asn Leu Leu Phe Leu Met Ala Ala Ala Gln Ser
1               5                   10                  15

Ala Gln Ala Gln Ile Gln Leu Val Gln Ser Gly Pro Glu Leu Lys Lys
            20                  25                  30
```

```
Pro Gly Glu Ala Val Lys Ile Ser Cys Lys Ser Ser Gly Tyr Thr Phe
                35                  40                  45
Thr Thr Tyr Gly Met Ser Trp Val Lys Gln Ala Pro Gly Arg Ala Leu
        50                  55                  60
Lys Trp Met Gly Trp Ile Asn Thr Tyr Ser Gly Val Pro Thr Tyr Ala
 65                  70                  75                  80
Asp Asp Phe Lys Gly Arg Phe Ala Phe Ser Leu Glu Ser Ser Ala Ser
                85                  90                  95
Thr Ala Tyr Leu Gln Ile Asn Asn Leu Lys Asn Glu Asp Thr Ala Thr
            100                 105                 110
Tyr Phe Cys Ala Arg Gly Arg Asp Gly Tyr Gln Val Ala Trp Phe Ala
            115                 120                 125
Tyr Trp Gly Gln Gly Thr Leu Val Thr Val Ser Ala Ala Lys Thr Thr
130                 135                 140
Pro Pro Ser Val Tyr Pro Leu Ala Pro Gly Ser Ala Ala Gln Thr Asn
145                 150                 155                 160
Ser Met Val Thr Leu Gly Cys Leu Val Lys Gly Tyr Phe Pro Glu Pro
                165                 170                 175
Val Thr Val Thr Trp Asn Ser Gly Ser Leu Ser Ser Gly Val His Thr
            180                 185                 190
Phe Pro Ala Val Leu Gln Ser Asp Leu Tyr Thr Leu Ser Ser Ser Val
            195                 200                 205
Thr Val Pro Ser Ser Thr Trp Pro Ser Gln Thr Val Thr Cys Asn Val
        210                 215                 220
Ala His Pro Ala Ser Ser Thr Lys Val Asp Lys Lys Ile Val Pro Arg
225                 230                 235                 240
Asp Cys Gly Cys Lys Pro Cys Ile Cys Thr Val Pro Glu Val Ser Ser
                245                 250                 255
Val Phe Ile Phe Pro Pro Lys Pro Lys Asp Val Leu Thr Ile Thr Leu
            260                 265                 270
Thr Pro Lys Val Thr Cys Val Val Val Asp Ile Ser Lys Asp Asp Pro
            275                 280                 285
Glu Val Gln Phe Ser Trp Phe Val Asp Asp Val Glu Val His Thr Ala
290                 295                 300
Gln Thr Gln Pro Arg Glu Glu Gln Phe Asn Ser Thr Phe Arg Ser Val
305                 310                 315                 320
Ser Glu Leu Pro Ile Met His Gln Asp Trp Leu Asn Gly Lys Glu Phe
                325                 330                 335
Lys Cys Arg Val Asn Ser Ala Ala Phe Pro Ala Pro Ile Glu Lys Thr
            340                 345                 350
Ile Ser Lys Thr Lys Gly Arg Pro Lys Ala Pro Gln Val Tyr Thr Ile
            355                 360                 365
Pro Pro Pro Lys Glu Gln Met Ala Lys Asp Lys Val Ser Leu Thr Cys
370                 375                 380
Met Ile Thr Asp Phe Phe Pro Glu Asp Ile Thr Val Glu Trp Gln Trp
385                 390                 395                 400
Asn Gly Gln Pro Ala Glu Asn Tyr Lys Asn Thr Gln Pro Ile Met Asp
                405                 410                 415
Thr Asp Gly Ser Tyr Phe Val Tyr Ser Lys Leu Asn Val Gln Lys Ser
            420                 425                 430
Asn Trp Glu Ala Gly Asn Thr Phe Thr Cys Ser Val Leu His Glu Gly
            435                 440                 445
Leu His Asn His His Thr Glu Lys Ser Leu Ser His Ser Pro Gly Lys
```

<210> SEQ ID NO 70
<211> LENGTH: 234
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 70

Met Phe Ser Leu Ala Leu Leu Ser Leu Leu Leu Cys Val Ser
1               5                   10                  15

Asp Ser Arg Ala Glu Thr Thr Val Thr Gln Ser Pro Ala Ser Leu Ser
            20                  25                  30

Met Ala Ile Gly Asp Lys Val Thr Ile Arg Cys Ile Thr Ser Thr Asp
        35                  40                  45

Ile Asp Asp Asp Met Asn Trp Phe Gln Gln Lys Pro Gly Glu Pro Pro
    50                  55                  60

Lys Leu Leu Ile Ser Glu Gly Asn Thr Leu Arg Pro Gly Val Pro Ser
65                  70                  75                  80

Arg Phe Ser Gly Ser Gly Tyr Gly Thr Asp Phe Ile Phe Thr Ile Glu
                85                  90                  95

Asn Met Leu Ser Glu Asp Val Ala Asp Tyr Tyr Cys Leu Gln Ser Asp
            100                 105                 110

Asn Leu Pro Tyr Thr Phe Gly Gly Gly Thr Lys Leu Glu Ile Lys Arg
        115                 120                 125

Ala Asp Ala Ala Pro Thr Val Ser Ile Phe Pro Pro Ser Ser Glu Gln
    130                 135                 140

Leu Thr Ser Gly Gly Ala Ser Val Val Cys Phe Leu Asn Asn Phe Tyr
145                 150                 155                 160

Pro Arg Asp Ile Asn Val Lys Trp Lys Ile Asp Gly Ser Glu Arg Gln
                165                 170                 175

Asn Gly Val Leu Asn Ser Trp Thr Asp Gln Asp Ser Lys Asp Ser Thr
            180                 185                 190

Tyr Ser Met Ser Ser Thr Leu Thr Leu Thr Lys Asp Glu Tyr Glu Arg
        195                 200                 205

His Asn Ser Tyr Thr Cys Glu Ala Thr His Lys Thr Ser Thr Ser Pro
    210                 215                 220

Ile Val Lys Ser Phe Asn Arg Asn Glu Cys
225                 230

<210> SEQ ID NO 71
<211> LENGTH: 5
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 71

Asn Tyr Trp Met His
1               5

<210> SEQ ID NO 72
<211> LENGTH: 17
<212> TYPE: PRT
<213> ORGANISM: Artificial Sequence
<220> FEATURE:
<223> OTHER INFORMATION: Description of Artificial Sequence: Synthetic -continued peptide

<400> SEQUENCE: 72

Met Ile Asp Pro Ser Asp Ser Tyr Thr Asn Tyr Asn Pro Lys Phe Lys
1               5                   10                  15

Gly

<210> SEQ ID NO 73
<211> LENGTH: 115
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 73

Gln Val Gln Leu Gln Gln Pro Gly Ala Glu Leu Val Arg Pro Gly Thr
1               5                   10                  15

Ser Val Lys Leu Ser Cys Lys Ala Ser Gly Tyr Thr Phe Thr Asn Tyr
                20                  25                  30

Trp Met His Trp Val Lys Gln Arg Pro Gly Gln Gly Leu Glu Trp Ile
            35                  40                  45

Gly Met Ile Asp Pro Ser Asp Ser Tyr Thr Asn Tyr Asn Pro Lys Phe
        50                  55                  60

Lys Gly Lys Ala Thr Leu Thr Val Asp Thr Ser Ser Ser Thr Ala Tyr
65                  70                  75                  80

Met Gln Leu Ser Ser Leu Thr Ser Glu Asp Ser Ala Val Tyr Tyr Cys
                85                  90                  95

Ala Arg Asn Tyr Ser Gly Asp Tyr Trp Gly Gln Gly Thr Thr Leu Thr
                100                 105                 110

Val Ser Ser
        115

<210> SEQ ID NO 74
<211> LENGTH: 112
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 74

Asp Val Leu Met Thr Gln Thr Pro Leu Ser Leu Pro Val Ser Leu Gly
1               5                   10                  15

Asp Gln Ala Ser Ile Ser Cys Arg Ser Ser Gln Ser Ile Val His Ser
                20                  25                  30

Asn Gly Asn Thr Tyr Leu Glu Trp Tyr Leu Gln Lys Pro Gly Gln Ser
            35                  40                  45

Pro Lys Leu Leu Ile Tyr Lys Val Ser Asn Arg Phe Ser Gly Val Pro
        50                  55                  60

Asp Arg Phe Ser Gly Ser Gly Ser Gly Thr Asp Phe Thr Leu Lys Ile
65                  70                  75                  80

Ser Arg Val Glu Ala Glu Asp Leu Gly Val Tyr Tyr Cys Phe Gln Gly
                85                  90                  95

Ser Tyr Val Pro Trp Thr Phe Gly Gly Gly Thr Lys Leu Glu Ile Lys
                100                 105                 110

<210> SEQ ID NO 75
<211> LENGTH: 458

```
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 75

Met Gly Trp Ser Cys Ile Ile Val Leu Leu Val Ser Thr Ala Thr Gly
1               5                   10                  15

Val His Ser Gln Val Gln Leu Gln Gln Pro Gly Ala Glu Leu Val Arg
            20                  25                  30

Pro Gly Thr Ser Val Lys Leu Ser Cys Lys Ala Ser Gly Tyr Thr Phe
        35                  40                  45

Thr Asn Tyr Trp Met His Trp Val Lys Gln Arg Pro Gly Gln Gly Leu
    50                  55                  60

Glu Trp Ile Gly Met Ile Asp Pro Ser Asp Ser Tyr Thr Asn Tyr Asn
65                  70                  75                  80

Pro Lys Phe Lys Gly Lys Ala Thr Leu Thr Val Asp Thr Ser Ser Ser
                85                  90                  95

Thr Ala Tyr Met Gln Leu Ser Ser Leu Thr Ser Glu Asp Ser Ala Val
            100                 105                 110

Tyr Tyr Cys Ala Arg Asn Tyr Ser Gly Asp Tyr Trp Gly Gln Gly Thr
        115                 120                 125

Thr Leu Thr Val Ser Ser Ala Lys Thr Thr Pro Pro Ser Val Tyr Pro
130                 135                 140

Leu Ala Pro Gly Ser Ala Ala Gln Thr Asn Ser Met Val Thr Leu Gly
145                 150                 155                 160

Cys Leu Val Lys Gly Tyr Phe Pro Glu Pro Val Thr Val Thr Trp Asn
                165                 170                 175

Ser Gly Ser Leu Ser Ser Gly Val His Thr Phe Pro Ala Val Leu Gln
            180                 185                 190

Ser Asp Leu Tyr Thr Leu Ser Ser Ser Val Thr Val Pro Ser Ser Thr
        195                 200                 205

Trp Pro Ser Gln Thr Val Thr Cys Asn Val Ala His Pro Ala Ser Ser
    210                 215                 220

Thr Lys Val Asp Lys Lys Ile Val Pro Arg Asp Cys Gly Cys Lys Pro
225                 230                 235                 240

Cys Ile Cys Thr Val Pro Glu Val Ser Ser Val Phe Ile Phe Pro Pro
                245                 250                 255

Lys Pro Lys Asp Val Leu Thr Ile Thr Leu Thr Pro Lys Val Thr Cys
            260                 265                 270

Val Val Val Asp Ile Ser Lys Asp Asp Pro Glu Val Gln Phe Ser Trp
        275                 280                 285

Phe Val Asp Asp Val Glu Val His Thr Ala Gln Thr Gln Pro Arg Glu
    290                 295                 300

Glu Gln Phe Asn Ser Thr Phe Arg Ser Val Ser Glu Leu Pro Ile Met
305                 310                 315                 320

His Gln Asp Trp Leu Asn Gly Lys Glu Phe Lys Cys Arg Val Asn Ser
                325                 330                 335

Ala Ala Phe Pro Ala Pro Ile Glu Lys Thr Ile Ser Lys Thr Lys Gly
            340                 345                 350

Arg Pro Lys Ala Pro Gln Val Tyr Thr Ile Pro Pro Pro Lys Glu Gln
        355                 360                 365

Met Ala Lys Asp Lys Val Ser Leu Thr Cys Met Ile Thr Asp Phe Phe
    370                 375                 380
```

-continued

Pro Glu Asp Ile Thr Val Glu Trp Gln Trp Asn Gly Gln Pro Ala Glu
385                 390                 395                 400

Asn Tyr Lys Asn Thr Gln Pro Ile Met Asp Thr Asp Gly Ser Tyr Phe
            405                 410                 415

Val Tyr Ser Lys Leu Asn Val Gln Lys Ser Asn Trp Glu Ala Gly Asn
        420                 425                 430

Thr Phe Thr Cys Ser Val Leu His Glu Gly Leu His Asn His His Thr
    435                 440                 445

Glu Lys Ser Leu Ser His Ser Pro Gly Lys
450                 455

<210> SEQ ID NO 76
<211> LENGTH: 238
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 76

Met Lys Leu Pro Val Arg Leu Leu Val Leu Met Phe Trp Ile Pro Ala
1               5                   10                  15

Ser Ser Ser Asp Val Leu Met Thr Gln Thr Pro Leu Ser Leu Pro Val
            20                  25                  30

Ser Leu Gly Asp Gln Ala Ser Ile Ser Cys Arg Ser Ser Gln Ser Ile
        35                  40                  45

Val His Ser Asn Gly Asn Thr Tyr Leu Glu Trp Tyr Leu Gln Lys Pro
    50                  55                  60

Gly Gln Ser Pro Lys Leu Leu Ile Tyr Lys Val Ser Asn Arg Phe Ser
65                  70                  75                  80

Gly Val Pro Asp Arg Phe Ser Gly Ser Gly Ser Gly Thr Asp Phe Thr
                85                  90                  95

Leu Lys Ile Ser Arg Val Glu Ala Glu Asp Leu Gly Val Tyr Tyr Cys
            100                 105                 110

Phe Gln Gly Ser Tyr Val Pro Trp Thr Phe Gly Gly Gly Thr Lys Leu
        115                 120                 125

Glu Ile Lys Arg Ala Asp Ala Ala Pro Thr Val Ser Ile Phe Pro Pro
130                 135                 140

Ser Ser Glu Gln Leu Thr Ser Gly Gly Ala Ser Val Val Cys Phe Leu
145                 150                 155                 160

Asn Asn Phe Tyr Pro Arg Asp Ile Asn Val Lys Trp Lys Ile Asp Gly
                165                 170                 175

Ser Glu Arg Gln Asn Gly Val Leu Asn Ser Trp Thr Asp Gln Asp Ser
            180                 185                 190

Lys Asp Ser Thr Tyr Ser Met Ser Ser Thr Leu Thr Leu Thr Lys Asp
        195                 200                 205

Glu Tyr Glu Arg His Asn Ser Tyr Thr Cys Glu Ala Thr His Lys Thr
210                 215                 220

Ser Thr Ser Pro Ile Val Lys Ser Phe Asn Arg Asn Glu Cys
225                 230                 235

<210> SEQ ID NO 77
<211> LENGTH: 449
<212> TYPE: PRT
<213> ORGANISM: Artificial Sequence
<220> FEATURE:
<223> OTHER INFORMATION: Antibody heavy chain

<400> SEQUENCE: 77

```
Gln Val Gln Leu Val Glu Ser Gly Gly Gly Leu Val Lys Pro Gly Gly
1               5                   10                  15
Ser Leu Arg Leu Ser Cys Ala Ala Ser Gly Phe Thr Phe Ser Asp Tyr
            20                  25                  30
Ala Met Ser Trp Ile Arg Gln Ala Pro Gly Lys Gly Leu Glu Trp Val
        35                  40                  45
Ser Thr Ile Ser Asp Gly Gly Thr Tyr Thr Tyr Tyr Pro Asp Ser Val
    50                  55                  60
Lys Gly Arg Phe Thr Ile Ser Arg Asp Asn Ala Lys Asn Ser Leu Tyr
65                  70                  75                  80
Leu Gln Met Asn Ser Leu Arg Ala Glu Asp Thr Ala Val Tyr Tyr Cys
            85                  90                  95
Ala Arg Glu Trp Gly Asp Tyr Asp Gly Phe Asp Tyr Trp Gly Gln Gly
        100                 105                 110
Thr Leu Val Thr Val Ser Ser Ala Ser Thr Lys Gly Pro Ser Val Phe
    115                 120                 125
Pro Leu Ala Pro Ser Ser Lys Ser Thr Ser Gly Gly Thr Ala Ala Leu
130                 135                 140
Gly Cys Leu Val Lys Asp Tyr Phe Pro Glu Pro Val Thr Val Ser Trp
145                 150                 155                 160
Asn Ser Gly Ala Leu Thr Ser Gly Val His Thr Phe Pro Ala Val Leu
            165                 170                 175
Gln Ser Ser Gly Leu Tyr Ser Leu Ser Ser Val Val Thr Val Pro Ser
        180                 185                 190
Ser Ser Leu Gly Thr Gln Thr Tyr Ile Cys Asn Val Asn His Lys Pro
    195                 200                 205
Ser Asn Thr Lys Val Asp Lys Lys Val Glu Pro Lys Ser Cys Asp Lys
210                 215                 220
Thr His Thr Cys Pro Pro Cys Pro Ala Pro Glu Leu Leu Gly Gly Pro
225                 230                 235                 240
Ser Val Phe Leu Phe Pro Pro Lys Pro Lys Asp Thr Leu Met Ile Ser
            245                 250                 255
Arg Thr Pro Glu Val Thr Cys Val Val Val Asp Val Ser His Glu Asp
        260                 265                 270
Pro Glu Val Lys Phe Asn Trp Tyr Val Asp Gly Val Glu Val His Asn
    275                 280                 285
Ala Lys Thr Lys Pro Arg Glu Glu Gln Tyr Asn Ser Thr Tyr Arg Val
290                 295                 300
Val Ser Val Leu Thr Val Leu His Gln Asp Trp Leu Asn Gly Lys Glu
305                 310                 315                 320
Tyr Lys Cys Lys Val Ser Asn Lys Ala Leu Pro Ala Pro Ile Glu Lys
            325                 330                 335
Thr Ile Ser Lys Ala Lys Gly Gln Pro Arg Glu Pro Gln Val Tyr Thr
        340                 345                 350
Leu Pro Pro Ser Arg Asp Glu Leu Thr Lys Asn Gln Val Ser Leu Thr
    355                 360                 365
Cys Leu Val Lys Gly Phe Tyr Pro Ser Asp Ile Ala Val Glu Trp Glu
        370                 375                 380
Ser Asn Gly Gln Pro Glu Asn Asn Tyr Lys Thr Thr Pro Pro Val Leu
385                 390                 395                 400
Asp Ser Asp Gly Ser Phe Phe Leu Tyr Ser Lys Leu Thr Val Asp Lys
```

```
                        405                 410                 415
Ser Arg Trp Gln Gln Gly Asn Val Phe Ser Cys Ser Val Met His Glu
            420                 425                 430

Ala Leu His Asn His Tyr Thr Gln Lys Ser Leu Ser Leu Ser Pro Gly
        435                 440                 445

Lys

<210> SEQ ID NO 78
<211> LENGTH: 214
<212> TYPE: PRT
<213> ORGANISM: Artificial Sequence
<220> FEATURE:
<223> OTHER INFORMATION: Antibody light chain

<400> SEQUENCE: 78

Asp Ile Gln Met Thr Gln Ser Pro Ser Ser Leu Ser Ala Ser Val Gly
1               5                   10                  15

Asp Arg Val Thr Ile Thr Cys Arg Ala Ser Gln Glu Ile Ser Gly Tyr
            20                  25                  30

Leu Ser Trp Tyr Gln Gln Lys Pro Gly Lys Ala Pro Lys Arg Leu Ile
        35                  40                  45

Tyr Ala Ala Ser Thr Leu Asp Ser Gly Val Pro Ser Arg Phe Ser Gly
    50                  55                  60

Ser Gly Ser Gly Thr Glu Phe Thr Leu Thr Ile Ser Ser Leu Gln Pro
65                  70                  75                  80

Glu Asp Phe Ala Thr Tyr Tyr Cys Leu Gln Tyr Asp Ser Tyr Pro Tyr
                85                  90                  95

Thr Phe Gly Gln Gly Thr Lys Leu Glu Ile Lys Arg Thr Val Ala Ala
            100                 105                 110

Pro Ser Val Phe Ile Phe Pro Pro Ser Asp Glu Gln Leu Lys Ser Gly
        115                 120                 125

Thr Ala Ser Val Val Cys Leu Leu Asn Asn Phe Tyr Pro Arg Glu Ala
    130                 135                 140

Lys Val Gln Trp Lys Val Asp Asn Ala Leu Gln Ser Gly Asn Ser Gln
145                 150                 155                 160

Glu Ser Val Thr Glu Gln Asp Ser Lys Asp Ser Thr Tyr Ser Leu Ser
                165                 170                 175

Ser Thr Leu Thr Leu Ser Lys Ala Asp Tyr Glu Lys His Lys Val Tyr
            180                 185                 190

Ala Cys Glu Val Thr His Gln Gly Leu Ser Ser Pro Val Thr Lys Ser
        195                 200                 205

Phe Asn Arg Gly Glu Cys
    210

<210> SEQ ID NO 79
<211> LENGTH: 119
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 79

Glu Val Gln Leu Val Glu Ser Gly Gly Gly Leu Val Gln Pro Gly Gly
1               5                   10                  15

Ser Leu Arg Leu Ser Cys Ala Ser Gly Phe Thr Phe Ser Asp Tyr
            20                  25                  30
```

```
Ala Met Ser Trp Val Arg Gln Ala Pro Gly Lys Gly Leu Glu Trp Val
            35                  40                  45

Ala Thr Ile Ser Asp Gly Gly Thr Tyr Thr Tyr Tyr Pro Asp Asn Val
 50                  55                  60

Lys Gly Arg Phe Thr Ile Ser Arg Asp Asn Ala Lys Asn Ser Leu Tyr
 65                  70                  75                  80

Leu Gln Met Asn Ser Leu Arg Ala Glu Asp Thr Ala Val Tyr Tyr Cys
                85                  90                  95

Ala Arg Glu Trp Gly Asp Tyr Asp Gly Phe Asp Tyr Trp Gly Gln Gly
            100                 105                 110

Thr Leu Val Thr Val Ser Ser
            115

<210> SEQ ID NO 80
<211> LENGTH: 119
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 80

Gln Val Gln Leu Val Glu Ser Gly Gly Gly Leu Val Lys Pro Gly Gly
 1                   5                  10                  15

Ser Leu Arg Leu Ser Cys Ala Ala Ser Gly Phe Thr Phe Ser Asp Tyr
                20                  25                  30

Ala Met Ser Trp Ile Arg Gln Ala Pro Gly Lys Gly Leu Glu Trp Val
            35                  40                  45

Ser Thr Ile Ser Asp Gly Gly Thr Tyr Thr Tyr Tyr Pro Asp Asn Val
 50                  55                  60

Lys Gly Arg Phe Thr Ile Ser Arg Asp Asn Ala Lys Asn Ser Leu Tyr
 65                  70                  75                  80

Leu Gln Met Asn Ser Leu Arg Ala Glu Asp Thr Ala Val Tyr Tyr Cys
                85                  90                  95

Ala Arg Glu Trp Gly Asp Tyr Asp Gly Phe Asp Tyr Trp Gly Gln Gly
            100                 105                 110

Thr Leu Val Thr Val Ser Ser
            115

<210> SEQ ID NO 81
<211> LENGTH: 119
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 81

Gln Val Gln Leu Val Glu Ser Gly Gly Gly Leu Val Lys Pro Gly Gly
 1                   5                  10                  15

Ser Leu Arg Leu Ser Cys Ala Ala Ser Gly Phe Thr Phe Ser Asp Tyr
                20                  25                  30

Ala Met Ser Trp Ile Arg Gln Ala Pro Gly Lys Gly Leu Glu Trp Val
            35                  40                  45

Ser Thr Ile Ser Asp Gly Gly Thr Tyr Thr Tyr Tyr Pro Asp Ser Val
 50                  55                  60

Lys Gly Arg Phe Thr Ile Ser Arg Asp Asn Ala Lys Asn Ser Leu Tyr
 65                  70                  75                  80
```

```
Leu Gln Met Asn Ser Leu Arg Ala Glu Asp Thr Ala Val Tyr Tyr Cys
                85                  90                  95

Ala Arg Glu Trp Gly Asp Tyr Asp Gly Phe Asp Tyr Trp Gly Gln Gly
            100                 105                 110

Thr Leu Val Thr Val Ser Ser
        115

<210> SEQ ID NO 82
<211> LENGTH: 119
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 82

Glu Val Gln Leu Val Glu Ser Gly Gly Gly Leu Val Lys Pro Gly Gly
1               5                   10                  15

Ser Leu Arg Leu Ser Cys Ala Ala Ser Gly Phe Thr Phe Ser Asp Tyr
            20                  25                  30

Ala Met Ser Trp Val Arg Gln Ala Pro Gly Lys Gly Leu Glu Trp Val
        35                  40                  45

Ser Thr Ile Ser Asp Gly Gly Thr Tyr Thr Tyr Tyr Pro Asp Asn Val
    50                  55                  60

Lys Gly Arg Phe Thr Ile Ser Arg Asp Asn Ala Lys Asn Ser Leu Tyr
65                  70                  75                  80

Leu Gln Met Asn Ser Leu Arg Ala Glu Asp Thr Ala Val Tyr Tyr Cys
                85                  90                  95

Ala Arg Glu Trp Gly Asp Tyr Asp Gly Phe Asp Tyr Trp Gly Gln Gly
            100                 105                 110

Thr Leu Val Thr Val Ser Ser
        115

<210> SEQ ID NO 83
<211> LENGTH: 119
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 83

Glu Val Gln Leu Leu Glu Ser Gly Gly Gly Leu Val Gln Pro Gly Gly
1               5                   10                  15

Ser Leu Arg Leu Ser Cys Ala Ala Ser Gly Phe Thr Phe Ser Asp Tyr
            20                  25                  30

Ala Met Ser Trp Val Arg Gln Ala Pro Gly Lys Gly Leu Glu Trp Val
        35                  40                  45

Ser Thr Ile Ser Asp Gly Gly Thr Tyr Thr Tyr Tyr Pro Asp Asn Val
    50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Ala Glu Asp Thr Ala Val Tyr Tyr Cys
                85                  90                  95

Ala Arg Glu Trp Gly Asp Tyr Asp Gly Phe Asp Tyr Trp Gly Gln Gly
            100                 105                 110

Thr Leu Val Thr Val Ser Ser
        115
```

<210> SEQ ID NO 84
<211> LENGTH: 119
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 84

Gln Val Gln Leu Val Glu Ser Gly Gly Gly Val Val Gln Pro Gly Arg
1               5                   10                  15

Ser Leu Arg Leu Ser Cys Ala Ala Ser Gly Phe Thr Phe Ser Asp Tyr
            20                  25                  30

Ala Met Ser Trp Val Arg Gln Ala Pro Gly Lys Gly Leu Glu Trp Val
        35                  40                  45

Ala Thr Ile Ser Asp Gly Gly Thr Tyr Thr Tyr Tyr Pro Asp Asn Val
    50                  55                  60

Lys Gly Arg Phe Thr Ile Ser Arg Asp Asn Ser Lys Asn Thr Leu Tyr
65                  70                  75                  80

Leu Gln Met Ser Ser Leu Arg Ala Glu Asp Thr Ala Val Tyr Tyr Cys
                85                  90                  95

Ala Arg Glu Trp Gly Asp Tyr Asp Gly Phe Asp Tyr Trp Gly Gln Gly
            100                 105                 110

Thr Leu Val Thr Val Ser Ser
        115

<210> SEQ ID NO 85
<211> LENGTH: 119
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 85

Glu Val Gln Leu Val Glu Ser Gly Gly Gly Leu Val Lys Pro Gly Gly
1               5                   10                  15

Ser Leu Arg Leu Ser Cys Ala Ala Ser Gly Phe Thr Phe Ser Asp Tyr
            20                  25                  30

Ala Met Ser Trp Val Arg Gln Ala Pro Gly Lys Gly Leu Glu Trp Val
        35                  40                  45

Ala Thr Ile Ser Asp Gly Gly Thr Tyr Thr Tyr Tyr Pro Asp Asn Val
    50                  55                  60

Lys Gly Arg Phe Thr Ile Ser Arg Asp Asn Ala Lys Asn Ser Leu Tyr
65                  70                  75                  80

Leu Gln Met Asn Ser Leu Arg Ala Glu Asp Thr Ala Val Tyr Tyr Cys
                85                  90                  95

Ala Arg Glu Trp Gly Asp Tyr Asp Gly Phe Asp Tyr Trp Gly Gln Gly
            100                 105                 110

Thr Leu Val Thr Val Ser Ser
        115

<210> SEQ ID NO 86
<211> LENGTH: 107
<212> TYPE: PRT
<213> ORGANISM: Artificial Sequence
<220> FEATURE:
<223> OTHER INFORMATION: Description of Artificial Sequence: Synthetic
      polypeptide

```
<400> SEQUENCE: 86

Asp Ile Gln Leu Thr Gln Ser Pro Ser Phe Leu Ser Ala Ser Val Gly
1               5                   10                  15

Asp Arg Val Thr Ile Thr Cys Arg Ala Ser Gln Glu Ile Ser Gly Tyr
            20                  25                  30

Leu Ser Trp Tyr Gln Gln Lys Pro Gly Lys Ala Pro Lys Leu Leu Ile
        35                  40                  45

Tyr Ala Ala Ser Thr Leu Asp Ser Gly Val Pro Ser Arg Phe Ser Gly
50                  55                  60

Ser Gly Ser Gly Thr Glu Phe Thr Leu Thr Ile Ser Ser Leu Gln Pro
65                  70                  75                  80

Glu Asp Phe Ala Thr Tyr Tyr Cys Leu Gln Tyr Asp Ser Tyr Pro Tyr
                85                  90                  95

Thr Phe Gly Gln Gly Thr Lys Leu Glu Ile Lys
            100                 105

<210> SEQ ID NO 87
<211> LENGTH: 107
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 87

Asp Ile Gln Met Thr Gln Ser Pro Ser Ser Leu Ser Ala Ser Val Gly
1               5                   10                  15

Asp Arg Val Thr Ile Thr Cys Arg Ala Ser Gln Glu Ile Ser Gly Tyr
            20                  25                  30

Leu Ser Trp Phe Gln Gln Lys Pro Gly Lys Ala Pro Lys Ser Leu Ile
        35                  40                  45

Tyr Ala Ala Ser Thr Leu Asp Ser Gly Val Pro Ser Arg Phe Ser Gly
50                  55                  60

Ser Gly Ser Gly Thr Asp Phe Thr Leu Thr Ile Ser Ser Leu Gln Pro
65                  70                  75                  80

Glu Asp Phe Ala Thr Tyr Tyr Cys Leu Gln Tyr Asp Ser Tyr Pro Tyr
                85                  90                  95

Thr Phe Gly Gln Gly Thr Lys Leu Glu Ile Lys
            100                 105

<210> SEQ ID NO 88
<211> LENGTH: 107
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 88

Asp Ile Gln Met Thr Gln Ser Pro Ser Ser Leu Ser Ala Ser Val Gly
1               5                   10                  15

Asp Arg Val Thr Ile Thr Cys Arg Ala Ser Gln Glu Ile Ser Gly Tyr
            20                  25                  30

Leu Ser Trp Tyr Gln Gln Lys Pro Gly Lys Ala Pro Lys Arg Leu Ile
        35                  40                  45

Tyr Ala Ala Ser Thr Leu Asp Ser Gly Val Pro Ser Arg Phe Ser Gly
50                  55                  60

Ser Gly Ser Gly Thr Glu Phe Thr Leu Thr Ile Ser Ser Leu Gln Pro
```

```
                65                  70                  75                  80
Glu Asp Phe Ala Thr Tyr Tyr Cys Leu Gln Tyr Asp Ser Tyr Pro Tyr
                    85                  90                  95

Thr Phe Gly Gln Gly Thr Lys Leu Glu Ile Lys
                100                 105
```

<210> SEQ ID NO 89
<211> LENGTH: 107
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 89

```
Asp Ile Gln Met Thr Gln Ser Pro Ser Ser Leu Ser Ala Ser Val Gly
1               5                   10                  15

Asp Arg Val Thr Ile Thr Cys Arg Ala Ser Gln Glu Ile Ser Gly Tyr
                20                  25                  30

Leu Ser Trp Tyr Gln Gln Lys Pro Gly Lys Ala Pro Lys Leu Leu Ile
            35                  40                  45

Tyr Ala Ala Ser Thr Leu Asp Ser Gly Val Pro Ser Arg Phe Ser Gly
    50                  55                  60

Ser Gly Ser Gly Thr Asp Phe Thr Phe Thr Ile Ser Ser Leu Gln Pro
65                  70                  75                  80

Glu Asp Ile Ala Thr Tyr Tyr Cys Leu Gln Tyr Asp Ser Tyr Pro Tyr
                85                  90                  95

Thr Phe Gly Gln Gly Thr Lys Leu Glu Ile Lys
                100                 105
```

<210> SEQ ID NO 90
<211> LENGTH: 107
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 90

```
Asp Ile Gln Met Thr Gln Ser Pro Ser Ser Leu Ser Ala Ser Val Gly
1               5                   10                  15

Asp Arg Val Thr Ile Thr Cys Arg Ala Ser Gln Glu Ile Ser Gly Tyr
                20                  25                  30

Leu Ser Trp Tyr Gln Gln Lys Pro Gly Lys Ala Pro Lys Leu Leu Ile
            35                  40                  45

Tyr Ala Ala Ser Thr Leu Asp Ser Gly Val Pro Ser Arg Phe Ser Gly
    50                  55                  60

Ser Gly Ser Gly Thr Asp Phe Thr Leu Thr Ile Ser Ser Leu Gln Pro
65                  70                  75                  80

Glu Asp Phe Ala Thr Tyr Tyr Cys Leu Gln Tyr Asp Ser Tyr Pro Tyr
                85                  90                  95

Thr Phe Gly Gln Gly Thr Lys Leu Glu Ile Lys
                100                 105
```

<210> SEQ ID NO 91
<211> LENGTH: 107
<212> TYPE: PRT
<213> ORGANISM: Artificial Sequence
<220> FEATURE:
<223> OTHER INFORMATION: Description of Artificial Sequence: Synthetic polypeptide

<400> SEQUENCE: 91

```
Asp Ile Gln Met Thr Gln Ser Pro Ser Ser Leu Ser Ala Ser Val Gly
1               5                   10                  15

Asp Arg Val Thr Ile Thr Cys Arg Ala Ser Gln Glu Ile Ser Gly Tyr
            20                  25                  30

Leu Ser Trp Leu Gln Gln Lys Pro Gly Gly Ala Ile Lys Arg Leu Ile
        35                  40                  45

Tyr Ala Ala Ser Thr Leu Asp Ser Gly Val Pro Ser Arg Phe Ser Gly
50                  55                  60

Ser Gly Ser Gly Ser Asp Tyr Thr Leu Thr Ile Ser Ser Leu Gln Pro
65                  70                  75                  80

Glu Asp Phe Ala Thr Tyr Tyr Cys Leu Gln Tyr Asp Ser Tyr Pro Tyr
                85                  90                  95

Thr Phe Gly Gln Gly Thr Lys Leu Glu Ile Lys
            100                 105
```

<210> SEQ ID NO 92
<211> LENGTH: 468
<212> TYPE: PRT
<213> ORGANISM: Artificial Sequence
<220> FEATURE:
<223> OTHER INFORMATION: Description of Artificial Sequence: Synthetic polypeptide

<400> SEQUENCE: 92

```
Met Asn Phe Gly Leu Ser Leu Met Phe Leu Val Leu Val Leu Lys Gly
1               5                   10                  15

Val Gln Cys Glu Val Gln Leu Val Glu Ser Gly Gly Gly Leu Val Lys
            20                  25                  30

Pro Gly Gly Ser Leu Lys Leu Ser Cys Ala Ala Ser Gly Phe Thr Phe
        35                  40                  45

Ser Asp Tyr Ala Met Ser Trp Val Arg Gln Thr Pro Glu Lys Arg Leu
50                  55                  60

Glu Trp Val Ala Thr Ile Ser Asp Gly Gly Thr Tyr Thr Tyr Tyr Pro
65                  70                  75                  80

Asp Asn Val Lys Gly Arg Phe Thr Ile Ser Arg Asp Asn Ala Lys Asn
                85                  90                  95

Asn Leu Tyr Leu Gln Met Ser His Leu Lys Ser Glu Asp Thr Ala Met
            100                 105                 110

Tyr Tyr Cys Ala Arg Glu Trp Gly Asp Tyr Asp Gly Phe Asp Tyr Trp
        115                 120                 125

Gly Gln Gly Thr Thr Leu Thr Val Ser Ser Ala Ser Thr Lys Gly Pro
130                 135                 140

Ser Val Phe Pro Leu Ala Pro Ser Ser Lys Ser Thr Ser Gly Gly Thr
145                 150                 155                 160

Ala Ala Leu Gly Cys Leu Val Lys Asp Tyr Phe Pro Glu Pro Val Thr
                165                 170                 175

Val Ser Trp Asn Ser Gly Ala Leu Thr Ser Gly Val His Thr Phe Pro
            180                 185                 190

Ala Val Leu Gln Ser Ser Gly Leu Tyr Ser Leu Ser Ser Val Val Thr
        195                 200                 205

Val Pro Ser Ser Ser Leu Gly Thr Gln Thr Tyr Ile Cys Asn Val Asn
210                 215                 220

His Lys Pro Ser Asn Thr Lys Val Asp Lys Arg Val Glu Pro Lys Ser
```

```
            225                 230                 235                 240

Cys Asp Lys Thr His Thr Cys Pro Pro Cys Pro Ala Pro Glu Leu Leu
                245                 250                 255

Gly Gly Pro Ser Val Phe Leu Phe Pro Pro Lys Pro Lys Asp Thr Leu
                260                 265                 270

Met Ile Ser Arg Thr Pro Glu Val Thr Cys Val Val Val Asp Val Ser
                275                 280                 285

His Glu Asp Pro Glu Val Lys Phe Asn Trp Tyr Val Asp Gly Val Glu
            290                 295                 300

Val His Asn Ala Lys Thr Lys Pro Arg Glu Glu Gln Tyr Asn Ser Thr
305                 310                 315                 320

Tyr Arg Val Val Ser Val Leu Thr Val Leu His Gln Asp Trp Leu Asn
                325                 330                 335

Gly Lys Glu Tyr Lys Cys Lys Val Ser Asn Lys Ala Leu Pro Ala Pro
                340                 345                 350

Ile Glu Lys Thr Ile Ser Lys Ala Lys Gly Gln Pro Arg Glu Pro Gln
                355                 360                 365

Val Tyr Thr Leu Pro Pro Ser Arg Glu Glu Met Thr Lys Asn Gln Val
            370                 375                 380

Ser Leu Thr Cys Leu Val Lys Gly Phe Tyr Pro Ser Asp Ile Ala Val
385                 390                 395                 400

Glu Trp Glu Ser Asn Gly Gln Pro Glu Asn Asn Tyr Lys Thr Thr Pro
                405                 410                 415

Pro Val Leu Asp Ser Asp Gly Ser Phe Phe Leu Tyr Ser Lys Leu Thr
                420                 425                 430

Val Asp Lys Ser Arg Trp Gln Gln Gly Asn Val Phe Ser Cys Ser Val
                435                 440                 445

Met His Glu Ala Leu His Asn His Tyr Thr Gln Lys Ser Leu Ser Leu
            450                 455                 460

Ser Pro Gly Lys
465

<210> SEQ ID NO 93
<211> LENGTH: 236
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 93

Met Asp Met Arg Val Pro Ala His Val Phe Gly Phe Leu Leu Leu Trp
1               5                   10                  15

Phe Pro Gly Thr Arg Cys Asp Ile Gln Met Thr Gln Ser Pro Ser Ser
                20                  25                  30

Leu Ser Ala Ser Leu Gly Glu Arg Val Ser Leu Thr Cys Arg Ala Ser
            35                  40                  45

Gln Glu Ile Ser Gly Tyr Leu Ser Trp Leu Gln Gln Lys Pro Asp Gly
        50                  55                  60

Thr Ile Lys Arg Leu Ile Tyr Ala Ala Ser Thr Leu Asp Ser Gly Val
65                  70                  75                  80

Pro Lys Arg Phe Ser Gly Ser Arg Ser Gly Ser Asp Tyr Ser Leu Thr
                85                  90                  95

Ile Gly Ser Leu Glu Ser Glu Asp Leu Ala Asp Tyr Tyr Cys Leu Gln
                100                 105                 110
```

```
Tyr Asp Ser Tyr Pro Tyr Thr Phe Gly Gly Thr Lys Leu Glu Ile
            115                 120                 125

Lys Arg Thr Val Ala Ala Pro Ser Val Phe Ile Phe Pro Pro Ser Asp
130                 135                 140

Glu Gln Leu Lys Ser Gly Thr Ala Ser Val Val Cys Leu Leu Asn Asn
145                 150                 155                 160

Phe Tyr Pro Arg Glu Ala Lys Val Gln Trp Lys Val Asp Asn Ala Leu
                165                 170                 175

Gln Ser Gly Asn Ser Gln Glu Ser Val Thr Glu Gln Asp Ser Lys Asp
            180                 185                 190

Ser Thr Tyr Ser Leu Ser Ser Thr Leu Thr Leu Ser Lys Ala Asp Tyr
        195                 200                 205

Glu Lys His Lys Val Tyr Ala Cys Glu Val Thr His Gln Gly Leu Ser
    210                 215                 220

Ser Pro Val Thr Lys Ser Phe Asn Arg Gly Glu Cys
225                 230                 235

<210> SEQ ID NO 94
<211> LENGTH: 471
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 94

Met Asp Met Arg Val Pro Ala Gln Leu Leu Gly Leu Leu Leu Leu Trp
1               5                   10                  15

Leu Arg Gly Ala Arg Cys Gln Val Gln Leu Val Glu Ser Gly Gly Gly
                20                  25                  30

Leu Val Lys Pro Gly Gly Ser Leu Arg Leu Ser Cys Ala Ala Ser Gly
            35                  40                  45

Phe Thr Phe Ser Asp Tyr Ala Met Ser Trp Ile Arg Gln Ala Pro Gly
        50                  55                  60

Lys Gly Leu Glu Trp Val Ser Thr Ile Ser Asp Gly Gly Thr Tyr Thr
65                  70                  75                  80

Tyr Tyr Pro Asp Ser Val Lys Gly Arg Phe Thr Ile Ser Arg Asp Asn
                85                  90                  95

Ala Lys Asn Ser Leu Tyr Leu Gln Met Asn Ser Leu Arg Ala Glu Asp
            100                 105                 110

Thr Ala Val Tyr Tyr Cys Ala Arg Glu Trp Gly Asp Tyr Asp Gly Phe
        115                 120                 125

Asp Tyr Trp Gly Gln Gly Thr Leu Val Thr Val Ser Ser Ala Ser Thr
    130                 135                 140

Lys Gly Pro Ser Val Phe Pro Leu Ala Pro Ser Ser Lys Ser Thr Ser
145                 150                 155                 160

Gly Gly Thr Ala Ala Leu Gly Cys Leu Val Lys Asp Tyr Phe Pro Glu
                165                 170                 175

Pro Val Thr Val Ser Trp Asn Ser Gly Ala Leu Thr Ser Gly Val His
            180                 185                 190

Thr Phe Pro Ala Val Leu Gln Ser Ser Gly Leu Tyr Ser Leu Ser Ser
        195                 200                 205

Val Val Thr Val Pro Ser Ser Ser Leu Gly Thr Gln Thr Tyr Ile Cys
    210                 215                 220

Asn Val Asn His Lys Pro Ser Asn Thr Lys Val Asp Lys Arg Val Glu
225                 230                 235                 240
```

```
Pro Lys Ser Cys Asp Lys Thr His Thr Cys Pro Pro Cys Pro Ala Pro
            245                 250                 255

Glu Leu Leu Gly Gly Pro Ser Val Phe Leu Phe Pro Pro Lys Pro Lys
        260                 265                 270

Asp Thr Leu Met Ile Ser Arg Thr Pro Glu Val Thr Cys Val Val Val
        275                 280                 285

Asp Val Ser His Glu Asp Pro Glu Val Lys Phe Asn Trp Tyr Val Asp
        290                 295                 300

Gly Val Glu Val His Asn Ala Lys Thr Lys Pro Arg Glu Glu Gln Tyr
305                 310                 315                 320

Asn Ser Thr Tyr Arg Val Val Ser Val Leu Thr Val Leu His Gln Asp
                325                 330                 335

Trp Leu Asn Gly Lys Glu Tyr Lys Cys Lys Val Ser Asn Lys Ala Leu
            340                 345                 350

Pro Ala Pro Ile Glu Lys Thr Ile Ser Lys Ala Lys Gly Gln Pro Arg
        355                 360                 365

Glu Pro Gln Val Tyr Thr Leu Pro Pro Ser Arg Glu Glu Met Thr Lys
    370                 375                 380

Asn Gln Val Ser Leu Thr Cys Leu Val Lys Gly Phe Tyr Pro Ser Asp
385                 390                 395                 400

Ile Ala Val Glu Trp Glu Ser Asn Gly Gln Pro Glu Asn Asn Tyr Lys
                405                 410                 415

Thr Thr Pro Pro Val Leu Asp Ser Asp Gly Ser Phe Phe Leu Tyr Ser
            420                 425                 430

Lys Leu Thr Val Asp Lys Ser Arg Trp Gln Gln Gly Asn Val Phe Ser
        435                 440                 445

Cys Ser Val Met His Glu Ala Leu His Asn His Tyr Thr Gln Lys Ser
    450                 455                 460

Leu Ser Leu Ser Pro Gly Lys
465                 470

<210> SEQ ID NO 95
<211> LENGTH: 467
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 95

Met Asp Met Arg Val Pro Ala Gln Leu Leu Gly Leu Leu Leu Leu Trp
1               5                   10                  15

Leu Arg Gly Ala Arg Cys Gln Val Gln Leu Val Glu Ser Gly Gly Gly
            20                  25                  30

Leu Val Lys Pro Gly Gly Ser Leu Arg Leu Ser Cys Ala Ala Ser Gly
        35                  40                  45

Phe Thr Phe Ser Asp Tyr Ala Met Ser Trp Ile Arg Gln Ala Pro Gly
    50                  55                  60

Lys Gly Leu Glu Trp Val Ser Thr Ile Ser Asp Gly Gly Thr Tyr Thr
65                  70                  75                  80

Tyr Tyr Pro Asp Ser Val Lys Gly Arg Phe Thr Ile Ser Arg Asp Asn
                85                  90                  95

Ala Lys Asn Ser Leu Tyr Leu Gln Met Asn Ser Leu Arg Ala Glu Asp
            100                 105                 110

Thr Ala Val Tyr Tyr Cys Ala Arg Glu Trp Gly Asp Tyr Asp Gly Phe
```

```
                    115                 120                 125
Asp Tyr Trp Gly Gln Gly Thr Leu Val Thr Val Ser Ser Ala Ser Thr
    130                 135                 140

Lys Gly Pro Ser Val Phe Pro Leu Ala Pro Cys Ser Arg Ser Thr Ser
145                 150                 155                 160

Glu Ser Thr Ala Ala Leu Gly Cys Leu Val Lys Asp Tyr Phe Pro Glu
                165                 170                 175

Pro Val Thr Val Ser Trp Asn Ser Gly Ala Leu Thr Ser Gly Val His
            180                 185                 190

Thr Phe Pro Ala Val Leu Gln Ser Ser Gly Leu Tyr Ser Leu Ser Ser
        195                 200                 205

Val Val Thr Val Pro Ser Ser Asn Phe Gly Thr Gln Thr Tyr Thr Cys
    210                 215                 220

Asn Val Asp His Lys Pro Ser Asn Thr Lys Val Asp Lys Thr Val Glu
225                 230                 235                 240

Arg Lys Cys Cys Val Glu Cys Pro Pro Cys Pro Ala Pro Pro Val Ala
                245                 250                 255

Gly Pro Ser Val Phe Leu Phe Pro Pro Lys Pro Lys Asp Thr Leu Met
            260                 265                 270

Ile Ser Arg Thr Pro Glu Val Thr Cys Val Val Val Asp Val Ser His
        275                 280                 285

Glu Asp Pro Glu Val Gln Phe Asn Trp Tyr Val Asp Gly Val Glu Val
    290                 295                 300

His Asn Ala Lys Thr Lys Pro Arg Glu Glu Gln Phe Asn Ser Thr Phe
305                 310                 315                 320

Arg Val Val Ser Val Leu Thr Val Val His Gln Asp Trp Leu Asn Gly
                325                 330                 335

Lys Glu Tyr Lys Cys Lys Val Ser Asn Lys Gly Leu Pro Ala Pro Ile
            340                 345                 350

Glu Lys Thr Ile Ser Lys Thr Lys Gly Gln Pro Arg Glu Pro Gln Val
        355                 360                 365

Tyr Thr Leu Pro Pro Ser Arg Glu Glu Met Thr Lys Asn Gln Val Ser
    370                 375                 380

Leu Thr Cys Leu Val Lys Gly Phe Tyr Pro Ser Asp Ile Ala Val Glu
385                 390                 395                 400

Trp Glu Ser Asn Gly Gln Pro Glu Asn Asn Tyr Lys Thr Thr Pro Pro
                405                 410                 415

Met Leu Asp Ser Asp Gly Ser Phe Phe Leu Tyr Ser Lys Leu Thr Val
            420                 425                 430

Asp Lys Ser Arg Trp Gln Gln Gly Asn Val Phe Ser Cys Ser Val Met
        435                 440                 445

His Glu Ala Leu His Asn His Tyr Thr Gln Lys Ser Leu Ser Leu Ser
    450                 455                 460

Pro Gly Lys
465

<210> SEQ ID NO 96
<211> LENGTH: 236
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 96
```

```
Met Asp Met Arg Val Pro Ala Gln Leu Leu Gly Leu Leu Leu Leu Trp
1               5                   10                  15

Leu Arg Gly Ala Arg Cys Asp Ile Gln Met Thr Gln Ser Pro Ser Ser
                20                  25                  30

Leu Ser Ala Ser Val Gly Asp Arg Val Thr Ile Thr Cys Arg Ala Ser
            35                  40                  45

Gln Glu Ile Ser Gly Tyr Leu Ser Trp Phe Gln Gln Lys Pro Gly Lys
        50                  55                  60

Ala Pro Lys Ser Leu Ile Tyr Ala Ala Ser Thr Leu Asp Ser Gly Val
65                  70                  75                  80

Pro Ser Arg Phe Ser Gly Ser Gly Ser Gly Thr Asp Phe Thr Leu Thr
                85                  90                  95

Ile Ser Ser Leu Gln Pro Glu Asp Phe Ala Thr Tyr Tyr Cys Leu Gln
            100                 105                 110

Tyr Asp Ser Tyr Pro Tyr Thr Phe Gly Gln Gly Thr Lys Leu Glu Ile
        115                 120                 125

Lys Arg Thr Val Ala Ala Pro Ser Val Phe Ile Phe Pro Pro Ser Asp
    130                 135                 140

Glu Gln Leu Lys Ser Gly Thr Ala Ser Val Val Cys Leu Leu Asn Asn
145                 150                 155                 160

Phe Tyr Pro Arg Glu Ala Lys Val Gln Trp Lys Val Asp Asn Ala Leu
                165                 170                 175

Gln Ser Gly Asn Ser Gln Glu Ser Val Thr Glu Gln Asp Ser Lys Asp
            180                 185                 190

Ser Thr Tyr Ser Leu Ser Ser Thr Leu Thr Leu Ser Lys Ala Asp Tyr
        195                 200                 205

Glu Lys His Lys Val Tyr Ala Cys Glu Val Thr His Gln Gly Leu Ser
    210                 215                 220

Ser Pro Val Thr Lys Ser Phe Asn Arg Gly Glu Cys
225                 230                 235

<210> SEQ ID NO 97
<211> LENGTH: 236
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 97

Met Asp Met Arg Val Pro Ala Gln Leu Leu Gly Leu Leu Leu Leu Trp
1               5                   10                  15

Leu Arg Gly Ala Arg Cys Asp Ile Gln Met Thr Gln Ser Pro Ser Ser
                20                  25                  30

Leu Ser Ala Ser Val Gly Asp Arg Val Thr Ile Thr Cys Arg Ala Ser
            35                  40                  45

Gln Glu Ile Ser Gly Tyr Leu Ser Trp Tyr Gln Gln Lys Pro Gly Lys
        50                  55                  60

Ala Pro Lys Arg Leu Ile Tyr Ala Ala Ser Thr Leu Asp Ser Gly Val
65                  70                  75                  80

Pro Ser Arg Phe Ser Gly Ser Gly Ser Gly Thr Glu Phe Thr Leu Thr
                85                  90                  95

Ile Ser Ser Leu Gln Pro Glu Asp Phe Ala Thr Tyr Tyr Cys Leu Gln
            100                 105                 110

Tyr Asp Ser Tyr Pro Tyr Thr Phe Gly Gln Gly Thr Lys Leu Glu Ile
        115                 120                 125
```

-continued

Lys Arg Thr Val Ala Ala Pro Ser Val Phe Ile Phe Pro Pro Ser Asp
130 135 140

Glu Gln Leu Lys Ser Gly Thr Ala Ser Val Val Cys Leu Leu Asn Asn
145 150 155 160

Phe Tyr Pro Arg Glu Ala Lys Val Gln Trp Lys Val Asp Asn Ala Leu
165 170 175

Gln Ser Gly Asn Ser Gln Glu Ser Val Thr Glu Gln Asp Ser Lys Asp
180 185 190

Ser Thr Tyr Ser Leu Ser Ser Thr Leu Thr Leu Ser Lys Ala Asp Tyr
195 200 205

Glu Lys His Lys Val Tyr Ala Cys Glu Val Thr His Gln Gly Leu Ser
210 215 220

Ser Pro Val Thr Lys Ser Phe Asn Arg Gly Glu Cys
225 230 235

<210> SEQ ID NO 98
<211> LENGTH: 449
<212> TYPE: PRT
<213> ORGANISM: Artificial Sequence
<220> FEATURE:
<223> OTHER INFORMATION: Antibody heavy chain no leader sequence

<400> SEQUENCE: 98

Gln Val Gln Leu Val Glu Ser Gly Gly Gly Leu Val Lys Pro Gly Gly
1 5 10 15

Ser Leu Arg Leu Ser Cys Ala Ala Ser Gly Phe Thr Phe Ser Asp Tyr
20 25 30

Ala Met Ser Trp Ile Arg Gln Ala Pro Gly Lys Gly Leu Glu Trp Val
35 40 45

Ser Thr Ile Ser Asp Gly Gly Thr Tyr Thr Tyr Tyr Pro Asp Ser Val
50 55 60

Lys Gly Arg Phe Thr Ile Ser Arg Asp Asn Ala Lys Asn Ser Leu Tyr
65 70 75 80

Leu Gln Met Asn Ser Leu Arg Ala Glu Asp Thr Ala Val Tyr Tyr Cys
85 90 95

Ala Arg Glu Trp Gly Asp Tyr Asp Gly Phe Asp Tyr Trp Gly Gln Gly
100 105 110

Thr Leu Val Thr Val Ser Ser Ala Ser Thr Lys Gly Pro Ser Val Phe
115 120 125

Pro Leu Ala Pro Ser Ser Lys Ser Thr Ser Gly Gly Thr Ala Ala Leu
130 135 140

Gly Cys Leu Val Lys Asp Tyr Phe Pro Glu Pro Val Thr Val Ser Trp
145 150 155 160

Asn Ser Gly Ala Leu Thr Ser Gly Val His Thr Phe Pro Ala Val Leu
165 170 175

Gln Ser Ser Gly Leu Tyr Ser Leu Ser Ser Val Val Thr Val Pro Ser
180 185 190

Ser Ser Leu Gly Thr Gln Thr Tyr Ile Cys Asn Val Asn His Lys Pro
195 200 205

Ser Asn Thr Lys Val Asp Lys Arg Val Glu Pro Lys Ser Cys Asp Lys
210 215 220

Thr His Thr Cys Pro Pro Cys Pro Ala Pro Glu Leu Leu Gly Gly Pro
225 230 235 240

Ser Val Phe Leu Phe Pro Pro Lys Pro Lys Asp Thr Leu Met Ile Ser
245 250 255

```
Arg Thr Pro Glu Val Thr Cys Val Val Val Asp Val Ser His Glu Asp
            260                 265                 270

Pro Glu Val Lys Phe Asn Trp Tyr Val Asp Gly Val Glu Val His Asn
            275                 280                 285

Ala Lys Thr Lys Pro Arg Glu Glu Gln Tyr Asn Ser Thr Tyr Arg Val
            290                 295                 300

Val Ser Val Leu Thr Val Leu His Gln Asp Trp Leu Asn Gly Lys Glu
305                 310                 315                 320

Tyr Lys Cys Lys Val Ser Asn Lys Ala Leu Pro Ala Pro Ile Glu Lys
            325                 330                 335

Thr Ile Ser Lys Ala Lys Gly Gln Pro Arg Glu Pro Gln Val Tyr Thr
            340                 345                 350

Leu Pro Pro Ser Arg Glu Glu Met Thr Lys Asn Gln Val Ser Leu Thr
            355                 360                 365

Cys Leu Val Lys Gly Phe Tyr Pro Ser Asp Ile Ala Val Glu Trp Glu
            370                 375                 380

Ser Asn Gly Gln Pro Glu Asn Asn Tyr Lys Thr Thr Pro Pro Val Leu
385                 390                 395                 400

Asp Ser Asp Gly Ser Phe Phe Leu Tyr Ser Lys Leu Thr Val Asp Lys
            405                 410                 415

Ser Arg Trp Gln Gln Gly Asn Val Phe Ser Cys Ser Val Met His Glu
            420                 425                 430

Ala Leu His Asn His Tyr Thr Gln Lys Ser Leu Ser Leu Ser Pro Gly
            435                 440                 445

Lys

<210> SEQ ID NO 99
<211> LENGTH: 445
<212> TYPE: PRT
<213> ORGANISM: Artificial Sequence
<220> FEATURE:
<223> OTHER INFORMATION: Antibody heavy chain no leader sequence

<400> SEQUENCE: 99

Gln Val Gln Leu Val Glu Ser Gly Gly Gly Leu Val Lys Pro Gly Gly
1               5                   10                  15

Ser Leu Arg Leu Ser Cys Ala Ala Ser Gly Phe Thr Phe Ser Asp Tyr
            20                  25                  30

Ala Met Ser Trp Ile Arg Gln Ala Pro Gly Lys Gly Leu Glu Trp Val
            35                  40                  45

Ser Thr Ile Ser Asp Gly Gly Thr Tyr Thr Tyr Tyr Pro Asp Ser Val
50                  55                  60

Lys Gly Arg Phe Thr Ile Ser Arg Asp Asn Ala Lys Asn Ser Leu Tyr
65                  70                  75                  80

Leu Gln Met Asn Ser Leu Arg Ala Glu Asp Thr Ala Val Tyr Tyr Cys
            85                  90                  95

Ala Arg Glu Trp Gly Asp Tyr Asp Gly Phe Asp Tyr Trp Gly Gln Gly
            100                 105                 110

Thr Leu Val Thr Val Ser Ser Ala Ser Thr Lys Gly Pro Ser Val Phe
            115                 120                 125

Pro Leu Ala Pro Cys Ser Arg Ser Thr Ser Glu Ser Thr Ala Ala Leu
            130                 135                 140

Gly Cys Leu Val Lys Asp Tyr Phe Pro Glu Pro Val Thr Val Ser Trp
145                 150                 155                 160
```

```
Asn Ser Gly Ala Leu Thr Ser Gly Val His Thr Phe Pro Ala Val Leu
                165                 170                 175
Gln Ser Ser Gly Leu Tyr Ser Leu Ser Ser Val Val Thr Val Pro Ser
            180                 185                 190
Ser Asn Phe Gly Thr Gln Thr Tyr Thr Cys Asn Val Asp His Lys Pro
        195                 200                 205
Ser Asn Thr Lys Val Asp Lys Thr Val Glu Arg Lys Cys Cys Val Glu
    210                 215                 220
Cys Pro Pro Cys Pro Ala Pro Pro Val Ala Gly Pro Ser Val Phe Leu
225                 230                 235                 240
Phe Pro Pro Lys Pro Lys Asp Thr Leu Met Ile Ser Arg Thr Pro Glu
                245                 250                 255
Val Thr Cys Val Val Val Asp Val Ser His Glu Asp Pro Glu Val Gln
            260                 265                 270
Phe Asn Trp Tyr Val Asp Gly Val Glu Val His Asn Ala Lys Thr Lys
        275                 280                 285
Pro Arg Glu Glu Gln Phe Asn Ser Thr Phe Arg Val Val Ser Val Leu
    290                 295                 300
Thr Val Val His Gln Asp Trp Leu Asn Gly Lys Glu Tyr Lys Cys Lys
305                 310                 315                 320
Val Ser Asn Lys Gly Leu Pro Ala Pro Ile Glu Lys Thr Ile Ser Lys
                325                 330                 335
Thr Lys Gly Gln Pro Arg Glu Pro Gln Val Tyr Thr Leu Pro Pro Ser
            340                 345                 350
Arg Glu Glu Met Thr Lys Asn Gln Val Ser Leu Thr Cys Leu Val Lys
        355                 360                 365
Gly Phe Tyr Pro Ser Asp Ile Ala Val Glu Trp Glu Ser Asn Gly Gln
    370                 375                 380
Pro Glu Asn Asn Tyr Lys Thr Thr Pro Pro Met Leu Asp Ser Asp Gly
385                 390                 395                 400
Ser Phe Phe Leu Tyr Ser Lys Leu Thr Val Asp Lys Ser Arg Trp Gln
                405                 410                 415
Gln Gly Asn Val Phe Ser Cys Ser Val Met His Glu Ala Leu His Asn
            420                 425                 430
His Tyr Thr Gln Lys Ser Leu Ser Leu Ser Pro Gly Lys
        435                 440                 445

<210> SEQ ID NO 100
<211> LENGTH: 214
<212> TYPE: PRT
<213> ORGANISM: Artificial Sequence
<220> FEATURE:
<223> OTHER INFORMATION: Antibody light chain no leader sequence

<400> SEQUENCE: 100

Asp Ile Gln Met Thr Gln Ser Pro Ser Ser Leu Ser Ala Ser Val Gly
1               5                   10                  15
Asp Arg Val Thr Ile Thr Cys Arg Ala Ser Gln Glu Ile Ser Gly Tyr
            20                  25                  30
Leu Ser Trp Phe Gln Gln Lys Pro Gly Lys Ala Pro Lys Ser Leu Ile
        35                  40                  45
Tyr Ala Ala Ser Thr Leu Asp Ser Gly Val Pro Ser Arg Phe Ser Gly
    50                  55                  60
Ser Gly Ser Gly Thr Asp Phe Thr Leu Thr Ile Ser Ser Leu Gln Pro
65                  70                  75                  80
```

```
Glu Asp Phe Ala Thr Tyr Tyr Cys Leu Gln Tyr Asp Ser Tyr Pro Tyr
                85                  90                  95

Thr Phe Gly Gln Gly Thr Lys Leu Glu Ile Lys Arg Thr Val Ala Ala
            100                 105                 110

Pro Ser Val Phe Ile Phe Pro Pro Ser Asp Glu Gln Leu Lys Ser Gly
            115                 120                 125

Thr Ala Ser Val Val Cys Leu Leu Asn Asn Phe Tyr Pro Arg Glu Ala
            130                 135                 140

Lys Val Gln Trp Lys Val Asp Asn Ala Leu Gln Ser Gly Asn Ser Gln
145                 150                 155                 160

Glu Ser Val Thr Glu Gln Asp Ser Lys Asp Ser Thr Tyr Ser Leu Ser
            165                 170                 175

Ser Thr Leu Thr Leu Ser Lys Ala Asp Tyr Glu Lys His Lys Val Tyr
            180                 185                 190

Ala Cys Glu Val Thr His Gln Gly Leu Ser Ser Pro Val Thr Lys Ser
            195                 200                 205

Phe Asn Arg Gly Glu Cys
    210

<210> SEQ ID NO 101
<211> LENGTH: 214
<212> TYPE: PRT
<213> ORGANISM: Artificial Sequence
<220> FEATURE:
<223> OTHER INFORMATION: Antibody light chain no leader sequence

<400> SEQUENCE: 101

Asp Ile Gln Met Thr Gln Ser Pro Ser Ser Leu Ser Ala Ser Val Gly
1               5                   10                  15

Asp Arg Val Thr Ile Thr Cys Arg Ala Ser Gln Glu Ile Ser Gly Tyr
            20                  25                  30

Leu Ser Trp Tyr Gln Gln Lys Pro Gly Lys Ala Pro Lys Arg Leu Ile
            35                  40                  45

Tyr Ala Ala Ser Thr Leu Asp Ser Gly Val Pro Ser Arg Phe Ser Gly
    50                  55                  60

Ser Gly Ser Gly Thr Glu Phe Thr Leu Thr Ile Ser Ser Leu Gln Pro
65                  70                  75                  80

Glu Asp Phe Ala Thr Tyr Tyr Cys Leu Gln Tyr Asp Ser Tyr Pro Tyr
                85                  90                  95

Thr Phe Gly Gln Gly Thr Lys Leu Glu Ile Lys Arg Thr Val Ala Ala
            100                 105                 110

Pro Ser Val Phe Ile Phe Pro Pro Ser Asp Glu Gln Leu Lys Ser Gly
            115                 120                 125

Thr Ala Ser Val Val Cys Leu Leu Asn Asn Phe Tyr Pro Arg Glu Ala
            130                 135                 140

Lys Val Gln Trp Lys Val Asp Asn Ala Leu Gln Ser Gly Asn Ser Gln
145                 150                 155                 160

Glu Ser Val Thr Glu Gln Asp Ser Lys Asp Ser Thr Tyr Ser Leu Ser
            165                 170                 175

Ser Thr Leu Thr Leu Ser Lys Ala Asp Tyr Glu Lys His Lys Val Tyr
            180                 185                 190

Ala Cys Glu Val Thr His Gln Gly Leu Ser Ser Pro Val Thr Lys Ser
            195                 200                 205

Phe Asn Arg Gly Glu Cys
    210
```

```
<210> SEQ ID NO 102
<211> LENGTH: 450
<212> TYPE: PRT
<213> ORGANISM: Artificial Sequence
<220> FEATURE:
<223> OTHER INFORMATION: Antibody heavy chain

<400> SEQUENCE: 102
```

| | | | | | | | | | | | | | | |
|---|---|---|---|---|---|---|---|---|---|---|---|---|---|---|
| Glu | Val | Gln | Leu | Val | Glu | Ser | Gly | Gly | Gly | Leu | Val | Gln | Pro | Gly |
| 1 | | | | 5 | | | | | 10 | | | | | 15 |
| Gly | | | | | | | | | | | | | | |
| Ser | Leu | Arg | Leu | Ser | Cys | Ala | Ala | Ser | Gly | Phe | Asn | Ile | Lys | Asp |
| | | 20 | | | | | 25 | | | | | 30 | | |
| Thr | | | | | | | | | | | | | | |
| Tyr | Ile | His | Trp | Val | Arg | Gln | Ala | Pro | Gly | Lys | Gly | Leu | Glu | Trp |
| | | 35 | | | | | 40 | | | | | 45 | | |
| Val | | | | | | | | | | | | | | |
| Ala | Arg | Ile | Tyr | Pro | Thr | Asn | Gly | Tyr | Thr | Arg | Tyr | Ala | Asp | Ser |
| 50 | | | | | 55 | | | | | 60 | | | | |
| Val | | | | | | | | | | | | | | |
| Lys | Gly | Arg | Phe | Thr | Ile | Ser | Ala | Asp | Thr | Ser | Lys | Asn | Thr | Ala |
| 65 | | | | 70 | | | | | 75 | | | | | 80 |
| Tyr | | | | | | | | | | | | | | |
| Leu | Gln | Met | Asn | Ser | Leu | Arg | Ala | Glu | Asp | Thr | Ala | Val | Tyr | Tyr |
| | | | | 85 | | | | | 90 | | | | | 95 |
| Cys | | | | | | | | | | | | | | |
| Ser | Arg | Trp | Gly | Gly | Asp | Gly | Phe | Tyr | Ala | Met | Asp | Tyr | Trp | Gly |
| | | | 100 | | | | | 105 | | | | | 110 | |
| Gln | | | | | | | | | | | | | | |
| Gly | Thr | Leu | Val | Thr | Val | Ser | Ser | Ala | Ser | Thr | Lys | Gly | Pro | Ser |
| | | 115 | | | | | 120 | | | | | 125 | | |
| Val | | | | | | | | | | | | | | |
| Phe | Pro | Leu | Ala | Pro | Ser | Ser | Lys | Ser | Thr | Ser | Gly | Gly | Thr | Ala |
| 130 | | | | | 135 | | | | | 140 | | | | |
| Ala | | | | | | | | | | | | | | |
| Leu | Gly | Cys | Leu | Val | Lys | Asp | Tyr | Phe | Pro | Glu | Pro | Val | Thr | Val |
| 145 | | | | | 150 | | | | | 155 | | | | 160 |
| Ser | | | | | | | | | | | | | | |
| Trp | Asn | Ser | Gly | Ala | Leu | Thr | Ser | Gly | Val | His | Thr | Phe | Pro | Ala |
| | | | | 165 | | | | | 170 | | | | | 175 |
| Val | | | | | | | | | | | | | | |
| Leu | Gln | Ser | Ser | Gly | Leu | Tyr | Ser | Leu | Ser | Ser | Val | Val | Thr | Val |
| | | | 180 | | | | | 185 | | | | | 190 | |
| Pro | | | | | | | | | | | | | | |
| Ser | Ser | Ser | Leu | Gly | Thr | Gln | Thr | Tyr | Ile | Cys | Asn | Val | Asn | His |
| | | 195 | | | | | 200 | | | | | 205 | | |
| Lys | | | | | | | | | | | | | | |
| Pro | Ser | Asn | Thr | Lys | Val | Asp | Lys | Lys | Val | Glu | Pro | Lys | Ser | Cys |
| | 210 | | | | | 215 | | | | | 220 | | | |
| Asp | | | | | | | | | | | | | | |
| Lys | Thr | His | Thr | Cys | Pro | Pro | Cys | Pro | Ala | Pro | Glu | Leu | Leu | Gly |
| 225 | | | | | 230 | | | | | 235 | | | | 240 |
| Gly | | | | | | | | | | | | | | |
| Pro | Ser | Val | Phe | Leu | Phe | Pro | Pro | Lys | Pro | Lys | Asp | Thr | Leu | Met |
| | | | 245 | | | | | 250 | | | | | 255 | |
| Ile | | | | | | | | | | | | | | |
| Ser | Arg | Thr | Pro | Glu | Val | Thr | Cys | Val | Val | Val | Asp | Val | Ser | His |
| | | | 260 | | | | | 265 | | | | | 270 | |
| Glu | | | | | | | | | | | | | | |
| Asp | Pro | Glu | Val | Lys | Phe | Asn | Trp | Tyr | Val | Asp | Gly | Val | Glu | Val |
| | 275 | | | | | 280 | | | | | 285 | | | |
| His | | | | | | | | | | | | | | |
| Asn | Ala | Lys | Thr | Lys | Pro | Arg | Glu | Glu | Gln | Tyr | Asn | Ser | Thr | Tyr |
| | 290 | | | | | 295 | | | | | 300 | | | |
| Arg | | | | | | | | | | | | | | |
| Val | Val | Ser | Val | Leu | Thr | Val | Leu | His | Gln | Asp | Trp | Leu | Asn | Gly |
| 305 | | | | | 310 | | | | | 315 | | | | 320 |
| Lys | | | | | | | | | | | | | | |
| Glu | Tyr | Lys | Cys | Lys | Val | Ser | Asn | Lys | Ala | Leu | Pro | Ala | Pro | Ile |
| | | | 325 | | | | | 330 | | | | | 335 | |
| Glu | | | | | | | | | | | | | | |
| Lys | Thr | Ile | Ser | Lys | Ala | Lys | Gly | Gln | Pro | Arg | Glu | Pro | Gln | Val |
| | | | 340 | | | | | 345 | | | | | 350 | |
| Tyr | | | | | | | | | | | | | | |
| Thr | Leu | Pro | Pro | Ser | Arg | Glu | Glu | Met | Thr | Lys | Asn | Gln | Val | Ser |
| | | 355 | | | | | 360 | | | | | 365 | | |
| Leu | | | | | | | | | | | | | | |

```
Thr Cys Leu Val Lys Gly Phe Tyr Pro Ser Asp Ile Ala Val Glu Trp
        370                 375                 380

Glu Ser Asn Gly Gln Pro Glu Asn Asn Tyr Lys Thr Thr Pro Pro Val
385                 390                 395                 400

Leu Asp Ser Asp Gly Ser Phe Phe Leu Tyr Ser Lys Leu Thr Val Asp
                405                 410                 415

Lys Ser Arg Trp Gln Gln Gly Asn Val Phe Ser Cys Ser Val Met His
                420                 425                 430

Glu Ala Leu His Asn His Tyr Thr Gln Lys Ser Leu Ser Leu Ser Pro
                435                 440                 445

Gly Lys
    450

<210> SEQ ID NO 103
<211> LENGTH: 214
<212> TYPE: PRT
<213> ORGANISM: Artificial Sequence
<220> FEATURE:
<223> OTHER INFORMATION: Antibody light chain

<400> SEQUENCE: 103

Asp Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Val Asn Thr Ala
                20                  25                  30

Val Ala Trp Tyr Gln Gln Lys Pro Gly Lys Ala Pro Lys Leu Leu Ile
            35                  40                  45

Tyr Ser Ala Ser Phe Leu Tyr Ser Gly Val Pro Ser Arg Phe Ser Gly
    50                  55                  60

Ser Arg Ser Gly Thr Asp Phe Thr Leu Thr Ile Ser Ser Leu Gln Pro
65                  70                  75                  80

Glu Asp Phe Ala Thr Tyr Tyr Cys Gln Gln His Tyr Thr Thr Pro Pro
                85                  90                  95

Thr Phe Gly Gln Gly Thr Lys Val Glu Ile Lys Arg Thr Val Ala Ala
                100                 105                 110

Pro Ser Val Phe Ile Phe Pro Pro Ser Asp Glu Gln Leu Lys Ser Gly
            115                 120                 125

Thr Ala Ser Val Val Cys Leu Leu Asn Asn Phe Tyr Pro Arg Glu Ala
            130                 135                 140

Lys Val Gln Trp Lys Val Asp Asn Ala Leu Gln Ser Gly Asn Ser Gln
145                 150                 155                 160

Glu Ser Val Thr Glu Gln Asp Ser Lys Asp Ser Thr Tyr Ser Leu Ser
                165                 170                 175

Ser Thr Leu Thr Leu Ser Lys Ala Asp Tyr Glu Lys His Lys Val Tyr
                180                 185                 190

Ala Cys Glu Val Thr His Gln Gly Leu Ser Ser Pro Val Thr Lys Ser
            195                 200                 205

Phe Asn Arg Gly Glu Cys
    210

<210> SEQ ID NO 104
<211> LENGTH: 448
<212> TYPE: PRT
<213> ORGANISM: Artificial Sequence
<220> FEATURE:
<223> OTHER INFORMATION: Antibody heavy chain

<400> SEQUENCE: 104
```

-continued

```
Glu Val Gln Leu Val Glu Ser Gly Gly Gly Leu Val Gln Pro Gly Gly
 1               5                  10                  15
Ser Leu Arg Leu Ser Cys Ala Ala Ser Gly Phe Thr Phe Thr Asp Tyr
             20                  25                  30
Thr Met Asp Trp Val Arg Gln Ala Pro Gly Lys Gly Leu Glu Trp Val
         35                  40                  45
Ala Asp Val Asn Pro Asn Ser Gly Ser Ile Tyr Asn Gln Arg Phe
 50                  55                  60
Lys Gly Arg Phe Thr Leu Ser Val Asp Arg Ser Lys Asn Thr Leu Tyr
 65              70                  75                  80
Leu Gln Met Asn Ser Leu Arg Ala Glu Asp Thr Ala Val Tyr Tyr Cys
             85                  90                  95
Ala Arg Asn Leu Gly Pro Ser Phe Tyr Phe Asp Tyr Trp Gly Gln Gly
            100                 105                 110
Thr Leu Val Thr Val Ser Ser Ala Ser Thr Lys Gly Pro Ser Val Phe
        115                 120                 125
Pro Leu Ala Pro Ser Ser Lys Ser Thr Ser Gly Gly Thr Ala Ala Leu
    130                 135                 140
Gly Cys Leu Val Lys Asp Tyr Phe Pro Glu Pro Val Thr Val Ser Trp
145                 150                 155                 160
Asn Ser Gly Ala Leu Thr Ser Gly Val His Thr Phe Pro Ala Val Leu
                165                 170                 175
Gln Ser Ser Gly Leu Tyr Ser Leu Ser Ser Val Val Thr Val Pro Ser
            180                 185                 190
Ser Ser Leu Gly Thr Gln Thr Tyr Ile Cys Asn Val Asn His Lys Pro
            195                 200                 205
Ser Asn Thr Lys Val Asp Lys Lys Val Glu Pro Lys Ser Cys Asp Lys
    210                 215                 220
Thr His Thr Cys Pro Pro Cys Pro Ala Pro Glu Leu Leu Gly Gly Pro
225                 230                 235                 240
Ser Val Phe Leu Phe Pro Pro Lys Pro Lys Asp Thr Leu Met Ile Ser
                245                 250                 255
Arg Thr Pro Glu Val Thr Cys Val Val Asp Val Ser His Glu Asp
            260                 265                 270
Pro Glu Val Lys Phe Asn Trp Tyr Val Asp Gly Val Glu Val His Asn
    275                 280                 285
Ala Lys Thr Lys Pro Arg Glu Glu Gln Tyr Asn Ser Thr Tyr Arg Val
    290                 295                 300
Val Ser Val Leu Thr Val Leu His Gln Asp Trp Leu Asn Gly Lys Glu
305                 310                 315                 320
Tyr Lys Cys Lys Val Ser Asn Lys Ala Leu Pro Ala Pro Ile Glu Lys
                325                 330                 335
Thr Ile Ser Lys Ala Lys Gly Gln Pro Arg Glu Pro Gln Val Tyr Thr
            340                 345                 350
Leu Pro Pro Ser Arg Glu Glu Met Thr Lys Asn Gln Val Ser Leu Thr
            355                 360                 365
Cys Leu Val Lys Gly Phe Tyr Pro Ser Asp Ile Ala Val Glu Trp Glu
    370                 375                 380
Ser Asn Gly Gln Pro Glu Asn Asn Tyr Lys Thr Thr Pro Pro Val Leu
385                 390                 395                 400
Asp Ser Asp Gly Ser Phe Phe Leu Tyr Ser Lys Leu Thr Val Asp Lys
                405                 410                 415
```

```
Ser Arg Trp Gln Gln Gly Asn Val Phe Ser Cys Ser Val Met His Glu
            420                 425                 430

Ala Leu His Asn His Tyr Thr Gln Lys Ser Leu Ser Leu Ser Pro Gly
            435                 440                 445

<210> SEQ ID NO 105
<211> LENGTH: 214
<212> TYPE: PRT
<213> ORGANISM: Artificial Sequence
<220> FEATURE:
<223> OTHER INFORMATION: Antibody light chain

<400> SEQUENCE: 105

Asp Ile Gln Met Thr Gln Ser Pro Ser Ser Leu Ser Ala Ser Val Gly
1               5                   10                  15

Asp Arg Val Thr Ile Thr Cys Lys Ala Ser Gln Asp Val Ser Ile Gly
            20                  25                  30

Val Ala Trp Tyr Gln Gln Lys Pro Gly Lys Ala Pro Lys Leu Leu Ile
        35                  40                  45

Tyr Ser Ala Ser Tyr Arg Tyr Thr Gly Val Pro Ser Arg Phe Ser Gly
50                  55                  60

Ser Gly Ser Gly Thr Asp Phe Thr Leu Thr Ile Ser Ser Leu Gln Pro
65                  70                  75                  80

Glu Asp Phe Ala Thr Tyr Tyr Cys Gln Gln Tyr Tyr Ile Tyr Pro Tyr
                85                  90                  95

Thr Phe Gly Gln Gly Thr Lys Val Glu Ile Lys Arg Thr Val Ala Ala
            100                 105                 110

Pro Ser Val Phe Ile Phe Pro Pro Ser Asp Glu Gln Leu Lys Ser Gly
        115                 120                 125

Thr Ala Ser Val Val Cys Leu Leu Asn Asn Phe Tyr Pro Arg Glu Ala
    130                 135                 140

Lys Val Gln Trp Lys Val Asp Asn Ala Leu Gln Ser Gly Asn Ser Gln
145                 150                 155                 160

Glu Ser Val Thr Glu Gln Asp Ser Lys Asp Ser Thr Tyr Ser Leu Ser
                165                 170                 175

Ser Thr Leu Thr Leu Ser Lys Ala Asp Tyr Glu Lys His Lys Val Tyr
            180                 185                 190

Ala Cys Glu Val Thr His Gln Gly Leu Ser Ser Pro Val Thr Lys Ser
        195                 200                 205

Phe Asn Arg Gly Glu Cys
    210

<210> SEQ ID NO 106
<211> LENGTH: 447
<212> TYPE: PRT
<213> ORGANISM: Artificial Sequence
<220> FEATURE:
<223> OTHER INFORMATION: Antibody heavy chain

<400> SEQUENCE: 106

Gln Val Gln Leu Gln Gln Trp Gly Ala Gly Leu Leu Lys Pro Ser Glu
1               5                   10                  15

Thr Leu Ser Leu Thr Cys Ala Val Tyr Gly Gly Ser Phe Ser Gly Tyr
            20                  25                  30

Tyr Trp Ser Trp Ile Arg Gln Pro Pro Gly Lys Gly Leu Glu Trp Ile
        35                  40                  45

Gly Glu Ile Asn His Ser Gly Ser Thr Asn Tyr Asn Pro Ser Leu Lys
50                  55                  60
```

Ser Arg Val Thr Ile Ser Val Glu Thr Ser Lys Asn Gln Phe Ser Leu
 65                  70                  75                  80

Lys Leu Ser Ser Val Thr Ala Ala Asp Thr Ala Val Tyr Tyr Cys Ala
             85                  90                  95

Arg Asp Lys Trp Thr Trp Tyr Phe Asp Leu Trp Gly Arg Gly Thr Leu
        100                 105                 110

Val Thr Val Ser Ser Ala Ser Thr Lys Gly Pro Ser Val Phe Pro Leu
    115                 120                 125

Ala Pro Ser Ser Lys Ser Thr Ser Gly Gly Thr Ala Ala Leu Gly Cys
130                 135                 140

Leu Val Lys Asp Tyr Phe Pro Glu Pro Val Thr Val Ser Trp Asn Ser
145                 150                 155                 160

Gly Ala Leu Thr Ser Gly Val His Thr Phe Pro Ala Val Leu Gln Ser
                165                 170                 175

Ser Gly Leu Tyr Ser Leu Ser Ser Val Val Thr Val Pro Ser Ser Ser
            180                 185                 190

Leu Gly Thr Gln Thr Tyr Ile Cys Asn Val Asn His Lys Pro Ser Asn
        195                 200                 205

Thr Lys Val Asp Lys Arg Val Glu Pro Lys Ser Cys Asp Lys Thr His
210                 215                 220

Thr Cys Pro Pro Cys Pro Ala Pro Glu Leu Leu Gly Gly Pro Ser Val
225                 230                 235                 240

Phe Leu Phe Pro Pro Lys Pro Lys Asp Thr Leu Met Ile Ser Arg Thr
                245                 250                 255

Pro Glu Val Thr Cys Val Val Val Asp Val Ser His Glu Asp Pro Glu
            260                 265                 270

Val Lys Phe Asn Trp Tyr Val Asp Gly Val Glu Val His Asn Ala Lys
        275                 280                 285

Thr Lys Pro Arg Glu Glu Gln Tyr Asn Ser Thr Tyr Arg Val Val Ser
290                 295                 300

Val Leu Thr Val Leu His Gln Asp Trp Leu Asn Gly Lys Glu Tyr Lys
305                 310                 315                 320

Cys Lys Val Ser Asn Lys Ala Leu Pro Ala Pro Ile Glu Lys Thr Ile
                325                 330                 335

Ser Lys Ala Lys Gly Gln Pro Arg Glu Pro Gln Val Tyr Thr Leu Pro
            340                 345                 350

Pro Ser Arg Glu Glu Met Thr Lys Asn Gln Val Ser Leu Thr Cys Leu
        355                 360                 365

Val Lys Gly Phe Tyr Pro Ser Asp Ile Ala Val Glu Trp Glu Ser Asn
370                 375                 380

Gly Gln Pro Glu Asn Asn Tyr Lys Thr Thr Pro Pro Val Leu Asp Ser
385                 390                 395                 400

Asp Gly Ser Phe Phe Leu Tyr Ser Lys Leu Thr Val Asp Lys Ser Arg
                405                 410                 415

Trp Gln Gln Gly Asn Val Phe Ser Cys Ser Val Met His Glu Ala Leu
            420                 425                 430

His Asn His Tyr Thr Gln Lys Ser Leu Ser Leu Ser Pro Gly Lys
        435                 440                 445

<210> SEQ ID NO 107
<211> LENGTH: 220
<212> TYPE: PRT
<213> ORGANISM: Artificial Sequence
<220> FEATURE:

<223> OTHER INFORMATION: Antibody light chain

<400> SEQUENCE: 107

| | | | | | | | | | | | | | | |
|---|---|---|---|---|---|---|---|---|---|---|---|---|---|---|
Asp Ile Glu Met Thr Gln Ser Pro Asp Ser Leu Ala Val Ser Leu Gly
1               5                   10                  15

Glu Arg Ala Thr Ile Asn Cys Arg Ser Ser Gln Ser Val Leu Tyr Ser
            20                  25                  30

Ser Ser Asn Arg Asn Tyr Leu Ala Trp Tyr Gln Gln Asn Pro Gly Gln
        35                  40                  45

Pro Pro Lys Leu Leu Ile Tyr Trp Ala Ser Thr Arg Glu Ser Gly Val
    50                  55                  60

Pro Asp Arg Phe Ser Gly Ser Gly Ser Gly Thr Asp Phe Thr Leu Thr
65                  70                  75                  80

Ile Ser Ser Leu Gln Ala Glu Asp Val Ala Val Tyr Tyr Cys Gln Gln
                85                  90                  95

Tyr Tyr Ser Thr Pro Arg Thr Phe Gly Gln Gly Thr Lys Val Glu Ile
            100                 105                 110

Lys Arg Thr Val Ala Ala Pro Ser Val Phe Ile Phe Pro Pro Ser Asp
        115                 120                 125

Glu Gln Leu Lys Ser Gly Thr Ala Ser Val Val Cys Leu Leu Asn Asn
    130                 135                 140

Phe Tyr Pro Arg Glu Ala Lys Val Gln Trp Lys Val Asp Asn Ala Leu
145                 150                 155                 160

Gln Ser Gly Asn Ser Gln Glu Ser Val Thr Glu Gln Asp Ser Lys Asp
                165                 170                 175

Ser Thr Tyr Ser Leu Ser Ser Thr Leu Thr Leu Ser Lys Ala Asp Tyr
            180                 185                 190

Glu Lys His Lys Val Tyr Ala Cys Glu Val Thr His Gln Gly Leu Ser
        195                 200                 205

Ser Pro Val Thr Lys Ser Phe Asn Arg Gly Glu Cys
    210                 215                 220

<210> SEQ ID NO 108
<211> LENGTH: 445
<212> TYPE: PRT
<213> ORGANISM: Artificial Sequence
<220> FEATURE:
<223> OTHER INFORMATION: Antibody heavy chain

<400> SEQUENCE: 108

Glu Val Gln Leu Leu Glu Ser Gly Gly Gly Leu Val Gln Pro Gly Gly
1               5                   10                  15

Ser Leu Arg Leu Ser Cys Ala Ala Ser Gly Phe Thr Phe Ser His Tyr
            20                  25                  30

Val Met Ala Trp Val Arg Gln Ala Pro Gly Lys Gly Leu Glu Trp Val
        35                  40                  45

Ser Ser Ile Ser Ser Ser Gly Gly Trp Thr Leu Tyr Ala Asp Ser Val
    50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Ala Glu Asp Thr Ala Val Tyr Tyr Cys
                85                  90                  95

Thr Arg Gly Leu Lys Met Ala Thr Ile Phe Asp Tyr Trp Gly Gln Gly
            100                 105                 110

Thr Leu Val Thr Val Ser Ser Ala Ser Thr Lys Gly Pro Ser Val Phe
        115                 120                 125

-continued

Pro Leu Ala Pro Cys Ser Arg Ser Thr Ser Glu Ser Thr Ala Ala Leu
    130                 135                 140

Gly Cys Leu Val Lys Asp Tyr Phe Pro Glu Pro Val Thr Val Ser Trp
145                 150                 155                 160

Asn Ser Gly Ala Leu Thr Ser Gly Val His Thr Phe Pro Ala Val Leu
                165                 170                 175

Gln Ser Ser Gly Leu Tyr Ser Leu Ser Ser Val Val Thr Val Pro Ser
            180                 185                 190

Ser Asn Phe Gly Thr Gln Thr Tyr Thr Cys Asn Val Asp His Lys Pro
        195                 200                 205

Ser Asn Thr Lys Val Asp Lys Thr Val Glu Arg Lys Cys Cys Val Glu
    210                 215                 220

Cys Pro Pro Cys Pro Ala Pro Pro Val Ala Gly Pro Ser Val Phe Leu
225                 230                 235                 240

Phe Pro Pro Lys Pro Lys Asp Thr Leu Met Ile Ser Arg Thr Pro Glu
                245                 250                 255

Val Thr Cys Val Val Val Asp Val Ser His Glu Asp Pro Glu Val Gln
            260                 265                 270

Phe Asn Trp Tyr Val Asp Gly Val Glu Val His Asn Ala Lys Thr Lys
        275                 280                 285

Pro Arg Glu Glu Gln Phe Asn Ser Thr Phe Arg Val Val Ser Val Leu
    290                 295                 300

Thr Val Val His Gln Asp Trp Leu Asn Gly Lys Glu Tyr Lys Cys Lys
305                 310                 315                 320

Val Ser Asn Lys Gly Leu Pro Ala Pro Ile Glu Lys Thr Ile Ser Lys
                325                 330                 335

Thr Lys Gly Gln Pro Arg Glu Pro Gln Val Tyr Thr Leu Pro Pro Ser
            340                 345                 350

Arg Glu Glu Met Thr Lys Asn Gln Val Ser Leu Thr Cys Leu Val Lys
        355                 360                 365

Gly Phe Tyr Pro Ser Asp Ile Ala Val Glu Trp Glu Ser Asn Gly Gln
    370                 375                 380

Pro Glu Asn Asn Tyr Lys Thr Thr Pro Pro Met Leu Asp Ser Asp Gly
385                 390                 395                 400

Ser Phe Phe Leu Tyr Ser Lys Leu Thr Val Asp Lys Ser Arg Trp Gln
                405                 410                 415

Gln Gly Asn Val Phe Ser Cys Ser Val Met His Glu Ala Leu His Asn
            420                 425                 430

His Tyr Thr Gln Lys Ser Leu Ser Leu Ser Pro Gly Lys
        435                 440                 445

<210> SEQ ID NO 109
<211> LENGTH: 217
<212> TYPE: PRT
<213> ORGANISM: Artificial Sequence
<220> FEATURE:
<223> OTHER INFORMATION: Antibody light chain

<400> SEQUENCE: 109

Gln Ser Ala Leu Thr Gln Pro Ala Ser Val Ser Gly Ser Pro Gly Gln
1               5                   10                  15

Ser Ile Thr Ile Ser Cys Thr Gly Thr Ser Ser Asp Val Gly Ser Tyr
            20                  25                  30

Asn Val Val Ser Trp Tyr Gln Gln His Pro Gly Lys Ala Pro Lys Leu
        35                  40                  45

```
Ile Ile Tyr Glu Val Ser Gln Arg Pro Ser Gly Val Ser Asn Arg Phe
         50                  55                  60

Ser Gly Ser Lys Ser Gly Asn Thr Ala Ser Leu Thr Ile Ser Gly Leu
 65                  70                  75                  80

Gln Thr Glu Asp Glu Ala Asp Tyr Tyr Cys Cys Ser Tyr Ala Gly Ser
                 85                  90                  95

Ser Ile Phe Val Ile Phe Gly Gly Thr Lys Val Thr Val Leu Gly
                100                 105                 110

Gln Pro Lys Ala Ala Pro Ser Val Thr Leu Phe Pro Pro Ser Ser Glu
            115                 120                 125

Glu Leu Gln Ala Asn Lys Ala Thr Leu Val Cys Leu Val Ser Asp Phe
        130                 135                 140

Tyr Pro Gly Ala Val Thr Val Ala Trp Lys Ala Asp Gly Ser Pro Val
145                 150                 155                 160

Lys Val Gly Val Glu Thr Thr Lys Pro Ser Lys Gln Ser Asn Asn Lys
                165                 170                 175

Tyr Ala Ala Ser Ser Tyr Leu Ser Leu Thr Pro Glu Gln Trp Lys Ser
                180                 185                 190

His Arg Ser Tyr Ser Cys Arg Val Thr His Glu Gly Ser Thr Val Glu
            195                 200                 205

Lys Thr Val Ala Pro Ala Glu Cys Ser
        210                 215

<210> SEQ ID NO 110
<211> LENGTH: 449
<212> TYPE: PRT
<213> ORGANISM: Artificial Sequence
<220> FEATURE:
<223> OTHER INFORMATION: Antibody heavy chain

<400> SEQUENCE: 110

Gln Val Gln Leu Val Gln Ser Gly Ala Glu Val Lys Lys Pro Gly Ala
  1               5                  10                  15

Ser Val Lys Val Ser Cys Lys Ala Ser Gly Tyr Thr Phe Arg Ser Ser
                 20                  25                  30

Tyr Ile Ser Trp Val Arg Gln Ala Pro Gly Gln Gly Leu Glu Trp Met
             35                  40                  45

Gly Trp Ile Tyr Ala Gly Thr Gly Ser Pro Ser Tyr Asn Gln Lys Leu
         50                  55                  60

Gln Gly Arg Val Thr Met Thr Thr Asp Thr Ser Thr Ser Thr Ala Tyr
 65                  70                  75                  80

Met Glu Leu Arg Ser Leu Arg Ser Asp Asp Thr Ala Val Tyr Tyr Cys
                 85                  90                  95

Ala Arg His Arg Asp Tyr Tyr Ser Asn Ser Leu Thr Tyr Trp Gly Gln
                100                 105                 110

Gly Thr Leu Val Thr Val Ser Ser Ala Ser Thr Lys Gly Pro Ser Val
            115                 120                 125

Phe Pro Leu Ala Pro Ser Ser Lys Ser Thr Ser Gly Gly Thr Ala Ala
        130                 135                 140

Leu Gly Cys Leu Val Lys Asp Tyr Phe Pro Glu Pro Val Thr Val Ser
145                 150                 155                 160

Trp Asn Ser Gly Ala Leu Thr Ser Gly Val His Thr Phe Pro Ala Val
                165                 170                 175

Leu Gln Ser Ser Gly Leu Tyr Ser Leu Ser Ser Val Val Thr Val Pro
                180                 185                 190
```

```
Ser Ser Ser Leu Gly Thr Gln Thr Tyr Ile Cys Asn Val Asn His Lys
            195                 200                 205

Pro Ser Asn Thr Lys Val Asp Lys Lys Val Glu Pro Lys Ser Cys Asp
    210                 215                 220

Lys Thr His Thr Cys Pro Pro Cys Pro Ala Pro Glu Leu Leu Gly Gly
225                 230                 235                 240

Pro Ser Val Phe Leu Phe Pro Pro Lys Pro Lys Asp Thr Leu Met Ile
                245                 250                 255

Ser Arg Thr Pro Glu Val Thr Cys Val Val Val Asp Val Ser His Glu
                260                 265                 270

Asp Pro Glu Val Lys Phe Asn Trp Tyr Val Asp Gly Val Glu Val His
                275                 280                 285

Asn Ala Lys Thr Lys Pro Arg Glu Glu Gln Tyr Asn Ser Thr Tyr Arg
    290                 295                 300

Val Val Ser Val Leu Thr Val Leu His Gln Asp Trp Leu Asn Gly Lys
305                 310                 315                 320

Glu Tyr Lys Cys Lys Val Ser Asn Lys Ala Leu Pro Ala Pro Ile Glu
                325                 330                 335

Lys Thr Ile Ser Lys Ala Lys Gly Gln Pro Arg Glu Pro Gln Val Tyr
                340                 345                 350

Thr Leu Pro Pro Ser Arg Asp Glu Leu Thr Lys Asn Gln Val Ser Leu
                355                 360                 365

Thr Cys Leu Val Lys Gly Phe Tyr Pro Ser Asp Ile Ala Val Glu Trp
                370                 375                 380

Glu Ser Asn Gly Gln Pro Glu Asn Asn Tyr Lys Thr Thr Pro Pro Val
385                 390                 395                 400

Leu Asp Ser Asp Gly Ser Phe Phe Leu Tyr Ser Lys Leu Thr Val Asp
                405                 410                 415

Lys Ser Arg Trp Gln Gln Gly Asn Val Phe Ser Cys Ser Val Met His
                420                 425                 430

Glu Ala Leu His Asn His Tyr Thr Gln Lys Ser Leu Ser Leu Ser Pro
                435                 440                 445

Gly

<210> SEQ ID NO 111
<211> LENGTH: 220
<212> TYPE: PRT
<213> ORGANISM: Artificial Sequence
<220> FEATURE:
<223> OTHER INFORMATION: Antibody light chain

<400> SEQUENCE: 111

Asp Ile Val Met Thr Gln Ser Pro Asp Ser Leu Ala Val Ser Leu Gly
1               5                   10                  15

Glu Arg Ala Thr Ile Asn Cys Lys Ser Ser Gln Ser Val Leu Asn Ser
            20                  25                  30

Gly Asn Gln Lys Asn Tyr Leu Thr Trp Tyr Gln Gln Lys Pro Gly Gln
        35                  40                  45

Pro Pro Lys Leu Leu Ile Tyr Trp Ala Ser Thr Arg Glu Ser Gly Val
    50                  55                  60

Pro Asp Arg Phe Ser Gly Ser Gly Ser Gly Thr Asp Phe Thr Leu Thr
65                  70                  75                  80

Ile Ser Ser Leu Gln Ala Glu Asp Val Ala Val Tyr Tyr Cys Gln Ser
                85                  90                  95
```

```
Asp Tyr Ser Tyr Pro Tyr Thr Phe Gly Gln Gly Thr Lys Leu Glu Ile
            100                 105                 110

Lys Arg Thr Val Ala Ala Pro Ser Val Phe Ile Phe Pro Pro Ser Asp
        115                 120                 125

Glu Gln Leu Lys Ser Gly Thr Ala Ser Val Val Cys Leu Leu Asn Asn
    130                 135                 140

Phe Tyr Pro Arg Glu Ala Lys Val Gln Trp Lys Val Asp Asn Ala Leu
145                 150                 155                 160

Gln Ser Gly Asn Ser Gln Glu Ser Val Thr Glu Gln Asp Ser Lys Asp
                165                 170                 175

Ser Thr Tyr Ser Leu Ser Ser Thr Leu Thr Leu Ser Lys Ala Asp Tyr
            180                 185                 190

Glu Lys His Lys Val Tyr Ala Cys Glu Val Thr His Gln Gly Leu Ser
        195                 200                 205

Ser Pro Val Thr Lys Ser Phe Asn Arg Gly Glu Cys
    210                 215                 220
```

<210> SEQ ID NO 112
<211> LENGTH: 446
<212> TYPE: PRT
<213> ORGANISM: Artificial Sequence
<220> FEATURE:
<223> OTHER INFORMATION: Antibody heavy chain

<400> SEQUENCE: 112

```
Glu Val Gln Leu Leu Glu Ser Gly Gly Gly Leu Val Gln Pro Gly Gly
1               5                   10                  15

Ser Leu Arg Leu Ser Cys Ala Ala Ser Gly Phe Thr Phe Ser Ser Tyr
            20                  25                  30

Ala Met Ser Trp Val Arg Gln Ala Pro Gly Lys Gly Leu Glu Trp Val
        35                  40                  45

Ser Ala Ile Asn Ser Gln Gly Lys Ser Thr Tyr Tyr Ala Asp Ser Val
    50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Ala Glu Asp Thr Ala Val Tyr Tyr Cys
                85                  90                  95

Ala Arg Trp Gly Asp Glu Gly Phe Asp Ile Trp Gly Gln Gly Thr Leu
            100                 105                 110

Val Thr Val Ser Ser Ala Ser Thr Lys Gly Pro Ser Val Phe Pro Leu
        115                 120                 125

Ala Pro Ser Ser Lys Ser Thr Ser Gly Gly Thr Ala Ala Leu Gly Cys
    130                 135                 140

Leu Val Lys Asp Tyr Phe Pro Glu Pro Val Thr Val Ser Trp Asn Ser
145                 150                 155                 160

Gly Ala Leu Thr Ser Gly Val His Thr Phe Pro Ala Val Leu Gln Ser
                165                 170                 175

Ser Gly Leu Tyr Ser Leu Ser Ser Val Val Thr Val Pro Ser Ser Ser
            180                 185                 190

Leu Gly Thr Gln Thr Tyr Ile Cys Asn Val Asn His Lys Pro Ser Asn
        195                 200                 205

Thr Lys Val Asp Lys Arg Val Glu Pro Lys Ser Cys Asp Lys Thr His
    210                 215                 220

Thr Cys Pro Pro Cys Pro Ala Pro Glu Leu Leu Gly Gly Pro Ser Val
225                 230                 235                 240
```

-continued

Phe Leu Phe Pro Pro Lys Pro Lys Asp Thr Leu Met Ile Ser Arg Thr
            245                 250                 255

Pro Glu Val Thr Cys Val Val Val Asp Val Ser His Glu Asp Pro Glu
        260                 265                 270

Val Lys Phe Asn Trp Tyr Val Asp Gly Val Glu Val His Asn Ala Lys
    275                 280                 285

Thr Lys Pro Arg Glu Glu Gln Tyr Asn Ser Thr Tyr Arg Val Val Ser
290                 295                 300

Val Leu Thr Val Leu His Gln Asp Trp Leu Asn Gly Lys Glu Tyr Lys
305                 310                 315                 320

Cys Lys Val Ser Asn Lys Ala Leu Pro Ala Pro Ile Glu Lys Thr Ile
                325                 330                 335

Ser Lys Ala Lys Gly Gln Pro Arg Glu Pro Gln Val Tyr Thr Leu Pro
            340                 345                 350

Pro Ser Arg Glu Glu Met Thr Lys Asn Gln Val Ser Leu Thr Cys Leu
        355                 360                 365

Val Lys Gly Phe Tyr Pro Ser Asp Ile Ala Val Glu Trp Glu Ser Asn
    370                 375                 380

Gly Gln Pro Glu Asn Asn Tyr Lys Thr Thr Pro Pro Val Leu Asp Ser
385                 390                 395                 400

Asp Gly Ser Phe Phe Leu Tyr Ser Lys Leu Thr Val Asp Lys Ser Arg
                405                 410                 415

Trp Gln Gln Gly Asn Val Phe Ser Cys Ser Val Met His Glu Ala Leu
            420                 425                 430

His Asn His Tyr Thr Gln Lys Ser Leu Ser Leu Ser Pro Gly
        435                 440                 445

<210> SEQ ID NO 113
<211> LENGTH: 214
<212> TYPE: PRT
<213> ORGANISM: Artificial Sequence
<220> FEATURE:
<223> OTHER INFORMATION: Antibody light chain

<400> SEQUENCE: 113

Asp Ile Gln Met Thr Gln Ser Pro Ser Ser Leu Ser Ala Ser Val Gly
1               5                   10                  15

Asp Arg Val Thr Ile Thr Cys Arg Ala Ser Gln Gly Ile Ser Asn Trp
            20                  25                  30

Leu Ala Trp Tyr Gln Gln Lys Pro Gly Lys Ala Pro Lys Leu Leu Ile
        35                  40                  45

Tyr Gly Ala Ser Ser Leu Gln Ser Gly Val Pro Ser Arg Phe Ser Gly
    50                  55                  60

Ser Gly Ser Gly Thr Asp Phe Thr Leu Thr Ile Ser Ser Leu Gln Pro
65                  70                  75                  80

Glu Asp Phe Ala Thr Tyr Tyr Cys Gln Gln Tyr Ser Ser Phe Pro Thr
                85                  90                  95

Thr Phe Gly Gln Gly Thr Lys Val Glu Ile Lys Arg Thr Val Ala Ala
            100                 105                 110

Pro Ser Val Phe Ile Phe Pro Pro Ser Asp Glu Gln Leu Lys Ser Gly
        115                 120                 125

Thr Ala Ser Val Val Cys Leu Leu Asn Asn Phe Tyr Pro Arg Glu Ala
    130                 135                 140

Lys Val Gln Trp Lys Val Asp Asn Ala Leu Gln Ser Gly Asn Ser Gln
145                 150                 155                 160

-continued

```
Glu Ser Val Thr Glu Gln Asp Ser Lys Asp Ser Thr Tyr Ser Leu Ser
                165                 170                 175

Ser Thr Leu Thr Leu Ser Lys Ala Asp Tyr Glu Lys His Lys Val Tyr
            180                 185                 190

Ala Cys Glu Val Thr His Gln Gly Leu Ser Ser Pro Val Thr Lys Ser
        195                 200                 205

Phe Asn Arg Gly Glu Cys
    210

<210> SEQ ID NO 114
<211> LENGTH: 25
<212> TYPE: DNA
<213> ORGANISM: Artificial Sequence
<220> FEATURE:
<223> OTHER INFORMATION: Morpholino

<400> SEQUENCE: 114
cgtcacaggc aggacccact gccca                                           25

<210> SEQ ID NO 115
<211> LENGTH: 1342
<212> TYPE: PRT
<213> ORGANISM: Homo sapiens

<400> SEQUENCE: 115

Met Arg Ala Asn Asp Ala Leu Gln Val Leu Gly Leu Leu Phe Ser Leu
1               5                   10                  15

Ala Arg Gly Ser Glu Val Gly Asn Ser Gln Ala Val Cys Pro Gly Thr
            20                  25                  30

Leu Asn Gly Leu Ser Val Thr Gly Asp Ala Glu Asn Gln Tyr Gln Thr
        35                  40                  45

Leu Tyr Lys Leu Tyr Glu Arg Cys Glu Val Val Met Gly Asn Leu Glu
    50                  55                  60

Ile Val Leu Thr Gly His Asn Ala Asp Leu Ser Phe Leu Gln Trp Ile
65                  70                  75                  80

Arg Glu Val Thr Gly Tyr Val Leu Val Ala Met Asn Glu Phe Ser Thr
                85                  90                  95

Leu Pro Leu Pro Asn Leu Arg Val Val Arg Gly Thr Gln Val Tyr Asp
            100                 105                 110

Gly Lys Phe Ala Ile Phe Val Met Leu Asn Tyr Asn Thr Asn Ser Ser
        115                 120                 125

His Ala Leu Arg Gln Leu Arg Leu Thr Gln Leu Thr Glu Ile Leu Ser
    130                 135                 140

Gly Gly Val Tyr Ile Glu Lys Asn Asp Lys Leu Cys His Met Asp Thr
145                 150                 155                 160

Ile Asp Trp Arg Asp Ile Val Arg Asp Arg Ala Glu Ile Val Val
                165                 170                 175

Lys Asp Asn Gly Arg Ser Cys Pro Pro Cys His Glu Val Cys Lys Gly
            180                 185                 190

Arg Cys Trp Gly Pro Gly Ser Glu Asp Cys Gln Thr Leu Thr Lys Thr
        195                 200                 205

Ile Cys Ala Pro Gln Cys Asn Gly His Cys Phe Gly Pro Asn Pro Asn
    210                 215                 220

Gln Cys Cys His Asp Glu Cys Ala Gly Gly Cys Ser Gly Pro Gln Asp
225                 230                 235                 240

Thr Asp Cys Phe Ala Cys Arg His Phe Asn Asp Ser Gly Ala Cys Val
                245                 250                 255
```

```
Pro Arg Cys Pro Gln Pro Leu Val Tyr Asn Lys Leu Thr Phe Gln Leu
            260                 265                 270

Glu Pro Asn Pro His Thr Lys Tyr Gln Tyr Gly Gly Val Cys Val Ala
        275                 280                 285

Ser Cys Pro His Asn Phe Val Val Asp Gln Thr Ser Cys Val Arg Ala
    290                 295                 300

Cys Pro Pro Asp Lys Met Glu Val Asp Lys Asn Gly Leu Lys Met Cys
305                 310                 315                 320

Glu Pro Cys Gly Gly Leu Cys Pro Lys Ala Cys Glu Gly Thr Gly Ser
                325                 330                 335

Gly Ser Arg Phe Gln Thr Val Asp Ser Ser Asn Ile Asp Gly Phe Val
            340                 345                 350

Asn Cys Thr Lys Ile Leu Gly Asn Leu Asp Phe Leu Ile Thr Gly Leu
            355                 360                 365

Asn Gly Asp Pro Trp His Lys Ile Pro Ala Leu Asp Pro Glu Lys Leu
        370                 375                 380

Asn Val Phe Arg Thr Val Arg Glu Ile Thr Gly Tyr Leu Asn Ile Gln
385                 390                 395                 400

Ser Trp Pro Pro His Met His Asn Phe Ser Val Phe Ser Asn Leu Thr
                405                 410                 415

Thr Ile Gly Gly Arg Ser Leu Tyr Asn Arg Gly Phe Ser Leu Leu Ile
            420                 425                 430

Met Lys Asn Leu Asn Val Thr Ser Leu Gly Phe Arg Ser Leu Lys Glu
        435                 440                 445

Ile Ser Ala Gly Arg Ile Tyr Ile Ser Ala Asn Arg Gln Leu Cys Tyr
    450                 455                 460

His His Ser Leu Asn Trp Thr Lys Val Leu Arg Gly Pro Thr Glu Glu
465                 470                 475                 480

Arg Leu Asp Ile Lys His Asn Arg Pro Arg Arg Asp Cys Val Ala Glu
                485                 490                 495

Gly Lys Val Cys Asp Pro Leu Cys Ser Ser Gly Gly Cys Trp Gly Pro
            500                 505                 510

Gly Pro Gly Gln Cys Leu Ser Cys Arg Asn Tyr Ser Arg Gly Gly Val
        515                 520                 525

Cys Val Thr His Cys Asn Phe Leu Asn Gly Glu Pro Arg Glu Phe Ala
530                 535                 540

His Glu Ala Glu Cys Phe Ser Cys His Pro Glu Cys Gln Pro Met Glu
545                 550                 555                 560

Gly Thr Ala Thr Cys Asn Gly Ser Gly Ser Asp Thr Cys Ala Gln Cys
                565                 570                 575

Ala His Phe Arg Asp Gly Pro His Cys Val Ser Ser Cys Pro His Gly
            580                 585                 590

Val Leu Gly Ala Lys Gly Pro Ile Tyr Lys Tyr Pro Asp Val Gln Asn
        595                 600                 605

Glu Cys Arg Pro Cys His Glu Asn Cys Thr Gln Gly Cys Lys Gly Pro
    610                 615                 620

Glu Leu Gln Asp Cys Leu Gly Gln Thr Leu Val Leu Ile Gly Lys Thr
625                 630                 635                 640

His Leu Thr Met Ala Leu Thr Val Ile Ala Gly Leu Val Val Ile Phe
                645                 650                 655

Met Met Leu Gly Gly Thr Phe Leu Tyr Trp Arg Gly Arg Arg Ile Gln
            660                 665                 670
```

Asn Lys Arg Ala Met Arg Arg Tyr Leu Glu Arg Gly Glu Ser Ile Glu
             675                 680                 685

Pro Leu Asp Pro Ser Glu Lys Ala Asn Lys Val Leu Ala Arg Ile Phe
    690                 695                 700

Lys Glu Thr Glu Leu Arg Lys Leu Lys Val Leu Gly Ser Gly Val Phe
705                 710                 715                 720

Gly Thr Val His Lys Gly Val Trp Ile Pro Glu Gly Glu Ser Ile Lys
                725                 730                 735

Ile Pro Val Cys Ile Lys Val Ile Glu Asp Lys Ser Gly Arg Gln Ser
            740                 745                 750

Phe Gln Ala Val Thr Asp His Met Leu Ala Ile Gly Ser Leu Asp His
    755                 760                 765

Ala His Ile Val Arg Leu Leu Gly Leu Cys Pro Gly Ser Ser Leu Gln
770                 775                 780

Leu Val Thr Gln Tyr Leu Pro Leu Gly Ser Leu Leu Asp His Val Arg
785                 790                 795                 800

Gln His Arg Gly Ala Leu Gly Pro Gln Leu Leu Leu Asn Trp Gly Val
                805                 810                 815

Gln Ile Ala Lys Gly Met Tyr Tyr Leu Glu Glu His Gly Met Val His
            820                 825                 830

Arg Asn Leu Ala Ala Arg Asn Val Leu Leu Lys Ser Pro Ser Gln Val
    835                 840                 845

Gln Val Ala Asp Phe Gly Val Ala Asp Leu Leu Pro Pro Asp Asp Lys
850                 855                 860

Gln Leu Leu Tyr Ser Glu Ala Lys Thr Pro Ile Lys Trp Met Ala Leu
865                 870                 875                 880

Glu Ser Ile His Phe Gly Lys Tyr Thr His Gln Ser Asp Val Trp Ser
                885                 890                 895

Tyr Gly Val Thr Val Trp Glu Leu Met Thr Phe Gly Ala Glu Pro Tyr
            900                 905                 910

Ala Gly Leu Arg Leu Ala Glu Val Pro Asp Leu Leu Glu Lys Gly Glu
    915                 920                 925

Arg Leu Ala Gln Pro Gln Ile Cys Thr Ile Asp Val Tyr Met Val Met
930                 935                 940

Val Lys Cys Trp Met Ile Asp Glu Asn Ile Arg Pro Thr Phe Lys Glu
945                 950                 955                 960

Leu Ala Asn Glu Phe Thr Arg Met Ala Arg Asp Pro Pro Arg Tyr Leu
                965                 970                 975

Val Ile Lys Arg Glu Ser Gly Pro Gly Ile Ala Pro Gly Pro Glu Pro
            980                 985                 990

His Gly Leu Thr Asn Lys Lys Leu Glu Glu Val Glu Leu Glu Pro Glu
    995                 1000                1005

Leu Asp Leu Asp Leu Asp Leu Glu Ala Glu Glu Asp Asn Leu Ala
    1010                1015                1020

Thr Thr Thr Leu Gly Ser Ala Leu Ser Leu Pro Val Gly Thr Leu
    1025                1030                1035

Asn Arg Pro Arg Gly Ser Gln Ser Leu Leu Ser Pro Ser Ser Gly
    1040                1045                1050

Tyr Met Pro Met Asn Gln Gly Asn Leu Gly Glu Ser Cys Gln Glu
    1055                1060                1065

Ser Ala Val Ser Gly Ser Ser Glu Arg Cys Pro Arg Pro Val Ser
    1070                1075                1080

Leu His Pro Met Pro Arg Gly Cys Leu Ala Ser Glu Ser Ser Glu

```
                    1085                1090                1095

Gly His Val Thr Gly Ser Glu Ala Glu Leu Gln Glu Lys Val Ser
    1100                1105                1110

Met Cys Arg Ser Arg Ser Arg Ser Pro Arg Pro Arg Gly
    1115                1120                1125

Asp Ser Ala Tyr His Ser Gln Arg His Ser Leu Leu Thr Pro Val
    1130                1135                1140

Thr Pro Leu Ser Pro Pro Gly Leu Glu Glu Asp Val Asn Gly
    1145                1150                1155

Tyr Val Met Pro Asp Thr His Leu Lys Gly Thr Pro Ser Ser Arg
    1160                1165                1170

Glu Gly Thr Leu Ser Ser Val Gly Leu Ser Ser Val Leu Gly Thr
    1175                1180                1185

Glu Glu Glu Asp Glu Asp Glu Tyr Glu Tyr Met Asn Arg Arg
    1190                1195                1200

Arg Arg His Ser Pro Pro His Pro Pro Arg Pro Ser Ser Leu Glu
    1205                1210                1215

Glu Leu Gly Tyr Glu Tyr Met Asp Val Gly Ser Asp Leu Ser Ala
    1220                1225                1230

Ser Leu Gly Ser Thr Gln Ser Cys Pro Leu His Pro Val Pro Ile
    1235                1240                1245

Met Pro Thr Ala Gly Thr Thr Pro Asp Glu Asp Tyr Glu Tyr Met
    1250                1255                1260

Asn Arg Gln Arg Asp Gly Gly Gly Pro Gly Gly Asp Tyr Ala Ala
    1265                1270                1275

Met Gly Ala Cys Pro Ala Ser Glu Gln Gly Tyr Glu Glu Met Arg
    1280                1285                1290

Ala Phe Gln Gly Pro Gly His Gln Ala Pro His Val His Tyr Ala
    1295                1300                1305

Arg Leu Lys Thr Leu Arg Ser Leu Glu Ala Thr Asp Ser Ala Phe
    1310                1315                1320

Asp Asn Pro Asp Tyr Trp His Ser Arg Leu Phe Pro Lys Ala Asn
    1325                1330                1335

Ala Gln Arg Thr
    1340

<210> SEQ ID NO 116
<211> LENGTH: 345
<212> TYPE: PRT
<213> ORGANISM: Artificial Sequence
<220> FEATURE:
<223> OTHER INFORMATION: Fusion protein

<400> SEQUENCE: 116

Glu Glu Glu Leu Gln Val Ile Gln Pro Asp Lys Ser Val Ser Val Ala
1               5                   10                  15

Ala Gly Glu Ser Ala Ile Leu His Cys Thr Val Thr Ser Leu Ile Pro
            20                  25                  30

Val Gly Pro Ile Gln Trp Phe Arg Gly Ala Gly Pro Ala Arg Glu Leu
        35                  40                  45

Ile Tyr Asn Gln Lys Glu Gly His Phe Pro Arg Val Thr Thr Val Ser
    50                  55                  60

Glu Ser Thr Lys Arg Glu Asn Met Asp Phe Ser Ile Ser Ile Ser Asn
65                  70                  75                  80

Ile Thr Pro Ala Asp Ala Gly Thr Tyr Tyr Cys Val Lys Phe Arg Lys
```

```
                    85                  90                  95

Gly Ser Pro Asp Thr Glu Phe Lys Ser Gly Ala Gly Thr Glu Leu Ser
                100                 105                 110

Val Arg Ala Lys Pro Ser Asp Lys Thr His Thr Cys Pro Pro Cys Pro
            115                 120                 125

Ala Pro Glu Leu Leu Gly Gly Pro Ser Val Phe Leu Phe Pro Pro Lys
        130                 135                 140

Pro Lys Asp Thr Leu Met Ile Ser Arg Thr Pro Glu Val Thr Cys Val
145                 150                 155                 160

Val Val Asp Val Ser His Glu Asp Pro Glu Val Lys Phe Asn Trp Tyr
                165                 170                 175

Val Asp Gly Val Glu Val His Asn Ala Lys Thr Lys Pro Arg Glu Glu
            180                 185                 190

Gln Tyr Asn Ser Thr Tyr Arg Val Val Ser Val Leu Thr Val Leu His
        195                 200                 205

Gln Asp Trp Leu Asn Gly Lys Glu Tyr Lys Cys Lys Val Ser Asn Lys
    210                 215                 220

Ala Leu Pro Ala Pro Ile Glu Lys Thr Ile Ser Lys Ala Lys Gly Gln
225                 230                 235                 240

Pro Arg Glu Pro Gln Val Tyr Thr Leu Pro Pro Ser Arg Asp Glu Leu
                245                 250                 255

Thr Lys Asn Gln Val Ser Leu Thr Cys Leu Val Lys Gly Phe Tyr Pro
            260                 265                 270

Ser Asp Ile Ala Val Glu Trp Glu Ser Asn Gly Gln Pro Glu Asn Asn
        275                 280                 285

Tyr Lys Thr Thr Pro Pro Val Leu Asp Ser Asp Gly Ser Phe Phe Leu
    290                 295                 300

Tyr Ser Lys Leu Thr Val Asp Lys Ser Arg Trp Gln Gln Gly Asn Val
305                 310                 315                 320

Phe Ser Cys Ser Val Met His Glu Ala Leu His Asn His Tyr Thr Gln
                325                 330                 335

Lys Ser Leu Ser Leu Ser Pro Gly Lys
            340                 345

<210> SEQ ID NO 117
<211> LENGTH: 345
<212> TYPE: PRT
<213> ORGANISM: Artificial Sequence
<220> FEATURE:
<223> OTHER INFORMATION: Fusion protein

<400> SEQUENCE: 117

Glu Glu Glu Leu Gln Val Ile Gln Pro Asp Lys Ser Val Ser Val Ala
1               5                   10                  15

Ala Gly Glu Ser Ala Ile Leu His Cys Thr Val Thr Ser Leu Ile Pro
                20                  25                  30

Val Gly Pro Ile Gln Trp Phe Arg Gly Ala Gly Pro Ala Arg Glu Leu
            35                  40                  45

Ile Tyr Asn Gln Lys Glu Gly His Phe Pro Arg Val Thr Thr Val Ser
        50                  55                  60

Glu Ser Thr Lys Arg Glu Asn Met Asp Phe Ser Ile Ser Ile Ser Asn
65                  70                  75                  80

Ile Thr Pro Ala Asp Ala Gly Thr Tyr Tyr Cys Val Lys Phe Arg Lys
                85                  90                  95

Gly Ser Pro Asp Thr Glu Phe Lys Ser Gly Ala Gly Thr Glu Leu Ser
```

```
                100                 105                 110
Val Arg Ala Lys Pro Ser Asp Lys Thr His Thr Cys Pro Cys Pro
            115                 120                 125
Ala Pro Glu Leu Leu Gly Gly Pro Ser Val Phe Leu Phe Pro Pro
            130                 135                 140
Pro Lys Asp Thr Leu Met Ile Ser Arg Thr Pro Glu Val Thr Cys Val
145                 150                 155                 160
Val Val Asp Val Ser His Glu Asp Pro Glu Val Lys Phe Asn Trp Tyr
                165                 170                 175
Val Asp Gly Val Glu Val His Asn Ala Lys Thr Lys Pro Arg Glu Glu
            180                 185                 190
Gln Tyr Asn Ser Thr Tyr Arg Val Val Ser Val Leu Thr Val Leu His
            195                 200                 205
Gln Asp Trp Leu Asn Gly Lys Glu Tyr Lys Cys Lys Val Ser Asn Lys
            210                 215                 220
Ala Leu Pro Ala Pro Ile Glu Lys Thr Ile Ser Lys Ala Lys Gly Gln
225                 230                 235                 240
Pro Arg Glu Pro Gln Val Tyr Thr Leu Pro Pro Ser Arg Asp Glu Leu
                245                 250                 255
Thr Lys Asn Gln Val Ser Leu Thr Cys Leu Val Lys Gly Phe Tyr Pro
            260                 265                 270
Ser Asp Ile Ala Val Glu Trp Glu Ser Asn Gly Gln Pro Glu Asn Asn
            275                 280                 285
Tyr Lys Thr Thr Pro Pro Val Leu Asp Ser Asp Gly Ser Phe Phe Leu
            290                 295                 300
Tyr Ser Lys Leu Thr Val Asp Lys Ser Arg Trp Gln Gln Gly Asn Val
305                 310                 315                 320
Phe Ser Cys Ser Val Met His Glu Ala Leu His Asn His Tyr Thr Gln
                325                 330                 335
Lys Ser Leu Ser Leu Ser Pro Gly Lys
            340                 345

<210> SEQ ID NO 118
<211> LENGTH: 347
<212> TYPE: PRT
<213> ORGANISM: Artificial Sequence
<220> FEATURE:
<223> OTHER INFORMATION: Fusion protein

<400> SEQUENCE: 118

Glu Glu Glu Leu Gln Val Ile Gln Pro Asp Lys Ser Val Ser Val Ala
1               5                   10                  15
Ala Gly Glu Ser Ala Ile Leu His Cys Thr Val Thr Ser Leu Ile Pro
            20                  25                  30
Val Gly Pro Ile Gln Trp Phe Arg Gly Ala Gly Pro Ala Arg Glu Leu
        35                  40                  45
Ile Tyr Asn Gln Lys Glu Gly His Phe Pro Arg Val Thr Thr Val Ser
    50                  55                  60
Glu Ser Thr Lys Arg Glu Asn Met Asp Phe Ser Ile Ser Ile Ser Asn
65                  70                  75                  80
Ile Thr Pro Ala Asp Ala Gly Thr Tyr Tyr Cys Val Lys Phe Arg Lys
                85                  90                  95
Gly Ser Pro Asp Thr Glu Phe Lys Ser Gly Ala Gly Thr Glu Leu Ser
            100                 105                 110
Val Arg Ala Lys Pro Ser Glu Ser Lys Tyr Gly Pro Pro Cys Pro Pro
```

115                 120                 125

Cys Pro Ala Pro Glu Phe Leu Gly Gly Pro Ser Val Phe Leu Phe Pro
    130                 135                 140

Pro Lys Pro Lys Asp Thr Leu Met Ile Ser Arg Thr Pro Glu Val Thr
145                 150                 155                 160

Cys Val Val Val Asp Val Ser Gln Glu Asp Pro Glu Val Gln Phe Asn
                165                 170                 175

Trp Tyr Val Asp Gly Val Glu Val His Asn Ala Lys Thr Lys Pro Arg
            180                 185                 190

Glu Glu Gln Phe Asn Ser Thr Tyr Arg Val Val Ser Val Leu Thr Val
        195                 200                 205

Leu His Gln Asp Trp Leu Asn Gly Lys Glu Tyr Lys Cys Lys Val Ser
    210                 215                 220

Asn Lys Gly Leu Pro Ser Ser Ile Glu Lys Thr Ile Ser Lys Ala Lys
225                 230                 235                 240

Gly Gln Pro Arg Glu Pro Gln Val Tyr Thr Leu Pro Pro Ser Gln Glu
                245                 250                 255

Glu Met Thr Lys Asn Gln Val Ser Leu Thr Cys Leu Val Lys Gly Phe
            260                 265                 270

Tyr Pro Ser Asp Ile Ala Val Glu Trp Glu Ser Asn Gly Gln Pro Glu
        275                 280                 285

Asn Asn Tyr Lys Thr Thr Pro Pro Val Leu Asp Ser Asp Gly Ser Phe
    290                 295                 300

Phe Leu Tyr Ser Arg Leu Thr Val Asp Lys Ser Arg Trp Gln Glu Gly
305                 310                 315                 320

Asn Val Phe Ser Cys Ser Val Met His Glu Ala Leu His Asn His Tyr
                325                 330                 335

Thr Gln Lys Ser Leu Ser Leu Ser Leu Gly Lys
            340                 345

<210> SEQ ID NO 119
<211> LENGTH: 119
<212> TYPE: PRT
<213> ORGANISM: Artificial Sequence
<220> FEATURE:
<223> OTHER INFORMATION: Heavy chain variable region

<400> SEQUENCE: 119

Glu Val Gln Leu Val Glu Ser Gly Gly Gly Val Val Gln Pro Gly Arg
1               5                   10                  15

Ser Leu Arg Leu Ser Cys Ser Ser Gly Phe Thr Phe Ser Asp Tyr
            20                  25                  30

Tyr Met Tyr Trp Val Arg Gln Ala Pro Gly Lys Gly Leu Glu Trp Val
        35                  40                  45

Ala Tyr Met Ser Asn Val Gly Ala Ile Thr Tyr Pro Asp Thr Val
    50                  55                  60

Lys Gly Arg Phe Thr Ile Ser Arg Asp Asn Ser Lys Asn Thr Leu Phe
65                  70                  75                  80

Leu Gln Met Asp Ser Leu Arg Pro Glu Asp Thr Gly Val Tyr Phe Cys
                85                  90                  95

Ala Arg Gly Thr Arg Asp Gly Ser Trp Phe Ala Tyr Trp Gly Gln Gly
            100                 105                 110

Thr Pro Val Thr Val Ser Ser
        115

```
<210> SEQ ID NO 120
<211> LENGTH: 119
<212> TYPE: PRT
<213> ORGANISM: Artificial Sequence
<220> FEATURE:
<223> OTHER INFORMATION: Heavy chain variable region

<400> SEQUENCE: 120
```

Glu Val Gln Leu Val Glu Ser Gly Gly Gly Val Val Gln Pro Gly Arg
1               5                   10                  15

Ser Leu Arg Leu Ser Cys Ser Thr Gly Phe Thr Phe Ser Asp Tyr
            20                  25                  30

Tyr Met Tyr Trp Val Arg Gln Ala Pro Gly Lys Gly Leu Glu Trp Val
        35                  40                  45

Ala Tyr Met Ser Asn Val Gly Ala Ile Thr Asp Tyr Pro Asp Thr Val
    50                  55                  60

Lys Gly Arg Phe Thr Ile Ser Arg Asp Asn Ser Lys Asn Thr Leu Phe
65                  70                  75                  80

Leu Gln Met Asp Ser Leu Arg Pro Glu Asp Thr Gly Val Tyr Phe Cys
                85                  90                  95

Ala Arg Gly Thr Arg Asp Gly Ser Trp Phe Ala Tyr Trp Gly Gln Gly
            100                 105                 110

Thr Pro Val Thr Val Ser Ser
        115

```
<210> SEQ ID NO 121
<211> LENGTH: 119
<212> TYPE: PRT
<213> ORGANISM: Artificial Sequence
<220> FEATURE:
<223> OTHER INFORMATION: Heavy chain variable region

<400> SEQUENCE: 121
```

Glu Val Gln Leu Val Glu Ser Gly Gly Gly Val Val Gln Pro Gly Arg
1               5                   10                  15

Ser Leu Arg Leu Ser Cys Ser Ser Gly Phe Thr Phe Ser Asp Tyr
            20                  25                  30

Tyr Met Tyr Trp Val Arg Gln Ala Pro Gly Lys Gly Leu Glu Trp Val
        35                  40                  45

Ala Tyr Met Ser Asn Val Gly Ala Ile Thr Asp Tyr Pro Asp Thr Val
    50                  55                  60

Lys Gly Arg Phe Thr Ile Ser Arg Asp Asn Ala Lys Asn Thr Leu Phe
65                  70                  75                  80

Leu Gln Met Asp Ser Leu Arg Pro Glu Asp Thr Gly Val Tyr Phe Cys
                85                  90                  95

Ala Arg Gly Thr Arg Asp Gly Ser Trp Phe Ala Tyr Trp Gly Gln Gly
            100                 105                 110

Thr Pro Val Thr Val Ser Ser
        115

```
<210> SEQ ID NO 122
<211> LENGTH: 119
<212> TYPE: PRT
<213> ORGANISM: Artificial Sequence
<220> FEATURE:
<223> OTHER INFORMATION: Heavy chain variable region

<400> SEQUENCE: 122
```

Glu Val Gln Leu Val Glu Ser Gly Gly Gly Val Val Gln Pro Gly Arg
1               5                   10                  15

```
Ser Leu Arg Leu Ser Cys Ser Ser Gly Phe Thr Phe Ser Asp Tyr
            20                  25                  30

Tyr Met Tyr Trp Val Arg Gln Ala Pro Gly Lys Gly Leu Glu Trp Val
        35                  40                  45

Ala Tyr Met Ser Asn Val Gly Ala Ile Thr Asp Tyr Pro Asp Thr Val
 50                  55                  60

Lys Gly Arg Phe Thr Ile Ser Arg Asp Asn Ala Lys Ser Thr Leu Phe
65                   70                  75                  80

Leu Gln Met Asp Ser Leu Arg Pro Glu Asp Thr Gly Val Tyr Phe Cys
                85                  90                  95

Ala Arg Gly Thr Arg Asp Gly Ser Trp Phe Ala Tyr Trp Gly Gln Gly
                100                 105                 110

Thr Pro Val Thr Val Ser Ser
            115
```

<210> SEQ ID NO 123
<211> LENGTH: 119
<212> TYPE: PRT
<213> ORGANISM: Artificial Sequence
<220> FEATURE:
<223> OTHER INFORMATION: Heavy chain variable region

<400> SEQUENCE: 123

```
Glu Val Gln Leu Val Glu Ser Gly Gly Gly Val Val Gln Pro Gly Arg
1               5                   10                  15

Ser Leu Arg Leu Ser Cys Ser Ser Gly Phe Thr Phe Ser Asp Tyr
            20                  25                  30

Tyr Met Tyr Trp Val Arg Gln Ala Pro Gly Lys Gly Leu Glu Trp Val
        35                  40                  45

Ala Tyr Met Ser Asn Val Gly Ala Ile Thr Asp Tyr Pro Asp Thr Val
 50                  55                  60

Lys Gly Arg Phe Thr Ile Ser Arg Asp Asn Ala Lys Ser Thr Leu Tyr
65                   70                  75                  80

Leu Gln Met Asp Ser Leu Arg Pro Glu Asp Thr Gly Val Tyr Phe Cys
                85                  90                  95

Ala Arg Gly Thr Arg Asp Gly Ser Trp Phe Ala Tyr Trp Gly Gln Gly
                100                 105                 110

Thr Pro Val Thr Val Ser Ser
            115
```

<210> SEQ ID NO 124
<211> LENGTH: 112
<212> TYPE: PRT
<213> ORGANISM: Artificial Sequence
<220> FEATURE:
<223> OTHER INFORMATION: Light chain variable region

<400> SEQUENCE: 124

```
Asp Ile Gln Met Thr Gln Ser Pro Ser Ser Leu Ser Ala Ser Val Gly
1               5                   10                  15

Asp Arg Val Thr Ile Thr Cys Arg Ser Ser Gln Arg Ile Val His Ser
            20                  25                  30

Asn Gly Asn Thr Tyr Leu Glu Trp Tyr Gln Gln Thr Pro Gly Lys Ala
        35                  40                  45

Pro Lys Leu Leu Ile Tyr Lys Val Ser Asn Arg Phe Ser Gly Val Pro
 50                  55                  60

Ser Arg Phe Ser Gly Ser Gly Ser Gly Thr Asp Tyr Thr Phe Thr Ile
```

```
                 65                  70                  75                  80
Ser Ser Leu Gln Pro Glu Asp Ile Ala Thr Tyr Tyr Cys Phe Gln Gly
                85                  90                  95
Ser His Val Pro Phe Thr Phe Gly Gln Gly Thr Lys Leu Gln Ile Thr
               100                 105                 110

<210> SEQ ID NO 125
<211> LENGTH: 112
<212> TYPE: PRT
<213> ORGANISM: Artificial Sequence
<220> FEATURE:
<223> OTHER INFORMATION: Light chain variable region

<400> SEQUENCE: 125

Asp Ile Gln Met Thr Gln Ser Pro Ser Ser Leu Ser Ala Ser Val Gly
1               5                   10                  15
Asp Arg Val Thr Ile Thr Cys Arg Ser Ser Gln Arg Ile Val His Ser
                20                  25                  30
Asn Gly Asn Thr Tyr Leu Glu Trp Tyr Gln Gln Thr Pro Gly Lys Ala
            35                  40                  45
Pro Lys Leu Leu Ile Tyr Lys Val Ser Asn Arg Phe Ser Gly Val Pro
        50                  55                  60
Ser Arg Phe Ser Gly Ser Gly Ser Gly Thr Asp Phe Thr Phe Thr Ile
65                  70                  75                  80
Ser Ser Leu Gln Pro Glu Asp Ile Ala Thr Tyr Tyr Cys Phe Gln Gly
                85                  90                  95
Ser His Val Pro Phe Thr Phe Gly Gln Gly Thr Lys Leu Gln Ile Thr
               100                 105                 110

<210> SEQ ID NO 126
<211> LENGTH: 10
<212> TYPE: PRT
<213> ORGANISM: Artificial Sequence
<220> FEATURE:
<223> OTHER INFORMATION: Heavy chain N-terminal region

<400> SEQUENCE: 126

Glu Val Gln Leu Val Glu Ser Gly Gly Gly
1               5                   10

<210> SEQ ID NO 127
<211> LENGTH: 5
<212> TYPE: PRT
<213> ORGANISM: Artificial Sequence
<220> FEATURE:
<223> OTHER INFORMATION: Heavy chain CDR1

<400> SEQUENCE: 127

Asp Tyr Tyr Met Tyr
1               5

<210> SEQ ID NO 128
<211> LENGTH: 17
<212> TYPE: PRT
<213> ORGANISM: Artificial Sequence
<220> FEATURE:
<223> OTHER INFORMATION: Heavy chain CDR2

<400> SEQUENCE: 128

Tyr Met Ser Asn Val Gly Ala Ile Thr Asp Tyr Pro Asp Thr Val Lys
1               5                   10                  15
Gly
```

<210> SEQ ID NO 129
<211> LENGTH: 10
<212> TYPE: PRT
<213> ORGANISM: Artificial Sequence
<220> FEATURE:
<223> OTHER INFORMATION: Heavy chain CDR3

<400> SEQUENCE: 129

Gly Thr Arg Asp Gly Ser Trp Phe Ala Tyr
1               5                   10

<210> SEQ ID NO 130
<211> LENGTH: 10
<212> TYPE: PRT
<213> ORGANISM: Artificial Sequence
<220> FEATURE:
<223> OTHER INFORMATION: Light chain N-terminal region

<400> SEQUENCE: 130

Asp Ile Gln Met Thr Gln Ser Pro Ser Ser
1               5                   10

<210> SEQ ID NO 131
<211> LENGTH: 16
<212> TYPE: PRT
<213> ORGANISM: Artificial Sequence
<220> FEATURE:
<223> OTHER INFORMATION: Light chain CDR1

<400> SEQUENCE: 131

Arg Ser Ser Gln Arg Ile Val His Ser Asn Gly Asn Thr Tyr Leu Glu
1               5                   10                  15

<210> SEQ ID NO 132
<211> LENGTH: 7
<212> TYPE: PRT
<213> ORGANISM: Artificial Sequence
<220> FEATURE:
<223> OTHER INFORMATION: Light chain CDR2

<400> SEQUENCE: 132

Lys Val Ser Asn Arg Phe Ser
1               5

<210> SEQ ID NO 133
<211> LENGTH: 9
<212> TYPE: PRT
<213> ORGANISM: Artificial Sequence
<220> FEATURE:
<223> OTHER INFORMATION: Light chain CDR3

<400> SEQUENCE: 133

Phe Gln Gly Ser His Val Pro Phe Thr
1               5

<210> SEQ ID NO 134
<211> LENGTH: 672
<212> TYPE: PRT
<213> ORGANISM: Artificial Sequence
<220> FEATURE:
<223> OTHER INFORMATION: Mutated and Conjugated Protein
<220> FEATURE:
<221> NAME/KEY: MISC_FEATURE
<222> LOCATION: (459)..(672)
<223> OTHER INFORMATION: Light Chain

<400> SEQUENCE: 134

```
Glu Val Gln Leu Gln Gln Ser Gly Pro Asp Leu Val Lys Pro Gly Ala
1               5                   10                  15

Ser Val Lys Ile Ser Cys Lys Ala Ser Gly Tyr Ser Phe Thr Gly Tyr
            20                  25                  30

Tyr Met His Trp Val Lys Gln Ser Pro Gly Lys Gly Leu Glu Trp Ile
        35                  40                  45

Gly Arg Ile Asn Pro Asn Asn Gly Val Thr Leu Tyr Asn Gln Lys Phe
    50                  55                  60

Lys Asp Lys Ala Thr Leu Thr Val Asp Lys Ser Ser Thr Thr Ala Tyr
65                  70                  75                  80

Met Glu Leu Arg Ser Leu Thr Ser Glu Asp Ser Ala Val Tyr Tyr Cys
                85                  90                  95

Ala Arg Ser Thr Met Ile Thr Asn Tyr Val Met Asp Tyr Trp Gly Gln
                100                 105                 110

Gly Thr Ser Val Thr Val Ser Ser Ala Lys Thr Thr Pro Pro Ser Val
            115                 120                 125

Tyr Pro Leu Ala Pro Gly Ser Ala Ala Gln Thr Asn Ser Met Val Thr
        130                 135                 140

Leu Gly Cys Leu Val Lys Gly Tyr Phe Pro Glu Pro Val Thr Val Thr
145                 150                 155                 160

Trp Asn Ser Gly Ser Leu Ser Ser Gly Val His Thr Phe Pro Ala Val
                165                 170                 175

Leu Gln Ser Asp Leu Tyr Thr Leu Ser Ser Ser Val Thr Val Pro Ser
                180                 185                 190

Ser Thr Trp Pro Ser Glu Thr Val Thr Cys Asn Val Ala His Pro Ala
            195                 200                 205

Ser Ser Thr Lys Val Asp Lys Lys Ile Val Pro Arg Asp Ser Gly Gly
210                 215                 220

Pro Ser Glu Lys Ser Glu Glu Ile Asn Glu Lys Asp Leu Arg Lys Lys
225                 230                 235                 240

Ser Glu Leu Gln Gly Thr Ala Leu Gly Asn Leu Lys Gln Ile Tyr Tyr
                245                 250                 255

Tyr Asn Ser Lys Ala Ile Thr Ser Ser Glu Lys Ser Ala Asp Gln Phe
            260                 265                 270

Leu Thr Asn Thr Leu Leu Phe Lys Gly Phe Phe Thr Gly His Pro Trp
            275                 280                 285

Tyr Asn Asp Leu Leu Val Asp Leu Gly Ser Thr Ala Ala Thr Ser Glu
    290                 295                 300

Tyr Glu Gly Ser Ser Val Asp Leu Tyr Gly Ala Tyr Tyr Gly Tyr Gln
305                 310                 315                 320

Cys Ala Gly Gly Thr Pro Asn Lys Thr Ala Cys Met Tyr Gly Gly Val
                325                 330                 335

Thr Leu His Asp Asn Asn Arg Leu Thr Glu Glu Lys Lys Val Pro Ile
            340                 345                 350

Asn Leu Trp Ile Asp Gly Lys Gln Thr Thr Val Pro Ile Asp Lys Val
            355                 360                 365

Lys Thr Ser Lys Lys Glu Val Thr Val Gln Glu Leu Asp Leu Gln Ala
    370                 375                 380

Arg His Tyr Leu His Gly Lys Phe Gly Leu Tyr Asn Ser Asp Ser Phe
385                 390                 395                 400

Gly Gly Lys Val Gln Arg Gly Leu Ile Val Phe His Ser Ser Glu Gly
                405                 410                 415
```

```
Ser Thr Val Ser Tyr Asp Leu Phe Asp Ala Gln Gly Gln Tyr Pro Asp
            420                 425                 430

Thr Leu Leu Arg Ile Tyr Arg Asp Asn Thr Thr Ile Ser Ser Thr Ser
            435                 440                 445

Leu Ser Ile Ser Leu Tyr Leu Tyr Thr Thr Ser Ile Val Met Thr Gln
            450                 455                 460

Thr Pro Thr Ser Leu Leu Val Ser Ala Gly Asp Arg Val Thr Ile Thr
465                 470                 475                 480

Cys Lys Ala Ser Gln Ser Val Ser Asn Asp Val Ala Trp Tyr Gln Gln
                    485                 490                 495

Lys Pro Gly Gln Ser Pro Lys Leu Leu Ile Ser Tyr Thr Ser Ser Arg
            500                 505                 510

Tyr Ala Gly Val Pro Asp Arg Phe Ser Gly Ser Gly Tyr Gly Thr Asp
            515                 520                 525

Phe Thr Leu Thr Ile Ser Ser Val Gln Ala Glu Asp Ala Ala Val Tyr
            530                 535                 540

Phe Cys Gln Gln Asp Tyr Asn Ser Pro Pro Thr Phe Gly Gly Gly Thr
545                 550                 555                 560

Lys Leu Glu Ile Lys Arg Ala Asp Ala Ala Pro Thr Val Ser Ile Phe
                    565                 570                 575

Pro Pro Ser Ser Glu Gln Leu Thr Ser Gly Gly Ala Ser Val Val Cys
            580                 585                 590

Phe Leu Asn Asn Phe Tyr Pro Lys Asp Ile Asn Val Lys Trp Lys Ile
            595                 600                 605

Asp Gly Ser Glu Arg Gln Asn Gly Val Leu Asn Ser Trp Thr Asp Gln
            610                 615                 620

Asp Ser Lys Asp Ser Thr Tyr Ser Met Ser Ser Thr Leu Thr Leu Thr
625                 630                 635                 640

Lys Asp Glu Tyr Glu Arg His Asn Ser Tyr Thr Cys Glu Ala Thr His
                    645                 650                 655

Lys Thr Ser Thr Ser Pro Ile Val Lys Ser Phe Asn Arg Asn Glu Ser
            660                 665                 670

<210> SEQ ID NO 135
<211> LENGTH: 458
<212> TYPE: PRT
<213> ORGANISM: Artificial Sequence
<220> FEATURE:
<223> OTHER INFORMATION: Synthetic polypeptide

<400> SEQUENCE: 135

Glu Val Gln Leu Gln Gln Ser Gly Pro Asp Leu Val Lys Pro Gly Ala
1               5                   10                  15

Ser Val Lys Ile Ser Cys Lys Ala Ser Gly Tyr Ser Phe Thr Gly Tyr
            20                  25                  30

Tyr Met His Trp Val Lys Gln Ser Pro Gly Lys Gly Leu Glu Trp Ile
        35                  40                  45

Gly Arg Ile Asn Pro Asn Asn Gly Val Thr Leu Tyr Asn Gln Lys Phe
    50                  55                  60

Lys Asp Lys Ala Thr Leu Thr Val Asp Lys Ser Ser Thr Thr Ala Tyr
65                  70                  75                  80

Met Glu Leu Arg Ser Leu Thr Ser Glu Asp Ser Ala Val Tyr Tyr Cys
                85                  90                  95

Ala Arg Ser Thr Met Ile Thr Asn Tyr Val Met Asp Tyr Trp Gly Gln
            100                 105                 110
```

```
Gly Thr Ser Val Thr Val Ser Ser Ala Lys Thr Thr Pro Pro Ser Val
            115                 120                 125

Tyr Pro Leu Ala Pro Gly Ser Ala Ala Gln Thr Asn Ser Met Val Thr
130                 135                 140

Leu Gly Cys Leu Val Lys Gly Tyr Phe Pro Glu Pro Val Thr Val Thr
145                 150                 155                 160

Trp Asn Ser Gly Ser Leu Ser Ser Gly Val His Thr Phe Pro Ala Val
                165                 170                 175

Leu Gln Ser Asp Leu Tyr Thr Leu Ser Ser Val Thr Val Pro Ser
            180                 185                 190

Ser Thr Trp Pro Ser Glu Thr Val Thr Cys Asn Val Ala His Pro Ala
            195                 200                 205

Ser Ser Thr Lys Val Asp Lys Lys Ile Val Pro Arg Asp Ser Gly Gly
        210                 215                 220

Pro Ser Glu Lys Ser Glu Glu Ile Asn Glu Lys Asp Leu Arg Lys Lys
225                 230                 235                 240

Ser Glu Leu Gln Gly Thr Ala Leu Gly Asn Leu Lys Gln Ile Tyr Tyr
                245                 250                 255

Tyr Asn Ser Lys Ala Ile Thr Ser Ser Glu Lys Ser Ala Asp Gln Phe
            260                 265                 270

Leu Thr Asn Thr Leu Leu Phe Lys Gly Phe Phe Thr Gly His Pro Trp
        275                 280                 285

Tyr Asn Asp Leu Leu Val Asp Leu Gly Ser Thr Ala Ala Thr Ser Glu
            290                 295                 300

Tyr Glu Gly Ser Ser Val Asp Leu Tyr Gly Ala Tyr Gly Tyr Gln
305                 310                 315                 320

Cys Ala Gly Gly Thr Pro Asn Lys Thr Ala Cys Met Tyr Gly Gly Val
                325                 330                 335

Thr Leu His Asp Asn Asn Arg Leu Thr Glu Glu Lys Lys Val Pro Ile
            340                 345                 350

Asn Leu Trp Ile Asp Gly Lys Gln Thr Thr Val Pro Ile Asp Lys Val
        355                 360                 365

Lys Thr Ser Lys Lys Glu Val Thr Val Gln Glu Leu Asp Leu Gln Ala
370                 375                 380

Arg His Tyr Leu His Gly Lys Phe Gly Leu Tyr Asn Ser Asp Ser Phe
385                 390                 395                 400

Gly Gly Lys Val Gln Arg Gly Leu Ile Val Phe His Ser Ser Glu Gly
                405                 410                 415

Ser Thr Val Ser Tyr Asp Leu Phe Asp Ala Gln Gly Gln Tyr Pro Asp
            420                 425                 430

Thr Leu Leu Arg Ile Tyr Arg Asp Asn Thr Thr Ile Ser Ser Thr Ser
        435                 440                 445

Leu Ser Ile Ser Leu Tyr Leu Tyr Thr Thr
450                 455

<210> SEQ ID NO 136
<211> LENGTH: 214
<212> TYPE: PRT
<213> ORGANISM: Artificial Sequence
<220> FEATURE:
<223> OTHER INFORMATION: Synthetic polypeptide

<400> SEQUENCE: 136

Ser Ile Val Met Thr Gln Thr Pro Thr Ser Leu Leu Val Ser Ala Gly
1               5                   10                  15
```

-continued

```
Asp Arg Val Thr Ile Thr Cys Lys Ala Ser Gln Ser Val Ser Asn Asp
            20                  25                  30
Val Ala Trp Tyr Gln Gln Lys Pro Gly Gln Ser Pro Lys Leu Leu Ile
        35                  40                  45
Ser Tyr Thr Ser Ser Arg Tyr Ala Gly Val Pro Asp Arg Phe Ser Gly
    50                  55                  60
Ser Gly Tyr Gly Thr Asp Phe Thr Leu Thr Ile Ser Ser Val Gln Ala
65                      70                  75                  80
Glu Asp Ala Ala Val Tyr Phe Cys Gln Gln Asp Tyr Asn Ser Pro Pro
                85                  90                      95
Thr Phe Gly Gly Gly Thr Lys Leu Glu Ile Lys Arg Ala Asp Ala Ala
            100                 105                 110
Pro Thr Val Ser Ile Phe Pro Pro Ser Ser Glu Gln Leu Thr Ser Gly
        115                 120                 125
Gly Ala Ser Val Val Cys Phe Leu Asn Asn Phe Tyr Pro Lys Asp Ile
    130                 135                 140
Asn Val Lys Trp Lys Ile Asp Gly Ser Glu Arg Gln Asn Gly Val Leu
145                 150                 155                 160
Asn Ser Trp Thr Asp Gln Asp Ser Lys Asp Ser Thr Tyr Ser Met Ser
            165                 170                 175
Ser Thr Leu Thr Leu Thr Lys Asp Glu Tyr Glu Arg His Asn Ser Tyr
            180                 185                 190
Thr Cys Glu Ala Thr His Lys Thr Ser Thr Ser Pro Ile Val Lys Ser
            195                 200                 205
Phe Asn Arg Asn Glu Ser
            210
```